US012590452B2

(12) United States Patent
Bowron

(10) Patent No.: US 12,590,452 B2
(45) Date of Patent: Mar. 31, 2026

(54) SYSTEMS AND METHODS FOR MODULAR CONSTRUCTION

(71) Applicant: Vector Meta Inc., Toronto (CA)

(72) Inventor: Julian L. W. Bowron, Toronto (CA)

(73) Assignee: Vector Meta Inc., Toronto (CA)

( * ) Notice: Subject to any disclaimer, the term of this patent is extended or adjusted under 35 U.S.C. 154(b) by 554 days.

(21) Appl. No.: 17/884,630

(22) Filed: Aug. 10, 2022

(65) Prior Publication Data

US 2023/0104556 A1 Apr. 6, 2023

Related U.S. Application Data

(63) Continuation of application No. PCT/CA2021/050188, filed on Feb. 19, 2021.

(Continued)

(51) Int. Cl.

*E04B 1/24* (2006.01)
*B66C 1/66* (2006.01)

(Continued)

(52) U.S. Cl.

CPC .............. *E04B 1/2403* (2013.01); *B66C 1/66* (2013.01); *B66C 13/08* (2013.01); *E04G 21/142* (2013.01);

(Continued)

(58) Field of Classification Search

CPC .. E04B 1/2403; E04B 1/34315; E04B 1/3483; E04B 2001/2415;

(Continued)

(56) References Cited

U.S. PATENT DOCUMENTS

| | | | |
|---|---|---|---|
| 2,994,415 | A | 8/1961 | Halle |
| 3,514,146 | A | 5/1970 | Zweifel et al. |

(Continued)

FOREIGN PATENT DOCUMENTS

| | | |
|---|---|---|
| CL | 61901 | 12/2018 |
| CN | 101680227 A | 3/2010 |

(Continued)

OTHER PUBLICATIONS

Mahoney, Stephen, "International Search Report and Written Opinion of the International Search Authority", dated May 25, 2021, PCT Application No. PCT/CA2021/05018, 14 pages.

(Continued)

*Primary Examiner* — Brian E Glessner
*Assistant Examiner* — Adam G Barlow

(57) ABSTRACT

A connection assembly for modular construction includes an upper junction connector coupled to an upper end of a column. The upper junction connector includes an upper end that has a planar upper surface, a recessed surface, and at least one connector sidewall extending between the upper surface and the recessed surface. The recessed surface and the at least one connector sidewall define a contiguous recessed area in the upper end that extends to second, third, and fourth edges of the upper end of the connector. A slot extends through the upper end adjacent to an interior surface of a column sidewall. A transverse bore extends through the first column sidewall proximate to and aligned with the slot.

16 Claims, 76 Drawing Sheets

Related U.S. Application Data

(60) Provisional application No. 62/979,065, filed on Feb. 20, 2020.

(51) Int. Cl.
*B66C 13/08* (2006.01)
*E04G 21/14* (2006.01)

(52) U.S. Cl.
CPC ................. *E04B 2001/2415* (2013.01); *E04B 2001/2418* (2013.01); *E04B 2001/2421* (2013.01); *E04B 2001/2451* (2013.01); *E04B 2001/246* (2013.01)

(58) Field of Classification Search
CPC ..... E04B 2001/2418; E04B 2001/2421; E04B 2001/2451; E04B 2001/246; E04B 2001/2406; E04B 2001/2448; F16B 7/04; F16B 7/0406; F16B 7/0413; F16B 7/042; F16B 7/18; B66C 1/66; B66C 13/08; B66C 1/10; B66C 1/64; E04G 21/142; Y10T 403/7001; Y10T 403/7003
See application file for complete search history.

(56) References Cited

U.S. PATENT DOCUMENTS

| | | | | |
|---|---|---|---|---|
| 3,945,741 | A * | 3/1976 | Wendt | E04B 1/5818 403/231 |
| 3,989,398 | A | 11/1976 | Wendt | |
| 4,439,966 | A | 4/1984 | Alles | |
| 4,563,031 | A | 1/1986 | Kishimoto et al. | |
| 5,785,359 | A * | 7/1998 | Nagai | F16B 7/046 403/255 |
| 5,836,131 | A | 11/1998 | Viola et al. | |
| 6,390,719 | B1 * | 5/2002 | Chan | E04B 1/5806 52/646 |
| 8,549,796 | B2 | 10/2013 | Heather | |
| 8,695,310 | B2 | 4/2014 | Tremblay | |
| 8,950,151 | B2 * | 2/2015 | Strickland | E04B 1/24 52/696 |
| 9,518,386 | B2 | 12/2016 | Ehsasi | |
| 10,006,193 | B1 * | 6/2018 | Liu | E04B 7/063 |
| 10,344,487 | B2 * | 7/2019 | Nyce | B60P 3/40 |
| 11,339,034 | B2 | 5/2022 | Sikora et al. | |
| 11,732,459 | B2 * | 8/2023 | Bowron | E04B 1/3483 52/655.1 |
| 2011/0047889 | A1 | 3/2011 | Gad et al. | |
| 2013/0152485 | A1 | 6/2013 | Austin et al. | |
| 2015/0377414 | A1 * | 12/2015 | Pirseyedi | F16B 7/0466 403/205 |
| 2017/0044753 | A1 | 2/2017 | Bowron | |
| 2017/0191515 | A1 * | 7/2017 | Kwon | E04B 1/3483 |
| 2023/0104556 | A1 * | 4/2023 | Bowron | B66C 13/08 52/125.6 |
| 2023/0125829 | A1 * | 4/2023 | Parkhouse | E04B 1/3483 52/79.13 |

FOREIGN PATENT DOCUMENTS

| | | | |
|---|---|---|---|
| CN | 103276799 | A | 9/2013 |
| CN | 203834666 | U | 9/2014 |
| CN | 204112497 | U | 1/2015 |
| CN | 105863067 | A | 8/2016 |
| CN | 107386437 | A | 11/2017 |
| CN | 107532418 | A | 1/2018 |
| CN | 207176924 | U | 4/2018 |
| CN | 207582668 | U | 7/2018 |
| CN | 109296080 | A | 2/2019 |
| CN | 109653367 | A | 4/2019 |
| CN | 110185152 | A | 8/2019 |
| CN | 110284514 | A | 9/2019 |
| CN | 209556139 | U | 10/2019 |
| DE | 19918153 | C2 | 5/2003 |
| DE | 102015216125 | A1 | 3/2017 |
| EP | 378523 | B1 | 3/1993 |
| JP | 03233042 | A | 10/1991 |
| JP | 2013245501 | A | 12/2013 |
| KR | 20050046439 | A | 5/2005 |
| KR | 100923637 | B1 | 10/2009 |
| KR | 101278983 | B1 | 6/2013 |
| KR | 1020150047701 | A | 5/2015 |
| WO | 2002057557 | A1 | 7/2002 |
| WO | 2014127472 | A1 | 8/2014 |
| WO | 2015164975 | A1 | 11/2015 |
| WO | 2017027965 | A1 | 2/2017 |
| WO | 2018111195 | A1 | 6/2018 |
| WO | 2020010463 | A1 | 1/2020 |
| WO | 2020144224 | A1 | 7/2020 |
| WO | 2021163804 | A1 | 8/2021 |
| WO | 2021194628 | A2 | 9/2021 |

OTHER PUBLICATIONS

Extended European Search Report issued May 29, 2024 in EP 21757390.6.

* cited by examiner

FIG. 83
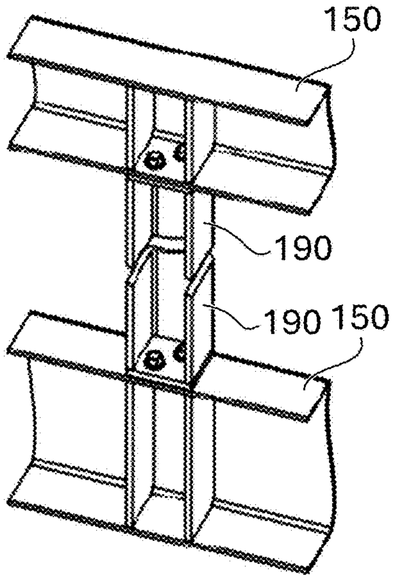
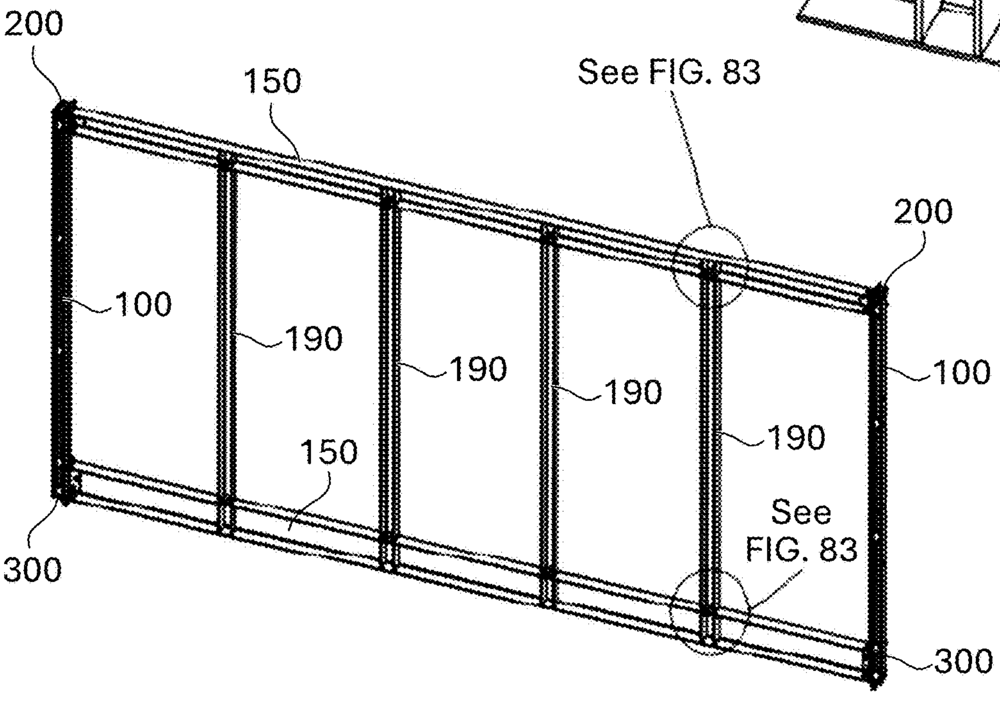
FIG. 82

FIG. 140
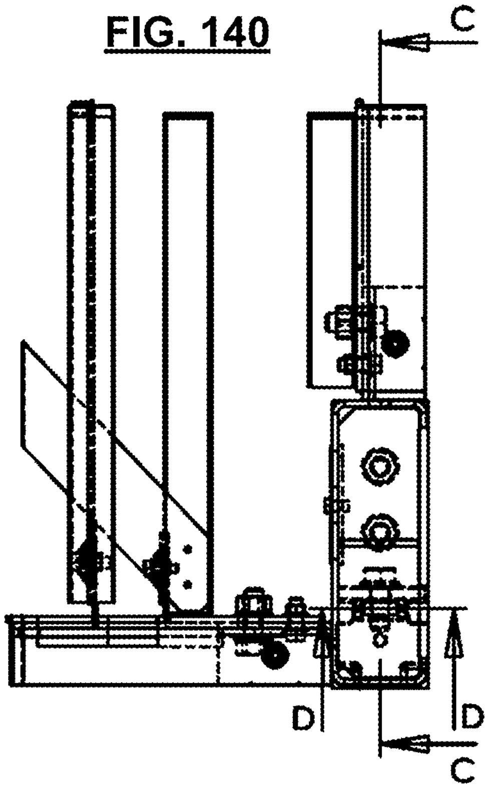
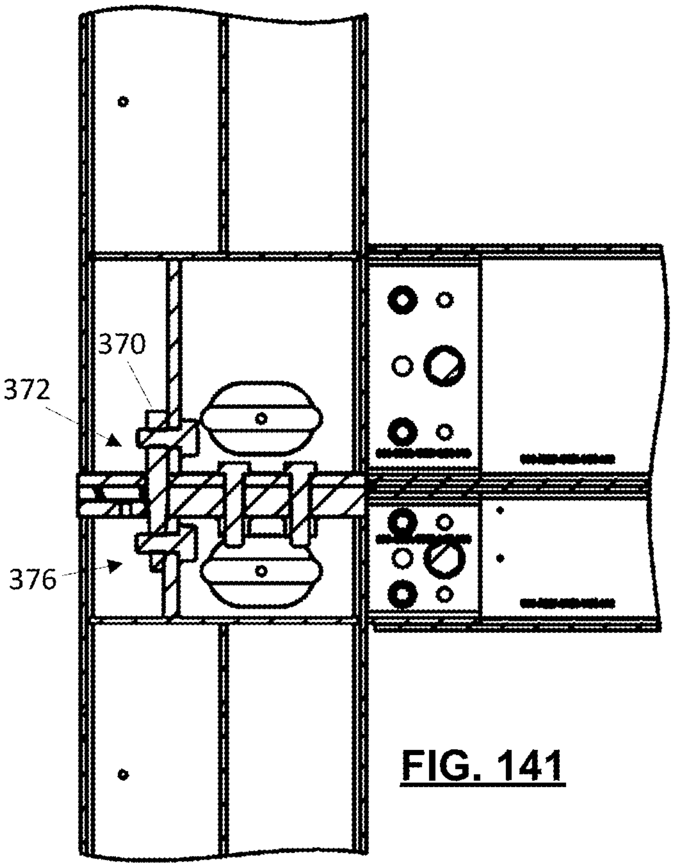
FIG. 141
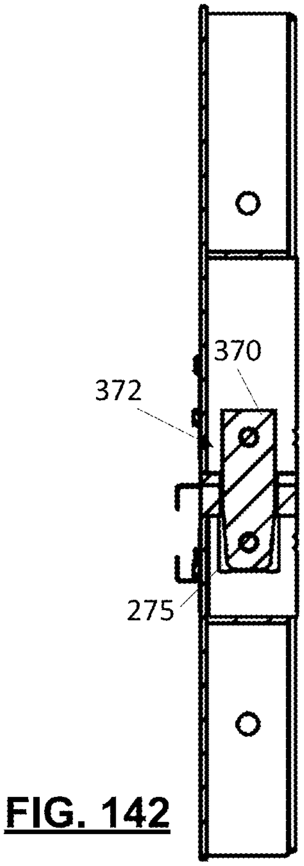
FIG. 142

SYSTEMS AND METHODS FOR MODULAR CONSTRUCTION

CROSS-REFERENCE TO RELATED APPLICATIONS

This application is a continuation of International Application No. PCT/CA2021/050188 filed on Feb. 19, 2021, which claims benefit of U.S. Provisional Application No. 62/979,065 filed on Feb. 20, 2020, each of which is hereby incorporated herein by reference in its entirety.

FIELD

This disclosure relates generally to systems and methods for modular construction, and more specifically to systems and methods for creating hoistable, self-bracing and non-self bracing structural modular units, for hoisting structural modular units, and for joining adjacent structural modular units to form buildings.

Introduction

Residential, commercial, and/or industrial buildings may be constructed using volumetric module frames made from metal (e.g. steel). Typically, module frames incorporate interconnection details that enable the on-site assembly of modules that are pre-fabricated (e.g. in an off-site factory) to form some or all of the frame of a building. Typically, the module frames are designed to meet building construction regulations and standards, to be non-combustible and resistant to decay, to resist wind loads, seismic loads, occupant loads and the loads of building systems such as cladding, elevators, etc.

In some cases, volumetric module frames may be assembled on-site and then the resulting structure may be fitted out. In other cases, pre-fabricated volumetric module frames may be fitted with one or more of: an interior floor; one or more interior partitions; a ceiling; fire-proofing; insulation; mechanical, plumbing, communication, and/or electrical systems; and exterior cladding, prior to being assembled into a building structure (e.g. off-site).

It is known to use structural steel (such as "I" beams, channels, angles and square, rectangular hollow steel sections, and the like) as the main load-bearing elements of a volumetric module frame by joining appropriate members directly to each other and/or to pre-fabricated connections, using mechanical fasteners, welding or other suitable methods).

It is also known that roll-formed and/or brake-formed light steel sections can be used for vertical, diagonal, and horizontal load-bearing elements of a building. These elements can be joined to each other (e.g. in a factory or other off-site location) to form pre-fabricated panels. Such pre-fabricated panels may be shipped to the site and assembled to form part of a building frame using threaded fasteners, rivets and the like, which may be driven through the light steel sections or through connections that are welded or otherwise fastened to the light steel sections.

It is also known that roll-formed and/or brake-formed light steel sections can be assembled in a factory setting to produce the frame of a hoistable module, which can be fit out in the factory and connected to other modules at a site to produce buildings of one or more stories.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The systems and methods disclosed herein may facilitate providing a system of components for the fabrication of self-bracing or externally braced volumetric module frames using predominantly light-weight, brake-formed and/or roll-formed open steel sections, and may also facilitate connecting light steel joists and studs to brake formed plate that results in a relatively strong moment connection (which may be referred to herein as a 'high fixity' connection). Such systems and methods may have one or more advantages.

For example, using light steel framing may produce a structure that is lighter in weight and easier to join than a corresponding structure made with structural steel. However, the inability of mechanical fasteners to handle large point loads, and/or the relative weakness of the members used in light steel framing can make it difficult to fasten the members to each other such that a moment or high-fixity connection is created. As a result, it is difficult to rig and hoist volumetric module frames made of such framing without damage due to excessive distortion or fastener shear, especially when hoisting is effected through a connection to the top face of the module frame (e.g. without the use of supporting slings under the module). Typically, such slings interfere with efficient and rapid building assembly.

The systems and methods disclosed herein may also provide a more secure connection between volumetric module frames both vertically and horizontally.

The systems and methods disclosed herein may also provide a more secure connection that can provide a distributed or 'flush' connection between vertically adjacent volumetric module frames when assembled, or that can alternatively provide a more secure local or 'point loaded' connection that can provide vertical separation between vertically adjacent volumetric module frames when assembled.

The systems and methods disclosed herein may also provide volumetric module frames without upwardly projecting members. This may have one or more advantages. For example, features that project upwardly from the top face of a module may present a safety hazard, e.g. due to the risk of workers tripping. They may also create an impediment to the protection of an incomplete building from precipitation, e.g. due to interference with tarpaulins used for that purpose. They may also cause difficulty with the placement of insulation and/or roofing on the top face of a completed building.

The systems disclosed herein may be provided as a precisely fabricated "kit of parts" that may require only relatively simple fixtures and fasteners for assembly at a modular plant. For example, one or more of the component parts may be compact and can be economically shipped to a modular production facility. Providing such a 'kit of parts' may have one or more advantages.

For example, assembling a volumetric module frame by welding the structural columns and beams to each other is a process typically regarded as being prone to the effects of heat-induced distortion and placement inaccuracy, as well as requiring extensive skilled labour. Therefore, such a process may require large investments in costly and/or complicated jigs, robotic equipment, and programming to position and retain the materials during the welding process.

As another example, shipping an assembled volumetric frame is typically considered inefficient, due, for example, to the low value of the frame relative to the cost of shipping, and that this inefficiency may be exacerbated for increased shipping distances.

The systems and methods disclosed herein may also facilitate the connection of services (e.g. water, electrical, communication, and the like) between adjacent modules in a manner that reduces the time and/or required skill level of on-site labour. This may be considered advantageous, as the work of connecting building systems such as electrical, communication and plumbing contained within modules, both to adjacent modules and to base-building systems, may be characterized as time-consuming, and/or may require specialized labour, which may be increasingly difficult to obtain and provide to work sites in certain jurisdictions.

The systems and methods disclosed herein may also facilitate a connection between volumetric module frames and truck beds, which may assist in transporting assembled module frames to a building site.

The systems and methods disclosed herein may also provide a connection between a top face of a module frame and a hoisting frame, which may facilitate the positioning the module frame above another module frame during assembly of a building.

The systems and methods disclosed herein may also facilitate the orientation of a volumetric module frame while it is being hoisted into position during assembly of a building, which may have one or more advantages. For example, it may allow a more efficient utilization of the heavy cranes used to assemble modular buildings. It may also facilitate the correct alignment and connection of a hoisting system to a module arriving at a building site, and/or facilitate the correct orientation of modules during erection of the building structure. The connection of modules to each other and/or the disconnection of modules from a hoisting system typically requires a number of workers who may be exposed to risks such as crush injuries, slip and fall injuries, working at heights, etc.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 82 is a perspective view of a wall frame of a volumetric module, in accordance with one embodiment;

FIG. 83 is an enlarged view of portions of FIG. 82;

FIG. 119 is an exploded view of the couplings of FIG. 118;

FIG. 120 is a side elevation view of the couplings between the horizontal structural members and the joist ends of FIG. 118;

FIG. 121 is a section view of one coupling between a horizontal structural member and a joist end of FIG. 120, taken along line M-M in FIG. 120;

FIG. 122 is a section view of the other coupling between a horizontal structural member and a joist end of FIG. 120, taken along line L-L in FIG. 120;

FIG. 123 is a perspective view of a coupling between adjacent mid-wall lower junction connectors in accordance with another embodiment;

FIG. 124 is a top plan view of the coupling between adjacent mid-wall lower junction connectors of FIG. 123;

FIG. 125 is a perspective view of a coupling between adjacent end-wall or outer corner lower junction connectors in accordance with another embodiment;

FIG. 126 is a top plan view of the coupling between adjacent end-wall or outer corner lower junction connectors of FIG. 125;

FIG. 127 is a perspective view of a coupling between adjacent end-wall or outer corner lower junction connectors in accordance with another embodiment;

FIG. 128 is a top plan view of the coupling between adjacent end-wall or outer corner lower junction connectors of FIG. 127;

FIG. 129 is a perspective view of a coupling between an upper junction connector and a lower junction connector in accordance with another embodiment;

FIG. 130 is a side elevation view of the coupling between the upper and lower junction connectors of FIG. 129;

Figure 129:
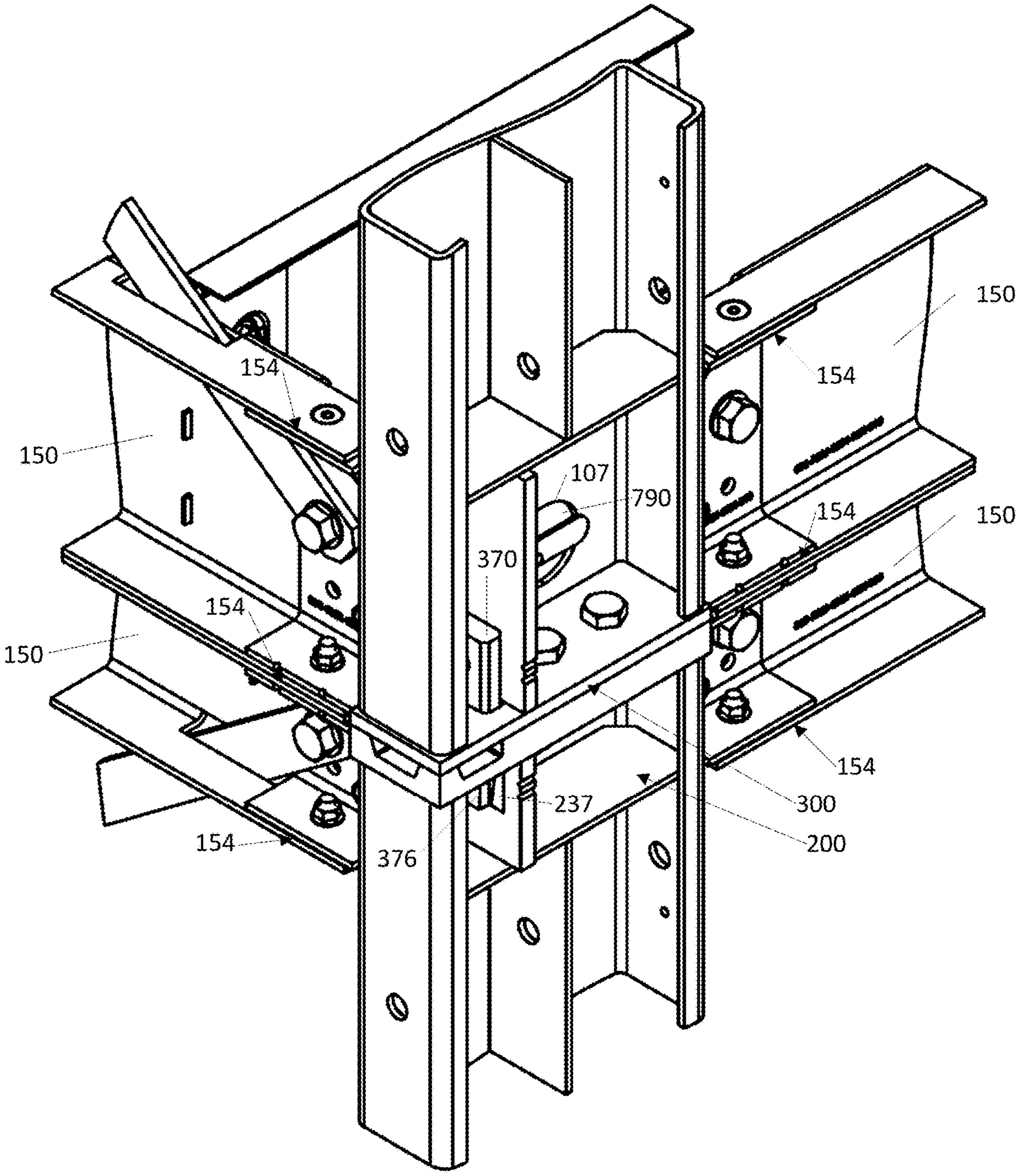
Figure 131:
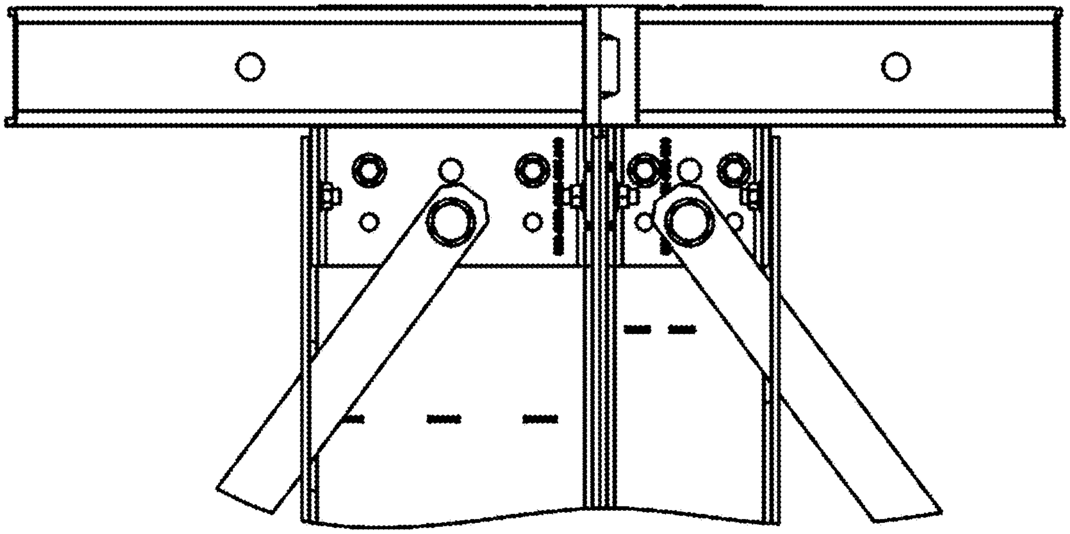
Figure 130:
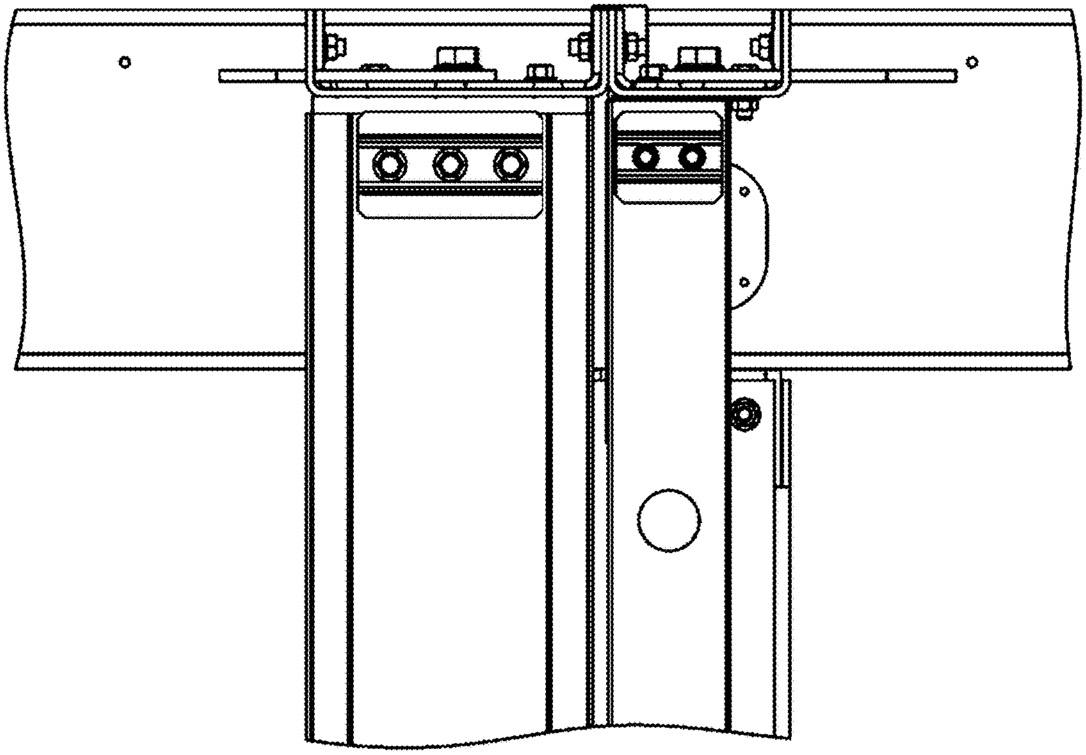
Figure 133:
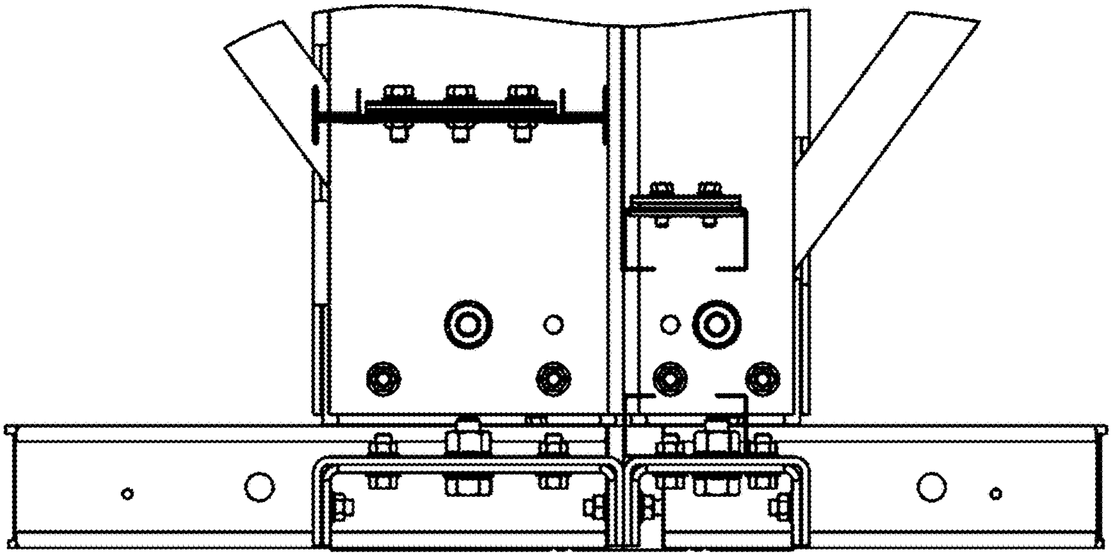
Figure 132:
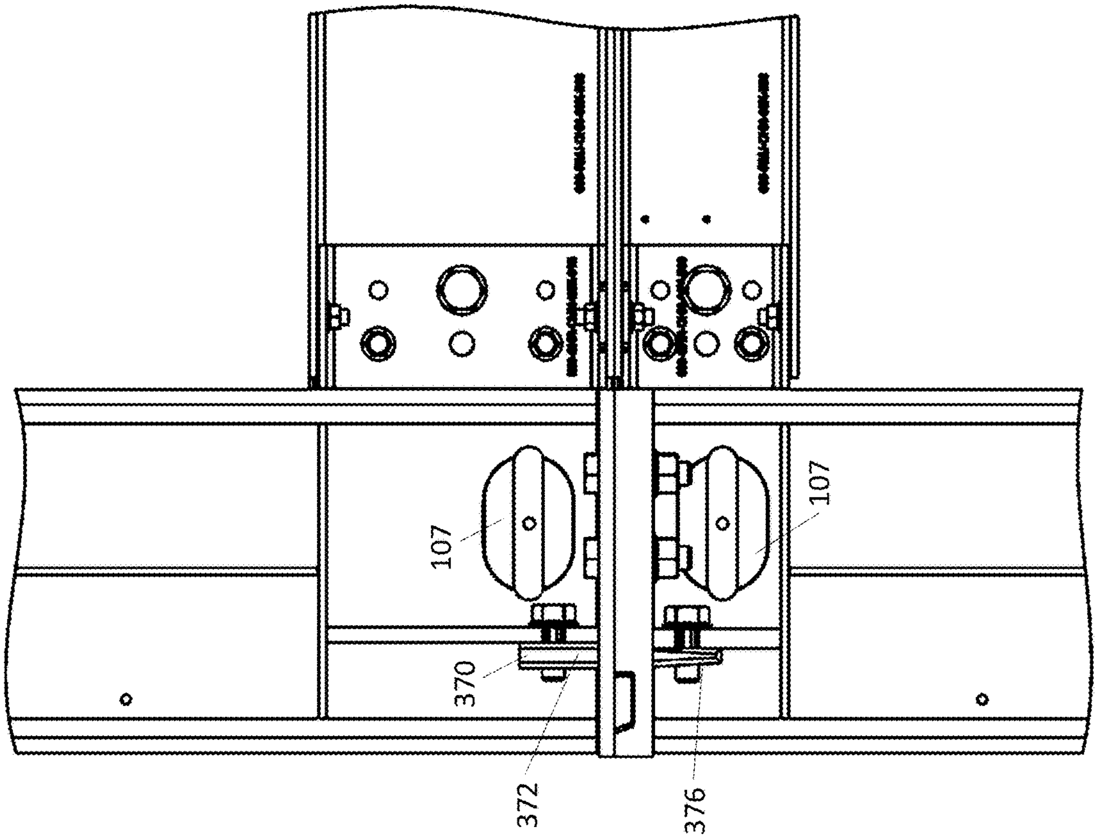
Figure 134:
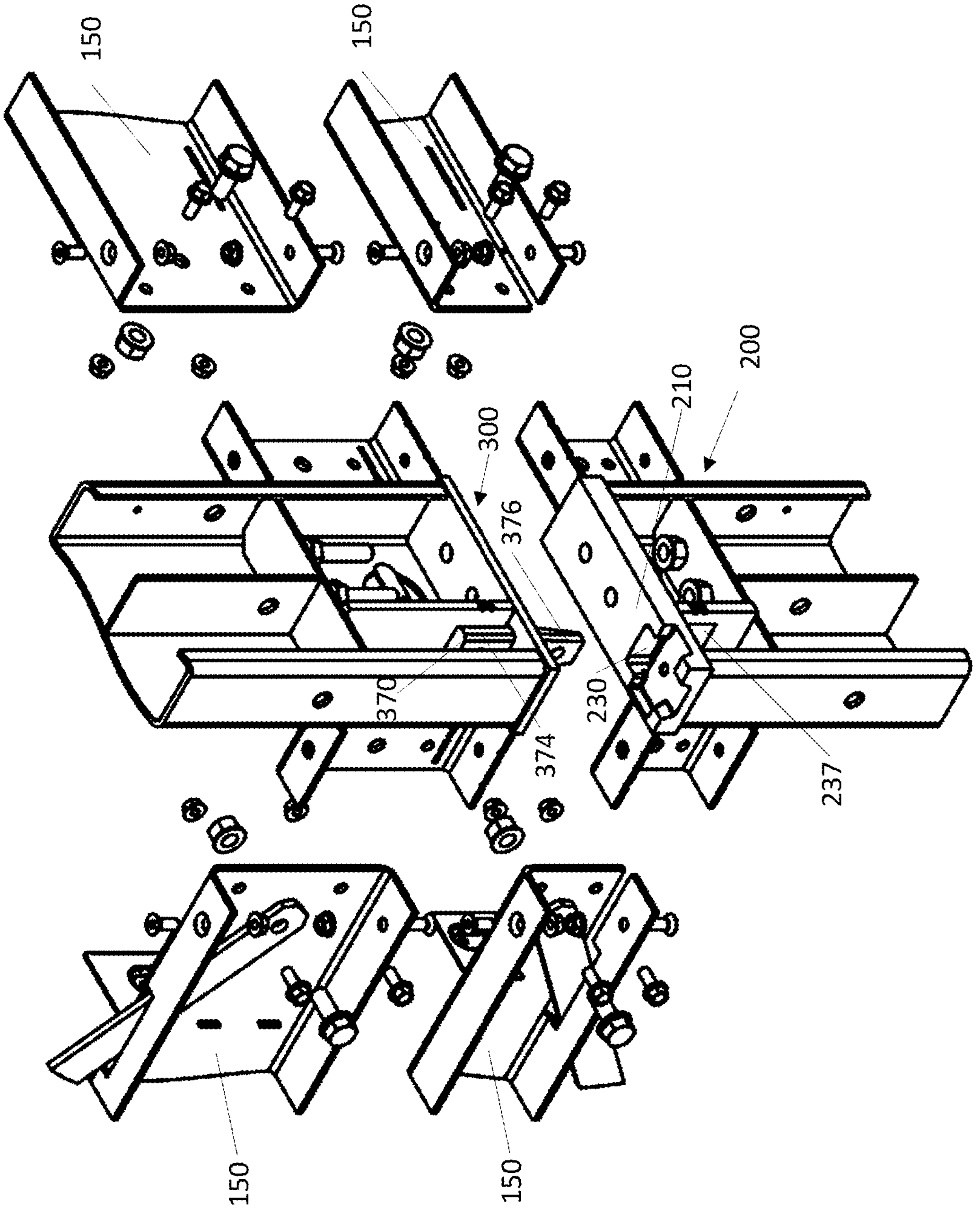
Figure 135:
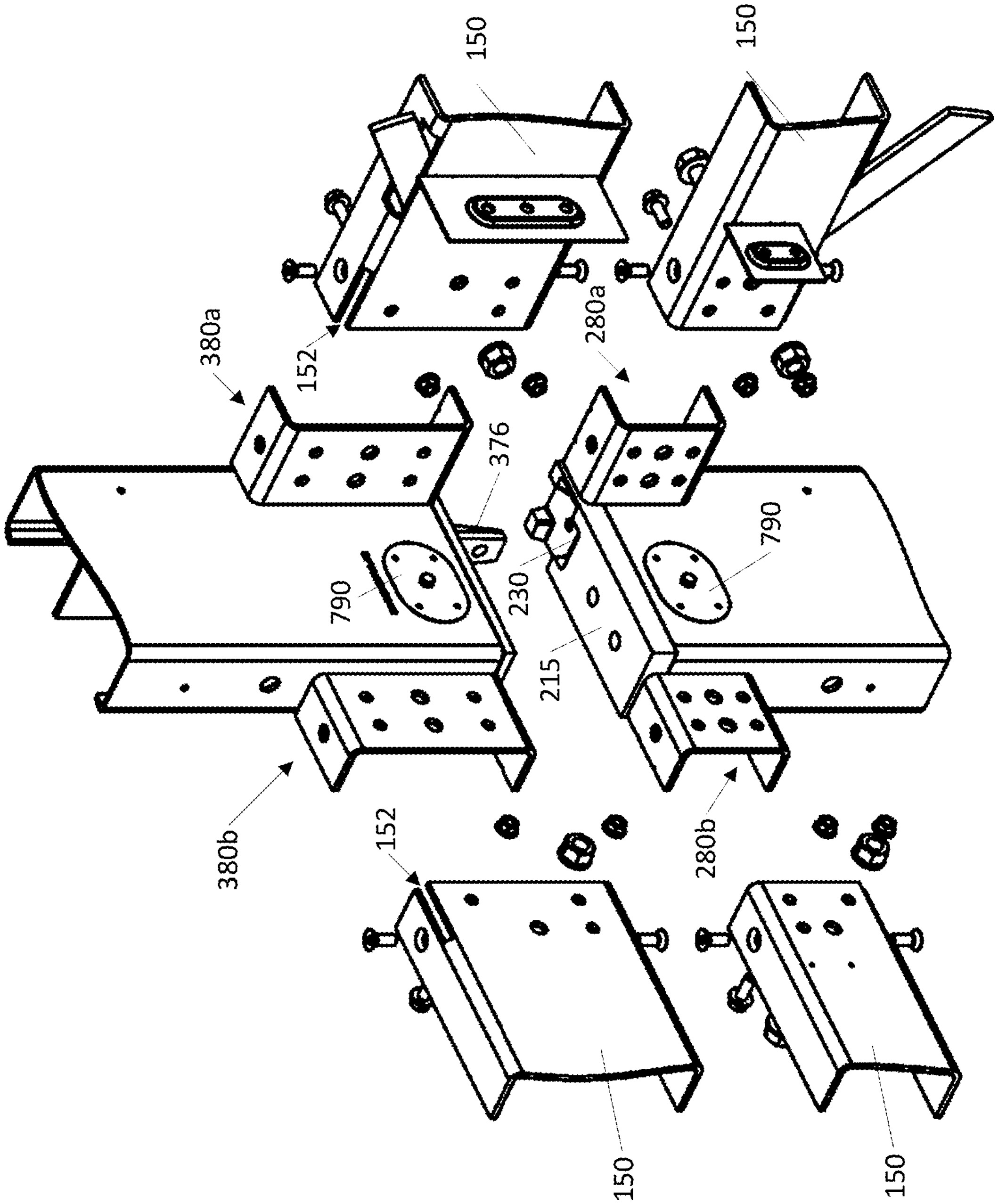
Figure 136:
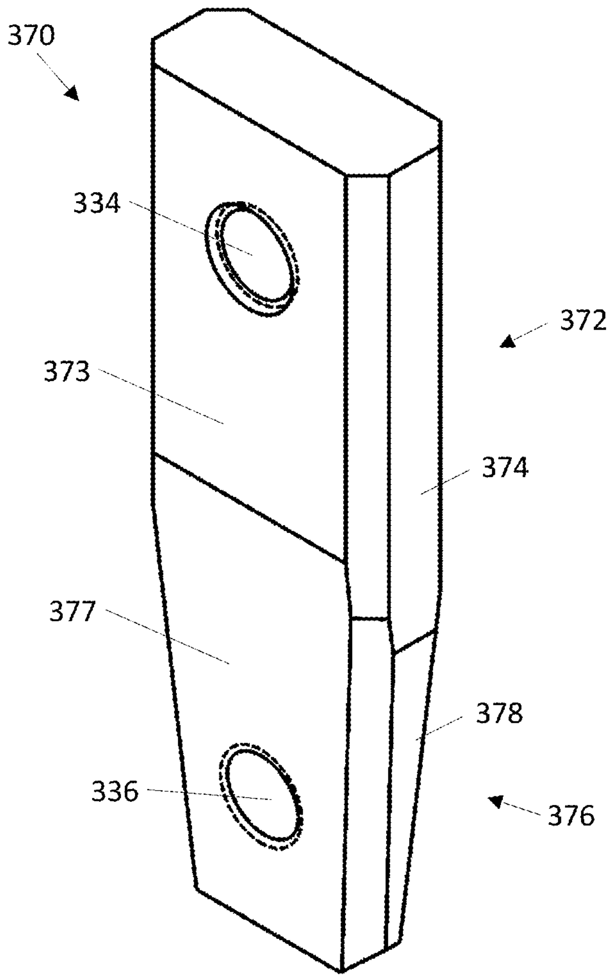
Figure 137:
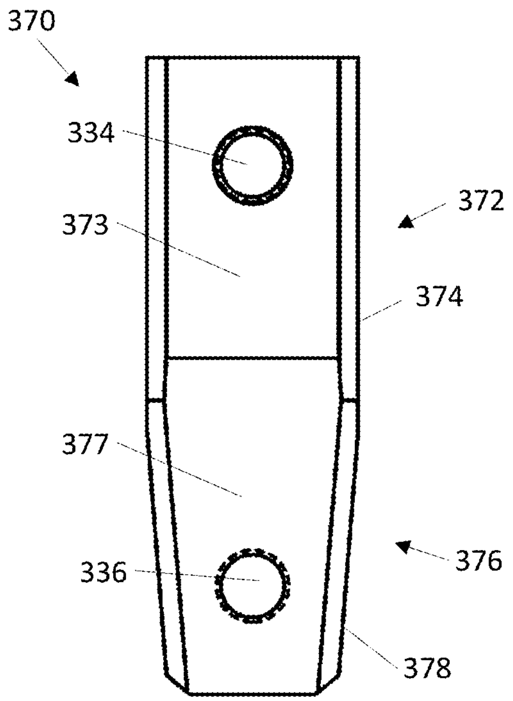
Figure 138:
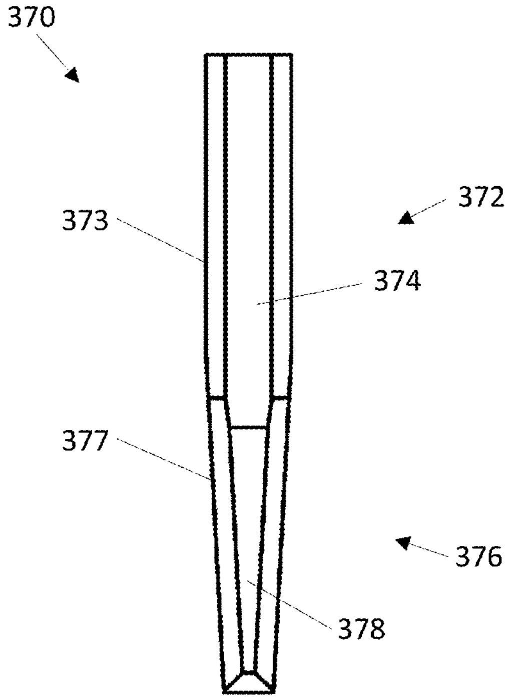
Figure 139:
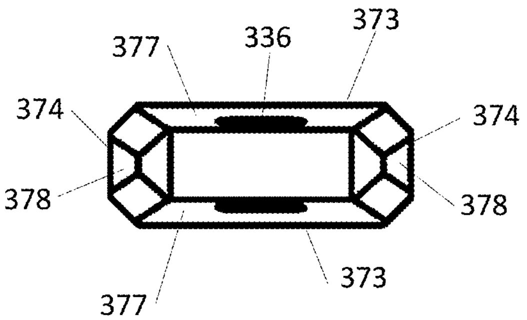
Figure 143:
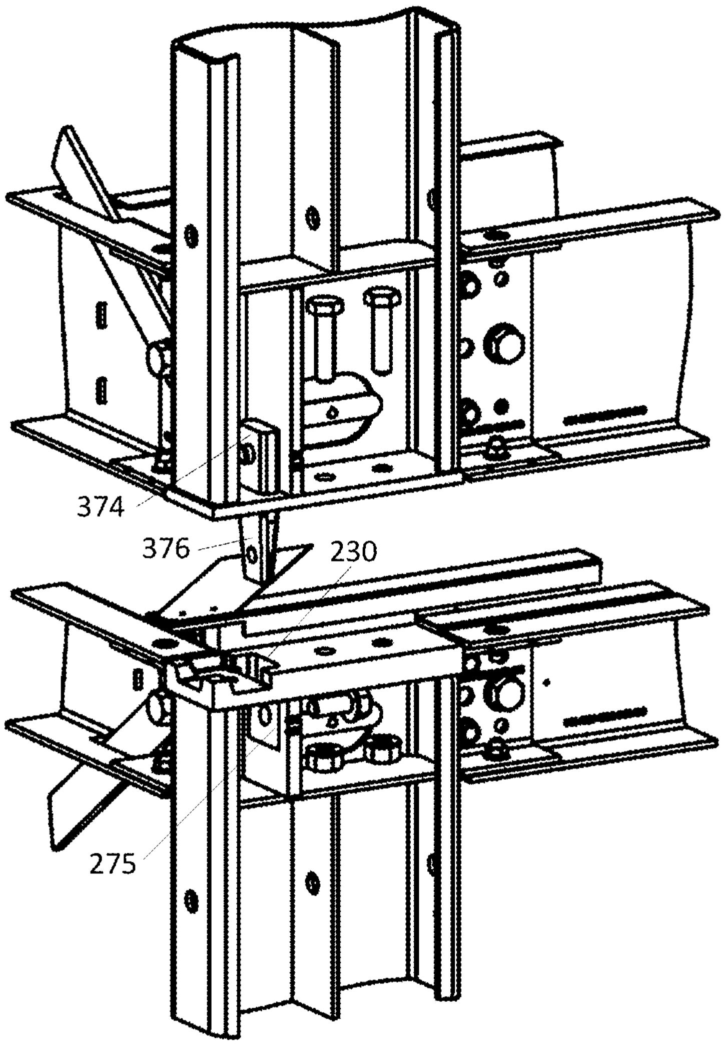
Figure 144:
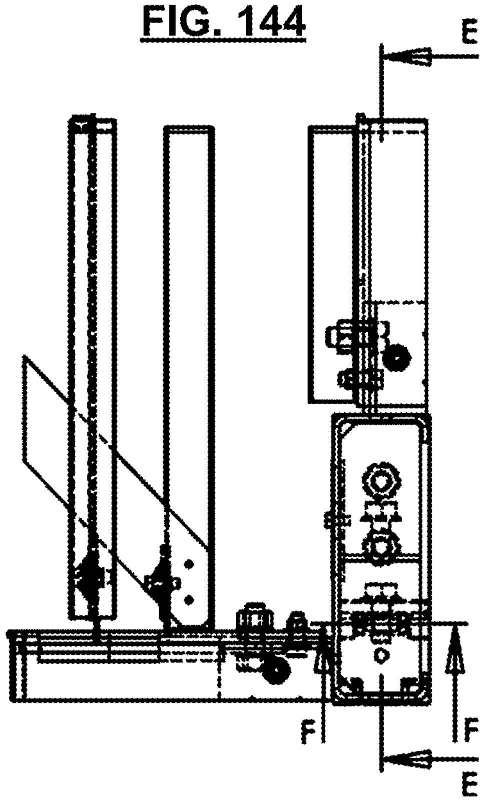
Figure 145:
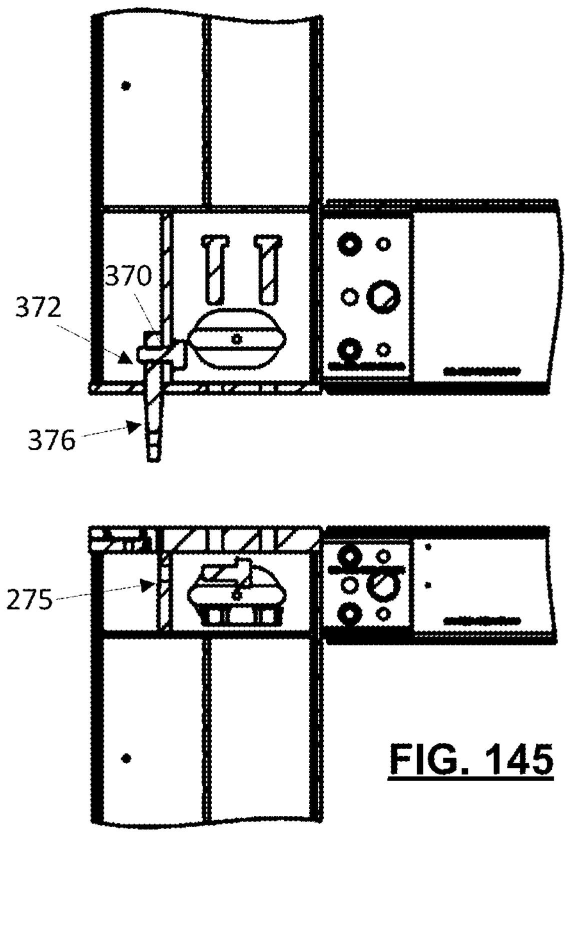
Figure 146:
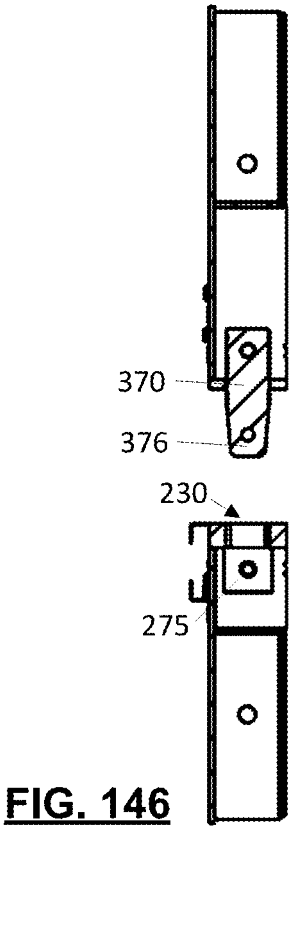
Figure 147:
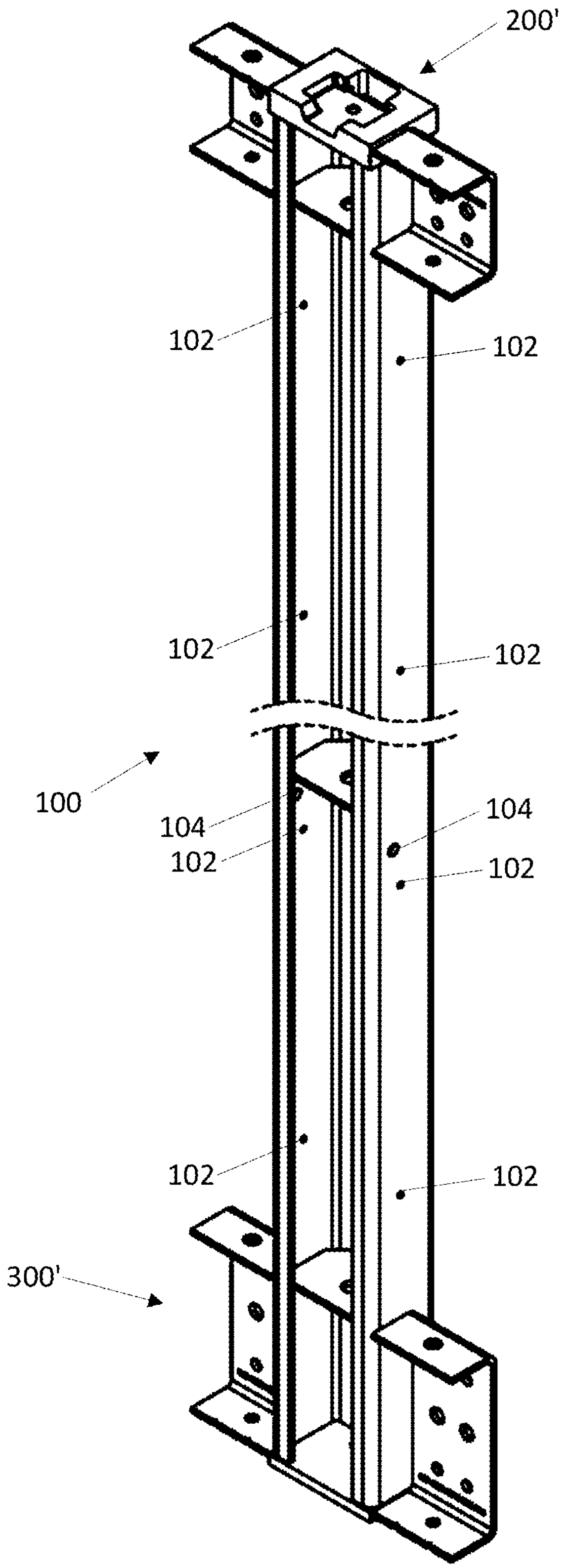
Figure 148:
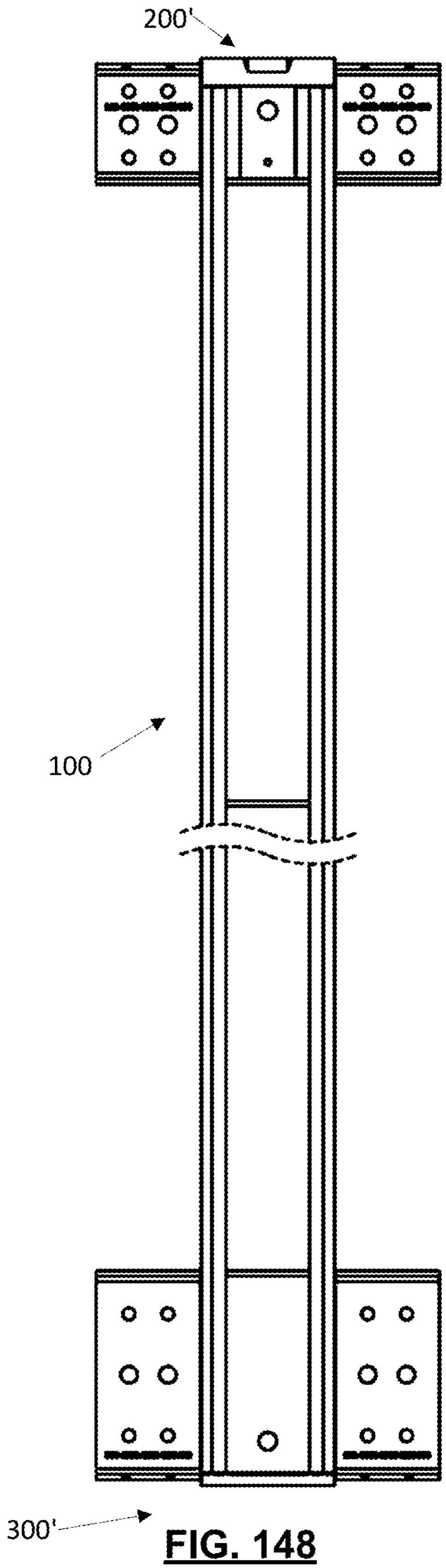
Figure 149:
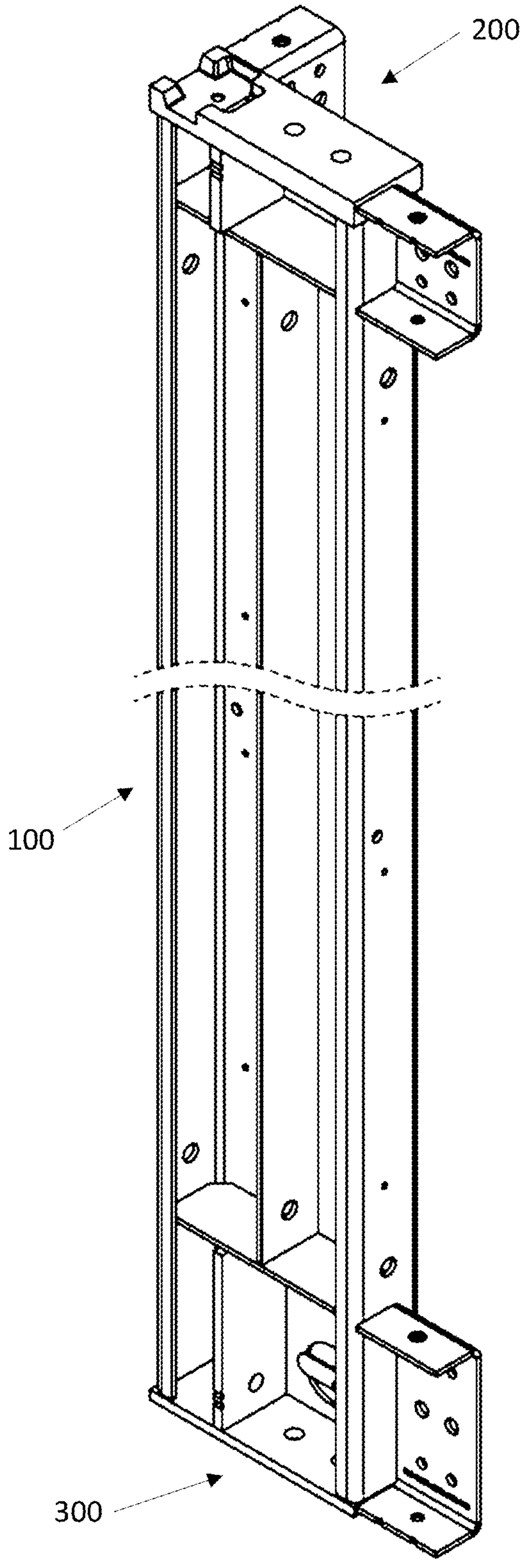
Figure 150:
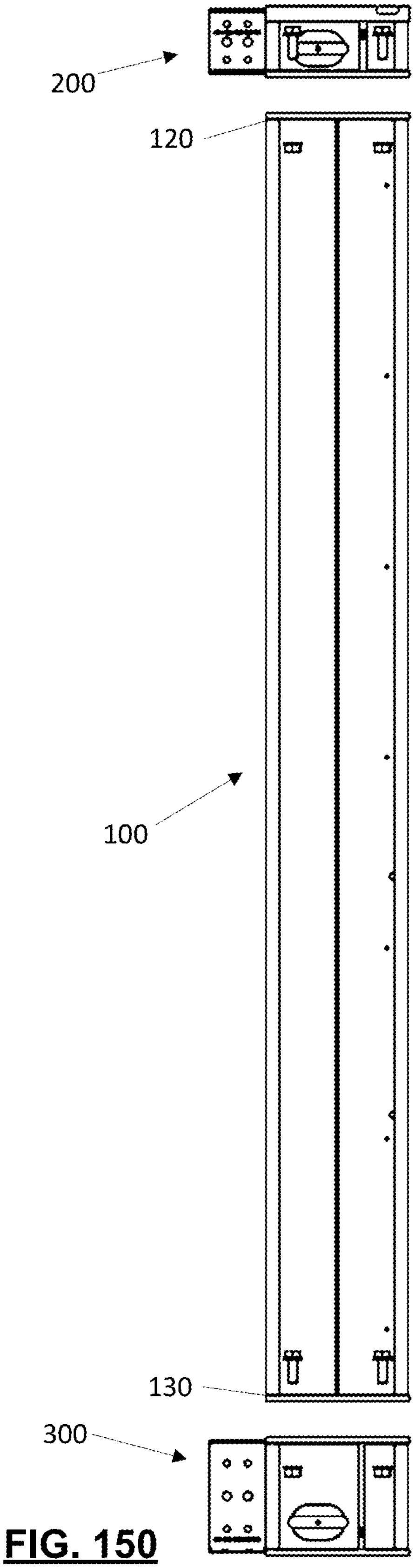

FIG. 131 is another side elevation view of the coupling between the upper and lower junction connectors of FIG. 129;

FIG. 132 is another side elevation view of the coupling between the upper and lower junction connectors of FIG. 129;

FIG. 133 is another side elevation view of the coupling between the upper and lower junction connectors of FIG. 129;

FIG. 134 is a partially exploded front perspective view of the coupling between the upper and lower junction connectors of FIG. 129;

FIG. 135 is a partially exploded rear perspective view of the coupling between the upper and lower junction connectors of FIG. 129;

FIG. 136 is a perspective view of a securement tab in accordance with one embodiment;

FIG. 137 is a front elevation view of the securement tab of FIG. 136;

FIG. 138 is a side elevation view of the securement tab of FIG. 136;

FIG. 139 is a bottom view of the securement tab of FIG. 136;

FIG. 140 is a top section view of the coupling between the upper and lower junction connectors of FIG. 129;

FIG. 141 is a section view taken along line C-C in FIG. 140;

FIG. 142 is a section view taken along line D-D in FIG. 140;

FIG. 143 is a partially exploded view of the coupling between the upper and lower junction connectors of FIG. 129;

FIG. 144 is a top section view of the coupling between the upper and lower junction connectors of FIG. 143;

FIG. 145 is a section view taken along line E-E in FIG. 144;

FIG. 146 is a section view taken along line F-F in FIG. 144;

FIG. 147 is a perspective view of a column with upper and lower junction connectors coupled to the ends of the column, in accordance with one embodiment;

FIG. 148 is a front view of the column and upper and lower junction connectors of FIG. 147;

FIG. 149 is a perspective view of a column with upper and lower junction connectors coupled to the ends of the column, in accordance with another embodiment; and FIG. 150 is a side view of a column with separable upper and lower junction connectors coupled to the ends of the column, in accordance with another embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

FIGS. 1 to 4 illustrate an example embodiment of an upper junction connector, referred to generally as 200, coupled to the upper end of a column 100. Upper junction connector 200 includes an upper end 210 that has an upper surface 220, a recessed surface 240, and a slot 230. Upper junction connector 200 also includes lateral connectors 280*a*, 280*b*, for coupling upper junction connector 200 to horizontal structural members.

In use, an upper junction connector 200 may be coupled to the upper ends of columns and to the ends of horizontal structural members to form part of a volumetric module frame. For example, a rectangular frame may be formed with an upper junction connector 200 at each of the upper corners (see e.g. FIG. 81).

Returning to FIGS. 1 to 4, in the illustrated example column 100 is an open steel channel, with three column sidewalls 112, 114, and 116 that are substantially closed, and a fourth column sidewall 118 that has a longitudinal gap running along the length thereof, giving the steel channel an open shape. Using a column formed from an open steel channel may have one or more advantages. For example, it may facilitate access to the interior walls of the column, which may assist in welding and/or securing mechanical fasteners to the column walls. It may also allow the interior walls of the column to be more easily painted, coated, and/or galvanized, e.g. to inhibit corrosion, as all of the column surfaces are accessible (as compared with, e.g. a column formed from a hollow steel section (HSS)).

Using a column formed from an open steel channel may also facilitate the filling of the column with insulation or other material to modify the structural, thermal, and/or acoustic transmission properties of the columns. For example, it may facilitate the installation of a cementitious material to increase the strength of the column. As another example, it may facilitate the installation of material configured to act as a firestop.

Alternatively, a column may be formed from HSS. A HSS may be preferred over an open steel channel e.g. where increased load bearing capabilities are preferred.

In the example illustrated in FIGS. 1 to 4, the upper end 210 of junction connector 200 has a first edge 212, a second edge 214, a third edge 216, and a fourth edge 218. As shown, the first edge 212 overlies a first sidewall 112 of column 100, the second edge 214 overlies a second column sidewall 114, the third edge 216 overlies a third column sidewall 116, and the fourth edge 218 overlies a fourth column sidewall 118. The upper end 210 may be secured to column 100 by welding or in any other suitable manner known to those in the art.

In the illustrated example, a reinforcing plate 205 is provided interior of the column 100. Reinforcing plate 205 is generally perpendicular to upper end 210 of junction connector 200, and located proximate the lower ends of the lateral connectors 280*a*, 280*b*. Reinforcing plate 205 may be secured to column 100 by welding or in any other suitable manner known to those in the art.

The upper end 210 of upper junction connector 200 also has an upper surface 220 and a recessed surface 240. Preferably, the upper surface 220 is generally planar, such that an object (e.g. a lower junction connector) placed on top of the upper end 210 sits flush against upper surface 220. Interior connector sidewalls 250 extend between upper surface 220 and recessed surface 240. In this arrangement, recessed surface 240 and connector sidewalls 250 define a recessed area in the upper end 210 of junction connector 200.

In the illustrated example, the recessed area extends to the second edge 214, third edge 216, and fourth edge 218 of the upper end 210. As discussed further below, the recessed area is configured to receive a lateral tie member that can be used to secure the upper junction connector 200 to one or more adjacent upper junction connectors 200 in a fixed orientation.

The interior connector sidewalls 250 in the illustrated example are tapered inwardly, such that a lower portion of the recessed area is smaller than an upper portion of the recessed area. As discussed further below, providing one or more tapered interior connector sidewalls may assist in securing an upper junction connector 200 to one or more adjacent upper junction connectors 200 using a lateral tie member.

In the illustrated example, a bore 245 extends through recessed surface 240. Bore 245 is configured to receive a bolt (or other mechanical fastener) to assist in securing a lateral tie member or a cap member within the recessed area of the upper end 210.

The upper end 210 of upper junction connector 200 also has a slot 230 that extends through to the interior of column 100. As discussed further below, slot 230 is configured to receive a securement tab to secure the upper junction connector 200 to an adjacent lower junction connector.

In the illustrated example, sidewalls 235 of slot 230 are tapered inwardly, such that a lower portion of slot is narrower than an upper portion of the slot. As discussed further below, providing one or more tapered slot sidewalls may assist in aligning an upper junction connector 200 to an adjacent lower junction connector.

Alternatively, the sidewalls of a slot 230 may be generally parallel to each other (i.e. not tapered). Providing 'straight' sidewalls for a slot 230 may allow a tapered securement tab (discussed further below) more freedom to move laterally within slot 230 until the securement tab is fully seated in the slot.

Figure 2:
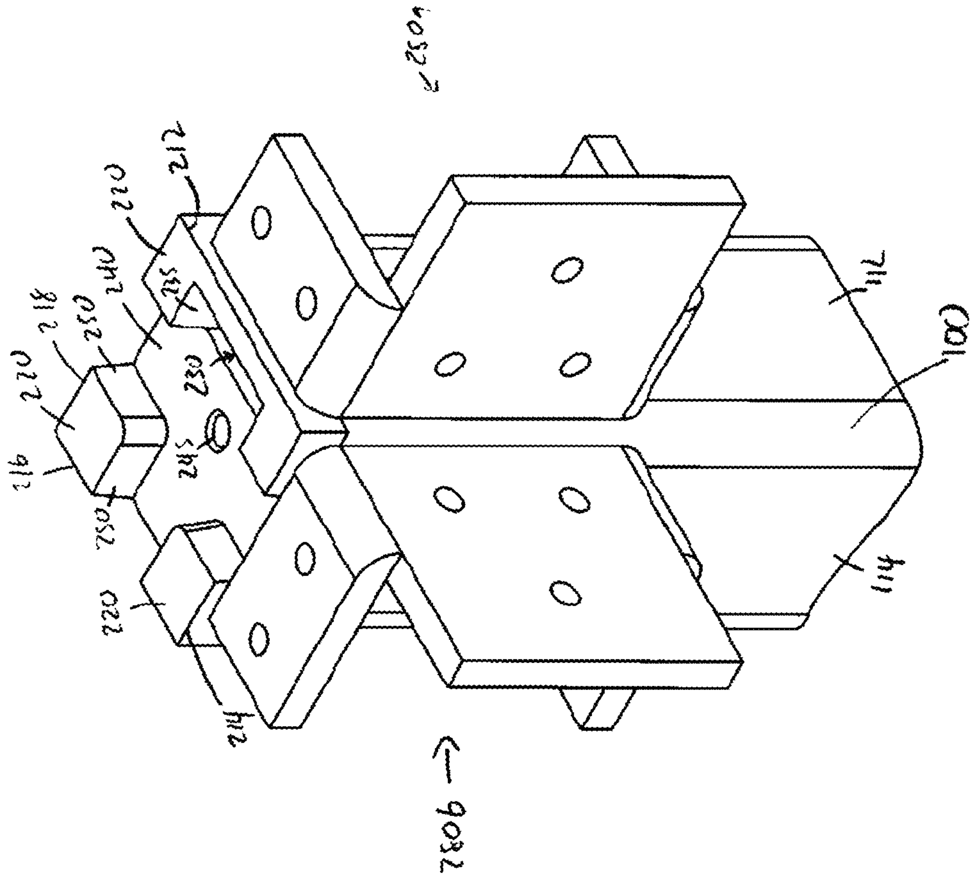
FIG. 2 is another perspective view of the upper junction connector and column end of FIG. 1.
Figure 1:
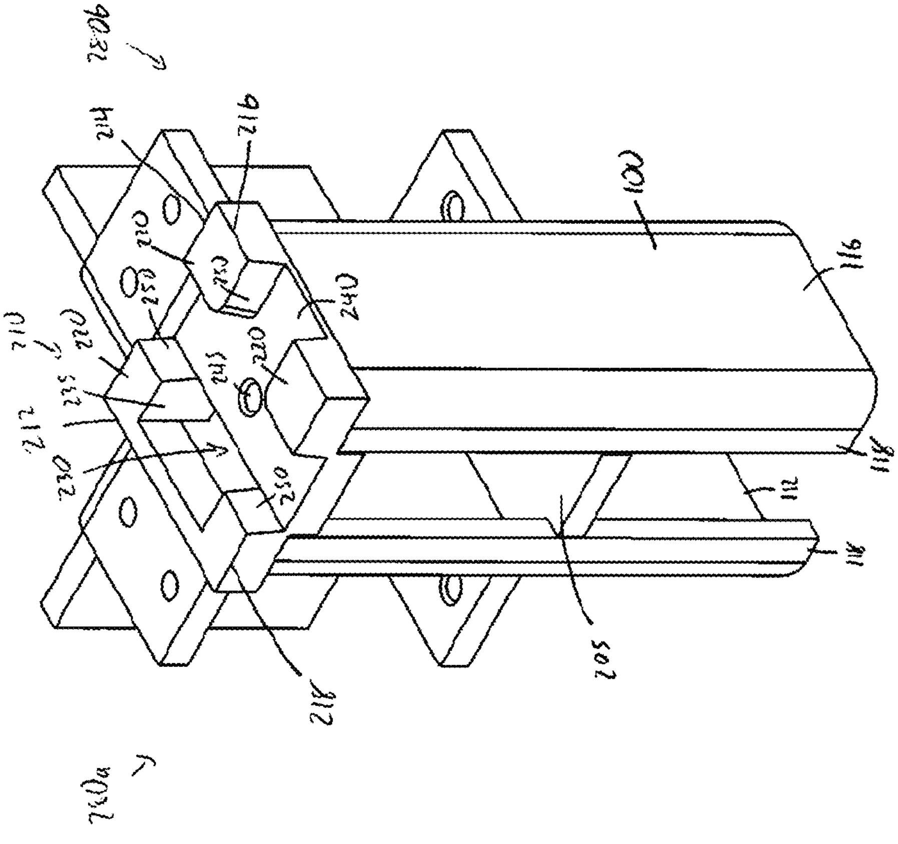
FIG. 1 is a perspective view of an upper junction connector coupled to the upper end of a column in accordance with one embodiment.
Figure 4:
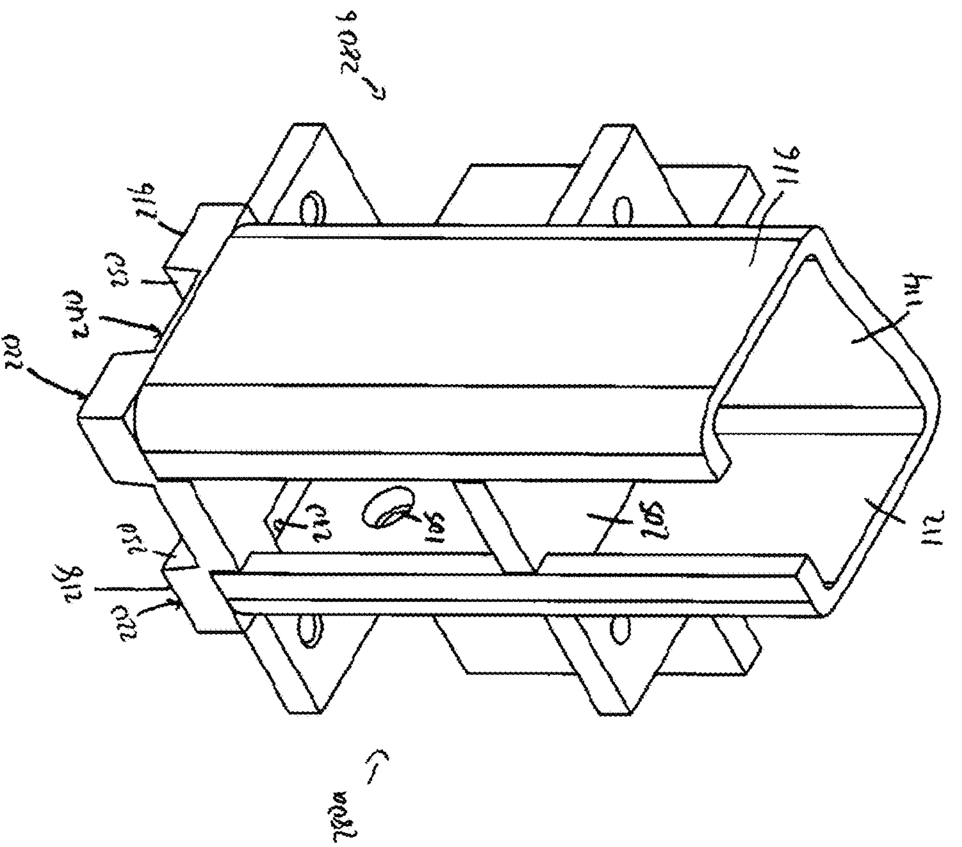
FIG. 4 is another perspective view of the upper junction connector and column end of FIG. 1.
Figure 3:
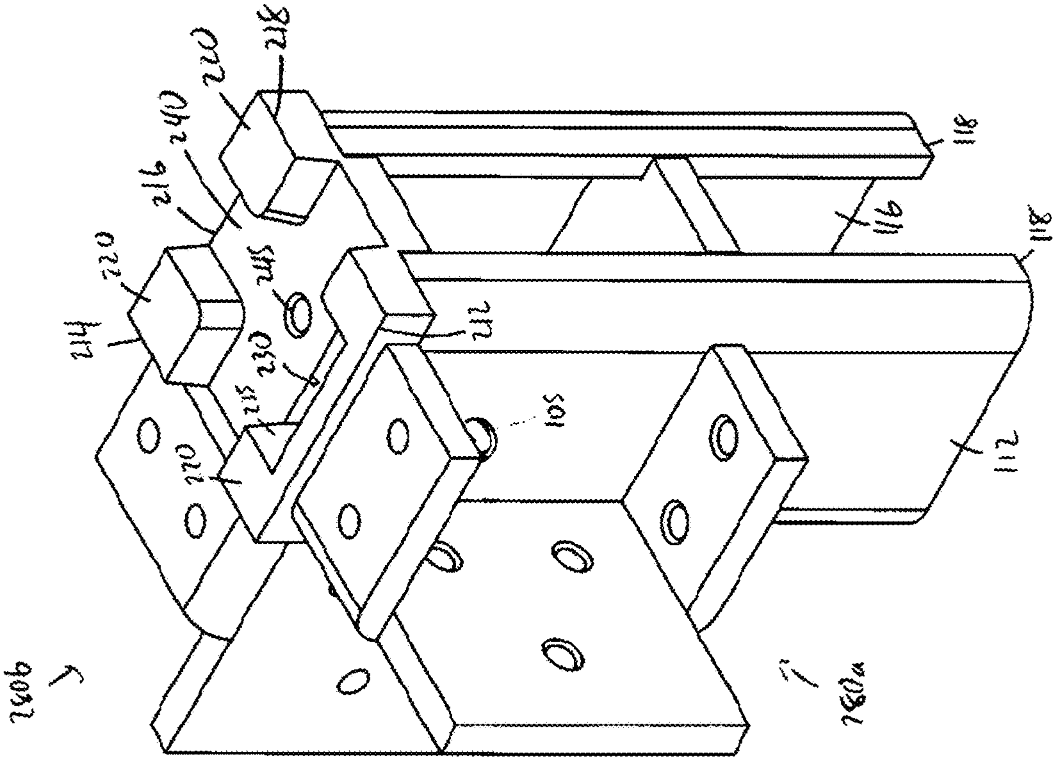
FIG. 3 is another perspective view of the upper junction connector and column end of FIG. 1.
Figure 6:
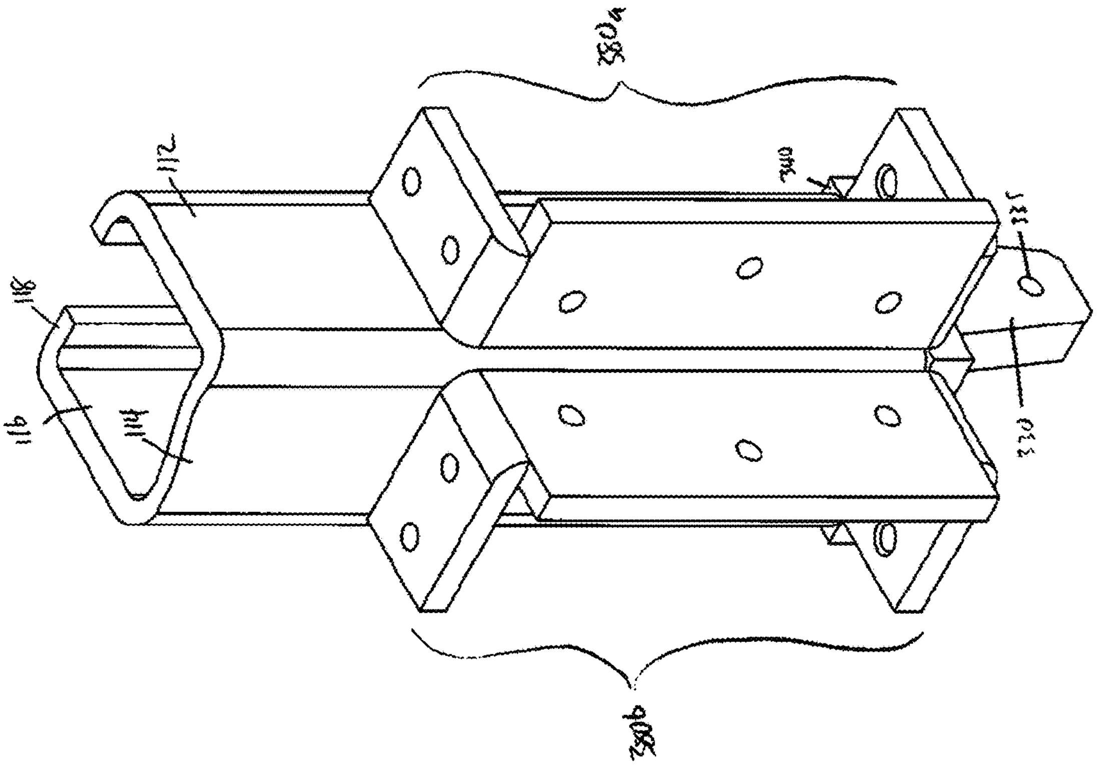
FIG. 6 is another perspective view of the lower junction connector and column end of FIG. 5.
Figure 5:
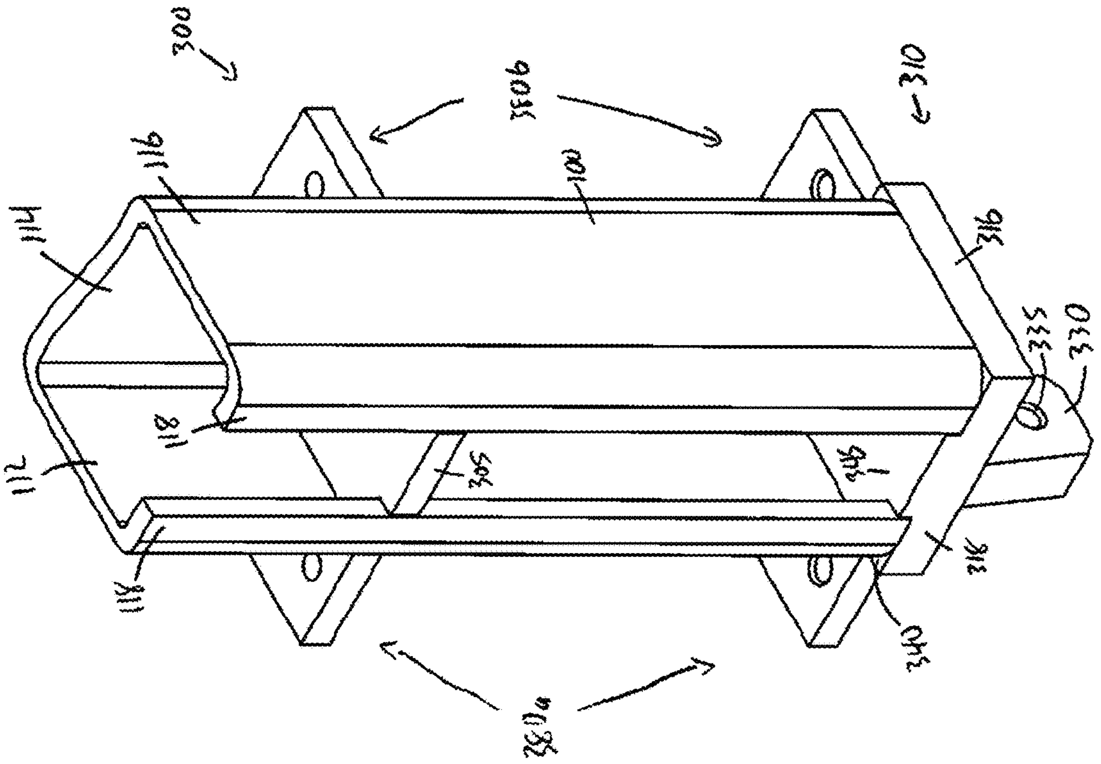
FIG. 5 is a perspective view of a lower junction connector coupled to the lower end of a column in accordance with one embodiment.
Figure 8:
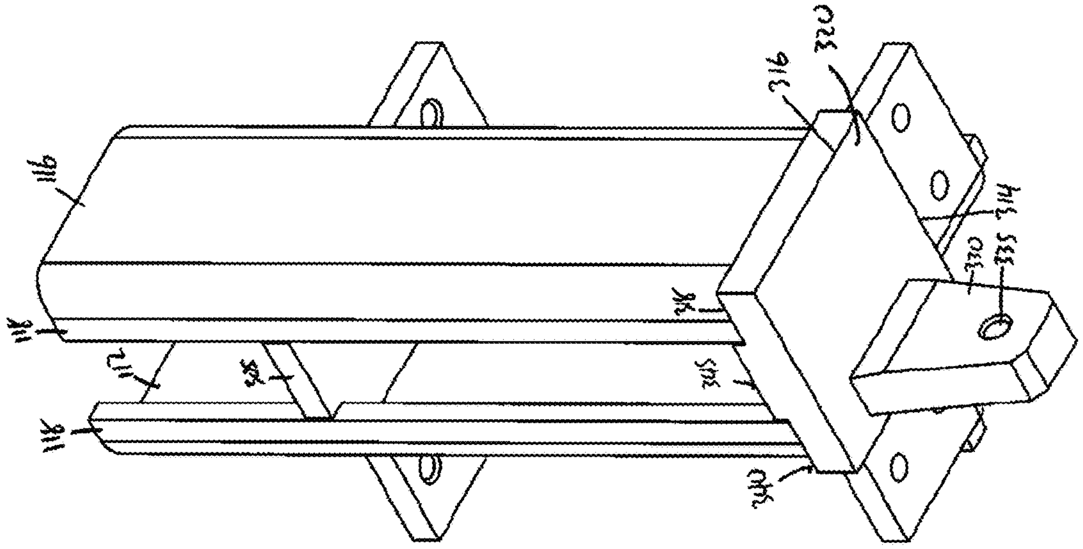
FIG. 8 is another perspective view of the lower junction connector and column end of FIG. 5.
Figure 7:
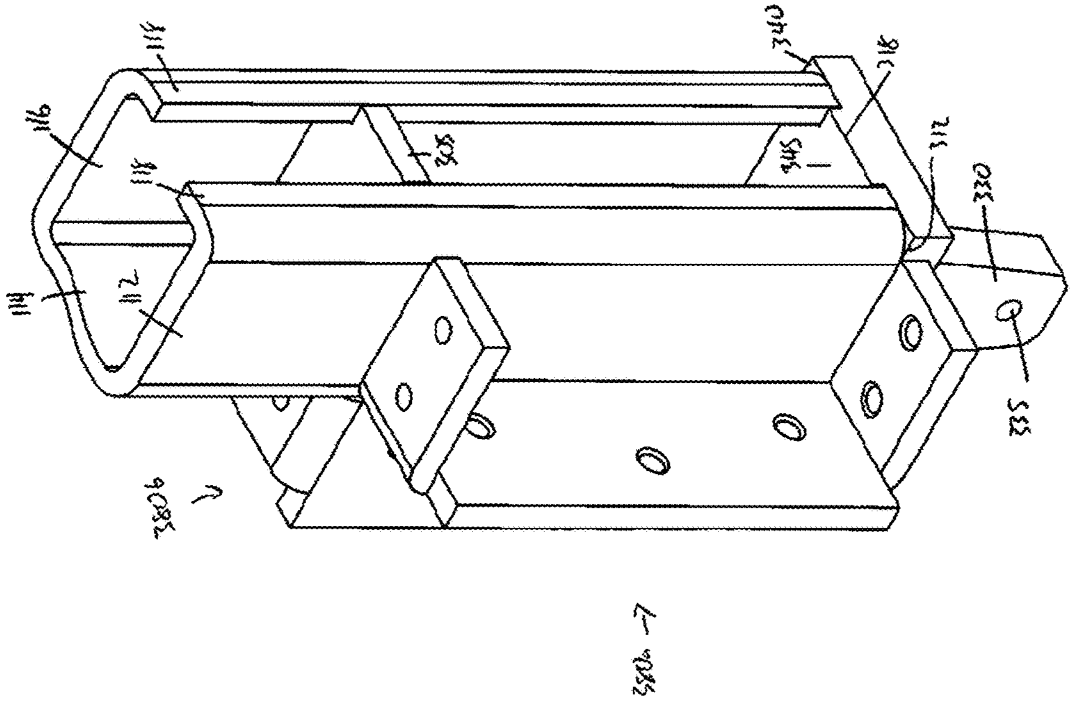
FIG. 7 is another perspective view of the lower junction connector and column end of FIG. 5.

As shown in FIGS. 3 and 4, a bore 105 is provided in the first column sidewall 112. As discussed further below, bore 105 is configured to receive a bolt (or other mechanical fastener) to assist in securing the upper junction connector 200 to an adjacent lower junction connector.

Figure 14:
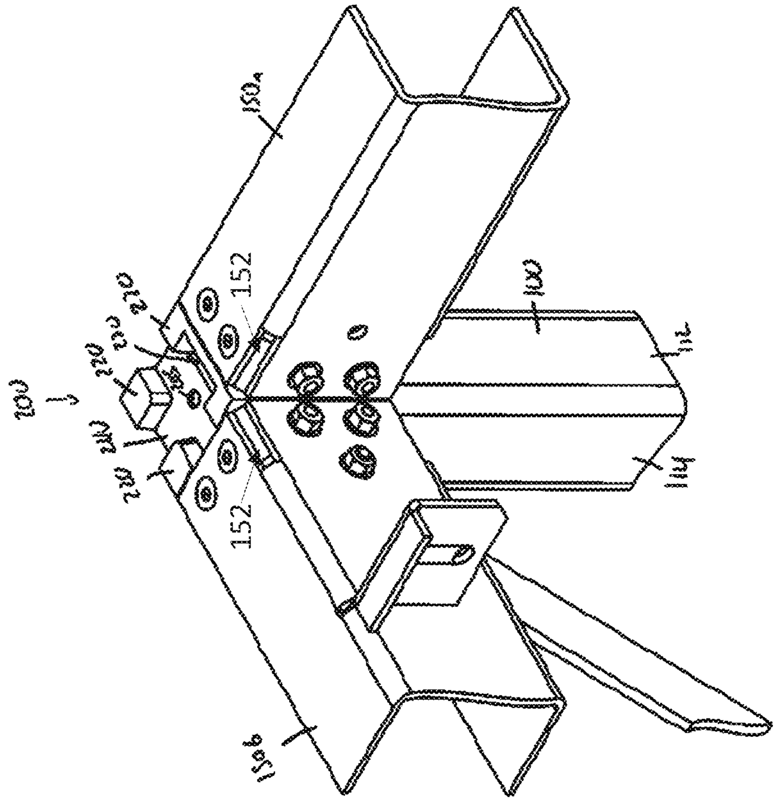
FIG. 14 is another perspective view of the upper junction connector, column end, and horizontal structural members of FIG. 13.
Figure 13:
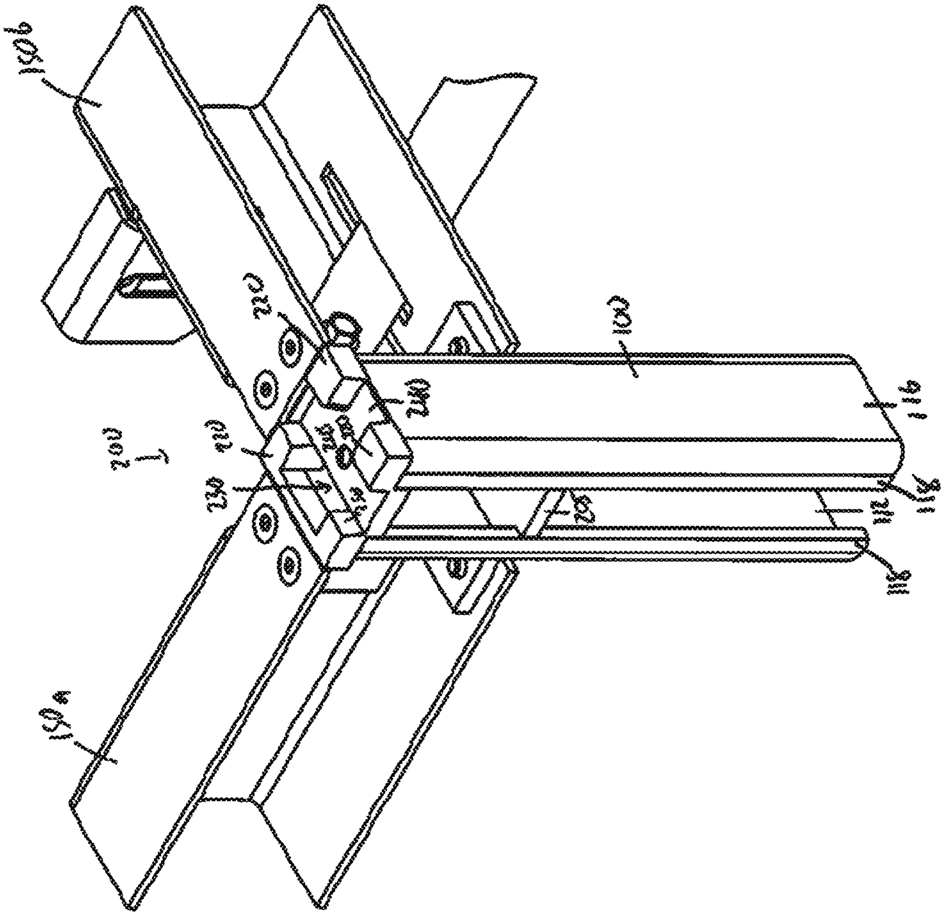
FIG. 13 is a perspective view of an upper junction connector coupled to the upper end of a column, to a first horizontal structural member, and to a second horizontal structural member in accordance with one embodiment.
Figure 16:
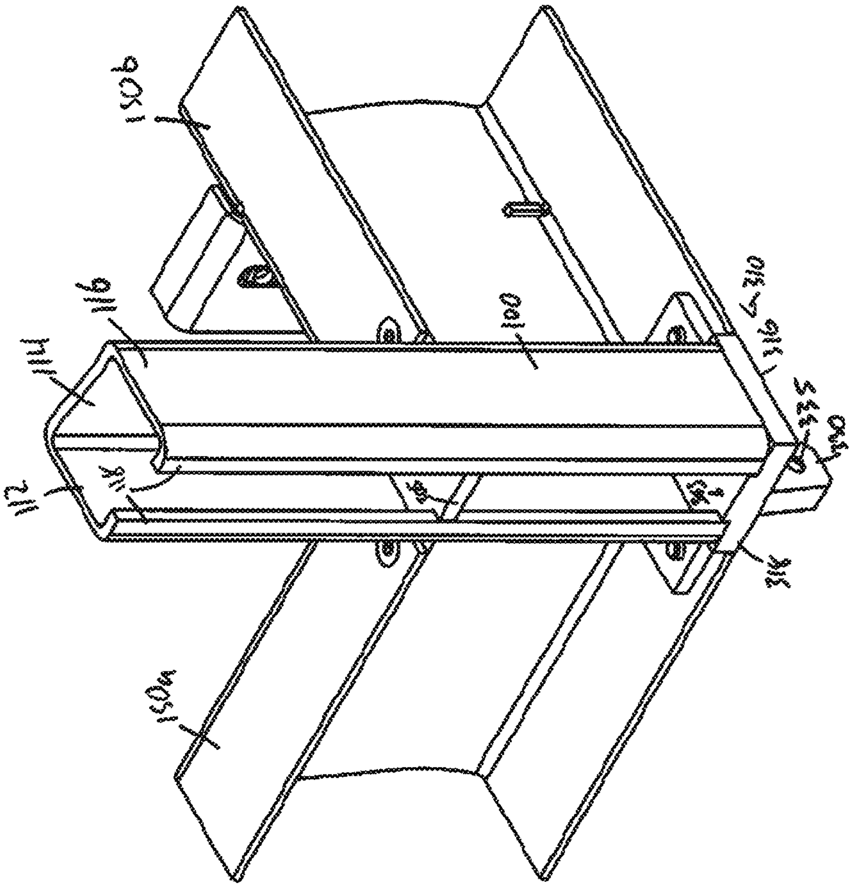
FIG. 16 is a perspective view of a lower junction connector coupled to the lower end of a column, to a first horizontal structural member, and to a second horizontal structural member in accordance with one embodiment.
Figure 15:
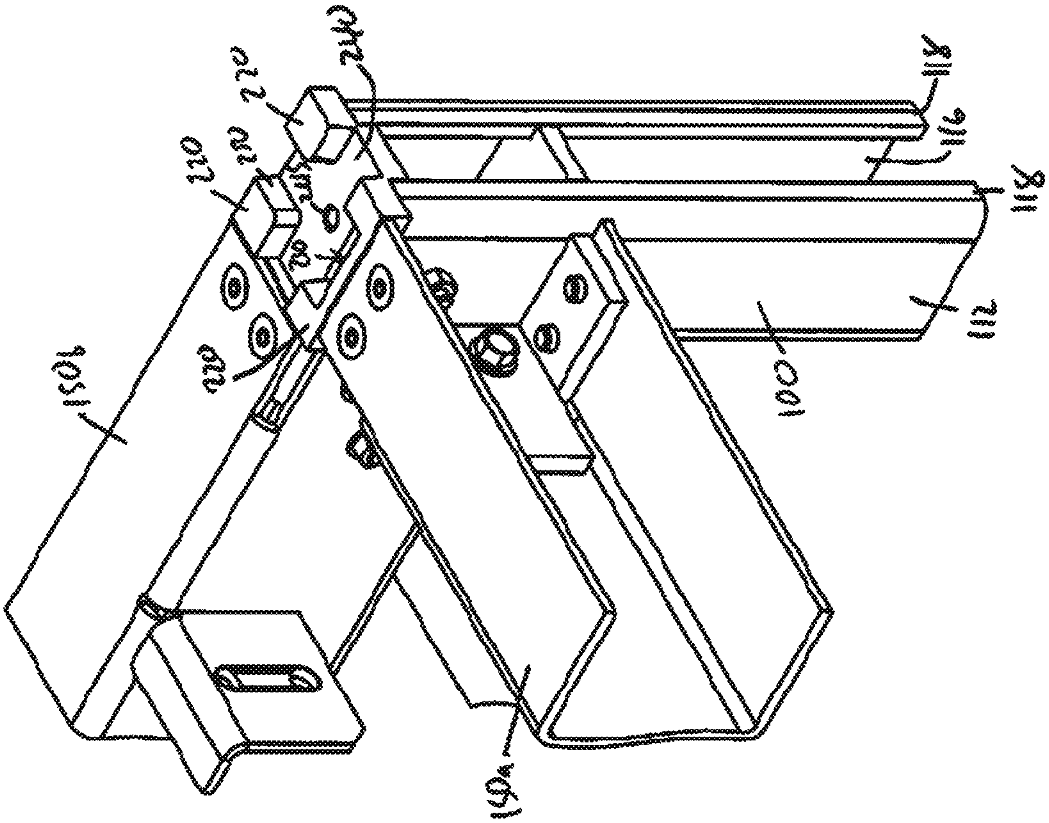
FIG. 15 is another perspective view of the upper junction connector, column end, and horizontal structural members of FIG. 13.
Figure 18:
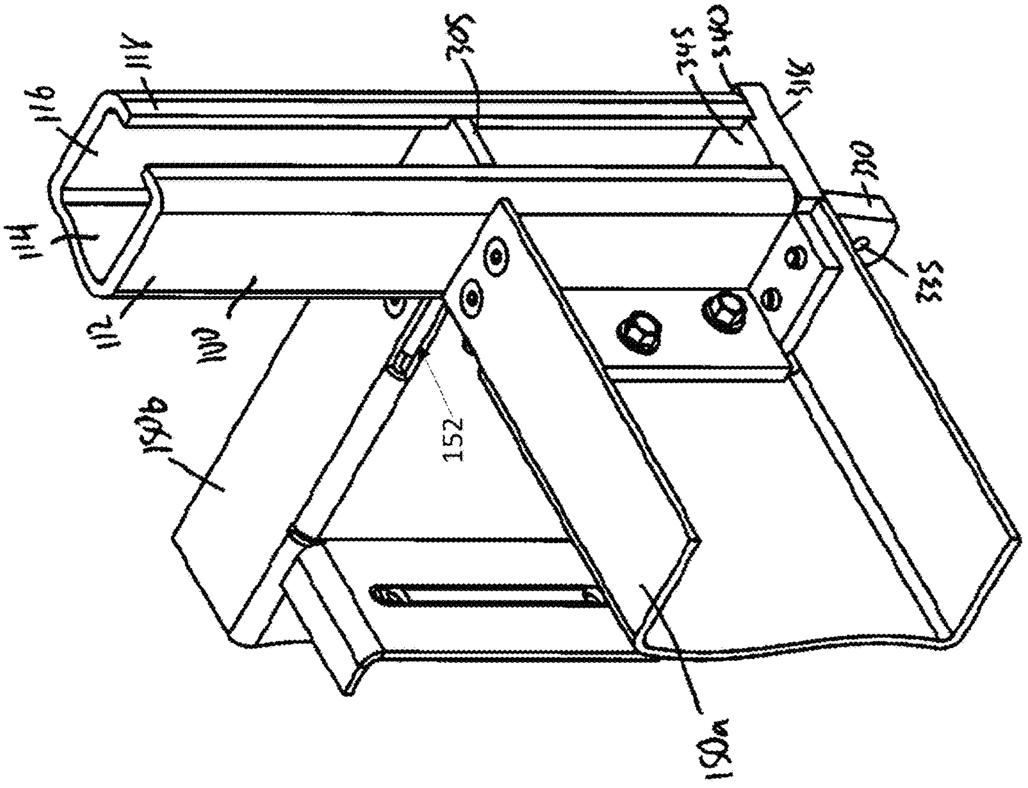
FIG. 18 is another perspective view of the lower junction connector, column end, and horizontal structural members of FIG. 16.

FIGS. 13 to 15 illustrate an example embodiment of an upper junction connector 200, coupled to the upper end of a column 100 and to the ends of horizontal structural members 150*a*, 150*b*. Such an arrangement may form part of a volumetric module frame. For example, a rectangular frame may be formed with an upper junction connector 200 at each of the upper corners (see e.g. FIG. 81).

In the illustrated example, the ends of horizontal structural members 150*a*, 150*b* are coupled to the lateral connectors of upper junction connector 200 using a plurality of mechanical fasteners. Providing lateral connectors 280 coupled to horizontal structural members 150 using mechanical fasteners may have one or more advantages. For example, a column 100 may be shipped from a fabricator to a building site (or to a staging area near a building site) with an upper junction connector 200 welded to the end, and a module frame may be assembled with reduced labour (e.g. without requiring certified welders), and/or with reduced complexity (e.g. without requiring a complicated jig to maintain the alignment of the components during welding).

Figure 17:
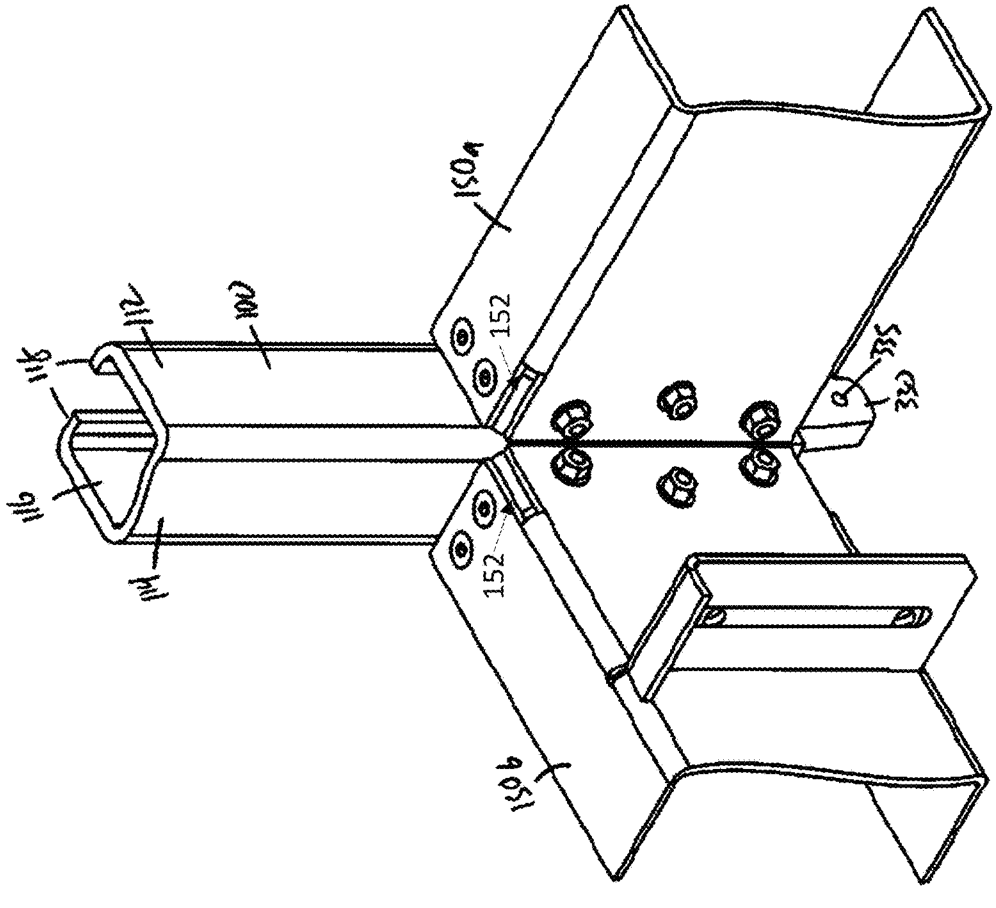
FIG. 17 is another perspective view of the lower junction connector, column end, and horizontal structural members of FIG. 16.
Figure 19:
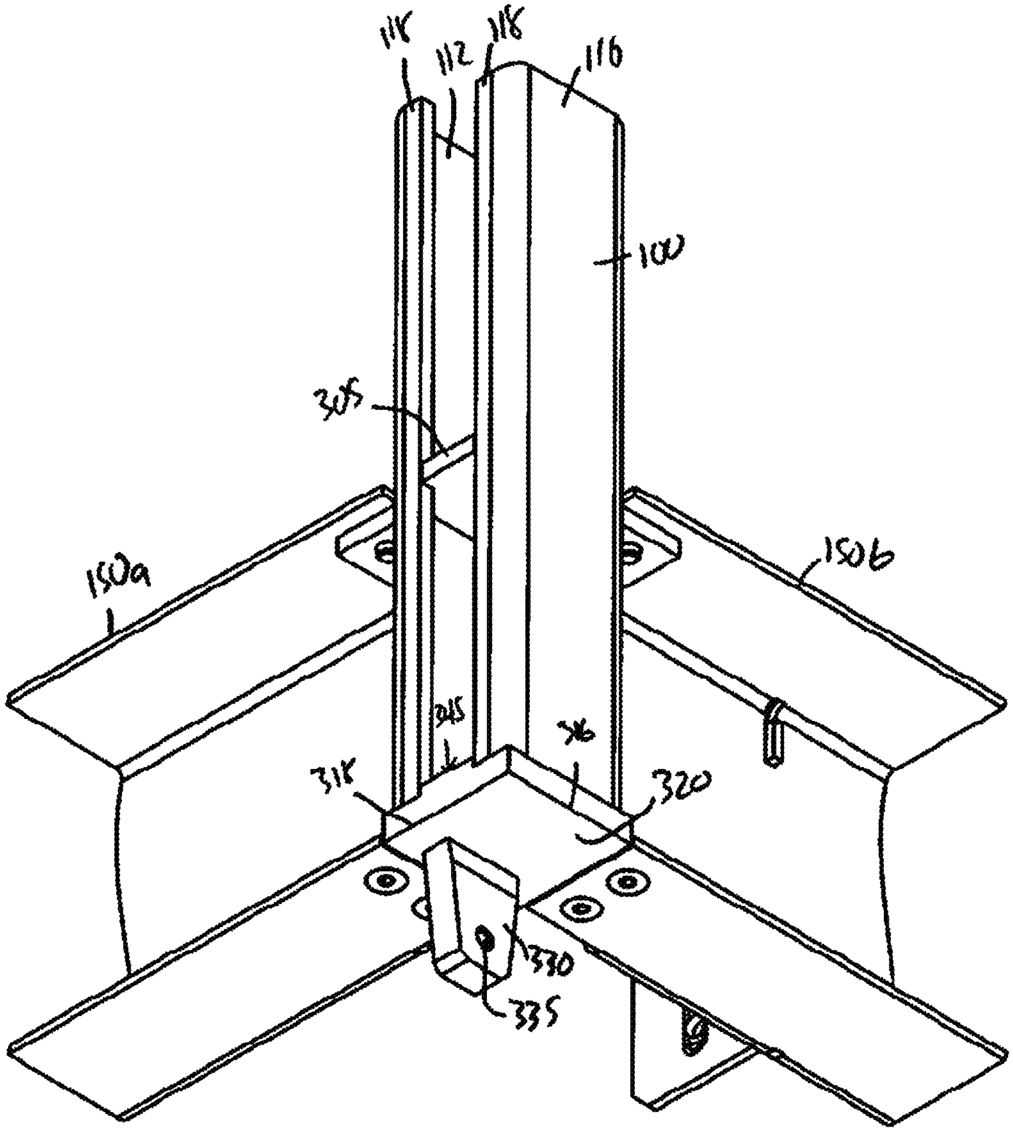
FIG. 19 is another perspective view of the lower junction connector, column end, and horizontal structural members of FIG. 16.

With reference to FIGS. 14, 17, and 135, the ends of horizontal structural members 150 may be provided with a slot 152 at the junction between the sidewall and one or both of the flanges. Slot 152 may decrease the tolerance requirements for lateral connectors 280 and/or horizontal structural members 150, e.g. by allowing the ends of a horizontal structural member 150 to be slightly expanded or contracted to better engage a lateral connector 280. Such an arrangement may also facilitate the assembly process.

Preferably, slot 152 is positioned on an interior-facing corner, which may facilitate a flush arrangement between a flange of a horizontal structural member 150 and a flange of a lateral connector 280, see e.g. flush alignments 154 illustrated in FIG. 129.

It will be appreciated that, alternatively, the horizontal structural members 150 and lateral connectors 280 may be coupled by welding or in any other suitable manner known to those in the art.

FIGS. 5 to 8 illustrate an example embodiment of a lower junction connector, referred to generally as 300, coupled to the lower end of a column 100. Lower junction connector 300 includes a lower end 310 that has a lower surface 320, and a downwardly-projecting securement tab 330. Lower junction connector 300 also includes lateral connectors 380*a*, 380*b*, for coupling lower junction connector 300 to horizontal structural members.

In use, a lower junction connector 300 may be coupled to the lower ends of columns and to the ends of horizontal structural members to form part of a volumetric module frame. For example, a rectangular frame may be formed with a lower junction connector 300 at each of the lower corners (see e.g. FIG. 81).

Returning to FIGS. 5 to 8, the lower end 310 of junction connector 300 has a first edge 312, a second edge 314, a third edge 316, and a fourth edge 318. As shown, the first edge 312 overlies the first sidewall 112 of column 100, the second edge 314 overlies the second column sidewall 114, the third edge 316 overlies the third column sidewall 316, and the fourth edge 318 overlies the fourth column sidewall 118. The lower end 310 may be secured to column 100 by welding or in any other suitable manner known to those in the art.

In the illustrated example, a reinforcing plate 305 is provided interior of the column 100. Reinforcing plate 305 is generally perpendicular to lower end 310 of junction connector 300, and located proximate the upper ends of the lateral connectors 380*a*, 380*b*. Reinforcing plate 305 may be secured to column 100 by welding or in any other suitable manner known to those in the art.

The lower end 310 of lower junction connector 300 also has a lower surface 320. Preferably, the lower surface 320 is generally planar, such that when the lower junction connector is placed on an object (e.g. an upper junction connector 200), the lower surface 320 sits flush against the object.

In the illustrated example, a securement tab 330 extends downwardly from the lower end 310 of junction connector 300. Securement tab 330 is configured to be received in a slot 230 of an upper junction connector 200. In the illustrated example, sidewalls 333 of tab 330 are tapered inwardly, such that a lower portion of tab 330 is narrower than an upper portion of the tab. Providing one or more tapered tab sidewalls may assist in aligning a lower junction connector 300 to an adjacent an upper junction connector 200.

A bore 335 is provided in securement tab 330. Bore 335 is located such that, when securement tab 330 is positioned in a slot 230 of an upper junction connector 200, and lower surface 320 of lower junction connector 300 is flush against an upper surface 220 of an upper junction connector 200, bore 335 and bore 105 are axially aligned, such that a bolt (or other mechanical fastener) may extend through bore 335 and bore 105 to assist in securing the lower junction connector 300 to an adjacent upper junction connector 200.

Figure 10:
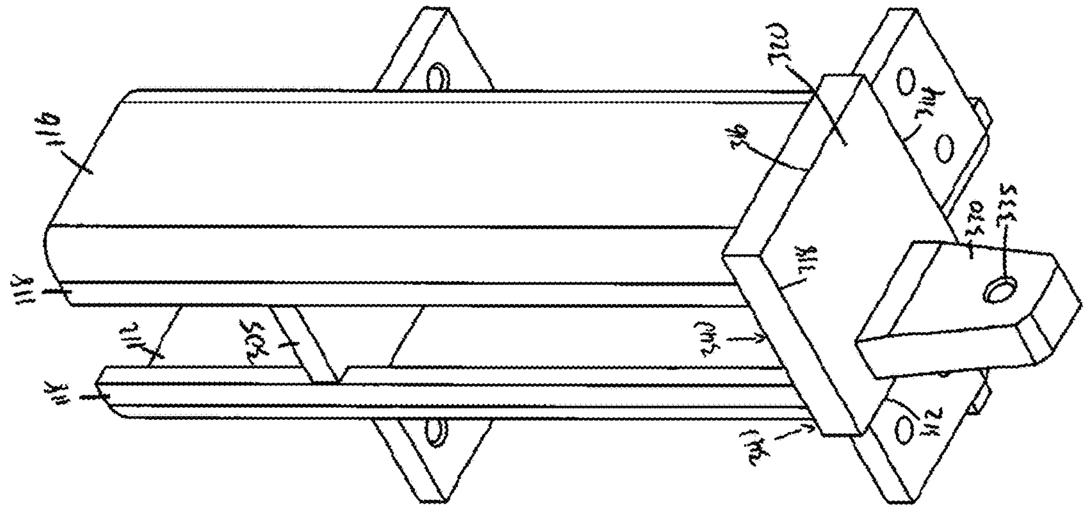
FIG. 10 is another perspective view of the lower junction connector and column end of FIG. 9.
Figure 9:
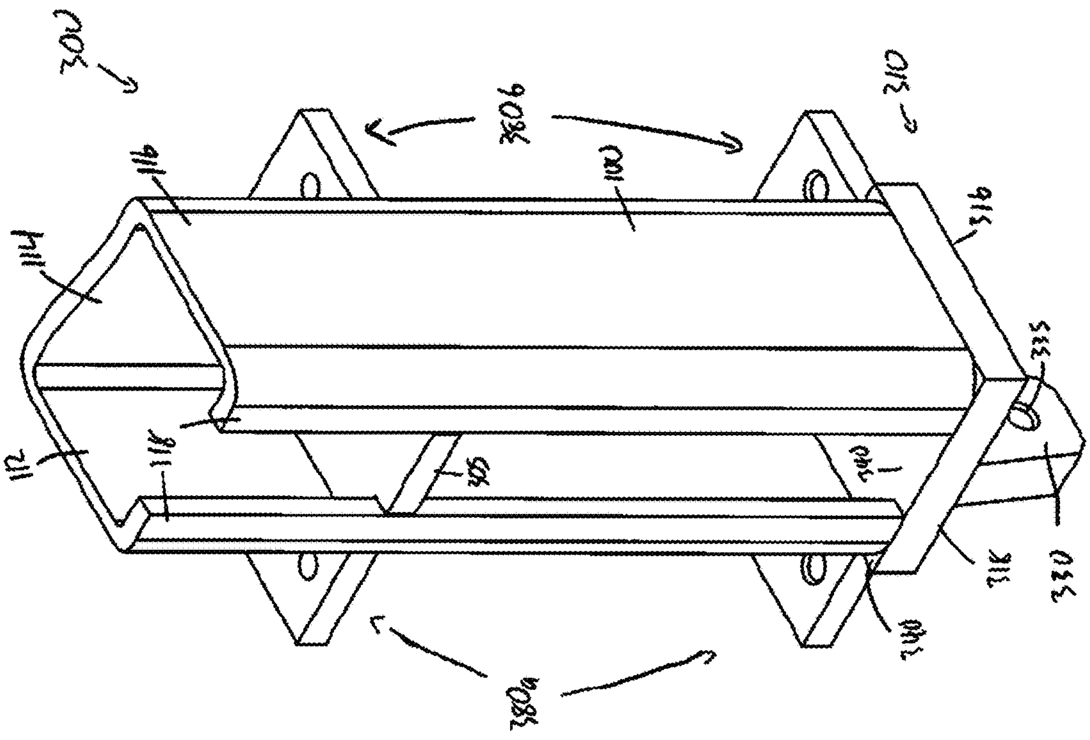
FIG. 9 is a perspective view of a lower junction connector coupled to the lower end of a column in accordance with another embodiment.

FIGS. 9 and 10 illustrate another example embodiment of a lower junction connector 300. In this example, an upper surface 340 of lower end 310 is substantially planar. In contrast, in the example lower junction connector 300 illustrated in FIGS. 5 to 8, upper surface 340 has a raised central portion 345. Providing a raised central portion may assist in locating the end of column 100 relative to the lower end 310, and/or may act as a weld backer. Providing a lower junction connector 300 with a generally planar upper surface 340 (i.e. without a raised central portion) may simplify manufacturing and/or decrease cost.

Figure 12:
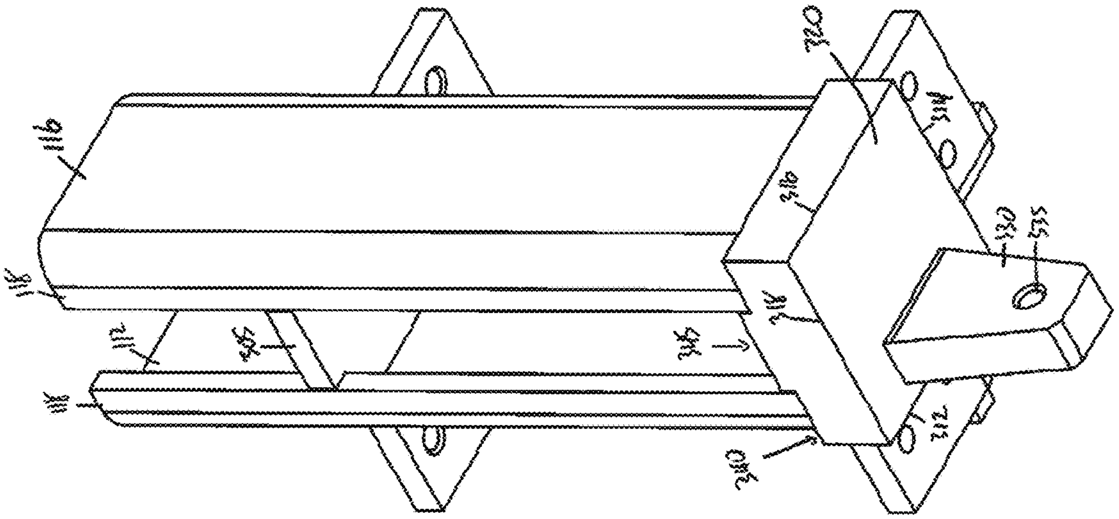
FIG. 12 is another perspective view of the lower junction connector and column end of FIG. 11.
Figure 11:
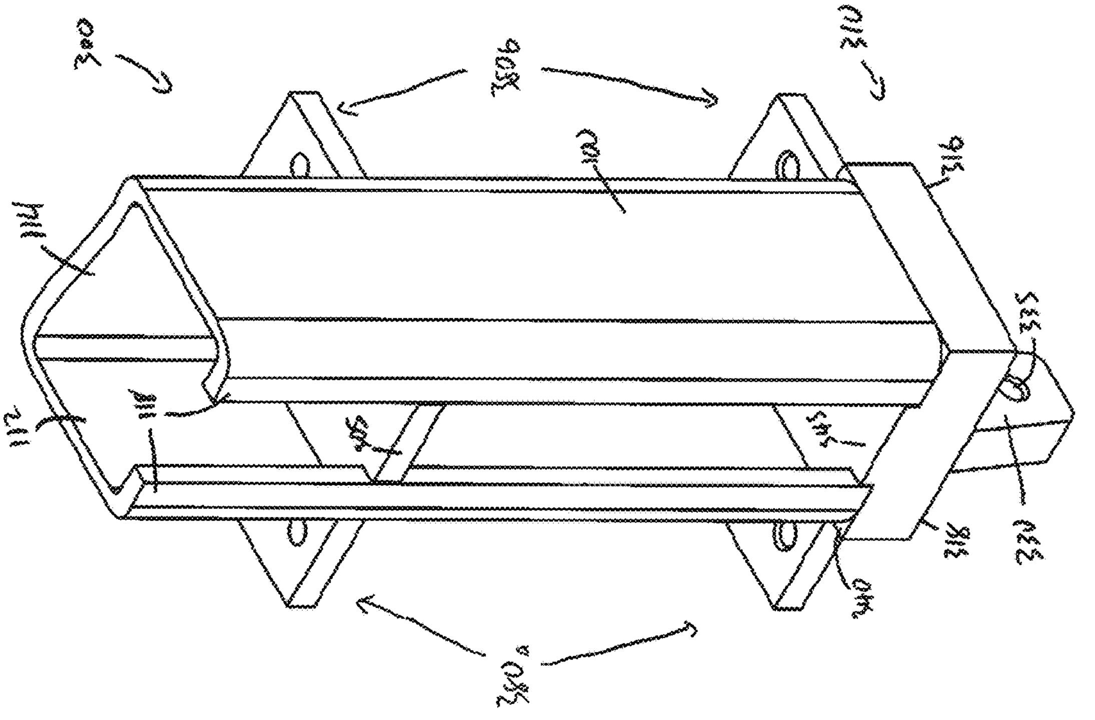
FIG. 11 is a perspective view of a lower junction connector coupled to the lower end of a column in accordance with another embodiment.

FIGS. 11 and 12 illustrate another example embodiment of a lower junction connector 300. In this example, the lower end 310 is thicker than in the example lower junction connector 300 illustrated in FIGS. 5 to 8, providing an increased distance between lower ends of the lateral connectors 380*a*, 380*b* and the lower surface 320 of junction connector 300. By providing a lower junction connector 300 with a thicker lower end 310, a separate spacer plate (discussed further below) may not be required in some embodiments.

FIGS. 16 to 19 illustrate an example embodiment of a lower junction connector 300 coupled to the lower end of a column 100 and to the ends of horizontal structural members 150*a*, 150*b*. Such an arrangement may form part of a volumetric module frame. For example, a rectangular frame may be formed with a lower junction connector 200 at each of the lower corners (see e.g. FIG. 81).

In the illustrated example, the ends of horizontal structural members 150*a*, 150*b* are coupled to, respectively, lateral connectors 380*a*, 380*b* of lower junction connector 300 using a plurality of mechanical fasteners. Providing lateral connectors 380 adapted to be coupled to horizontal structural members 150 using mechanical fasteners may have one or more advantages. For example, a column 100 may be shipped from a fabricator to a building site (or to a staging area near a building site) with a lower junction connector 300 welded to one end, and a module frame may be assembled with reduced labour (e.g. without requiring certified welders), and/or with reduced complexity (e.g. without requiring a complicated jig to maintain the alignment of the components during welding).

In the example illustrated in FIG. 135, lateral connectors 280*a*, 280*b* of upper junction connector 200 are each fabricated as a single piece, and are configured to be reversible (i.e. the same lateral connector 280 may be secured either as a lateral connector 280*a* or as a lateral connector 280*b*). Similarly, lateral connectors 380*a*, 380*b* of lower junction connector 300 are each fabricated as a single piece, and are configured to be reversible (i.e. the same lateral connector 380 may be secured either as a lateral connector 380*a* or as a lateral connector 380*b*). An advantage of this design is that upper and lower junction connectors 280, 380 may be fabricated as brake-formed components. Another advantage is that using the same component as connector 280*a* or 280*b* (or as connector 380*a* or 380*b*) reduce the number of different component required (e.g. as compared with requiring different 'left handed' and 'right handed' connectors 280*a*, 280*b*).

It will be appreciated that, alternatively, the horizontal structural members 150 and lateral connectors 380 may be coupled by welding or in any other suitable manner known to those in the art.

FIGS. 20 to 24 illustrate examples of a column 100 with an upper junction connector 200 welded to one end and a lower junction connector 300 welded to the other end. As discussed above, providing a column 100 with an upper junction connector 200 welded to one end and a lower junction connector 300 welded to the other end may have one or more advantages.

Figure 87:
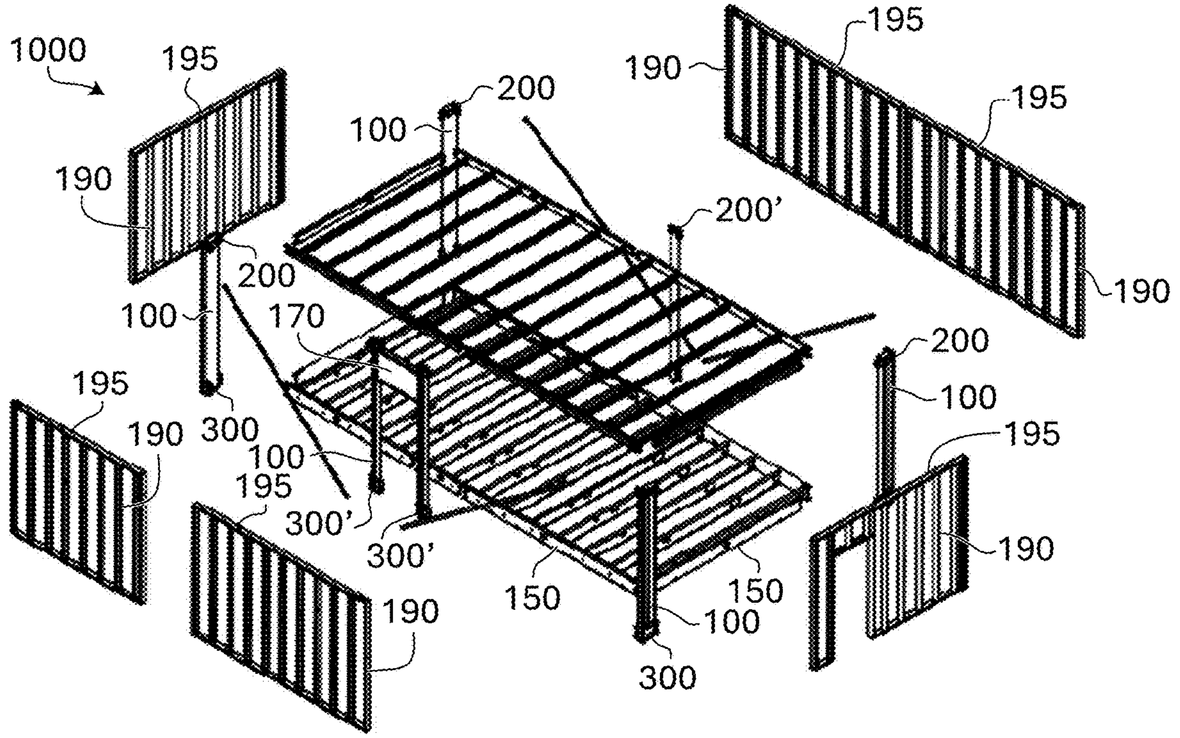
FIG. 87 is an exploded view of the volumetric module frame of FIG. 84.

For example, components for a volumetric modular frame (including e.g. 4 columns with welded junction connectors, and 8 horizontal structural members) may be shipped from a fabricator to a building side (or to a modular factory located proximate a building site) as a 'knock-down' bundle of parts, which may increase the efficiency and/or decrease the cost of shipping (see e.g. FIG. 87). Additionally, the use of mechanical fasteners to couple the lateral connectors of junction connectors to horizontal structural members may allow the components to be assembled relatively quickly, with reduced labour requirements (e.g. person-hours, specialized training), and/or with reduced equipment (e.g. without a complicated jig).

As another example, fabricating the upper and lower junction connectors (and/or columns capped with such connectors) at a central facility may facilitate the production of connection features that have a relatively high dimensional tolerance. Providing junction components with a relatively high tolerance (e.g. reduced clearance when assembled) may facilitate the assembly of volumetric module frames that have relatively high dimensional tolerance, with reduced adjustment and/or modification during assembly.

Figure 20:
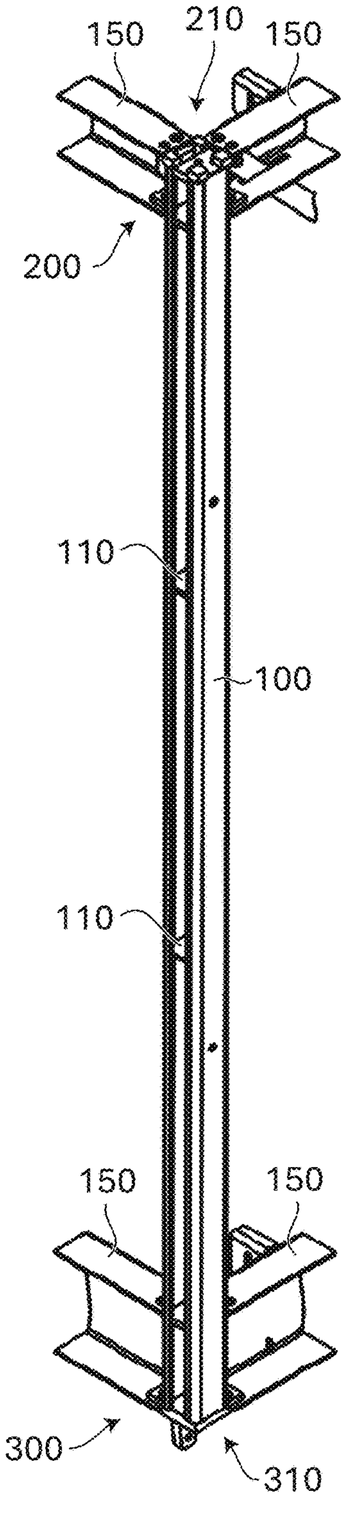
FIG. 20 is a perspective view of a column with upper and lower junction connectors coupled to the ends of the column, and with horizontal structural members coupled to the junction connectors in accordance with one embodiment.
Figure 23:
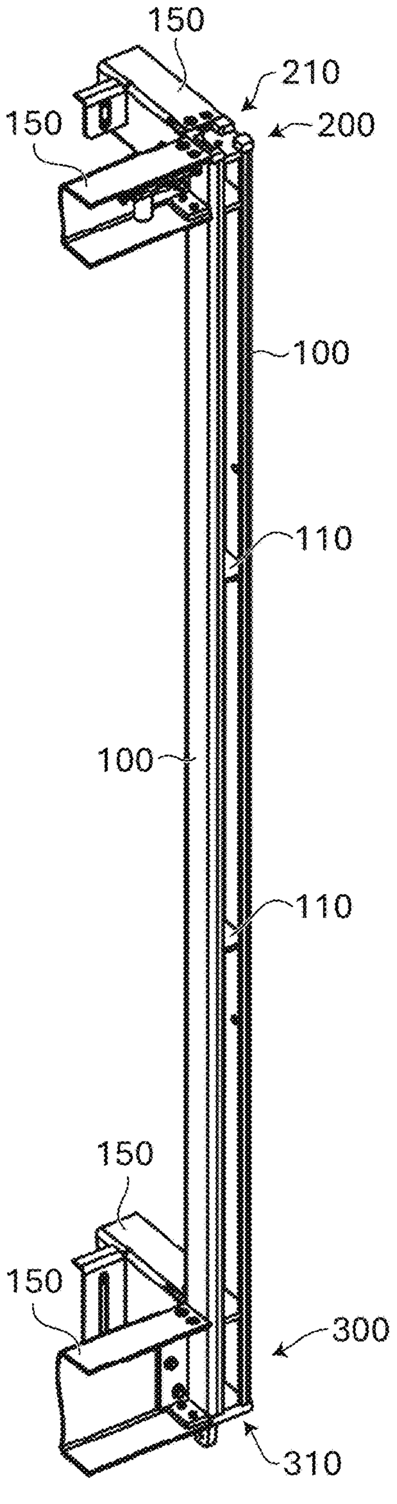
FIG. 23 is a perspective view of a column with upper and lower junction connectors coupled to the ends of the column, and with horizontal structural members coupled to the junction connectors in accordance with another embodiment.
Figure 24:
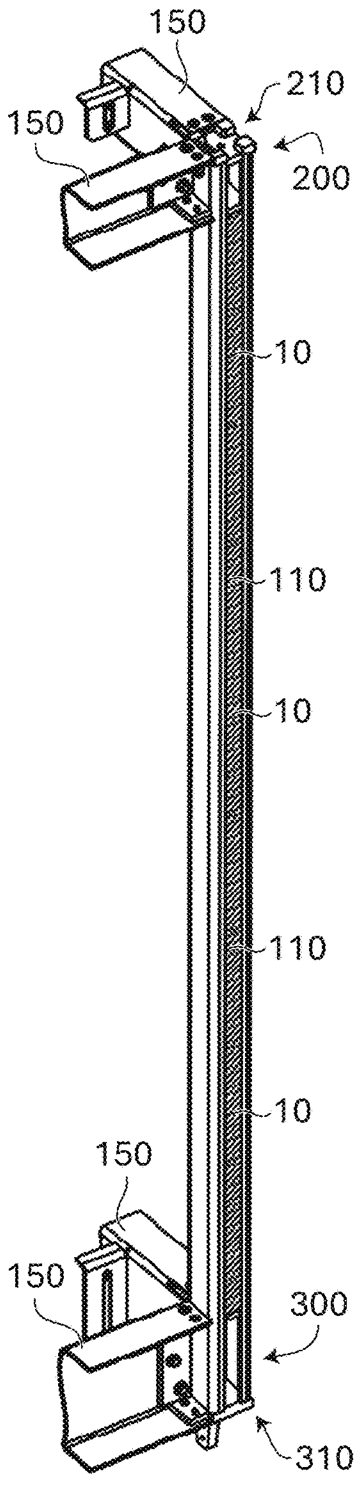
FIG. 24 is a perspective view of the column, junction connectors, and horizontal structural members of FIG. 20, with a central portion of the column filled with a cementitious material in accordance with one embodiment.
Figure 22:
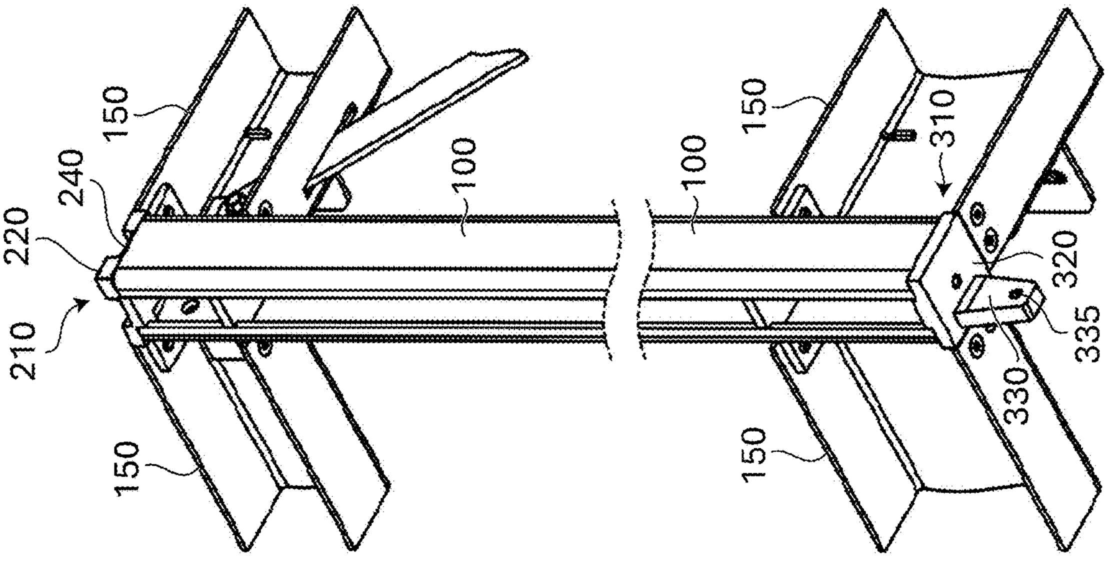
FIG. 22 is another perspective view of the column, junction connectors, and horizontal structural members of FIG. 21.
Figure 21:
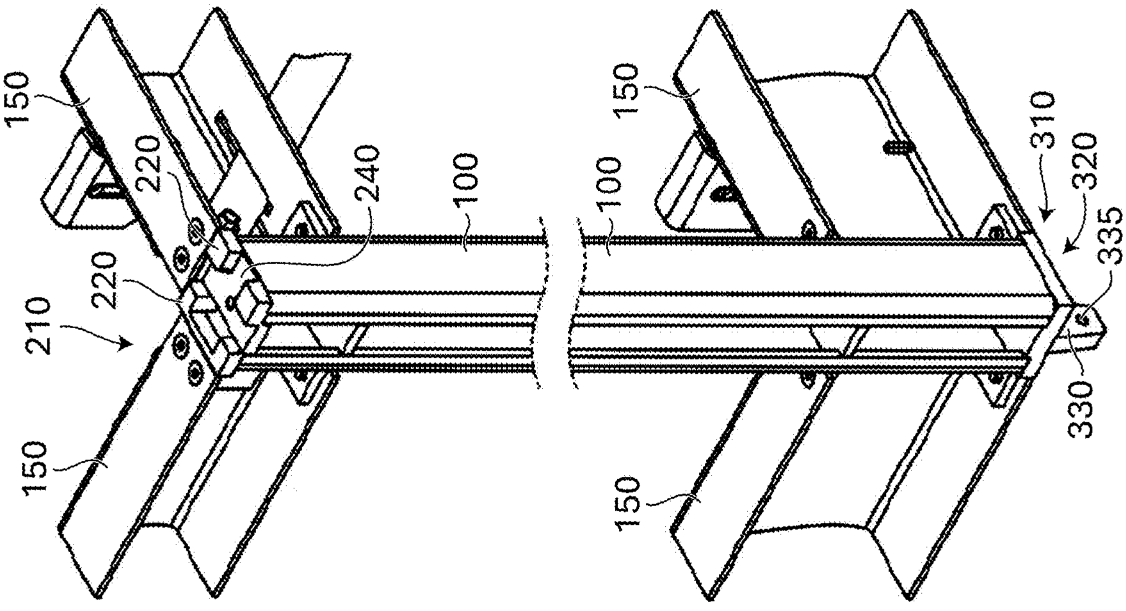
FIG. 21 is a perspective view of the column, junction connectors, and horizontal structural members of FIG. 20, with a central portion of the column omitted for clarity.
Figure 53:
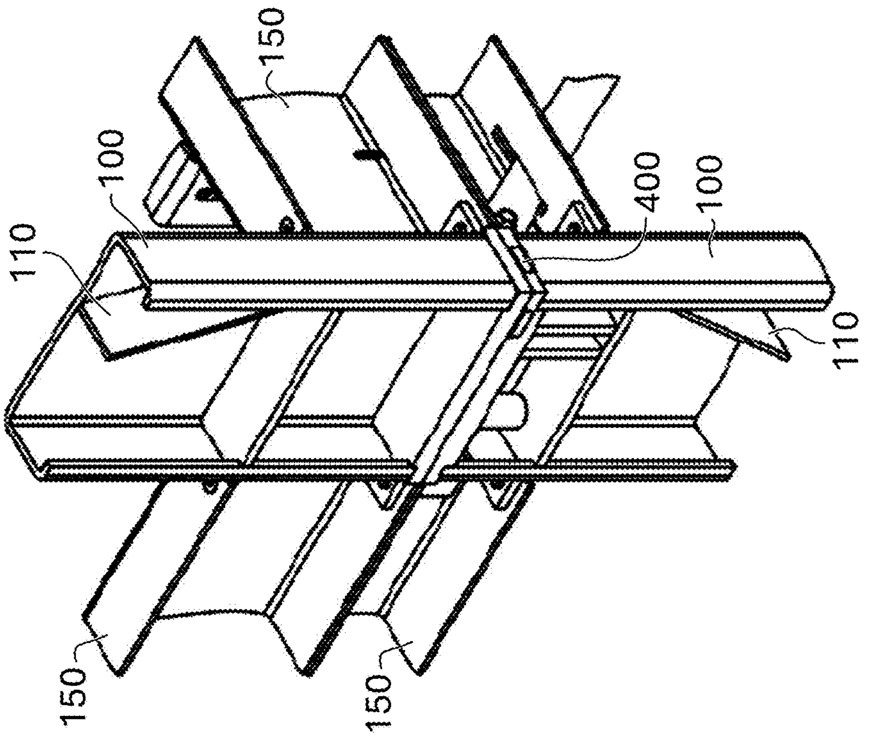
FIG. 53 is a perspective view of a coupling between an upper junction connector and a lower junction connector in accordance with another embodiment.
Figure 57:
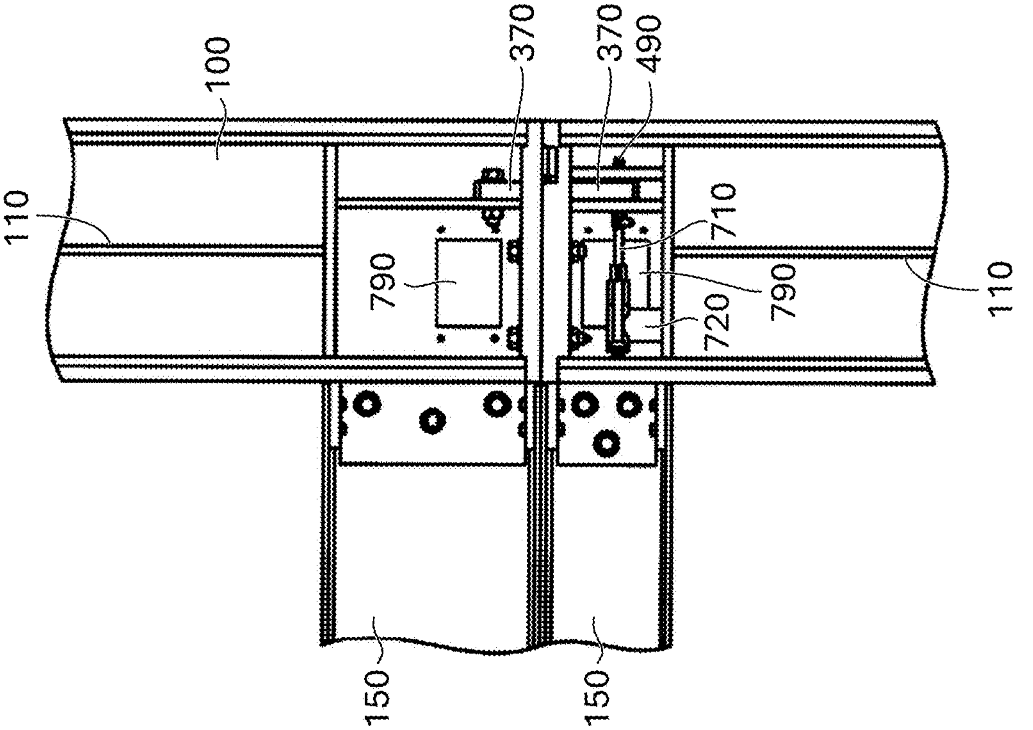
FIG. 57 is a side elevation view of a coupling between an upper junction connector and a lower junction connector, in accordance with another embodiment.
Figure 60:
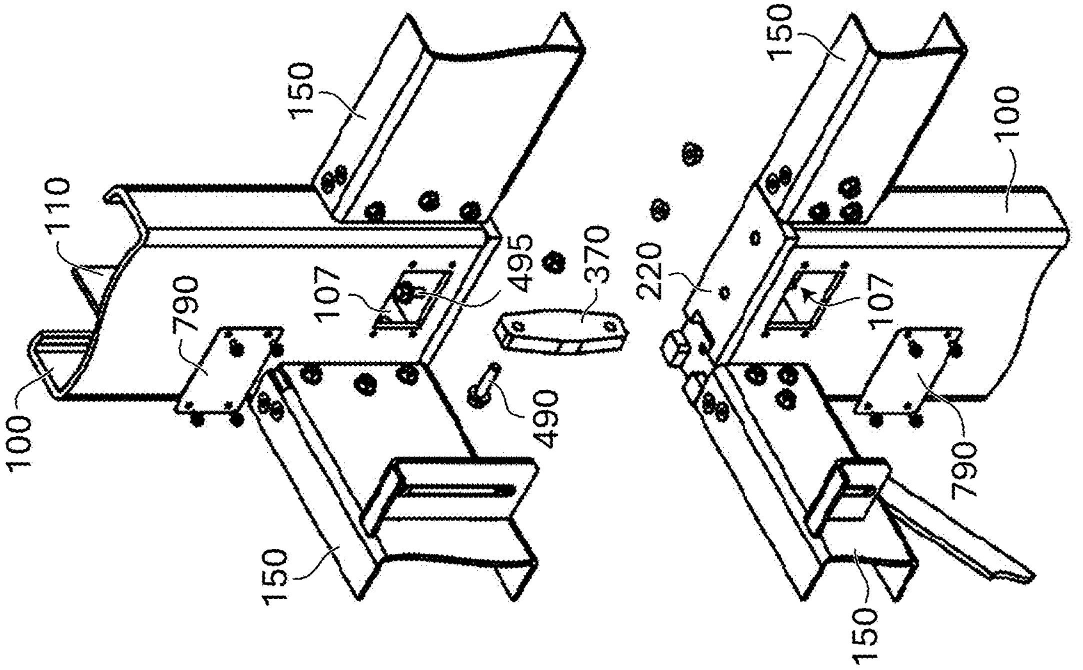
FIG. 60 is another exploded perspective view of the coupling between the upper and lower junction connectors of FIG. 57.
Figure 59:
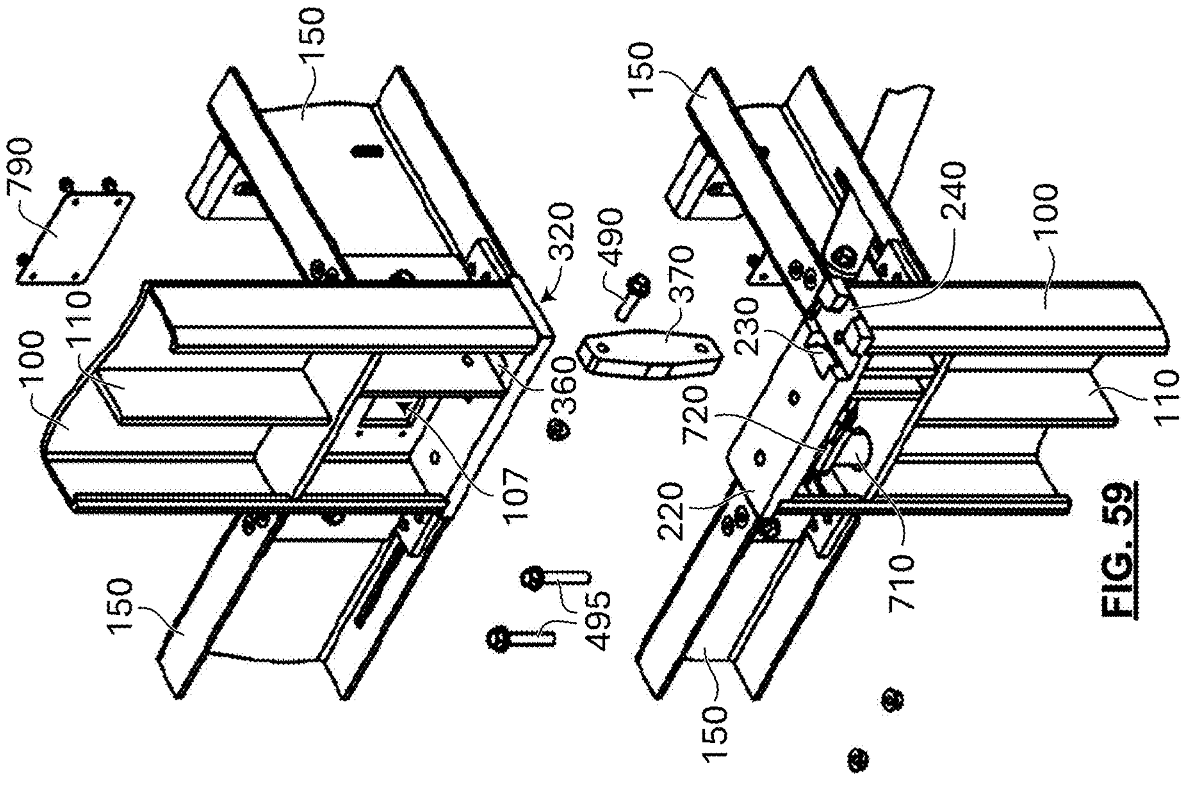
FIG. 59 is an exploded perspective view of the coupling between the upper and lower junction connectors of FIG. 57.

As shown in FIGS. 20, 23, and 24, a column 100 may be provided with one or more interior reinforcing plates 110 in the interior of the column 100. Reinforcing plates 110 may be provided generally perpendicular to a longitudinal axis of the column 100, and/or generally parallel to the longitudinal axis of column 100 (e.g. in wider columns, as in the examples illustrated in FIGS. 53 and 57). Reinforcing plates 110 may be secured to column 100 by welding or in any other suitable manner known to those in the art.

In the example illustrated in FIG. 24, column 100 has been filled with a cementitious material. Such an arrangement may increase the strength and/or load bearing capacity of column 100. Optionally, the cementitious material may be reinforced with rebar, fibers, or other suitable material. Filling a column 100 with a cementitious material may have one or more advantages. For example, it may increase the resistance of the column to the deleterious effects of heat, and/or impede the propagation of fire and/or smoke. As another example, it may reduce or eliminate a void (i.e. the interior of the column) within a building structure.

FIG. 150 illustrates an example of a column 100 that has an upper cap plate 120 secured to an upper end of the column and a lower cap plate 130 secured to a lower end of the column. The upper and lower cap plates 120, 130 may be secured to column 100 by welding or in any other suitable manner known to those in the art.

In the illustrated example, cap plates 120, 130 overlie substantially all of the column ends. An advantage of this design is that it may facilitate providing dimensional tolerance for the 'capped' ends of column 100.

An upper junction connector 200 may be secured to upper cap plate 120. In the illustrated example, one or more mechanical fasteners are used to couple junction connector 200 to upper cap plate 120. Similarly, a lower junction connector 300 may be secured to lower cap plate 130. In the illustrated example, one or more mechanical fasteners are used to couple junction connector 300 to lower cap plate 120.

An advantage of this design is that columns 100 may be separated from junction connectors 200, 300 during assembly of a volumetric module frame, and/or installed later on during assembly of a volumetric module frame. For example, one or more columns 100 may be decoupled from lower junction connectors to facilitate the installation of a floor surface on a lower portion of a module frame. Additionally, or alternatively, one or more columns 100 may be decoupled from upper junction connectors to facilitate the installation of a ceiling surface on an upper portion of a module frame. For example, a floor surface and a ceiling surface may be concurrently installed on upper and lower portions of a module frame that has been partially separated, then the module frame portions may be secured to each other via columns 100. By facilitating parallel access, this may increase the capacity and/or speed of an off-site module assembly facility.

As another example, a floor assembly (e.g. that includes perimeter beams 150, junction connections 300, and infill framing, and optionally including one or more of decking, flooring, HVAC piping, plumbing, electrical wiring, etc.) may be completed to a desired degree as a separate assembly, and then connected with a ceiling assembly (e.g. that includes perimeter beams 150, junction connections 200, and infill framing, and optionally including one or more of drywall, HVAC piping, electrical wiring, etc.) by securing columns between junction connectors 200, 300 to form a volumetric module frame.

FIGS. 147 and 148 illustrate an example of a mid-wall column 100 that has an upper junction connector 200' secured to an upper end of the column and a lower junction connector 300' secured to a lower end of the column. In the illustrated example, a number of optional bores 102 and 104 are provided in the sidewalls of the steel channel. Smaller bores, such as bores 102, may be used to secure light steel framing to column 100, e.g. to attach drywall to a volumetric module frame. Larger bores, such as bores 104, may be used with bolts or other mechanical fasteners to secure adjacent columns to each other in a manner analogous to the connection between horizontal members of vertically adjacent volumetric module frames illustrated in FIGS. 98 to 100. Joining abutting column members 100 to each other may serve to increase the effective width of the structural member, which can be expected to increase its resistance to the forces acting on it, including torsion and compression. Such a connection may also be expected to increase the moment action of a group of end frames of abutting volumetric module frames.

Figure 89:
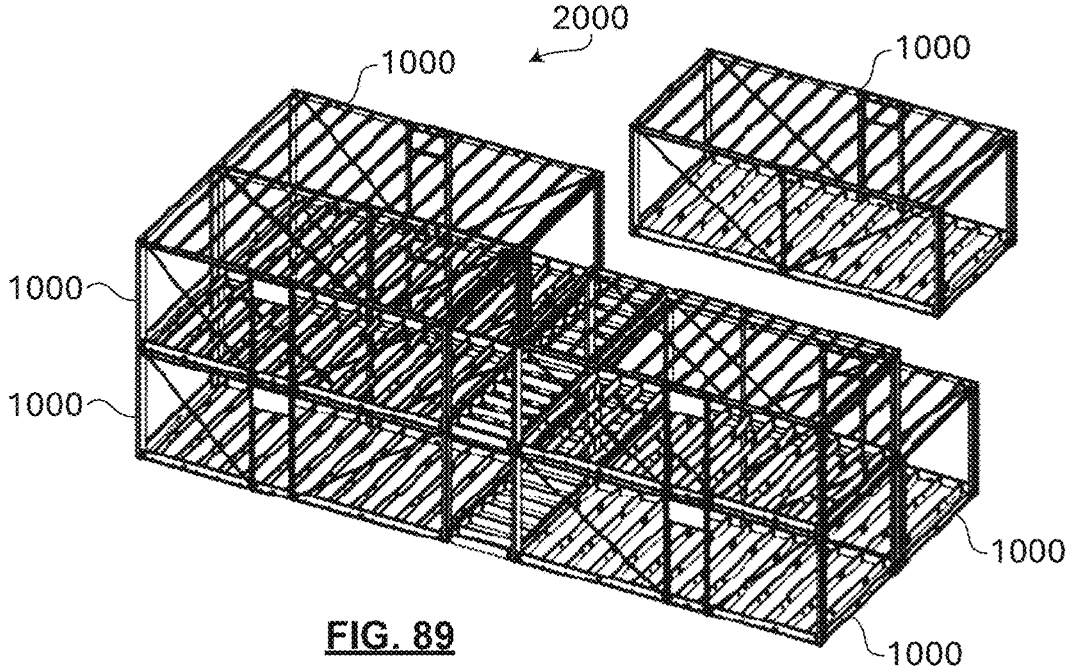
FIG. 89 is a perspective view of a plurality of the volumetric module frames of FIG. 84 coupled to each other to form a building structure, in accordance with one embodiment.

FIGS. 25 to 32 illustrate an example of a connection between an upper junction connector 200 and a lower junction connector 300. Such a connection may be used to secure one volumetric module frame to another volumetric module frame. For example, vertically adjacent rectangular frames may be coupled to each other by securing upper junction connectors 200 located at upper corners of a lower module frame to lower junction connectors 300 located at upper corners of an upper module frame (see e.g. FIG. 89).

Figure 26:
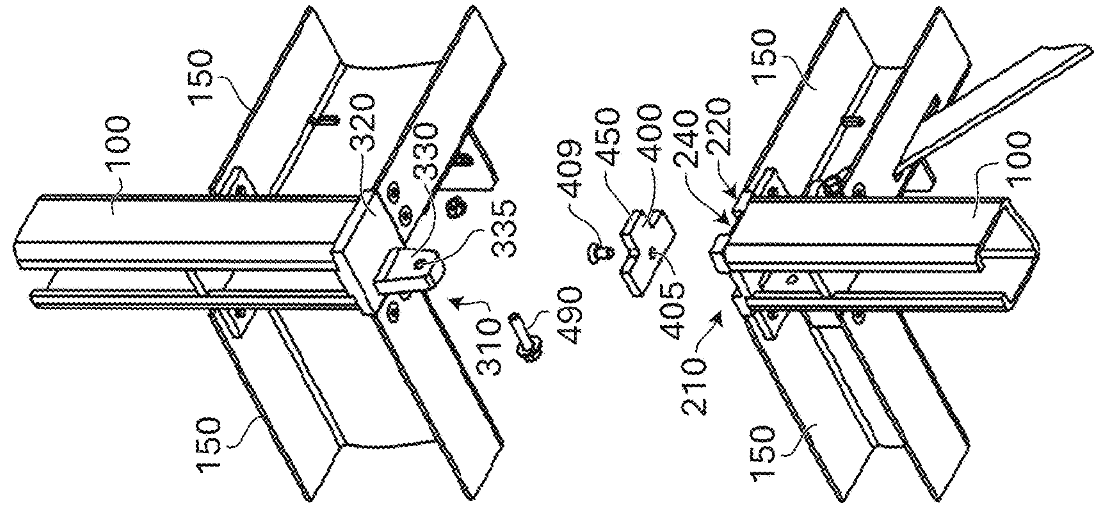
FIG. 26 is another exploded view of the coupling between the upper and lower junction connectors of FIG. 25.
Figure 25:
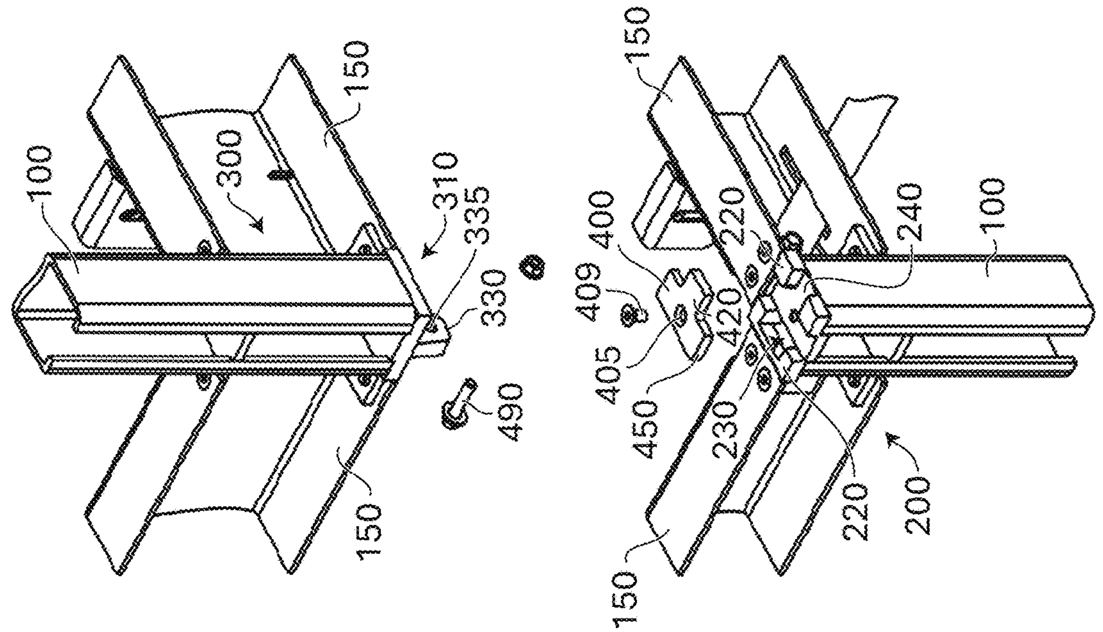
FIG. 25 is an exploded view of a coupling between an upper junction connector and a lower junction connector in accordance with one embodiment.

With reference to FIGS. 25 and 26, an upper junction connector 200 (coupled to a column 100 and to horizontal structural members 150) and a lower junction connector 300 (coupled to another column 100 and horizontal structural members 150) may be brought into alignment, with securement tab 330 aligned with slot 230.

In the illustrated example, a cap member 400 is provided to seat in the recessed area in the upper end 210 of junction connector 200. Preferably, one or more of the sidewalls 450 of cap member 400 are tapered such that the sidewalls 450 sit flush against interior connector sidewalls 250 of upper end 210 of upper junction connector 200 when the cap member is seated in the recessed area.

In the illustrated example, cap member 400 is dimensioned such that, when seated in the recessed area in the upper end 210 of junction connector 200, an upper surface 420 of cap member 400 is recessed from the upper surface 220 of junction connector 200. Alternatively, cap member 400 may be dimensioned such that it sits flush with the upper surface 220 of junction connector 200 when seated in the recessed area 210.

Figure 28:
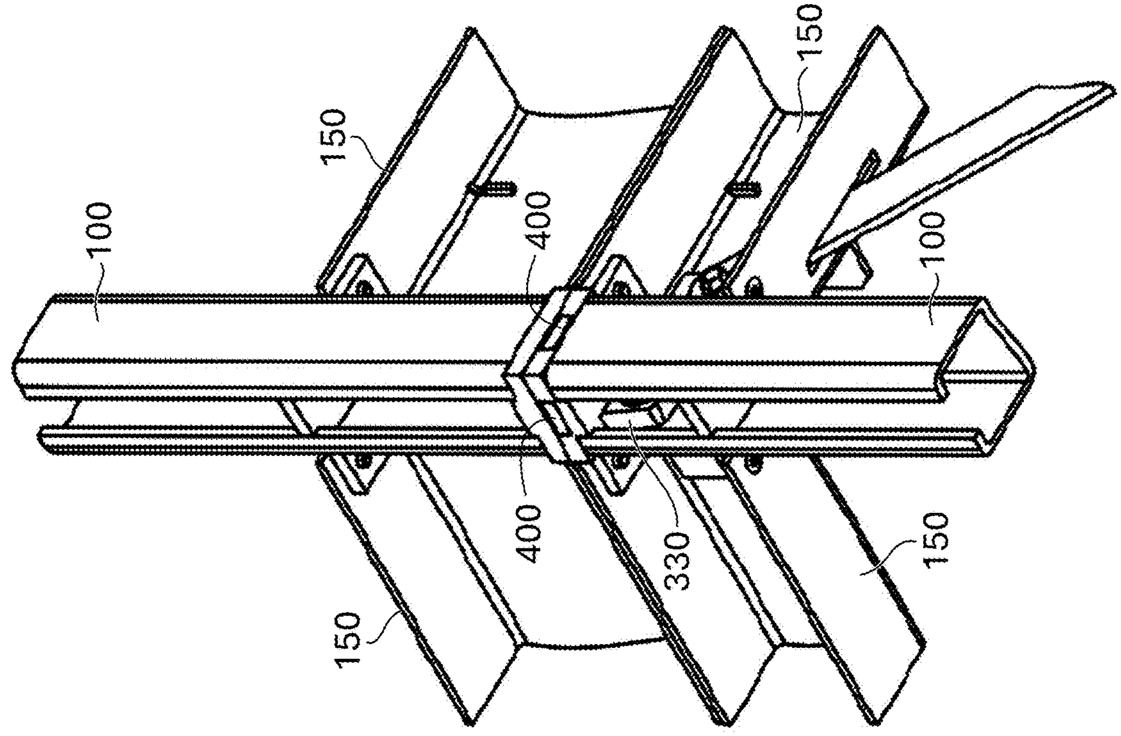
FIG. 28 is another perspective view of the coupling between the upper and lower junction connectors of FIG. 25.
Figure 32:
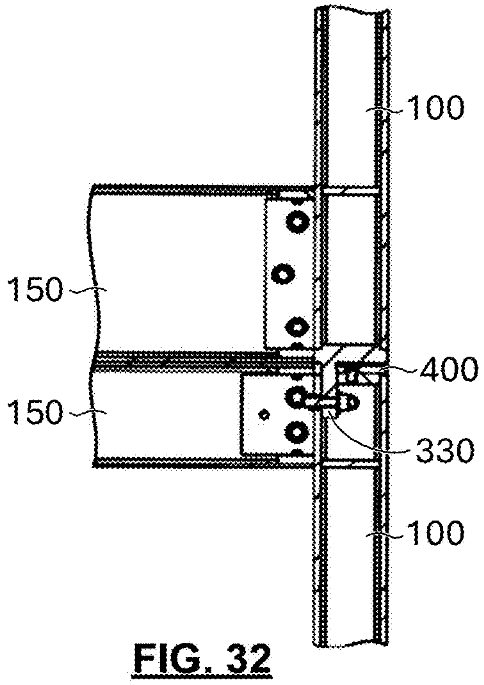
FIG. 32 is a section view of the upper junction connector, column end, and horizontal structural members of FIG. 10, taken along line 32-32 in FIG. 30.

As can be seen in FIGS. 28 and 32, when the securement tab 330 of the lower junction connector is received in the slot 230 of the upper junction connector, and the lower surface 320 of the lower end 310 of the lower junction connector 300 abuts the upper surface 220 of the upper end 210 of the upper junction connector 200 and the upper surface 420 of cap member 400, a securement bolt 490 may be positioned through both the transverse bore 105 in the first column sidewall 112 and through the transverse bore 335 of the securement tab 330. In such an arrangement, the upper junction connector and the lower junction connector are secured in a fixed orientation to each other.

Providing an upper junction connector 200 and a lower junction connector 300 that can be connected as illustrated in FIGS. 25 to 32 may have one or more advantages. For example, during assembly of a building structure the upper surface of volumetric module frame may lack upwardly projecting surface features. Features that project upwardly from the top face of a module may present a safety hazard, e.g. due to the risk of workers tripping. They may also create an impediment to the protection of an incomplete building from precipitation, e.g. due to interference with tarpaulins used for that purpose. They may also cause difficulty with the placement of insulation and/or roofing on the top face of a completed building.

Figure 31:
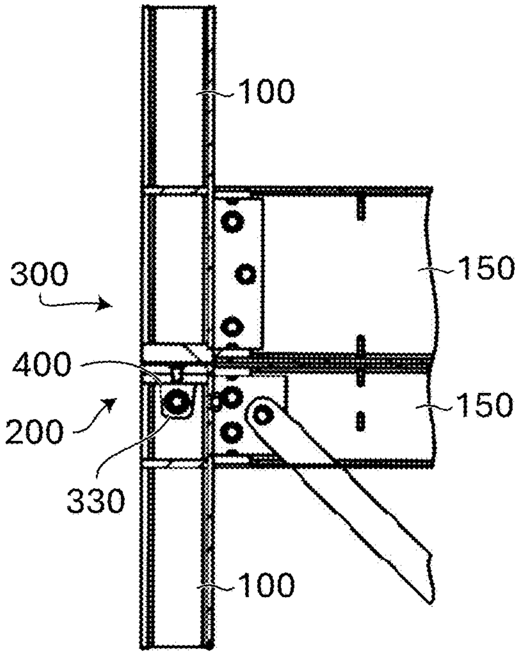
FIG. 31 is a section view of the upper junction connector, column end, and horizontal structural members of FIG. 30, taken along line 31-31 in FIG. 30.
Figure 33:
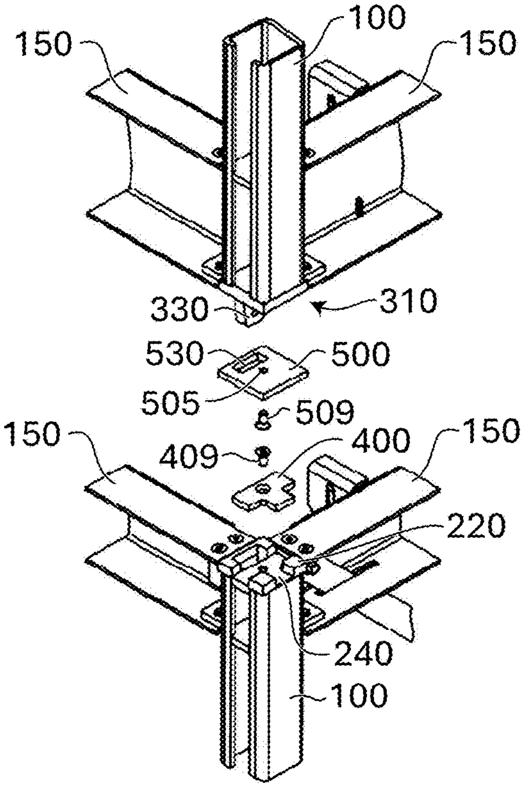
FIG. 33 is an exploded view of a coupling between an upper junction connector and a lower junction connector in accordance with another embodiment.
Figure 30:
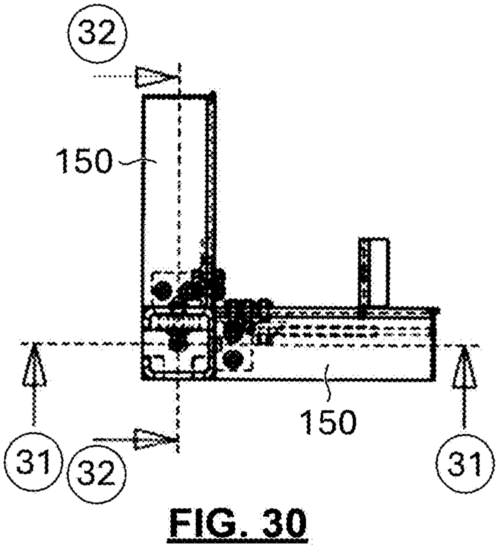
FIG. 30 is a top section view of the coupling between the upper and lower junction connectors of FIG. 25.

Also, with reference to FIGS. 31 and 32, such a connection may provide contact between the horizontal members of vertically adjacent volumetric module frames. In such an arrangement, the connection between vertically adjacent volumetric module frames may be characterized as having a distributed load profile, which may provide capacity to transfer vertical loads through the structure of the walls to the supporting framework at a lower level of the building, or to the foundation, and may improve the transfer of lateral and longitudinal loads to a core, shear walls, etc.

Figure 98:
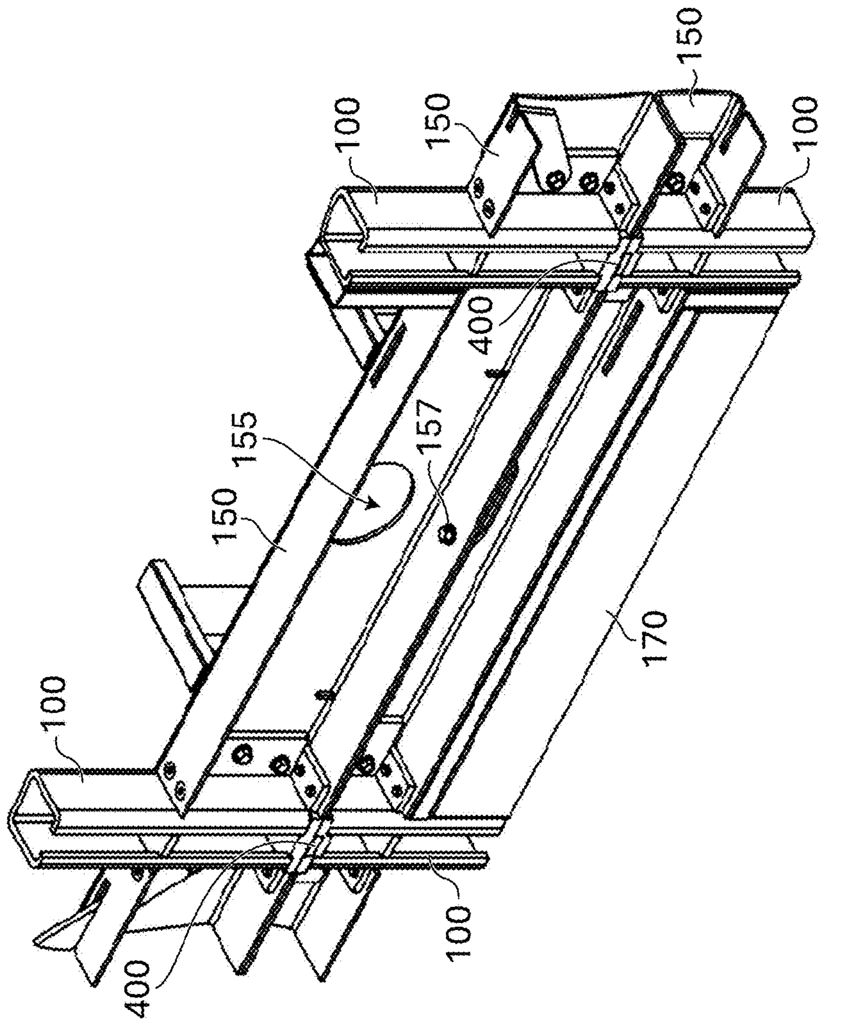
FIG. 98 is a perspective view of a coupling between a lower end of a first door frame and an upper end of a second door frame, in accordance with one embodiment.
Figure 99:
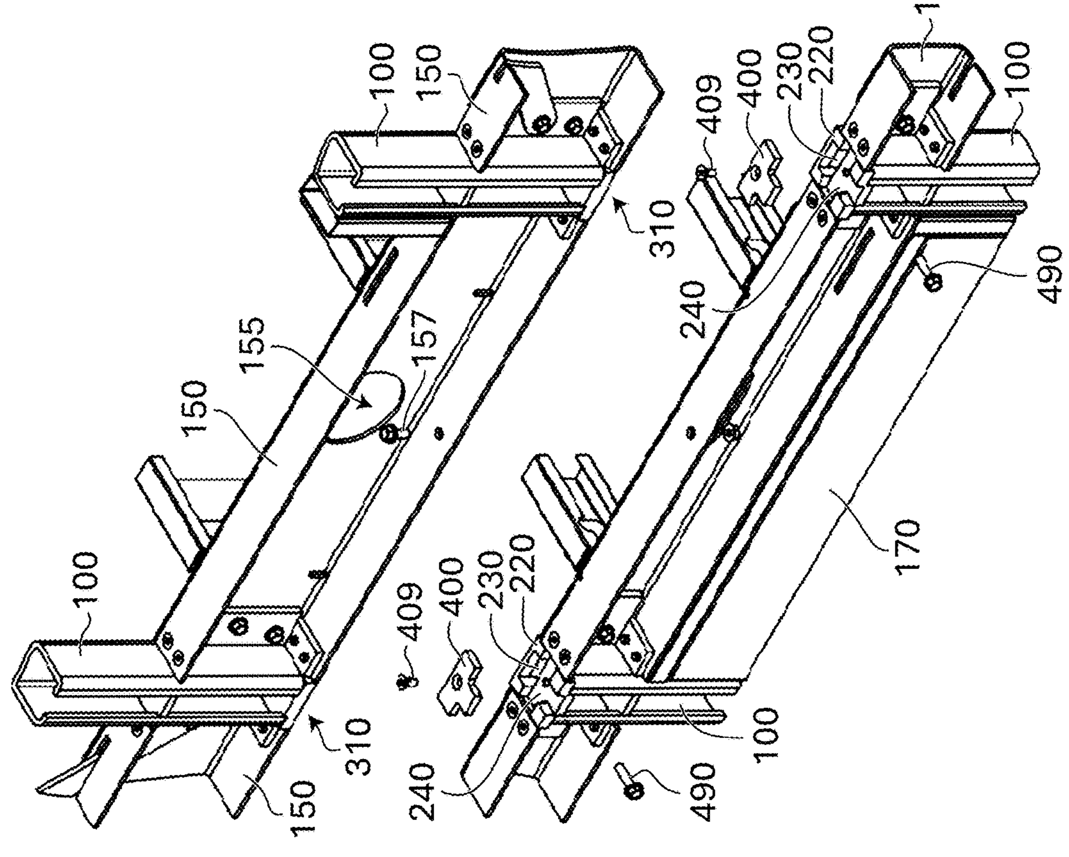
FIG. 99 is an exploded view of the coupling between the lower end of the first door frame and the upper end of the second door frame of FIG. 98.
Figure 100:
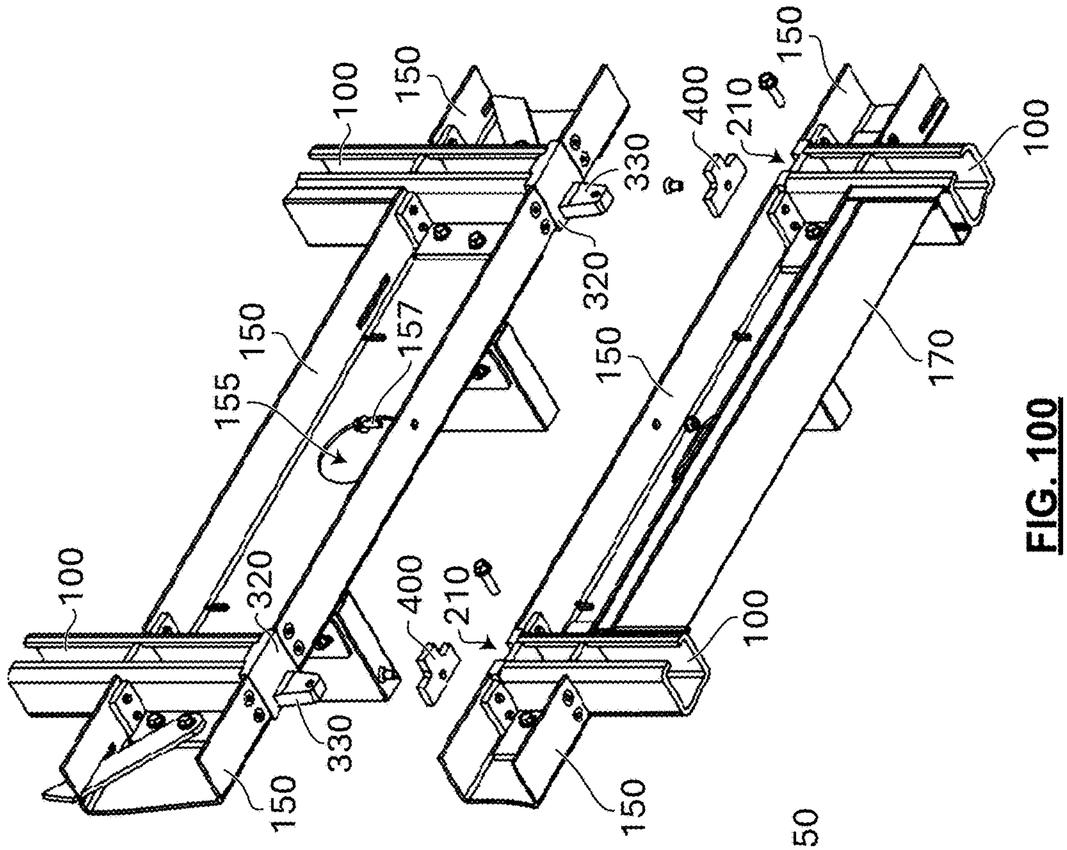
FIG. 100 is another exploded view of the coupling between the lower end of the first door frame and the upper end of the second door frame of FIG. 98.

Also, joining abutting horizontal structural members 150 to each other with one or more bolts (or other mechanical fasteners) as shown in FIGS. 98 to 100 may serve to increase the effective depth of the structural member, which can be expected to increase its resistance to the forces acting on it, including torsion, compression, and gravity. Additionally, joining abutting structural members may increase the capacity to resist shear loads (such as those that may be caused by the horizontal acceleration imposed on a building frame by an earthquake) along the abutting edges of volumetric modules in a building structure. As discussed below, one or more cutouts 155 may be provided in a sidewall of a horizontal structural member 150 to facilitate access to bolts 157, e.g. during installation and/or inspection.

FIGS. 33 to 36 illustrate an example of another connection between an upper junction connector 200 and a lower junction connector 300. In the illustrated example, a spacer member 500 is provided between the junction connectors 200, 300. Spacer member 500 has a slot 530 to accommodate securement tab 330, and a bore 505 for securing spacer member 500 against the lower surface 320 of lower junction connector 300.

Figure 35:
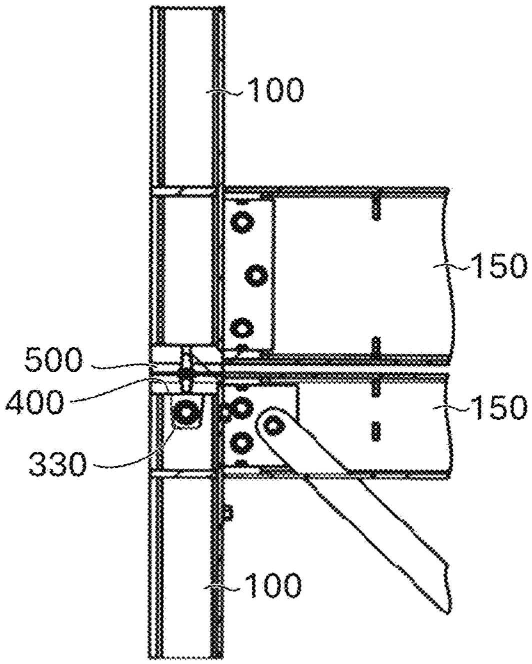
FIG. 35 is a section view of the upper junction connector, column end, and horizontal structural members of FIG. 34, taken along line 35-35 in FIG. 34.
Figure 34:
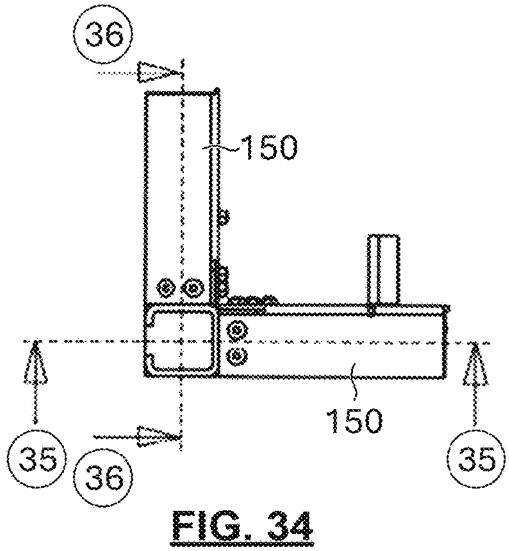
FIG. 34 is a top plan view of a coupling between the upper and lower junction connectors of FIG. 33.
Figure 36:
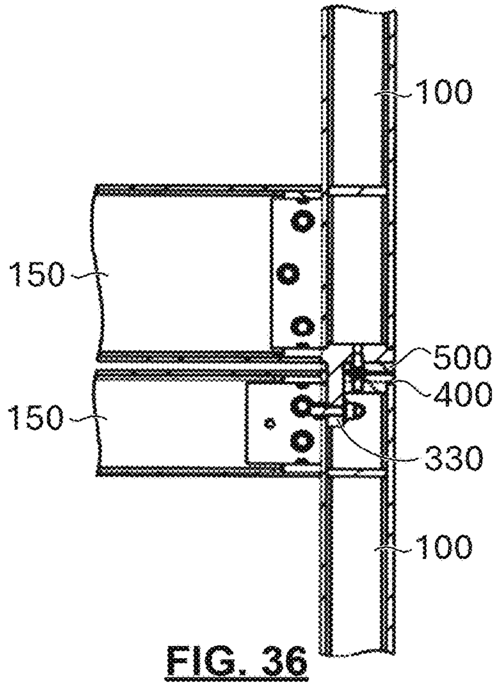
FIG. 36 is a section view of the upper junction connector, column end, and horizontal structural members of FIG. 34, taken along line 36-36 in FIG. 34.

As can be seen in FIGS. 35 and 36, when the spacer member 500 is sandwiched between the junction connectors 200, 300, the horizontal members of vertically adjacent volumetric module frames are spaced from each other. In such an arrangement, the connection between vertically adjacent volumetric module frames may be characterized as having point loads at the connection locations. Such an arrangement may be desirable in cases where the horizontal circulation of services is facilitated, and/or when volumetric modules are structurally braced so as to span between vertical load paths so as to create an open space below, as for an opening between two adjacent spaces.

Optionally, spacer member may be made from a compressible and/or resilient material, which may provide a degree of seismic isolation between vertically adjacent volumetric module frames.

Instead of providing separate spacer plates, a lower junction connector 300 may be provided with a relatively thick lower end 310 (e.g. as shown in FIGS. 11 and 12), providing an increased distance between lower ends of the lateral connectors 380*a*, 380*b* and the lower surface 320 of junction connector 300. It will be appreciated that, additionally or alternatively, an upper junction connector 200 may be provided with a relatively thick upper end 210, providing an increased distance between upper ends of lateral connectors 280*a*, 280*b* and the upper surface 220 of junction connector 200.

Providing spacing between horizontal members of vertically adjacent volumetric module frames may have one or more advantages. For example, it may facilitate the provision of thermal and/or acoustic breaks in a resulting structure, it may facilitate the installation of fire-proofing materials between adjacent volumetric modules, it may improve the acoustic performance of the building, and/or it may allow for clearance around bracing.

In addition to providing vertical connections between upper junction connectors 200 and lower junction connector 300, exemplary embodiments of the present system provide lateral connections between adjacent upper junction connectors 200.

Figure 37:
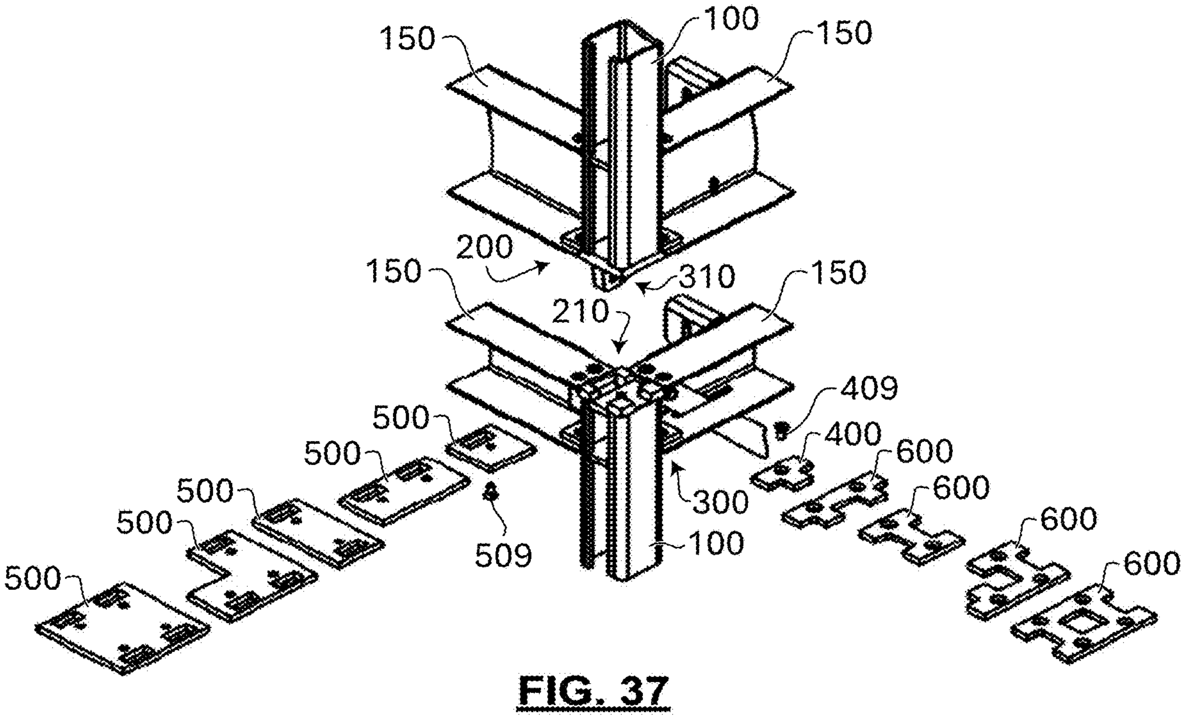
FIG. 37 is an exploded view of a coupling between an upper junction connector and a lower junction connector, with a cap member, a plurality of lateral tie members, and a plurality of spacer plates in accordance with one embodiment.

FIG. 37 illustrates an example of an upper junction connector 200, a lower junction connector 300, and a variety of lateral tie members 600, a cap member 400, and a variety of spacer plates 500. Such components can be used to provide a number of different connections between adjacent junction connectors, which may advantageously provide increased design flexibility for constructing a building structure using volumetric module frames, with a relatively low number of component types.

Figure 38:
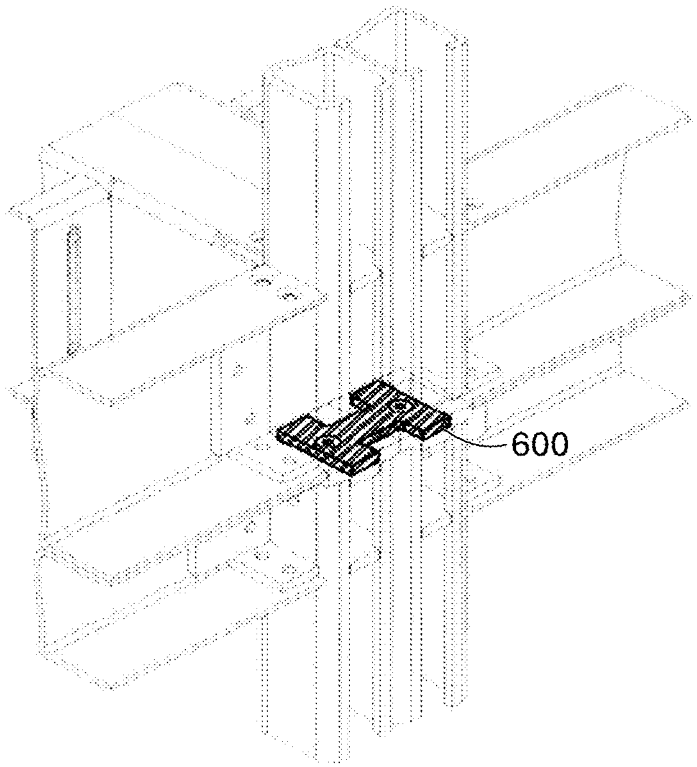
FIG. 38 is a perspective view of a coupling between two adjacent junction connectors using a lateral tie member, with portions of the junction connectors shown as translucent, in accordance with one embodiment.

FIG. 38 illustrates an example connection between two adjacent upper junction connectors 200*a*, 200*b* using a lateral tie member 600. Lateral tie member 600 is dimensioned to seat concurrently in both the recessed area of junction connector 200*a* and in the recessed area of junction connector 200*b*. Preferably, one or more of the sidewalls 650 of tie member 600 are tapered such that the sidewalls 650 sit flush against interior connector sidewalls 250 of junction connectors 200*a*, 200*b* when the tie member is seated in the recessed areas.

Similar to cap member 400, tie member 600 is dimensioned such that, when seated in the recessed areas of the upper ends of junction connectors 200*a*, 200*b*, an upper surface 620 of tie member 600 is recessed from or flush with the upper surfaces 220 of junction connectors 200*a*, 200*b*.

Additionally, or alternatively, providing a tapered interface between tie member 600 and interior connector sidewalls 250 may result in a horizontal clamping action being exerted by the tie member on the junction connectors in which it is seated as it is seated in the recesses (e.g. as one or more threaded fasteners forcing the tie member down are tightened). For example, tie member 600 may be dimensioned to promote tight contact between adjacent junction connectors, which may promote lateral force transfer between adjacent volumetric module frames.

Figure 39:
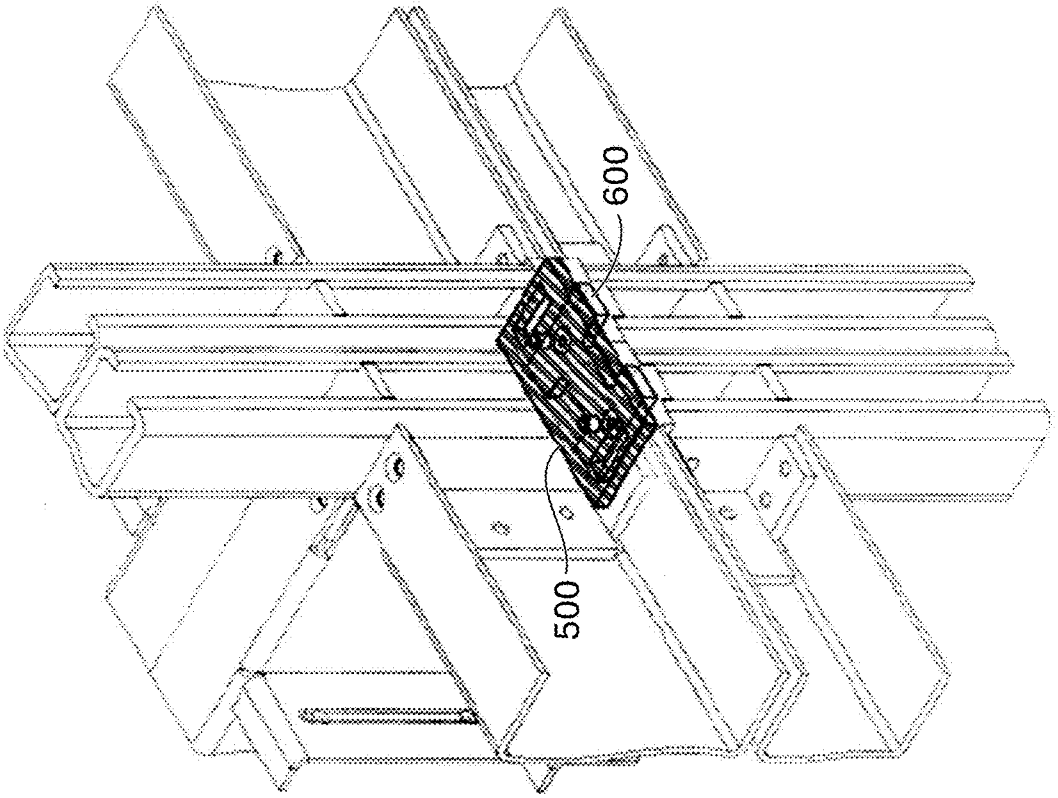
FIG. 39 is a perspective view of a coupling between two adjacent junction connectors using a lateral tie member and a spacer plate, with portions of the junction connectors and spacer plate shown as translucent, in accordance with one embodiment.

FIG. 39 illustrates an example connection between two adjacent upper junction connectors using the lateral tie member 600 of FIG. 38, and a spacer plate 500 to provide vertical separation between the two upper and lower volumetric module frames.

Figure 40:
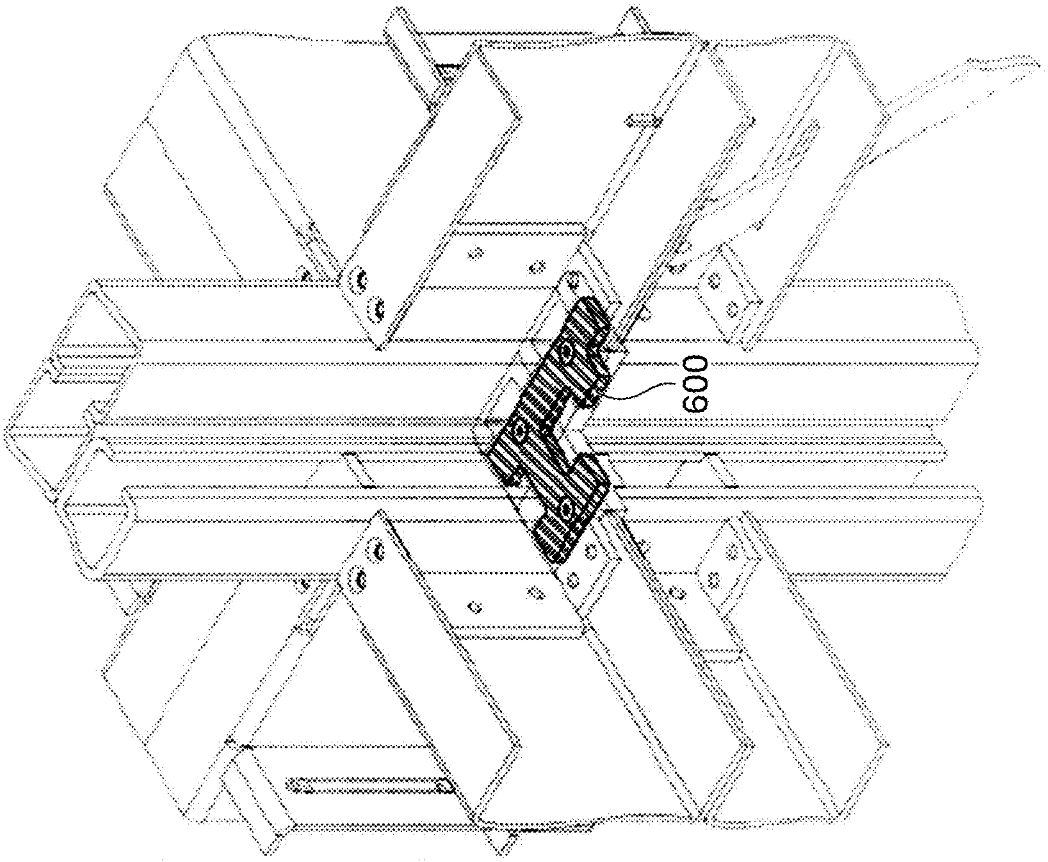
FIG. 40 is a perspective view of a coupling between three adjacent junction connectors using a lateral tie member, with portions of the junction connectors shown as translucent, in accordance with one embodiment.

FIG. 40 illustrates an example connection between three adjacent upper junction connectors 200*a*, 200*b*, and 200*c* using a lateral tie member 600. Lateral tie member 600 is dimensioned to seat concurrently in the recessed areas of junction connectors 200*a*, 200*b*, and 200*c*. Preferably, one or more of the sidewalls 650 of tie member 600 are tapered to sit flush against interior connector sidewalls 250.

Figure 41:
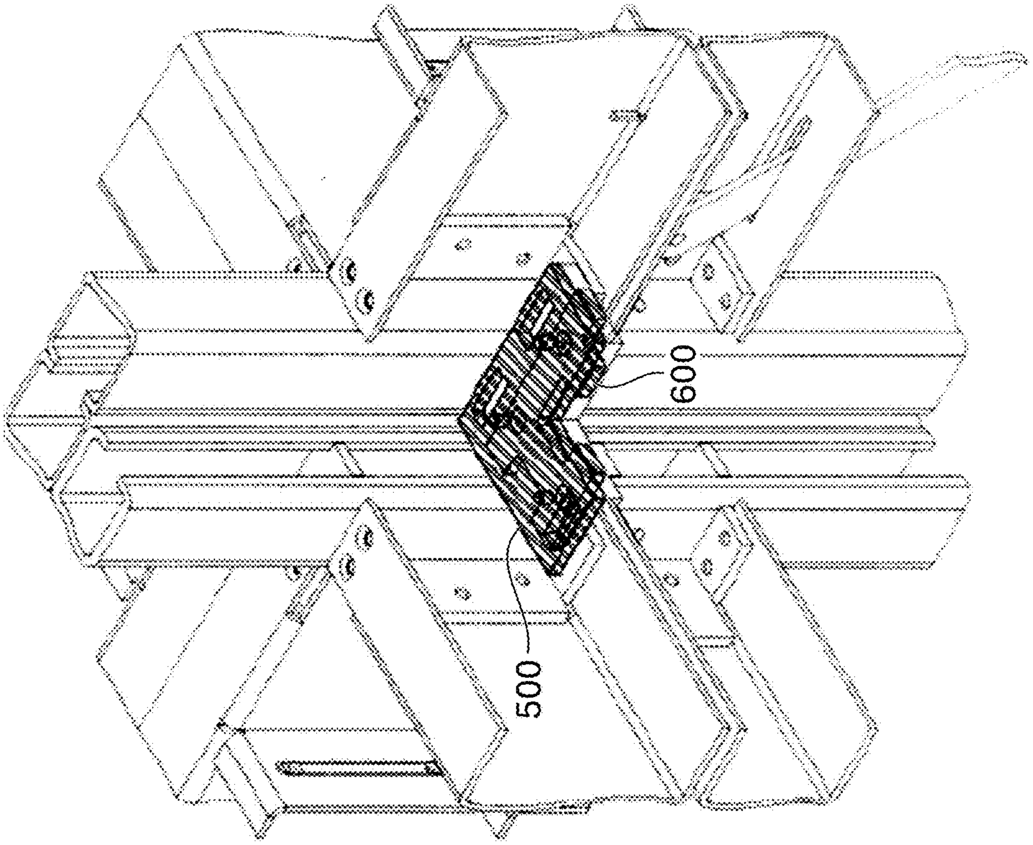
FIG. 41 is a perspective view of a coupling between three adjacent junction connectors using a lateral tie member and a spacer plate, with portions of the junction connectors and spacer plate shown as translucent, in accordance with one embodiment.

FIG. 41 illustrates an example connection between three adjacent upper junction connectors using the lateral tie member 600 of FIG. 40, and a spacer plate 500 to provide vertical separation between the three upper and lower volumetric module frames.

Figure 42:
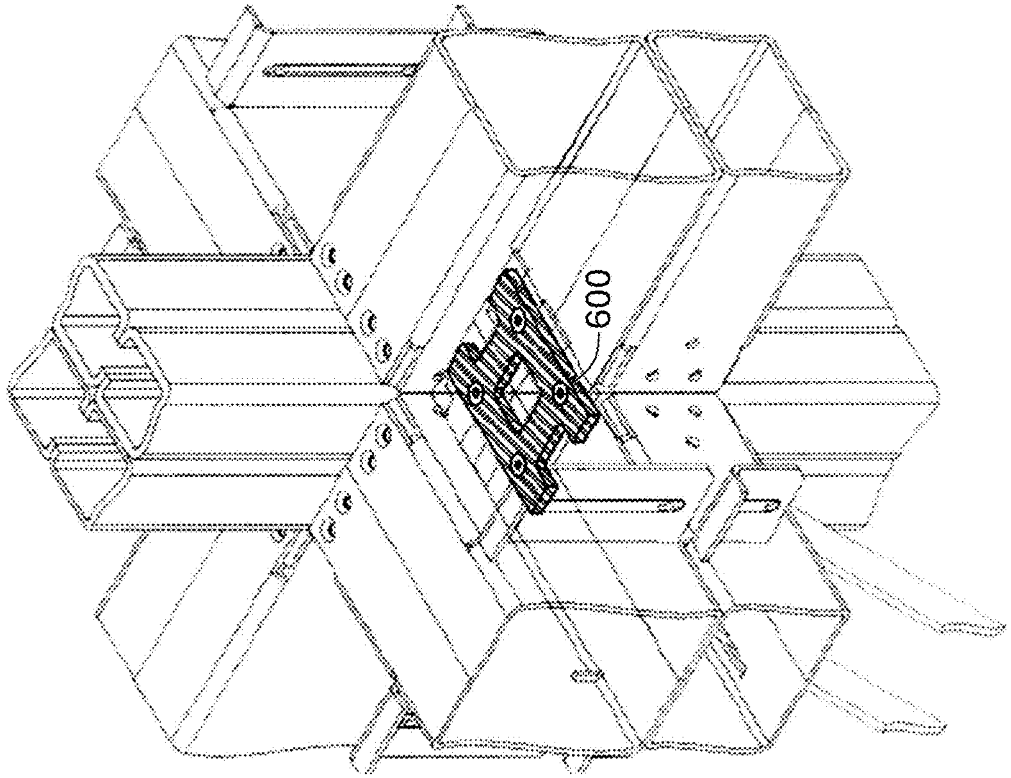
FIG. 42 is a perspective view of a coupling between four adjacent junction connectors using a lateral tie member, with portions of the junction connectors shown as translucent, in accordance with one embodiment.

FIG. 42 illustrates an example connection between four adjacent upper junction connectors using a lateral tie member 600. Lateral tie member 600 is dimensioned to seat concurrently in the recessed areas of all lower four junction connectors, and preferably has one or more tapered sidewalls 650 to sit flush against interior connector sidewalls 250.

Figure 43:
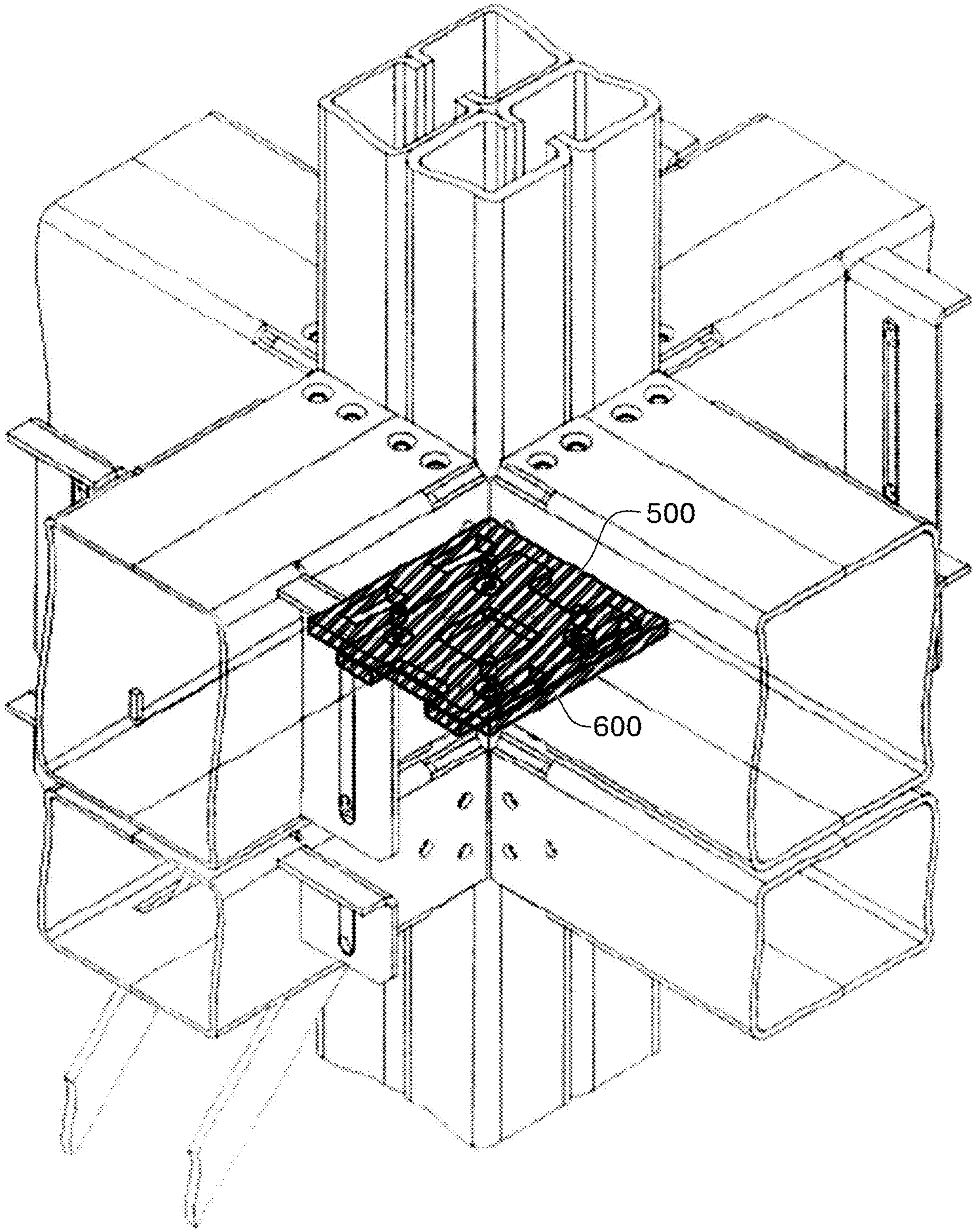
FIG. 43 is a perspective view of a coupling between four adjacent junction connectors using a lateral tie member and a spacer plate, with portions of the junction connectors and spacer plate shown as translucent, in accordance with one embodiment.
Figure 44:
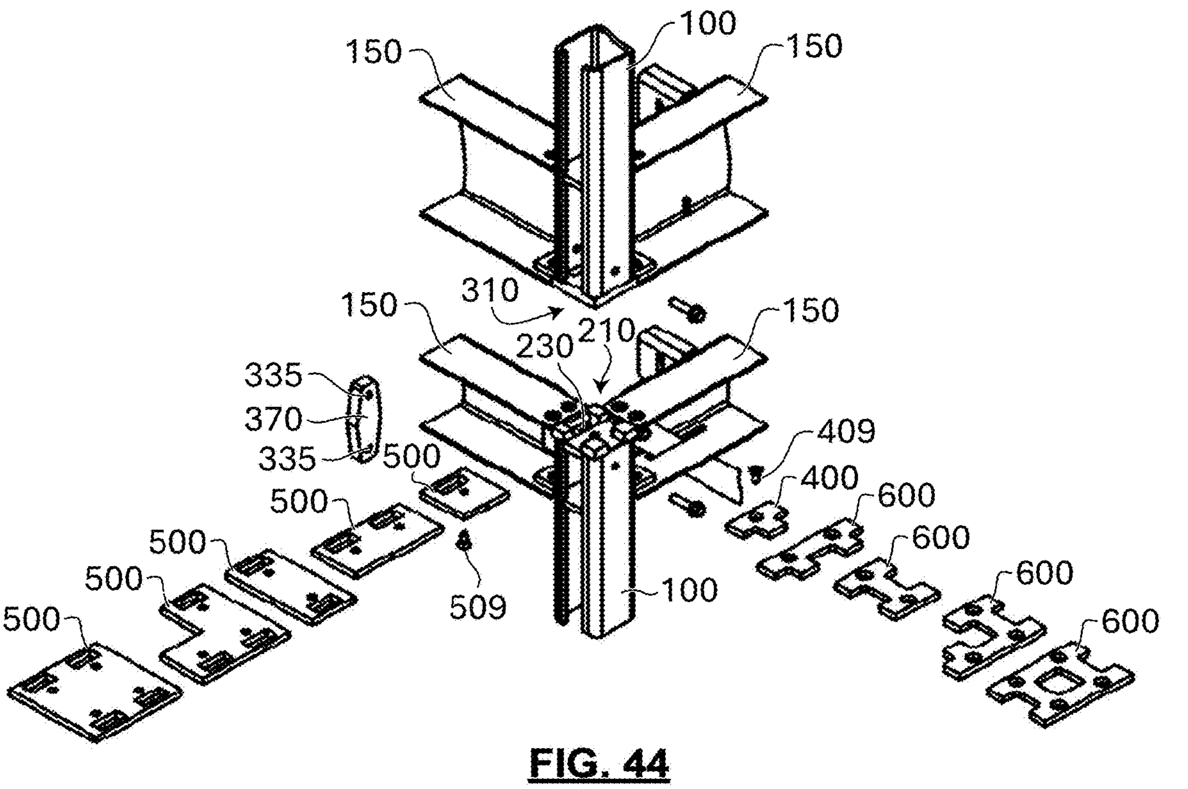
FIG. 44 is an exploded view of a coupling between an upper junction connector and a lower junction connector, with a plurality of lateral tie members and a plurality of spacer plates, in accordance with another embodiment.
Figure 45:
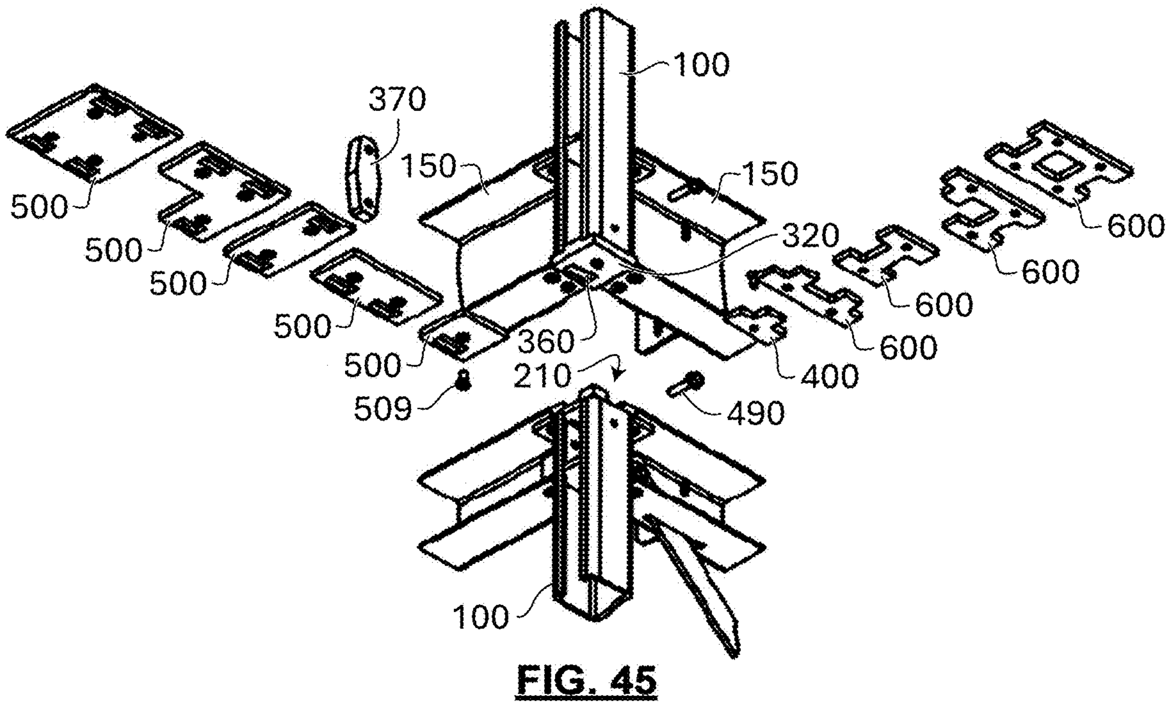
FIG. 45 is another exploded view of the coupling between the upper and lower junction connectors and the plurality of lateral tie members and the plurality of spacer plates of FIG. 44.
Figure 47:
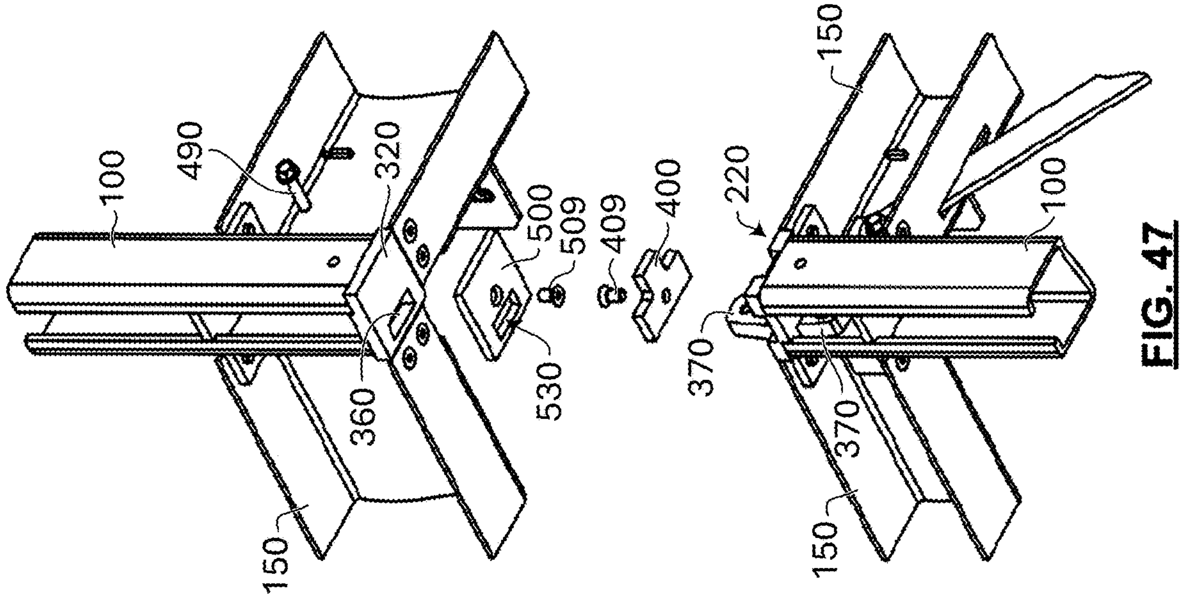
FIG. 47 is another exploded view of the coupling between the upper and lower junction connectors of FIG. 46.
Figure 46:
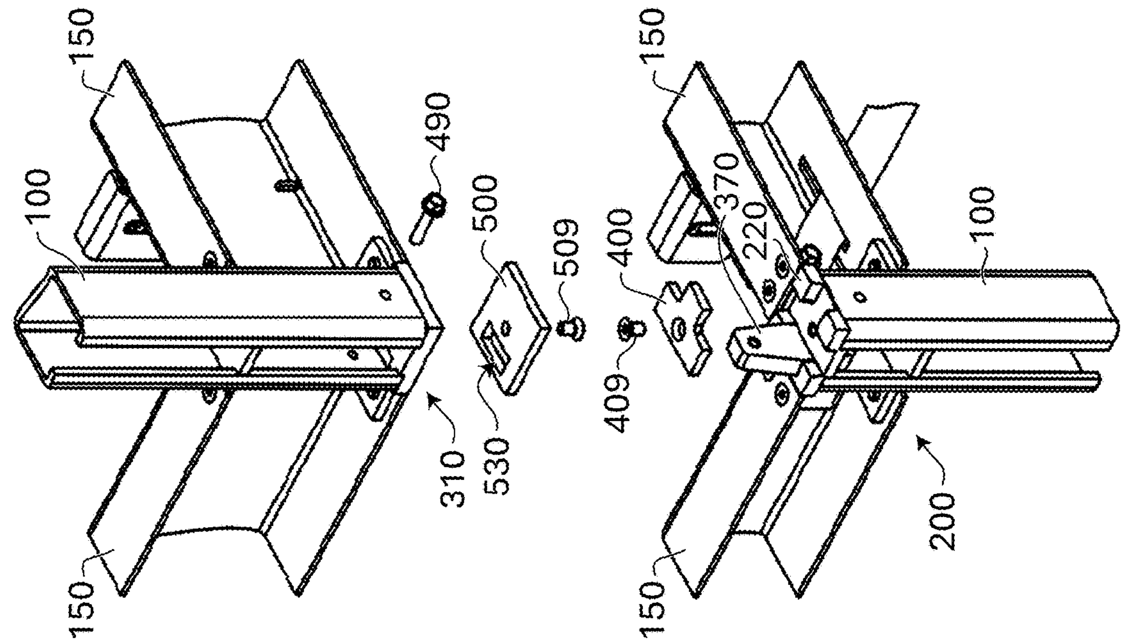
FIG. 46 is an exploded view of a coupling between an upper junction connector and a lower junction connector, in accordance with another embodiment.

FIG. 43 illustrates an example connection between four adjacent upper junction connectors using the lateral tie member 600 of FIG. 42, and a spacer plate 500 to provide vertical separation between the four upper and lower volumetric module frames.

FIGS. 44 to 47 illustrate another example embodiment of a lower junction connector 300, and a connection between this lower junction connector 300 and an upper junction connector 200.

In the illustrated example, lower junction connector 300 does not include a downwardly-projecting securement tab. Instead, a slot 360 is provided in the lower end 310 of junction connector 300. A separate securement tab 370 is also provided. Securement tab 370 is configured to be secured to lower junction connector 300 (and a column 100 to which the junction connector is secured) using a mechanical fastener, in an analogous manner to the coupling of securement tab 330 to upper junction connector 200 (i.e. an upper end of tab 370 is positioned in slot 360, and a securement bolt 490 is positioned through an upper bore 335 of tab 370 and through a transverse bore 105 in a sidewall of the column to which junction connector 300 is secured).

Figure 27:
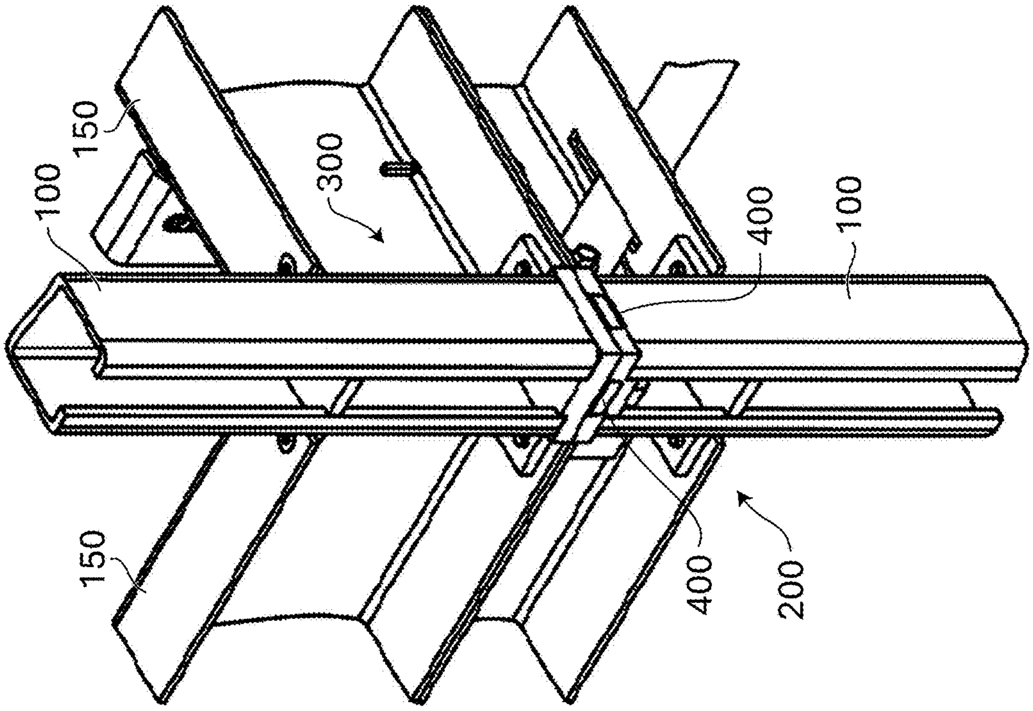
FIG. 27 is a perspective view of the coupling between the upper and lower junction connectors of FIG. 25.
Figure 29:
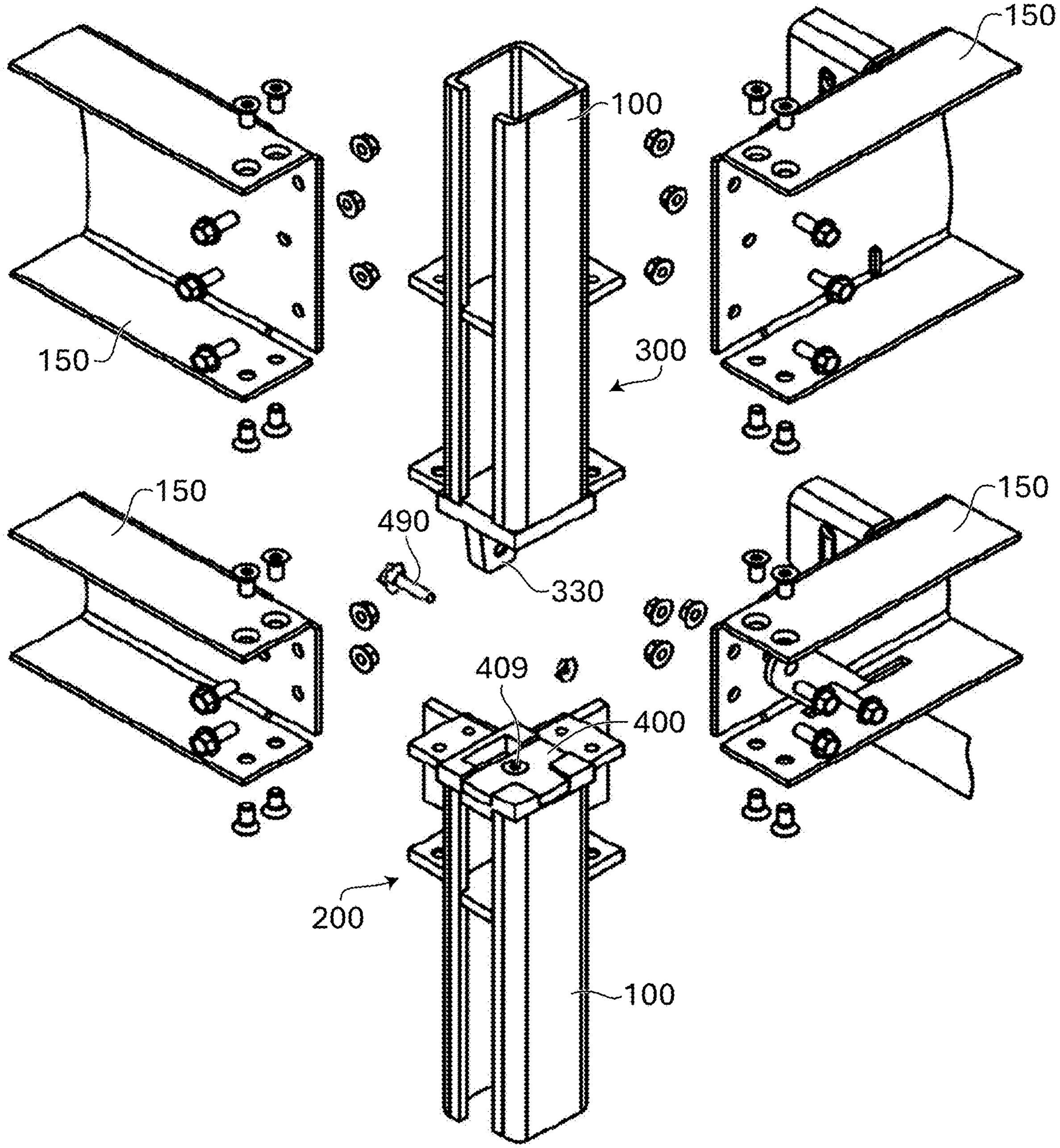
FIG. 29 is an exploded view of the coupling between the upper and lower junction connectors of FIG. 25 and of the coupling between the upper and lower junction connectors and horizontal structural members of FIG. 25.

Providing a lower junction connector 300 with a slot 360 and a separate securement tab 370 may have one or more advantages over the coupling arrangement shown in FIGS. 25 to 27. For example, during assembly of a building structure, the upper surface of a volumetric module frame may lack upwardly projecting surface features, and a lower surface of a volumetric module frame may lack downwardly projecting surface features, until the coupling between the adjacent module frames is made. For example, securement tab 370 may be installed in slot 230 or slot 360 immediately prior to placing the junction connectors 200, 300 in contact with each other.

As another possible advantage, in some cases a lower junction connector 300 with a slot to receive an upward-projecting tab may be considered desirable (e.g. for a foundation level of a building structure, where an upward facing tab may be most appropriate for setting a first level of volumetric modules), while in other cases an upper junction connector 200 with a slot to receive an upward-projecting tab may be considered desirable (e.g. at an upper end of a roof level of a building structure, where a securement tab may not be needed and may be considered undesirable, e.g. as it may result in a thermal bridge).

As another possible advantage, a separate securement tab 370 may be provided in several different versions. For example, some securement tabs may have smooth transverse bores, others may have threaded bores, and others may have one smooth and one threaded bore. As another example, some securement tabs may have more or less tapering at one or both of its ends. As another example, different securement tabs may be made from different alloys and/or grades of steel or other materials, which may facilitate the provision of securement tabs with different physical properties (e.g. tensile strength, thermal expansion coefficient, etc.).

Providing different securement tabs may facilitate the selection of a particular tab to be made independently of the production of the column assembly. For example, a securement tab may be selectable at a later time in the volumetric module production process as compared to a junction connector 300 with a fixed downwardly-projecting securement tab 330. This may advantageous as, for example, alternative versions of securing tabs may be considered as more appropriate for different uses (e.g. when securing a volumetric module frame to a truck or to the hold of a ship for transport, when securing a volumetric module frame to a building foundation, when securing a volumetric module frame to a hoisting apparatus, or when securing all or part of a module frame to a set of wheels for movement within a factory or assembly facility).

Figure 49:
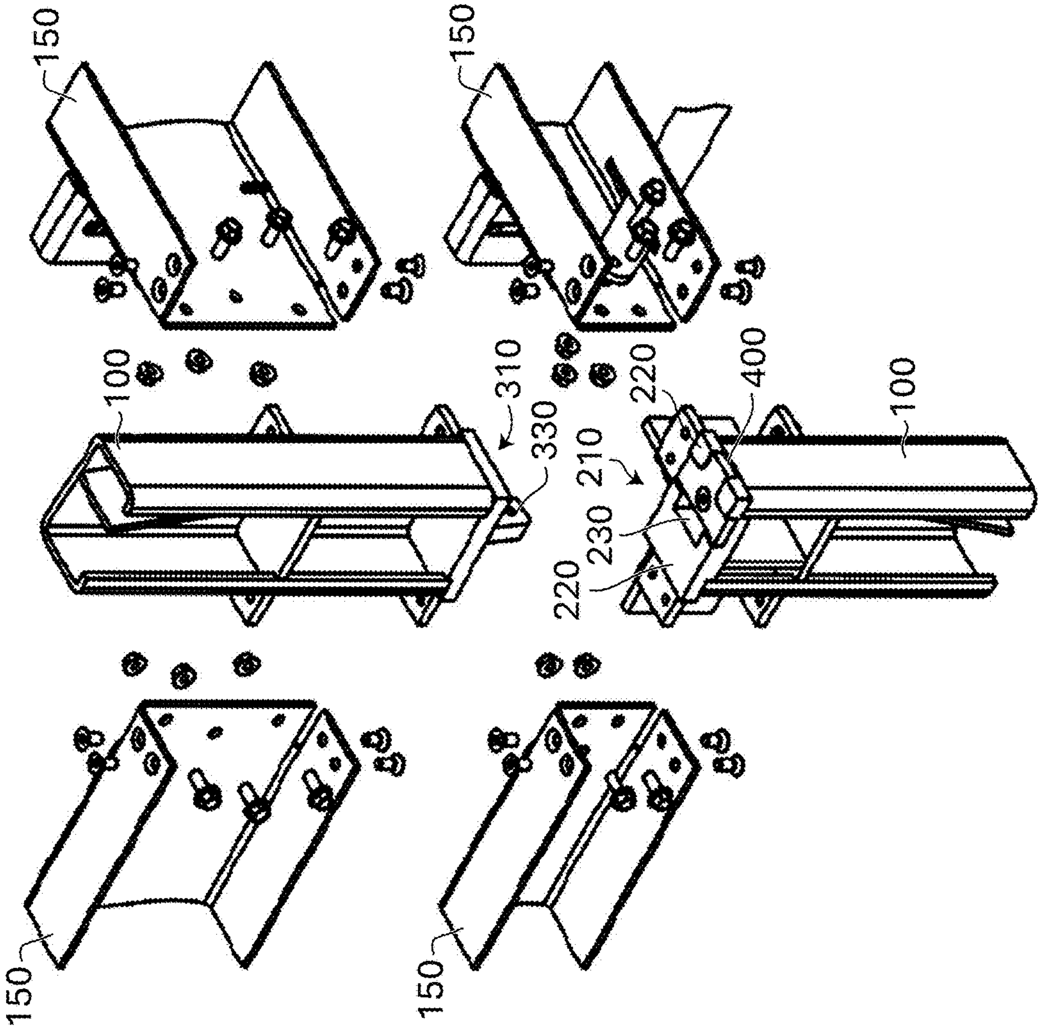
FIG. 49 is an exploded view of the coupling between upper and lower junction connectors of FIG. 48 and of the coupling between the upper and lower junction connectors and horizontal structural members of FIG. 48.
Figure 48:
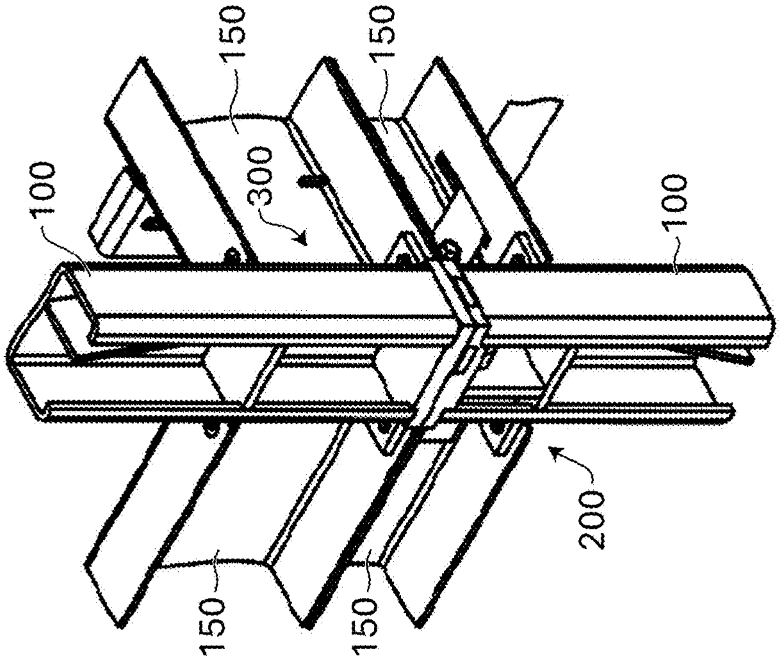
FIG. 48 is a perspective view of a coupling between an upper junction connector and a lower junction connector in accordance with another embodiment.

FIGS. 48 and 49 illustrate an example of another connection between an upper junction connector 200 and a lower junction connector 300. In the examples illustrated in FIGS. 1 to 8, the columns 100 had a generally square sectional profile. In FIGS. 48 and 49, the columns 100 have a generally rectangular sectional profile. It will be appreciated that any suitable column shape may be used in one or more alternative embodiments.

Figure 51:
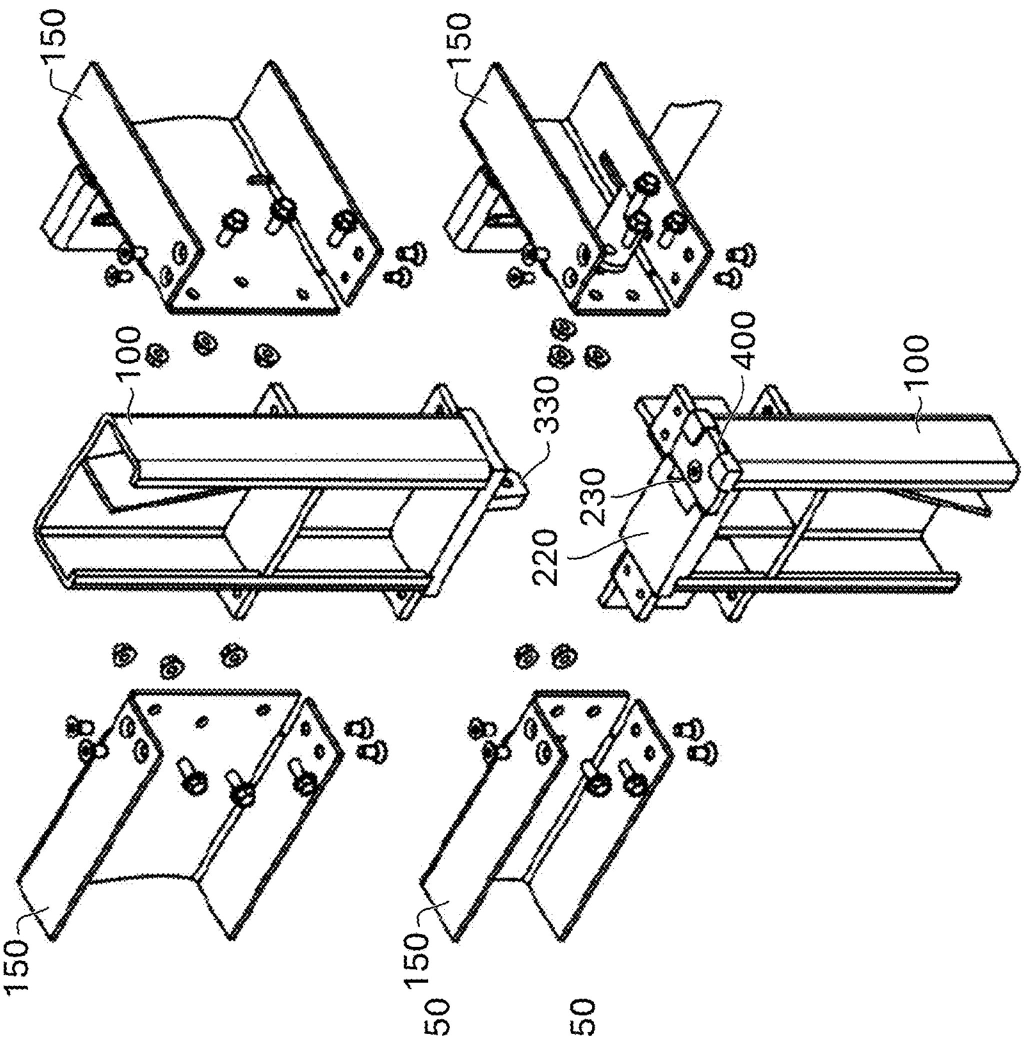
FIG. 51 is an exploded view of the coupling between upper and lower junction connectors of FIG. 50 and of the coupling between the upper and lower junction connectors and horizontal structural members of FIG. 50.
Figure 50:
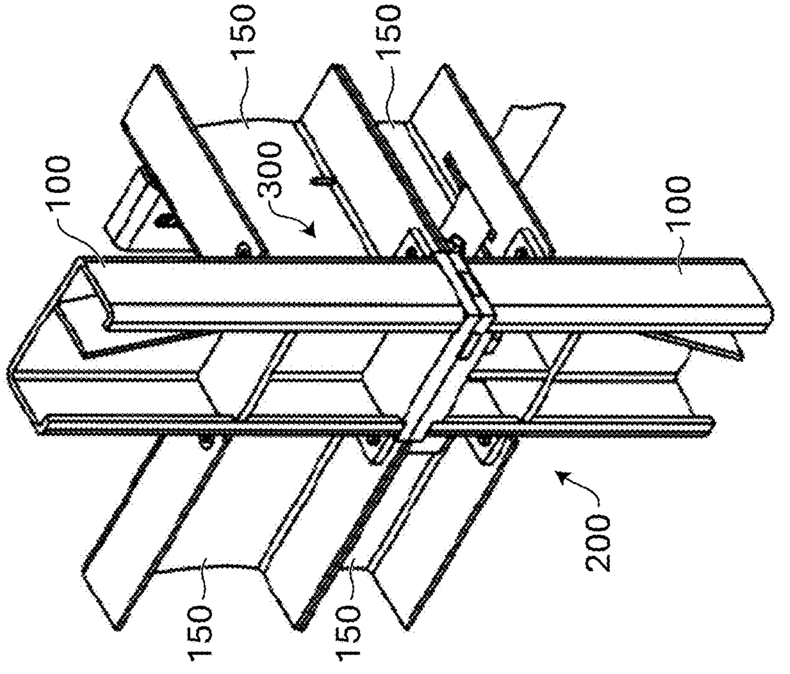
FIG. 50 is a perspective view of a coupling between an upper junction connector and a lower junction connector in accordance with another embodiment.

FIGS. 50 and 51 illustrate an example of another connection between an upper junction connector 200 and a lower junction connector 300, in which the columns 100 have a rectangular sectional profile that has a greater ratio of length to width as compared with the profile of the example illustrated in FIGS. 48 and 49.

Figure 52:
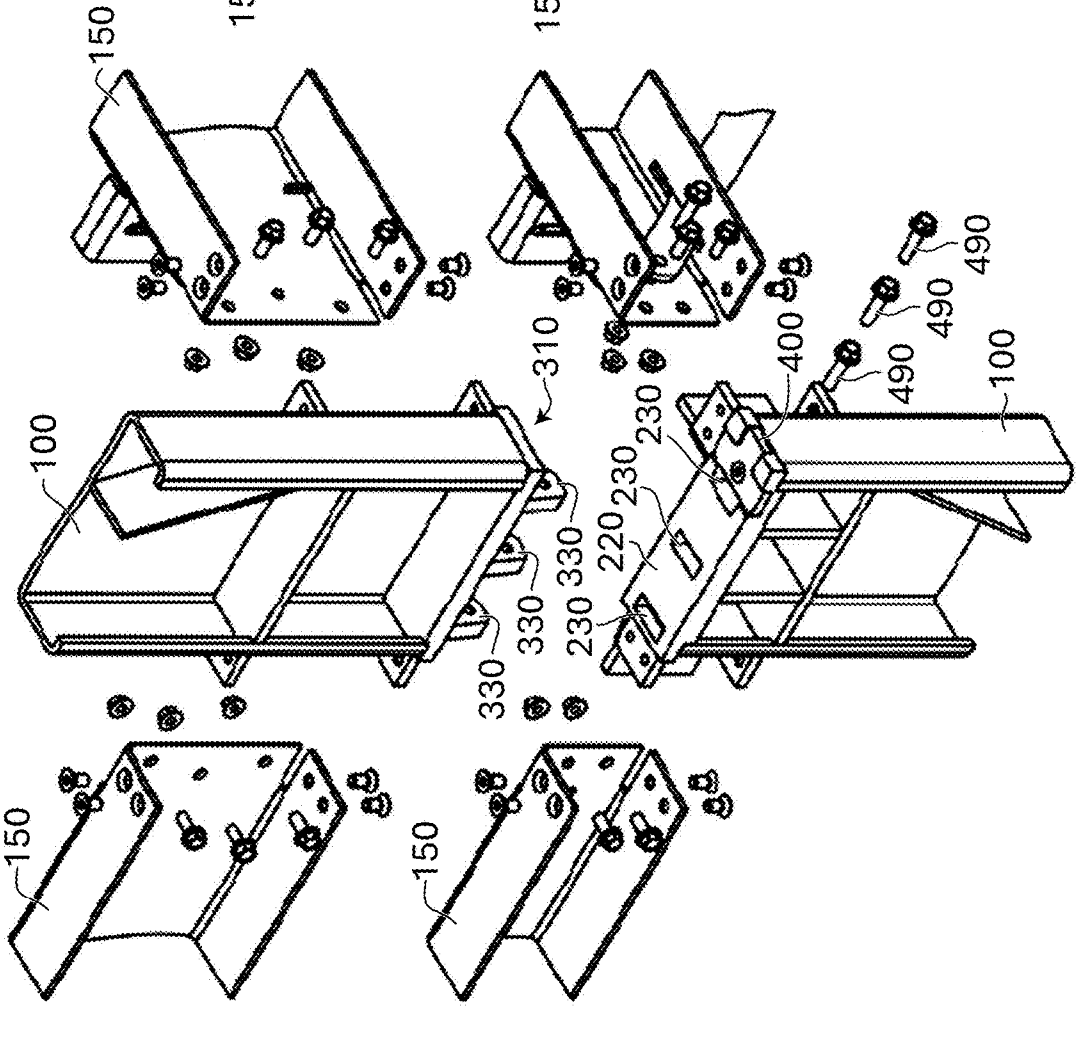
FIG. 52 is an exploded view of a coupling between upper and lower junction connectors and of a coupling between the upper and lower junction connectors and horizontal structural members, in accordance with one embodiment.
Figure 54:
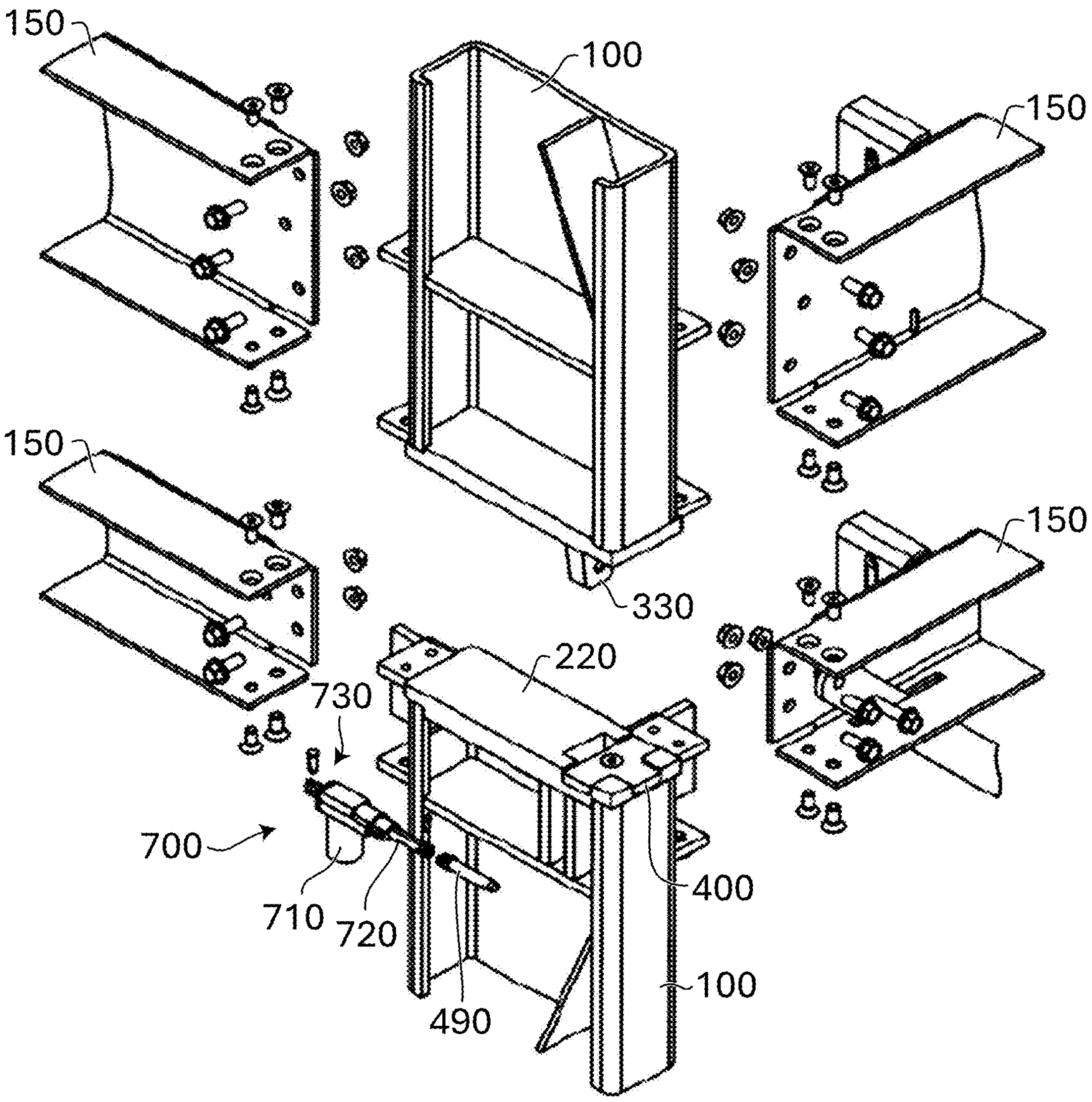
FIG. 54 is an exploded view of the coupling between upper and lower junction connectors of FIG. 53 and of the coupling between the upper and lower junction connectors and horizontal structural members of FIG. 53.
Figure 55:
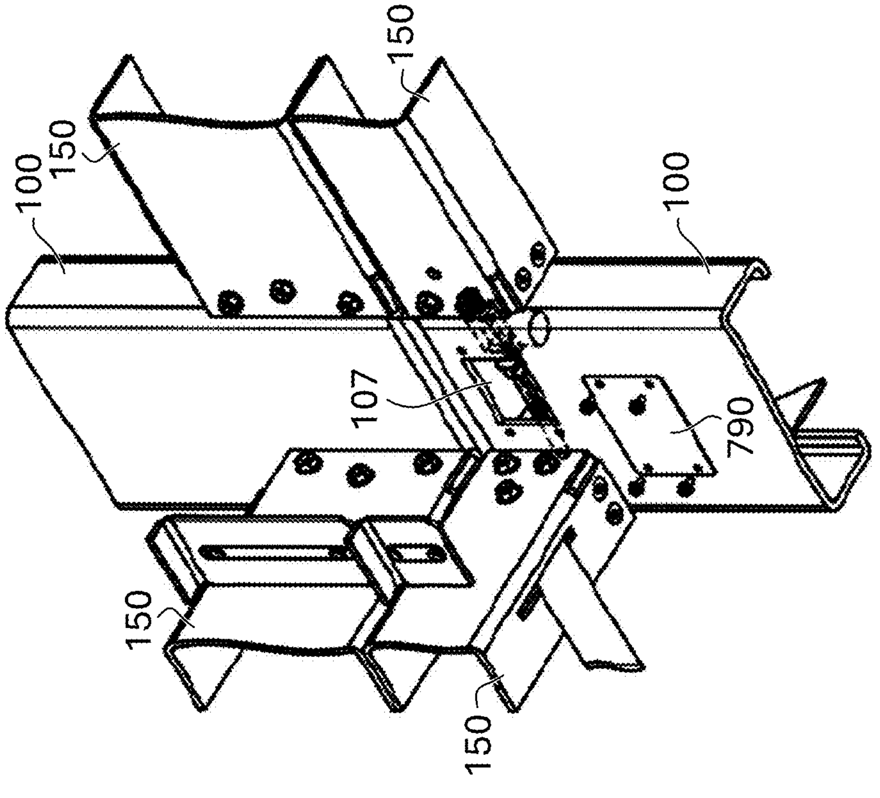
FIG. 55 is a perspective view of the coupling between an upper junction connector and a lower junction connector of FIG. 53.

FIG. 52 illustrates an example of another connection between an upper junction connector 200 and a lower junction connector 300. In this example, lower junction connector 300 includes three downwardly-projecting securement tabs 330*a*, 330*b*, and 330*c*, and upper junction connector 200 includes three corresponding slots 230*a*, 230*b*, and 230*c*. Providing more than one securement tab/slot connection may have one or more advantages. For example, it may provide increased vertical load (tension) capacity of the connection between upper junction connector 200 and lower junction connector 300. It may also have the effect of increasing the horizontal shear capacity of the connection, and/or increasing resistance to rotation about the longitudinal axis of the column.

In the illustrated example, three separate transverse bolts are provided, one for each tab/slot connection. Alternatively, a single transverse bolt may be used to couple two or more tab/slot connections.

FIGS. 129 to 146 illustrate another example embodiment of a lower junction connector 300, and a connection between this lower junction connector 300 and an upper junction connector 200.

Turning first to FIGS. 136 to 139, in the illustrated example, securement tab 370 has an upper portion 372 that has a generally rectangular profile, with generally parallel front and rear surfaces 373, and generally parallel side surfaces 374. Securement tab 370 also has a lower portion 376 that has profile that tapers along two axes. Specifically, front and rear surfaces 377 are angled towards each other, thinning the profile of the lower portion 376, and side surfaces 378 are angled towards each other, narrowing the profile of the lower portion 376. In the illustrated example the edges are chamfered, although this chamfering is optional.

In the illustrated example, an upper bore 334 is provided through upper portion 372, and a lower bore 336 is provided through lower portion 376. Optionally, one or both of bores 334, 336 are threaded. Providing threaded bores 334, 336 may allow tab 370 to be secured using only bolts, e.g. without requiring nuts.

As perhaps best seen in FIGS. 134 and 143, in the illustrated example slot 230 includes an angled or ramp surface 237. When lower portion 376 of securement tab 370 is positioned in slot 230, ramp surface 237 abuts surface 337.

Providing a securement tab 370 with a lower tapered portion and a complementary ramp surface 237 in slot 230 may have one or more advantages. For example, the respective angled surfaces may assist in aligning upper and lower junction connectors 200, 300 during assembly. As another example, an abutment between ramp surface 237 and surface 337 may result in the connection between securement tab 370 and upper and lower junction connectors 200, 300 acting as a slip-critical joint. As another example, when a securement bolt (or other mechanical fastener) is inserted through lower bore 336 to secure lower portion 376 of securement tab 370, an abutment between ramp surface 237 and surface 337 may promote a reduced prying effect on securement tab 370.

As discussed above, an upper junction connector 200 and a lower junction connector 300 can be secured in a fixed orientation to each other by inserting a securement bolt 490 through both a transverse bore 105 in a column sidewall 112 and through a transverse bore 335 of a securement tab 330 (or through a transverse bore in a separate securement tab 370). It will be appreciated that any suitable bolt (or other mechanical fastener) may be used, and that a bolt 490 may be inserted inwardly (i.e. towards the longitudinal axis of column 100) or outwardly (i.e. from the interior of column 100 away from its longitudinal axis).

In some embodiments, securement bolt 490 may be positioned and secured manually (e.g. using a wrench or a handheld powered tool) by a laborer once a volumetric module frame is in position (e.g. once the securement tab 330 of the lower junction connector is received in the slot 230 of the upper junction connector, and the lower junction connector 300 abuts the upper junction connector).

In one or more alternative embodiments, a powered actuator (e.g. an electrically driven actuator) may be provided in the module frame to position securement bolt 490 once the volumetric module frame is in position. For example, the actuator may be a linear actuator (e.g. a ballscrew-driven actuator) that can extend securement bolt 490 through transverse bores 105, 335. Alternatively, the actuator may be a rotary actuator that can rotate a threaded bolt to engage correspondingly threaded transverse bores 105, 335.

In some embodiments, the actuator may be provided with a fuse or other semi-permanent or permanent disengagement mechanism to ensure the actuator is not inadvertently actuated after securement bolt 490 is in position. For example, one or more inline fuses may be provided so that, once the securement bolt 490 is in position, a predetermined tripping voltage may be applied to the actuator to 'trip' the fuse(s) so that the circuit is interrupted and the actuator is no longer powered.

Providing a powered actuator may have one or more advantages. For example, it may reduce the labour required to secure adjacent module frames to each other, increase safety, increase speed of assembly, and/or reduce cost. For example, a powered actuator may be controllable from a remote location, which may reduce or eliminate the need for workers to enter into or climb on to the sides or top of a volumetric module frame.

This may reduce or eliminate some or all of the work (including work that may be characterized as dangerous) that would typically be involved in connecting and/or disconnecting volumetric module frames from e.g. a transportation truck, a hoisting apparatus, or a building structure.

For example, a control system may be connected to one or more actuators via a wireless or wired connection (e.g. via one or more wires positioned in completed portions of a building structure, positioned in a hoisting apparatus, positioned in a transport truck, etc.).

Additionally, or alternatively, providing powered actuators that may be controllable remotely may facilitate remote, semi-autonomous loading, transportation, hoisting, and/or assembly of volumetric module frames into a building. For example, a volumetric module frame may be placed on a truck bed that has upwardly-projecting tabs, and one or more powered actuators may be actuated to 'lock' the module frame to the truck bed. As another example, once a truck arrives at a building site, one or more powered actuators may be actuated to 'lock' the module frame to a hoisting apparatus, prior to, after, or concurrently with one or more other powered actuators being actuated to 'unlock' the module frame from a truck bed. The remote coupling/decoupling of a volumetric module frame may be under the control of a crane operator, a dedicated operator, an automatic or semi-automatic system, or by a small crew.

As another possible advantage, a powered actuator may provide a verifiable audit trail regarding the connection of transverse bolts 490 (e.g. on its own or in combination with one or more position sensors proximate a bolt 490).

FIGS. 53 to 56 illustrate an example of a connection between an upper junction connector 200 and a lower junction connector 300 using a powered actuator 700. In the illustrated example, actuator 700 includes an electric motor 710 and a drive shaft 720 coupled to securement bolt 490. Actuator 700 also includes a fixed coupling 730 to prevent the actuator from rotating relative to the upper junction connector 200. Securement bolt 490 may be threaded (e.g. in case of a rotary actuator 700), or it may be a tapered pin that is forced into transverse bores 105, 335 (e.g. in the case of a linear actuator 700).

Figure 56:
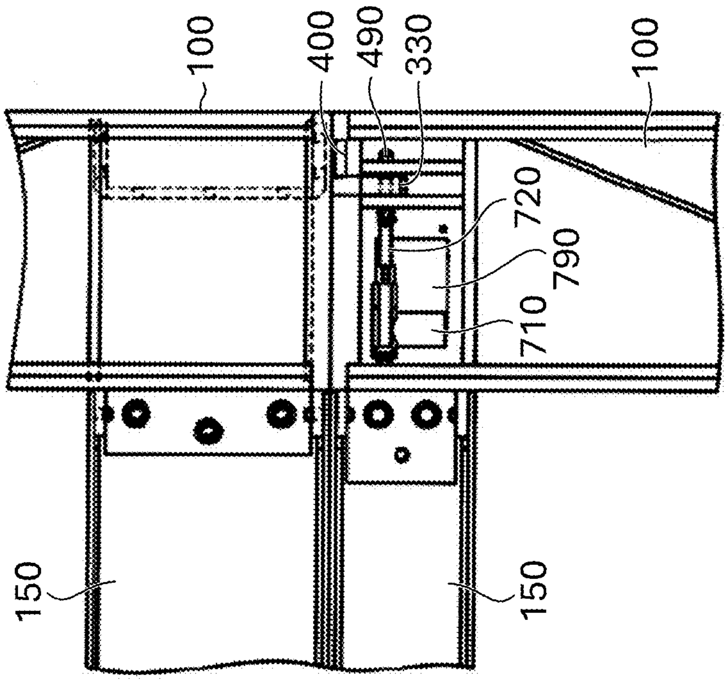
FIG. 56 is a side elevation view of the coupling between the upper and lower junction connectors of FIG. 53.
Figure 58:
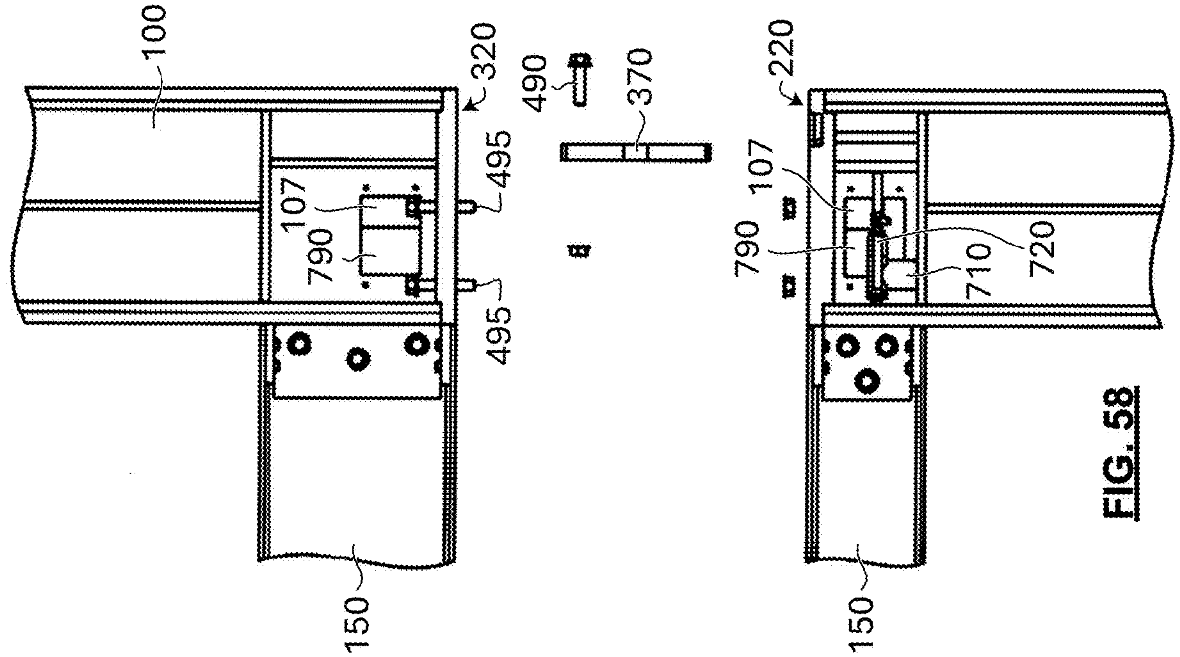
FIG. 58 is an exploded side elevation view of the coupling between the upper and lower junction connectors of FIG. 57.
Figure 62:
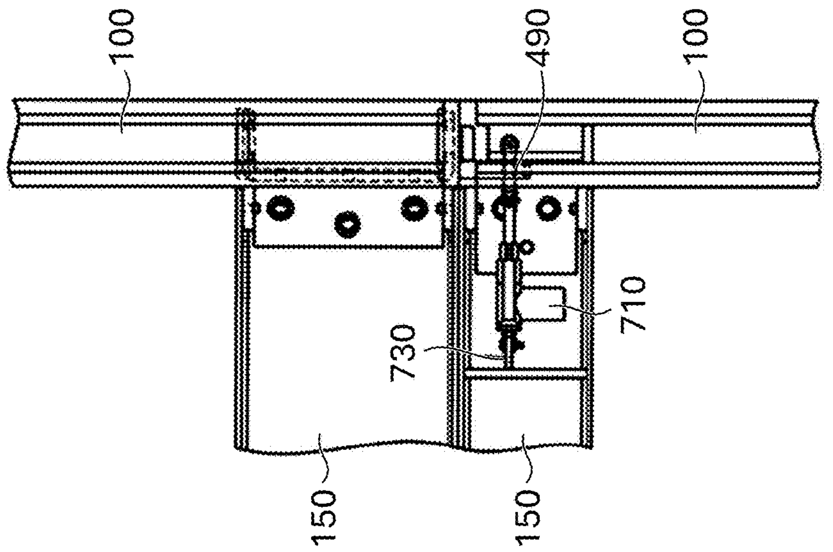
FIG. 62 is a side elevation view of a coupling between an upper junction connector and a lower junction connector in accordance with another embodiment.
Figure 61:
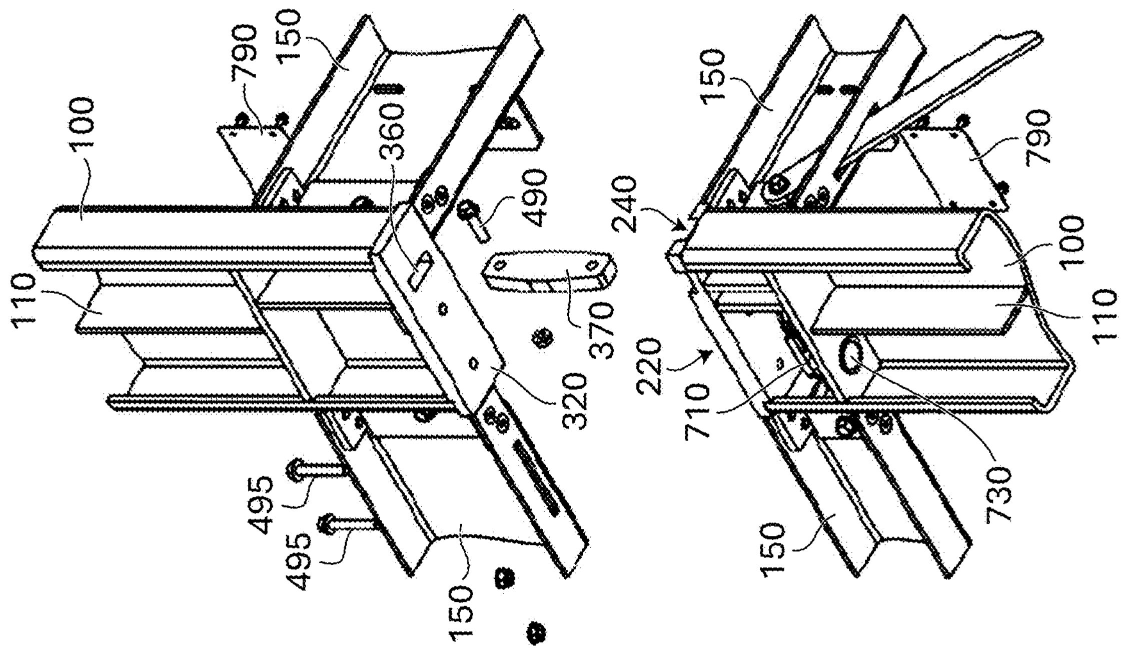
FIG. 61 is another exploded perspective view of the coupling between the upper and lower junction connectors of FIG. 57.

As can be seen in FIG. 56, in this example actuator 700 is positioned in the interior of column 100. Alternatively, as illustrated in FIG. 62, an actuator 700 may be positioned within a horizontal structural member 150. While in the illustrated examples the actuator 700 is positioned adjacent an upper junction connector at an upper end of the column, additionally, or alternatively, an actuator may positioned adjacent a lower junction connector at a lower end of the column (e.g. in embodiments where a lower junction connector includes a slot 360).

As discussed above, an upper junction connector 200 and a lower junction connector 300 can be secured in a fixed orientation to each other by inserting a securement bolt 490 through both a transverse bore 105 in a column sidewall 112 and through a transverse bore 335 of a securement tab 330 (or through a transverse bore in a separate securement tab 370).

In some embodiments, one or more supplemental securement bolts may be provided to enhance the tensile load bearing capacity of the coupling between junction connectors 200, 300.

FIGS. 57 to 61 illustrate an example of a connection between an upper junction connector 200 and a lower junction connector 300 using supplemental securement bolts 495. In the illustrated example, two bolts 495 are provided, although it will be appreciated that one or three or more bolts 495 may be provided in alternative embodiments.

Supplemental securement bolts 495 may be positioned and secured manually (e.g. using a wrench or a handheld powered tool) by a laborer once the lower surface 320 of lower junction connector 300 abuts the upper surface 220 of junction connector 200.

In the illustrated example, a cutout 107 is provided in a sidewall of column 100 proximate the ends of an installed position of the supplemental securement bolts 495. Such a cutout may facilitate access to the bolts 495, during installation and/or inspection. Access panels 790 are also shown in the illustrated example, to cover cutouts 107 when not in use.

In the example illustrated in FIGS. 132 and 135, cutouts 107 have a generally oval shape. Such a cutout may result in reduces stress raisers. Access panels 790 in the illustrated example have a similar rounded shape, to cover cutouts 107 when not in use.

In the examples illustrated in FIGS. 38 to 45, the lateral tie members 600 were configured to provide lateral connections between adjacent upper junction connectors 200 that resulted in adjacent columns 100 being substantially flush with each other.

Figure 63:
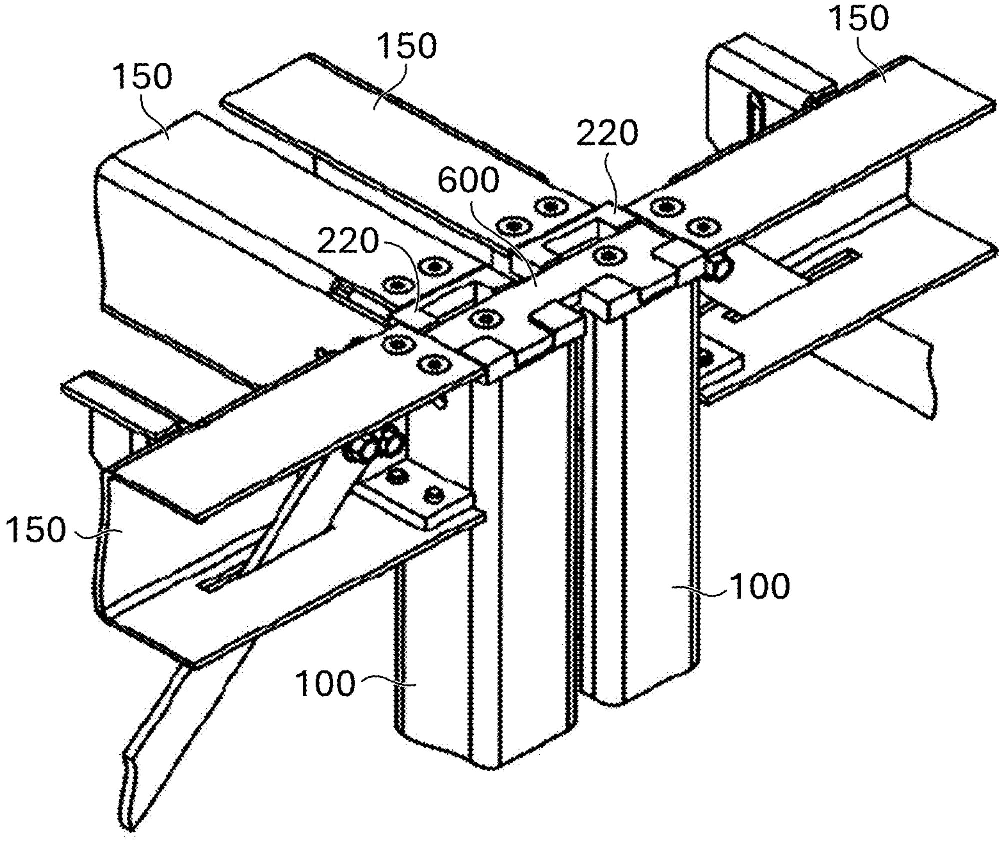
FIG. 63 is a perspective view of a coupling between adjacent lower junction connectors in accordance with another embodiment.
Figure 64:
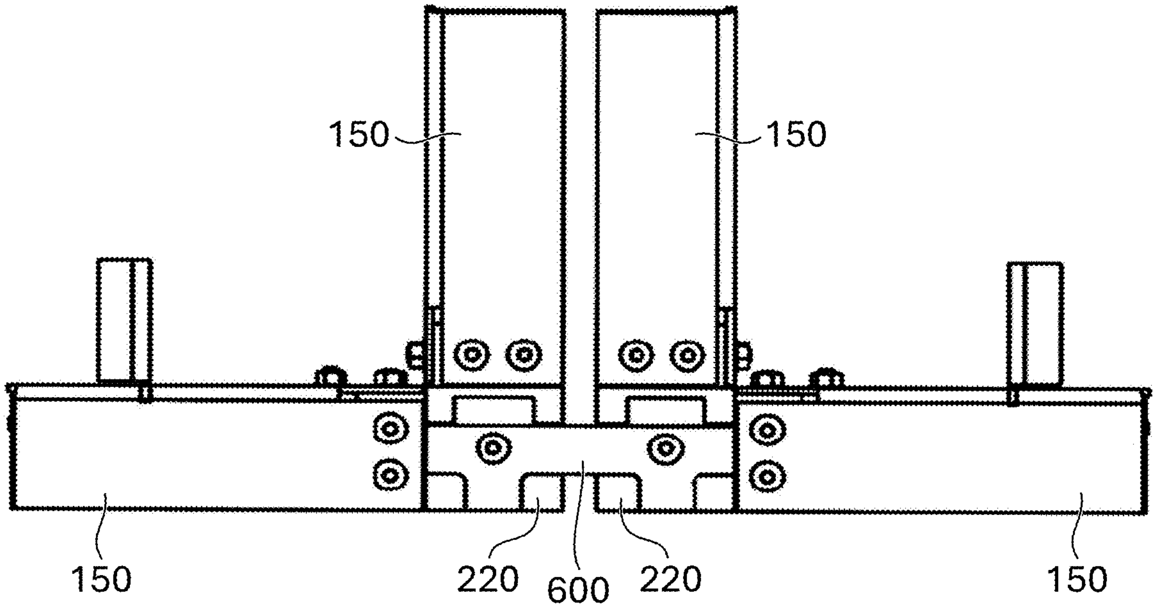
FIG. 64 is a top plan view of the coupling between adjacent lower junction connectors of FIG. 63.
Figure 65:
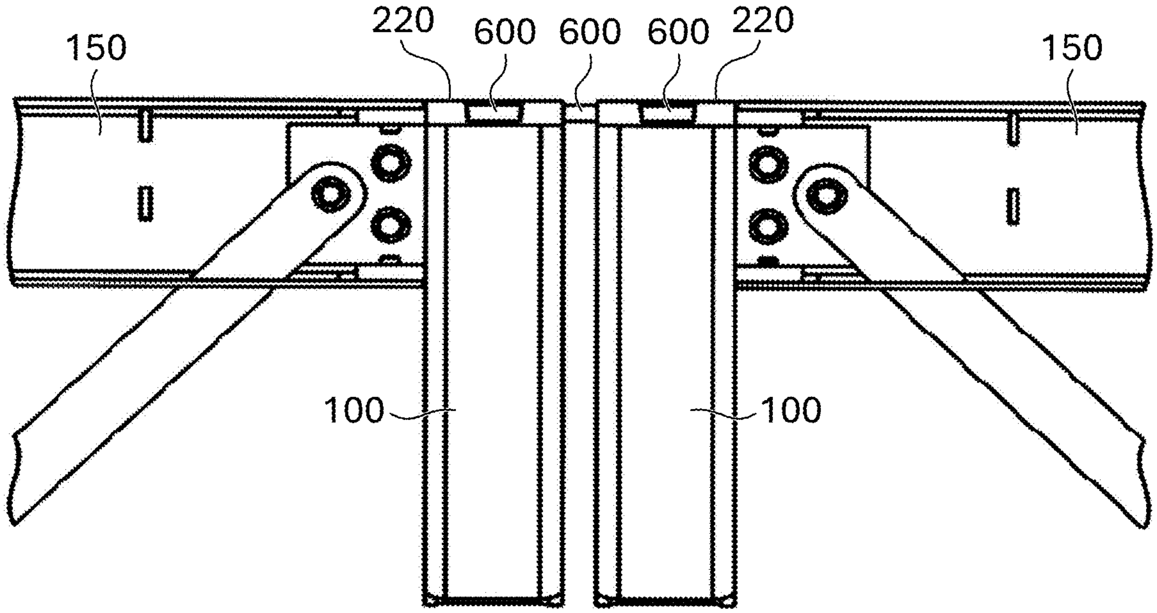
FIG. 65 is a side elevation view of the coupling between adjacent lower junction connectors of FIG. 63.
Figure 66:
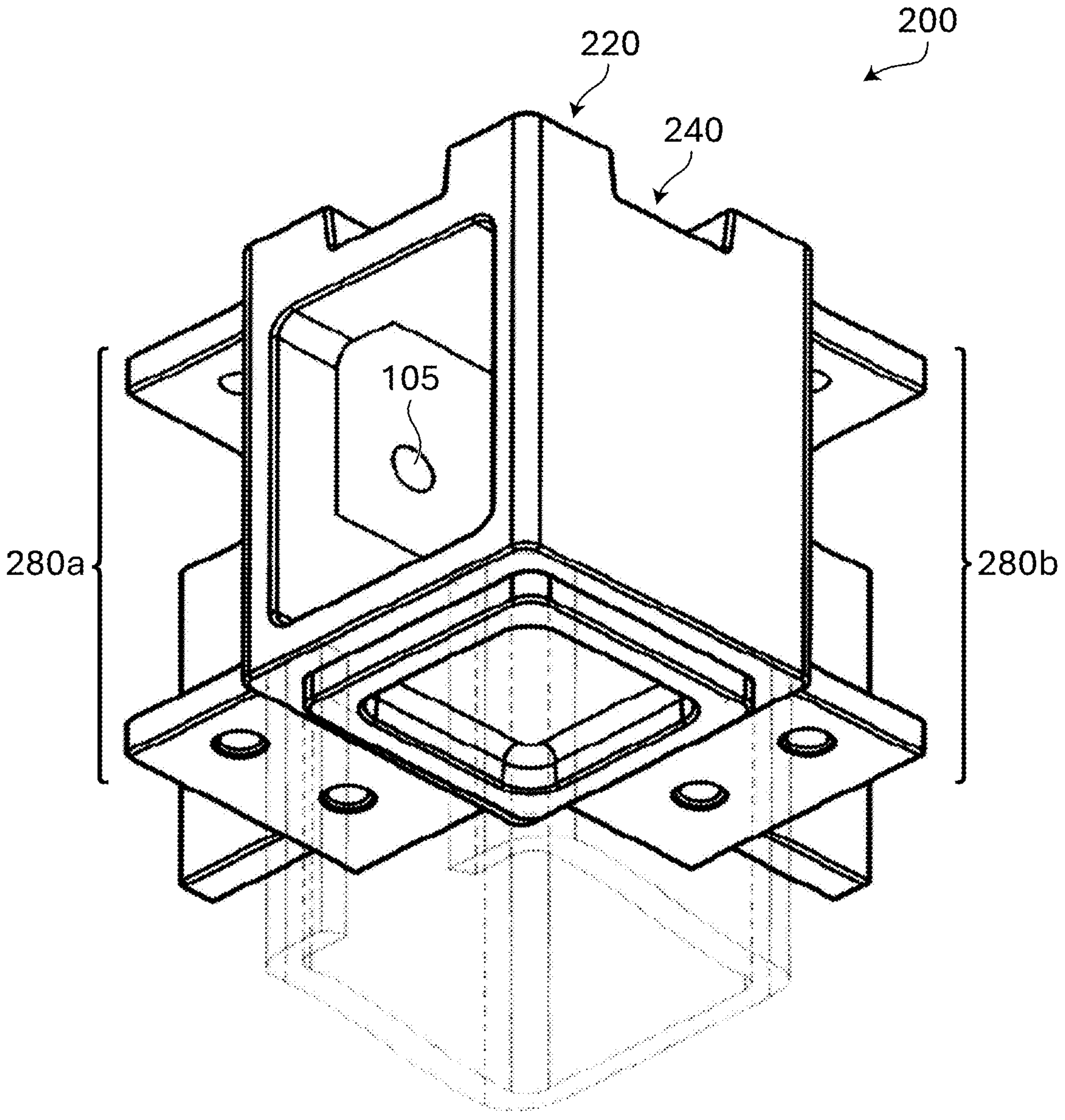
FIG. 66 is a perspective view of an upper junction connector in accordance with another embodiment.
Figure 67:
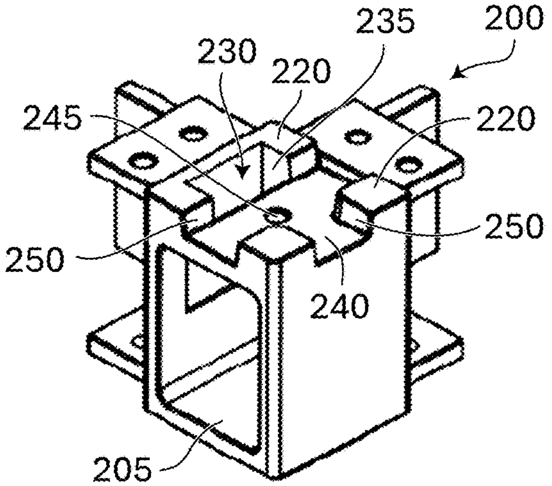
FIG. 67 is another perspective view of the upper junction connector of FIG. 66.
Figure 68:
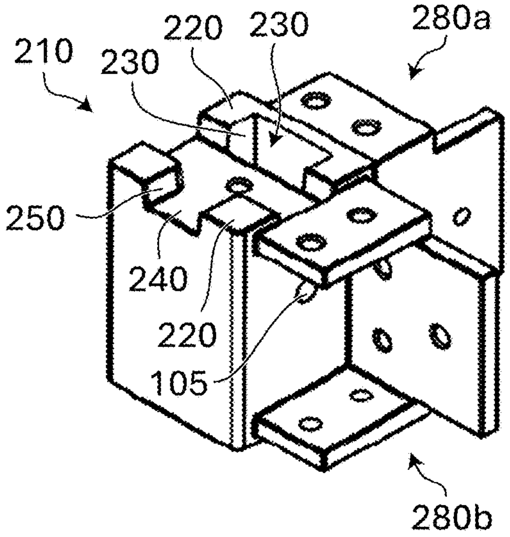
FIG. 68 is another perspective view of the upper junction connector of FIG. 66.
Figure 69:
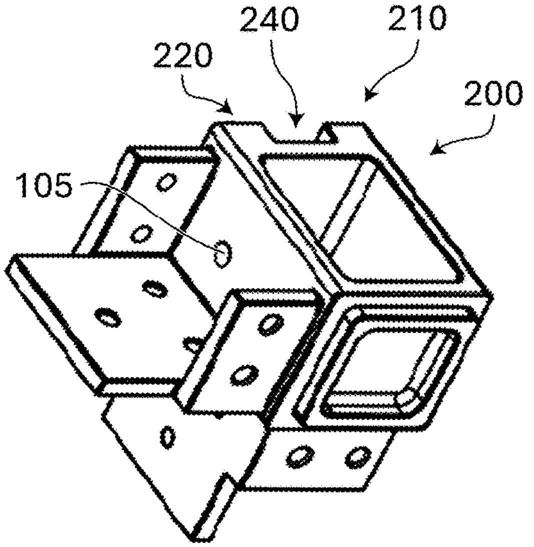
FIG. 69 is another perspective view of the upper junction connector of FIG. 66.

Alternatively, lateral tie members 600 may be configured to provide a predetermined space between adjacent connected columns 100. FIGS. 63 to 65 illustrate an example of a lateral tie member 600 being used to provide a spaced connection between adjacent columns.

Providing a spaced connection may have one or more advantages. For example, it may facilitate the provision of thermal and/or acoustic breaks in a resulting structure, it may facilitate the vertical circulation of services, it may facilitate the installation of fire-proofing materials between adjacent volumetric modules, it may improve the acoustic performance of the building, and/or it may allow for clearance around bracing.

Additionally, or alternatively, a spaced connection may facilitate the accommodation of relaxed manufacturing tolerances. For example, when components are assembled to form module frames, the cumulative effect of manufacturing tolerances for each component may result in a variance in the overall dimensions between each assembled module frame. Providing lateral tie members that are designed to provide a predetermined space (e.g. ⅜ths of an inch) between adjacent module frames may facilitate the connection between frames of slightly different dimensions.

Figure 123:
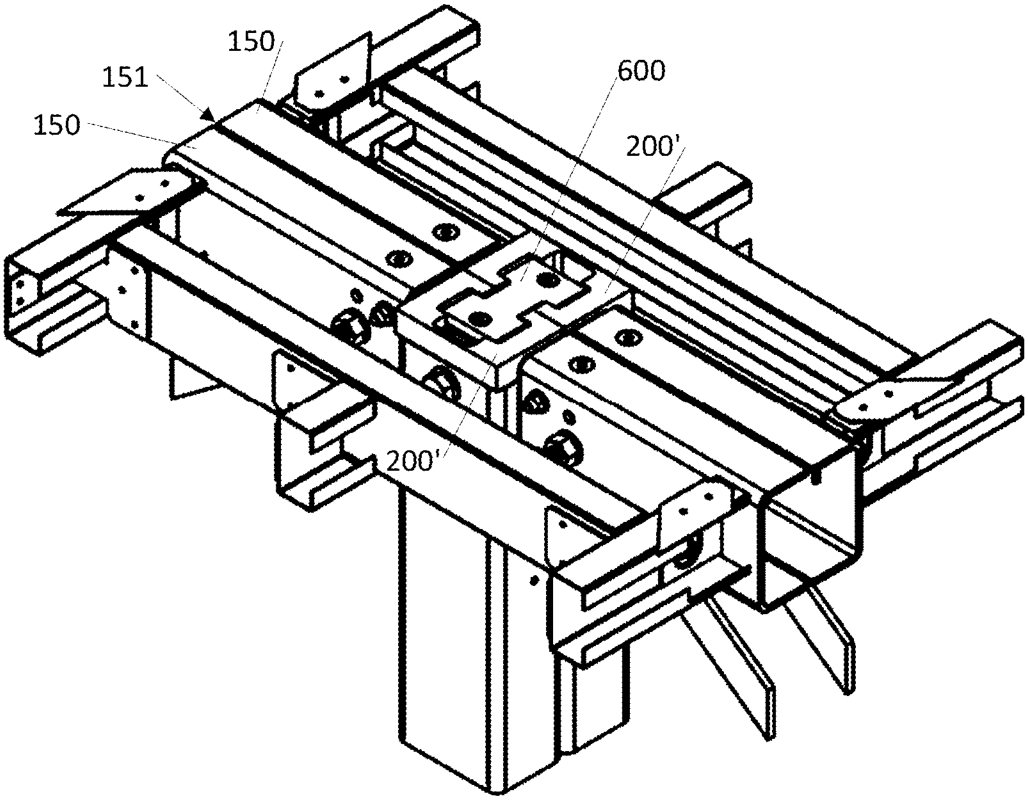
Figure 124:
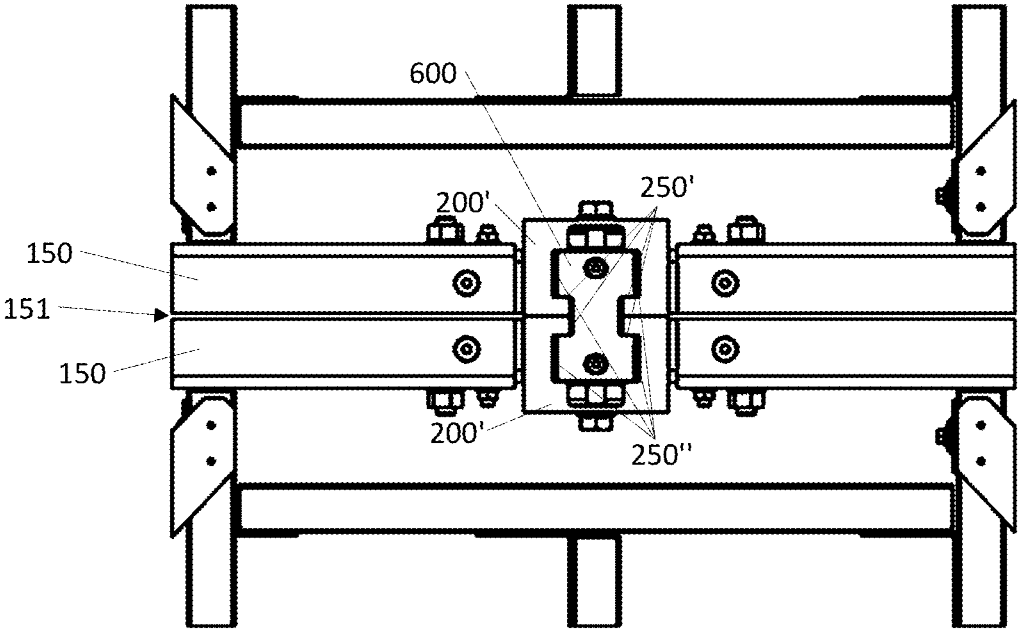
Figure 126:
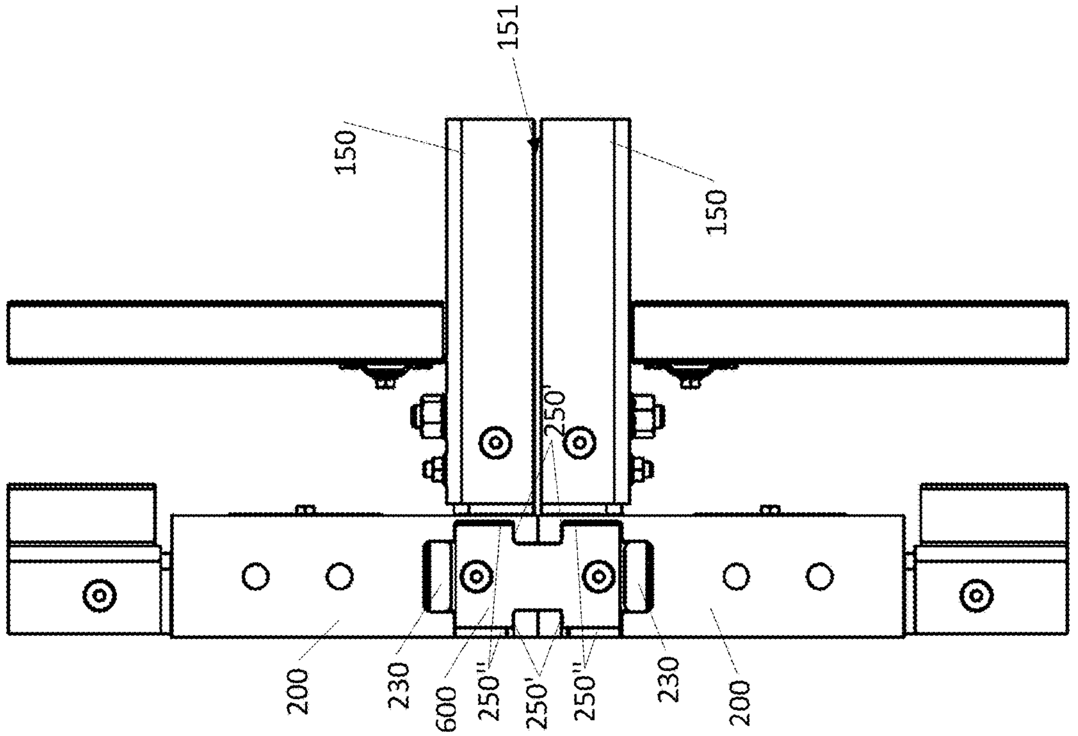
Figure 125:
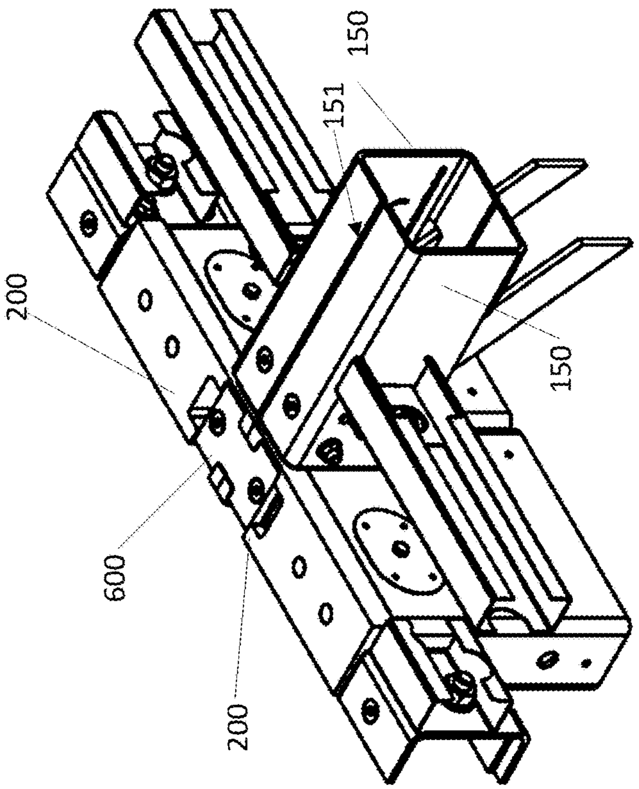
Figure 128:
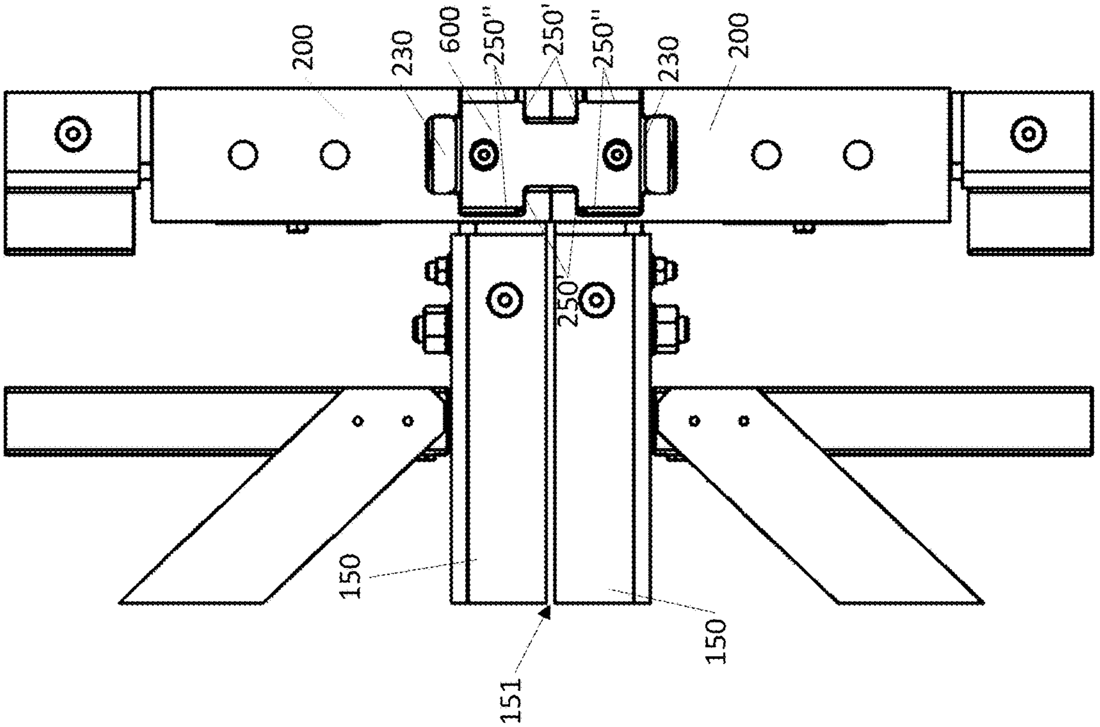
Figure 127:
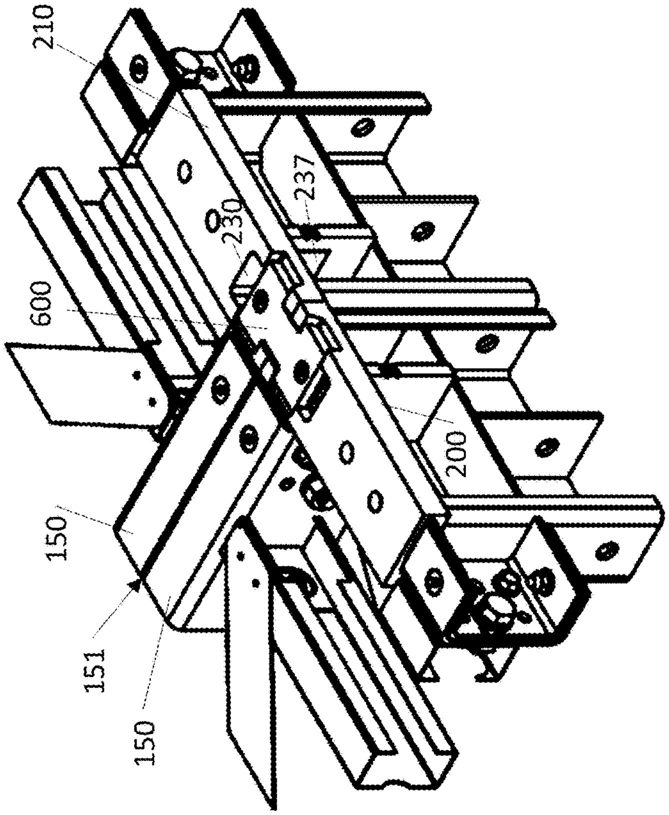

FIGS. 123 and 124 illustrate another example embodiment of a lateral tie member 600 being used to provide a substantially flush connection between adjacent columns.

In the illustrated example, the seat in the recessed area in the upper end 210 of each junction connector 200—including interior connector sidewalls 250—and connector 600 are dimensioned to promote flush contact between the edges of adjacent junction connectors 200. Optionally, with reference to FIG. 124, interior connector sidewalls 250' that are parallel to the abutting edges of the junction connectors 200 are dimensioned (and tapered) to promote tight contact, while interior connector sidewalls 250" that are perpendicular to the abutting edges of the junction connectors 200 are dimensioned to provide clearance (e.g. about ¼") to allow lateral movement between the junction connectors 200, e.g. to accommodate longitudinal positional variants.

Returning to FIG. 123, optionally horizontal structural members 150 are set back (e.g. by about ⅛") from the edges of the junction connectors 200, so that when adjacent junction connectors 200 are coupled to each other, a clearance gap 151 is provided between adjacent horizontal structural members 150.

FIGS. 125 and 126, and FIGS. 127 and 128 illustrate further example embodiments of lateral tie members 600 being used to provide a substantially flush connection between adjacent columns.

Figure 70:
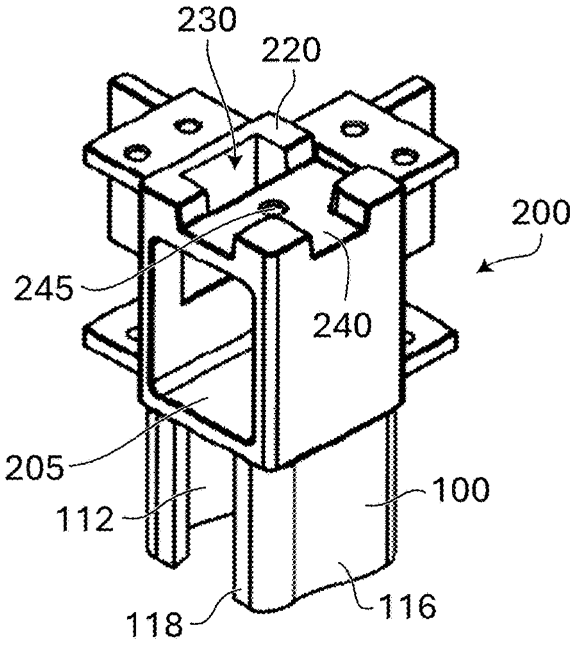
FIG. 70 is a perspective view of the upper junction connector of FIG. 66 coupled to the upper end of a column.
Figure 72:
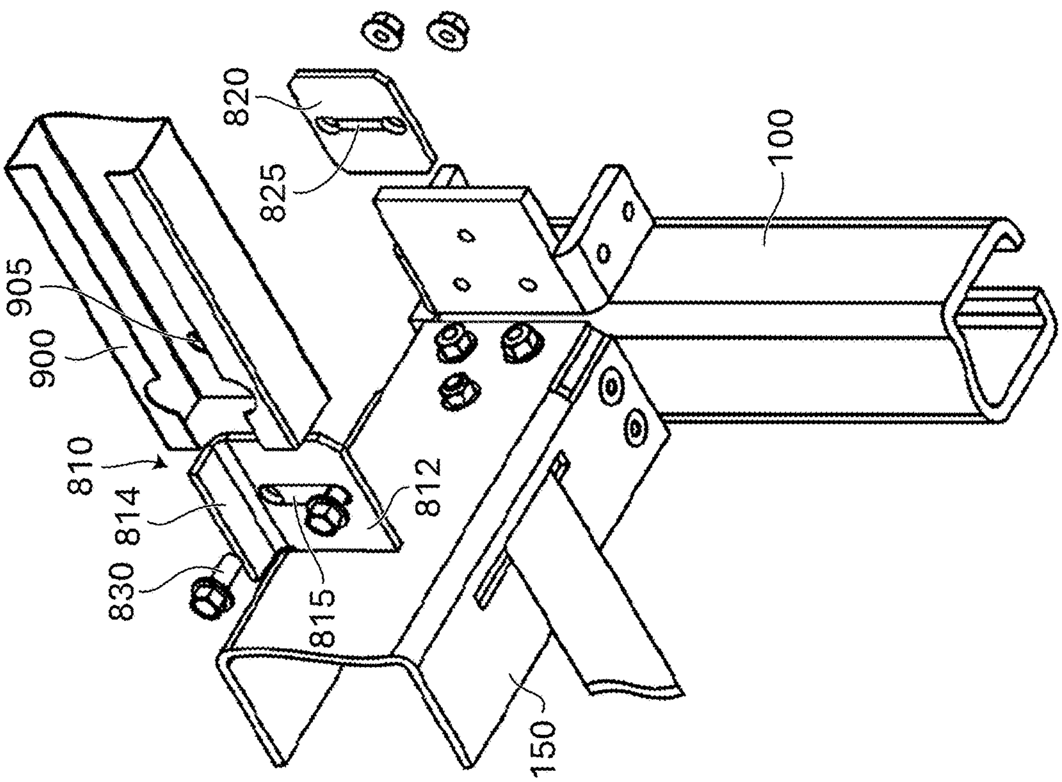
FIG. 72 is another exploded view of the coupling between the horizontal structural member and the joist end of FIG. 71.
Figure 71:
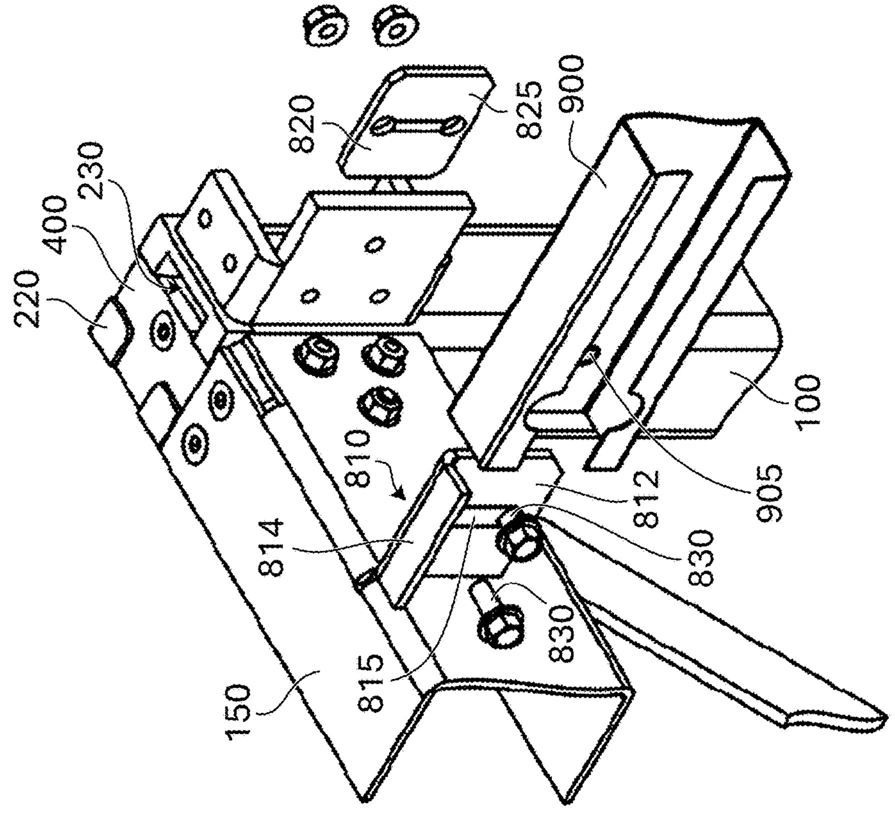
FIG. 71 is an exploded view of a coupling between a horizontal structural member and a joist end in accordance with one embodiment.
Figure 74:
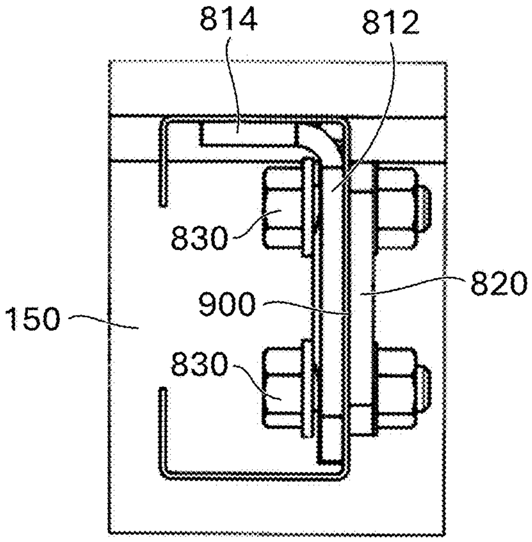
FIG. 74 is an enlarged view of a portion of FIG. 73.
Figure 73:
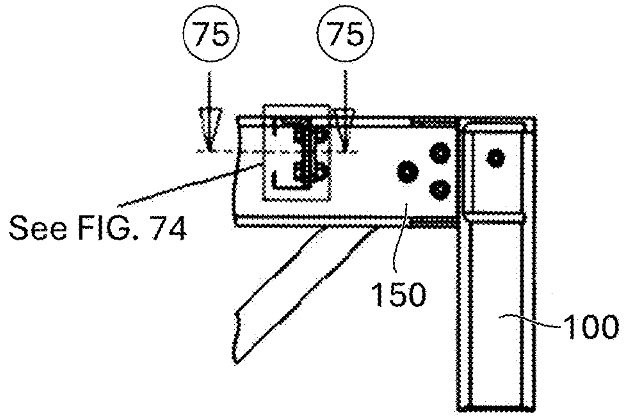
FIG. 73 is a side elevation view of the coupling between the horizontal structural member and the joist end of FIG. 71.
Figure 75:
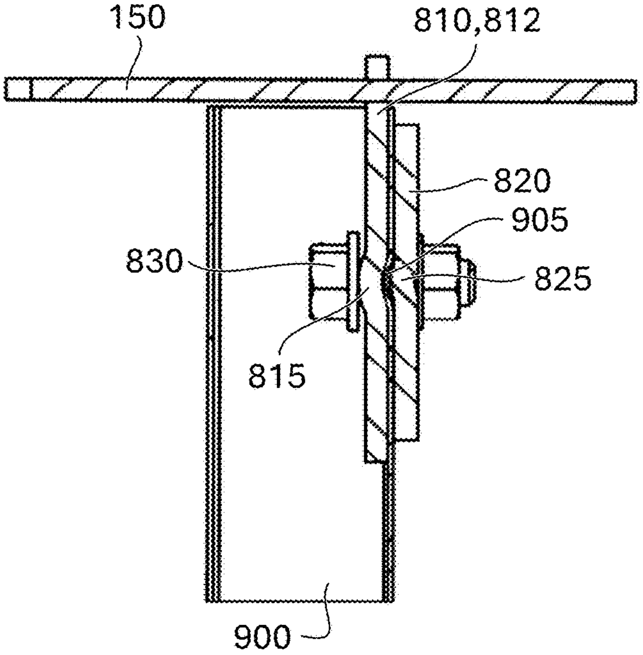
FIG. 75 is a section view of the coupling between the horizontal structural member and the joist end of FIG. 73, taken along line 75-75 in FIG. 73.
Figure 77:
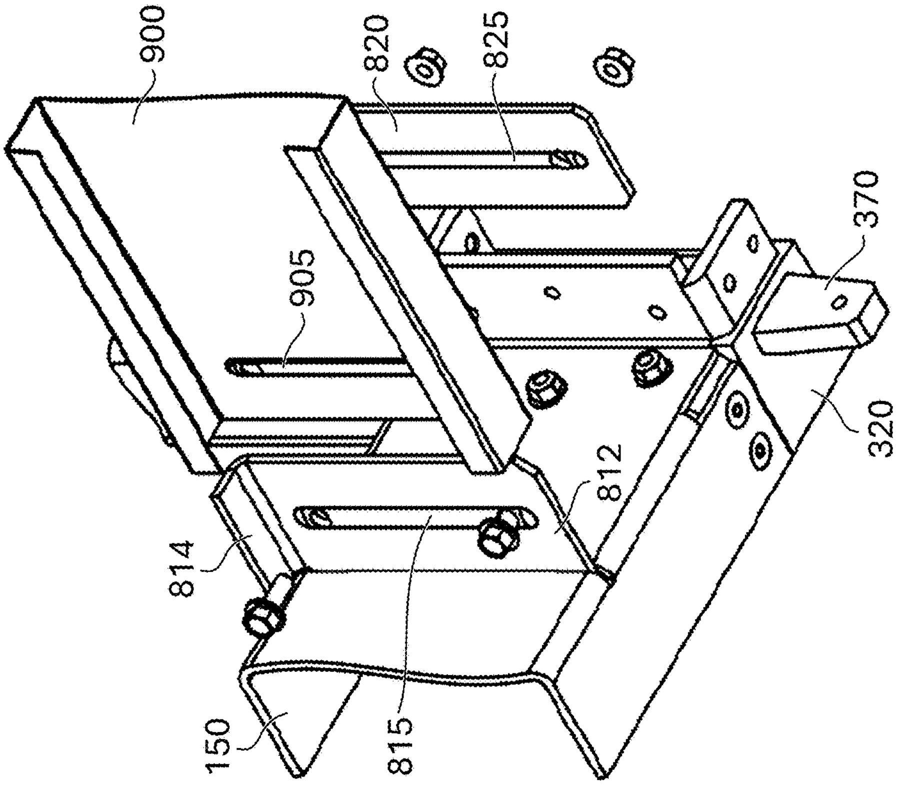
FIG. 77 is another exploded view of the coupling between the horizontal structural member and the joist end of FIG. 76.
Figure 76:
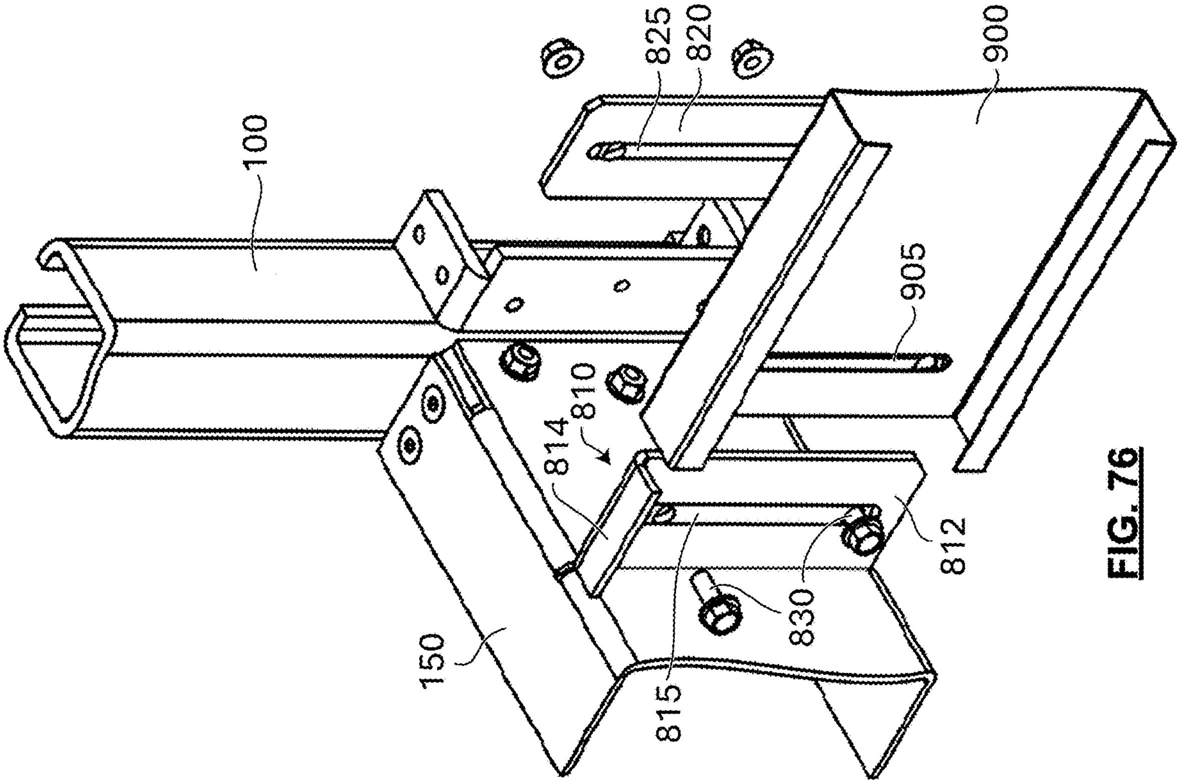
FIG. 76 is an exploded view of a coupling between a horizontal structural member and a joist end in accordance with another embodiment.
Figure 79:
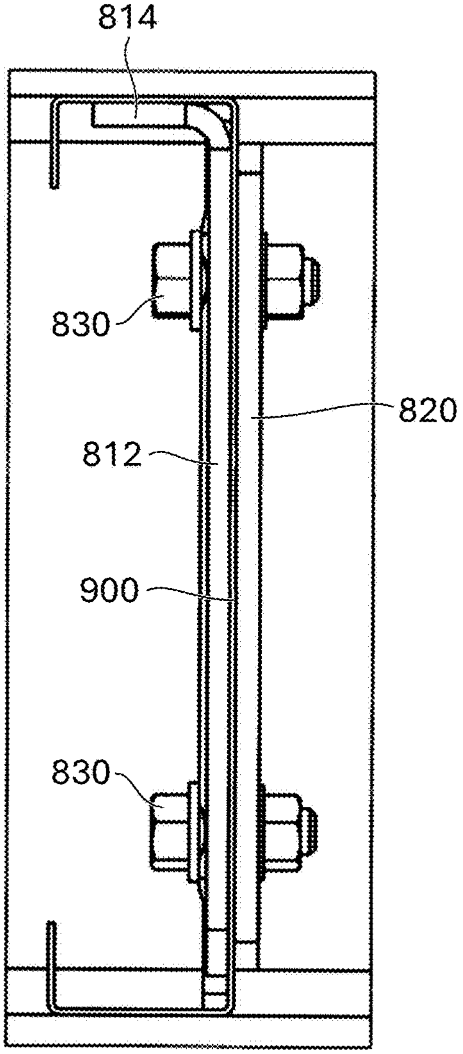
FIG. 79 is an enlarged view of a portion of FIG. 78.
Figure 78:
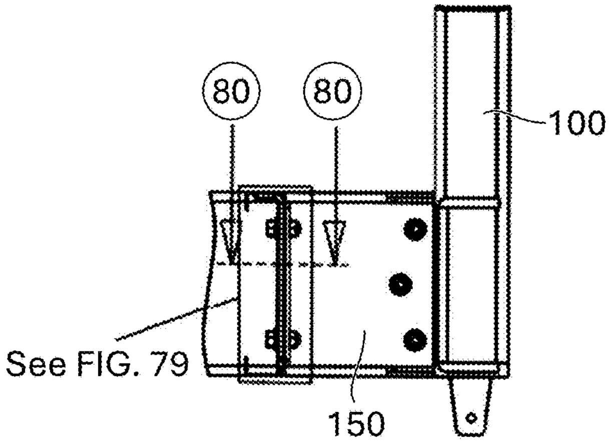
FIG. 78 is a side elevation view of the coupling between the horizontal structural member and the joist end of FIG. 76.
Figure 80:
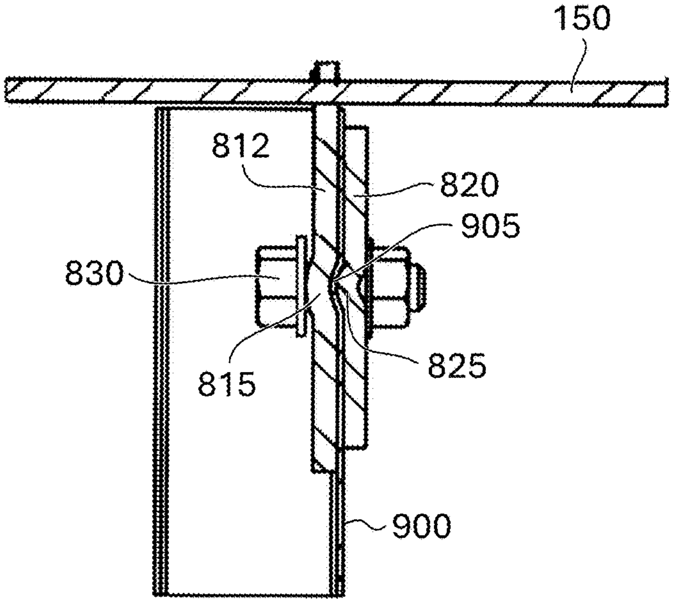
FIG. 80 is a section view of the coupling between the horizontal structural member and the joist end of FIG. 78, taken along line 80-80 in FIG. 78.

FIGS. 66 to 70 illustrate an example embodiment of an upper junction connector 200. In this example, upper junction connector 200 is formed as a unitary component (e.g. by casting and/or machining). As shown in FIG. 70, upper junction connector 200 may be welded to an end of a column 100, or secured in any other suitable manner known to those in the art.

It will be appreciated that a lower junction connector 300 may also be formed as a unitary component.

Providing a unitary junction connector may have one or more advantages. For example, it may improve the dimensional accuracy, facilitate manufacturing, and/or reduce cost. Additionally, or alternatively, it may reduce the number of components that must be manufactured and/or stored. Additionally, or alternatively, it may reduce the number of components that must be placed in a fixture for welding, and/or reduce the number and/or complexity of welds required.

A unitary junction connector may be made from a material or an alloy that has desirable mechanical properties, e.g. increased strength, improved weld-ability, and/or improved corrosion resistance as compared with the material of a column 100 (e.g. steel).

In the foregoing examples, the lateral connectors 280, 380 of junction connectors 200, 300 were illustrated as being at a 90 degree angle to each other. For example, the upper junction connector shown in FIG. 1 has a first lateral connector 280*a* extending outwardly from the first column sidewall 112, and a second lateral connector 280*b* extending outwardly from the second column sidewall 114. Accordingly, the illustrated junction connectors 200, 300 were suitable to form corners of a rectangular volumetric module frame.

Figure 81:
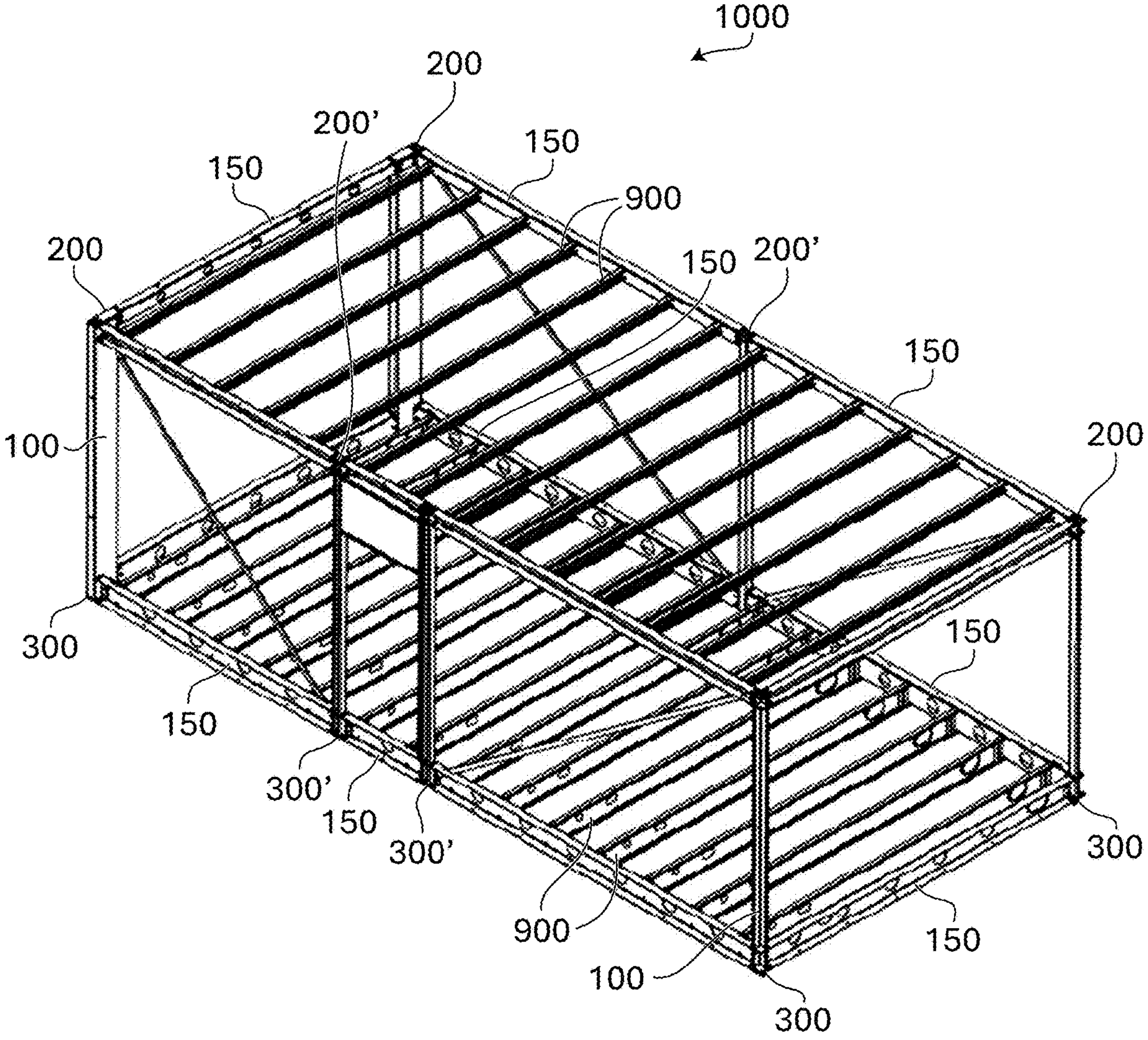
FIG. 81 is a perspective view of a volumetric module frame, in accordance with one embodiment.
Figure 85:
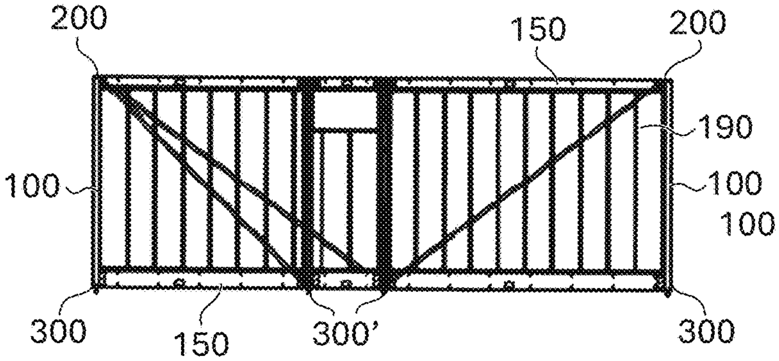
FIG. 85 is a side elevation view of the volumetric module frame of FIG. 84.
Figure 86:
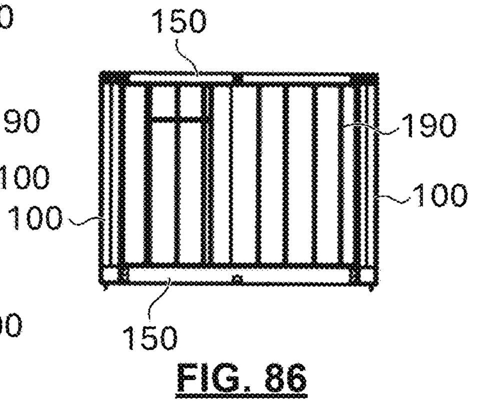
FIG. 86 is an end elevation view of the volumetric module frame of FIG. 84.
Figure 84:
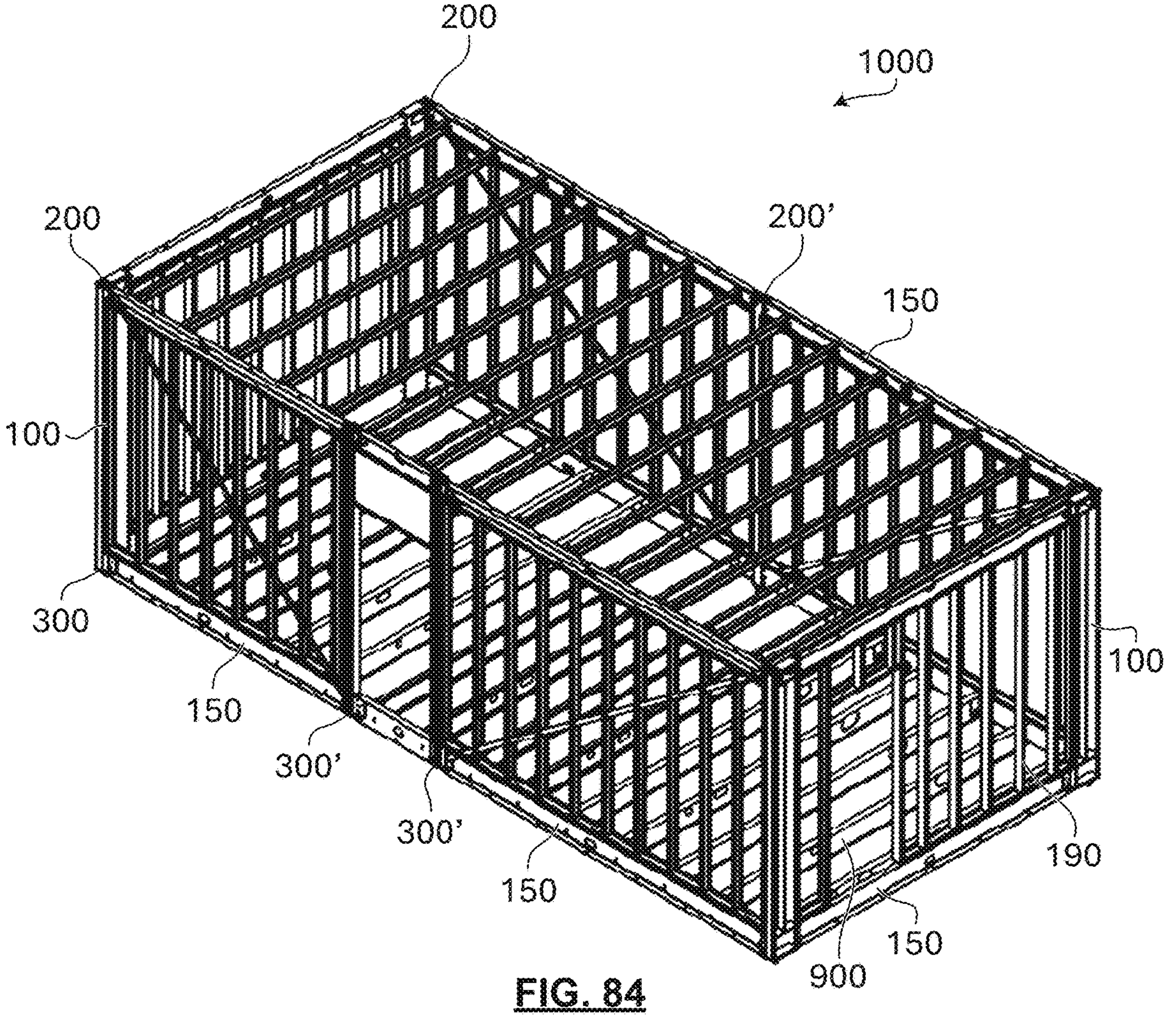
FIG. 84 is a perspective view of a volumetric module frame, in accordance with another embodiment.

It will be appreciated that lateral connectors 280, 380 may be provided at other relative angles to each other. For example, a junction connector 200 may have a second lateral connector 280*b* extending outwardly from the third column sidewall 116 (instead of from the second column sidewall), resulting in a lateral connectors 280*a*, 280*b* being at a 180 degree angle to each other. Examples of such a connector are shown in FIGS. 81, 123, 124, 147, and 148, as junction connector 200'. 47 and 148, as junction connector 200'. Examples of lower intermediate junction connectors with lateral connectors at a 180 degree angle to each other are shown in FIGS. 81, 147, and 148, as junction connector 300'. Angles of 30 degrees, 45 degrees, 60 degrees, or other desired angles may be provided in one or more alternative embodiments.

As discussed above, junction connectors 200, 300 may be coupled to the ends of columns and to the ends of horizontal structural members to form part of a volumetric module frame. A volumetric module frame may also include a plurality of joists, studs, and/or cross-braces.

In some prior systems, volumetric frames have been constructed using light steel framing, as light steel is relatively easy to join, and can produce a structure that is relatively light in weight. However, the inability of mechanical fasteners to handle large point loads, and/or the relative weakness of the joist, stud, and/or cross-brace members made from light steel framing can make it difficult to fasten the members to each other such that a moment or high-fixity connection is created. As a result, it is difficult to rig and hoist volumetric module frames made of such framing without damage due to excessive distortion or fastener shear, especially when hoisting is effected through a connection to the top face of the module frame (e.g. without the use of supporting slings under the module).

In other prior systems, volumetric frames have been constructed using structural steel framing. However, such volumetric frames may be relatively expensive, and/or difficult to manufacture.

FIGS. 71 to 80 illustrate example embodiments of connections between horizontal structural members and the ends of light steel frame joist members. Such a connection includes a fixed plate member 810 coupled to a horizontal structural member 150, and a floating plate 820. Fixed plate member 810 may be welded to horizontal structural member 150, or secured in any other suitable manner.

In the illustrated examples, fixed plate member 810 includes a connection face 812 and an alignment face 814. Alignment face 814 is adapted to assist in vertically locating an end of a joist 900 relative to the horizontal structural member 150, by contacting an inner surface of the upper end of the joist end. Additionally, the alignment face 814 may inhibit or prevent vertical displacement of the joist 900. Additionally, the alignment face 814 may transmit gravity loads to the horizontal structural member 150.

Connection face 812 includes a linear trough 815 (which may be alternatively characterized as a bead, dimple, depression, a groove, or as an indent) that is configured to engage a corresponding projecting surface feature 905 formed in the end of the joist 900.

Floating plate 820 includes a linear boss 825 (which may be alternatively characterized as a ridge, a bead, or a dimple) that is configured to engage a corresponding recessed surface feature 905 formed in the end of the joist 900.

To form the connection, an end of the joist 900 may be positioned against connection face 812 and alignment face 814 such that the joist surface feature 905 is brought into alignment with trough 815. Subsequently, or concurrently, floating plate 820 may be positioned against the end of the joist 900 such that boss 825 is brought into alignment with joist surface feature 905. The joist 900 may be clamped between fixed plate member 810 and floating plate 820 using mechanical fasteners 830.

While in the illustrated embodiments, the connection face 812 of the fixed plate member 810 includes a trough 815, it will be appreciated that appreciated that it may instead include a linear boss 825, and the surface features 905 and 815 may be likewise inverted.

The resulting connection may have one or more advantages. For example, the mechanical fasteners 830 may exert a clamping force when tightened, resulting in a locking action between the layered arrangement of the joist end and plates 810, 820. This may create a relatively stiff, moment connection between the joist end and the horizontal structural member 150. Such a connection may be characterized as having a relatively high 'fixity'. Such a connection may also provide a greater fixity than a connection formed without the linear surface features 815, 905, and 825 (e.g. a connection that relies on a combination of simple planar friction and the resistance of the edges of holes through which mechanical fasteners pass).

As another example, providing a joist 900 with a surface feature 905 at each end may assist in maintaining a desired spacing between opposing horizontal structural members 150. In this respect, once a first end of a joist is secured to one horizontal structural member, when the opposite end of the joist is being connected, as the mechanical fasteners 830 are tightened, the engagement of linear surface features 815, 905, and 825 may pull or push the fixed plate member 810 (and thus the horizontal structural member at that location) so that the distance between linear troughs 815 of opposing fixed plate members 810 is determined by the distance between the surface features 905 at each end of the joist 900. This may facilitate the accurate assembly of a volumetric frame without e.g. the use of jigs and/or precision measuring.

FIGS. 118 to 122 illustrate further example embodiments of connections between horizontal structural members and the ends of light steel frame joist members. In the illustrated example, an upper fixed plate member 810*a* is coupled to a horizontal structural member 150*a*, and a lower fixed plate member 810*b* is coupled to a horizontal structural member 150*b*.

Figure 119:
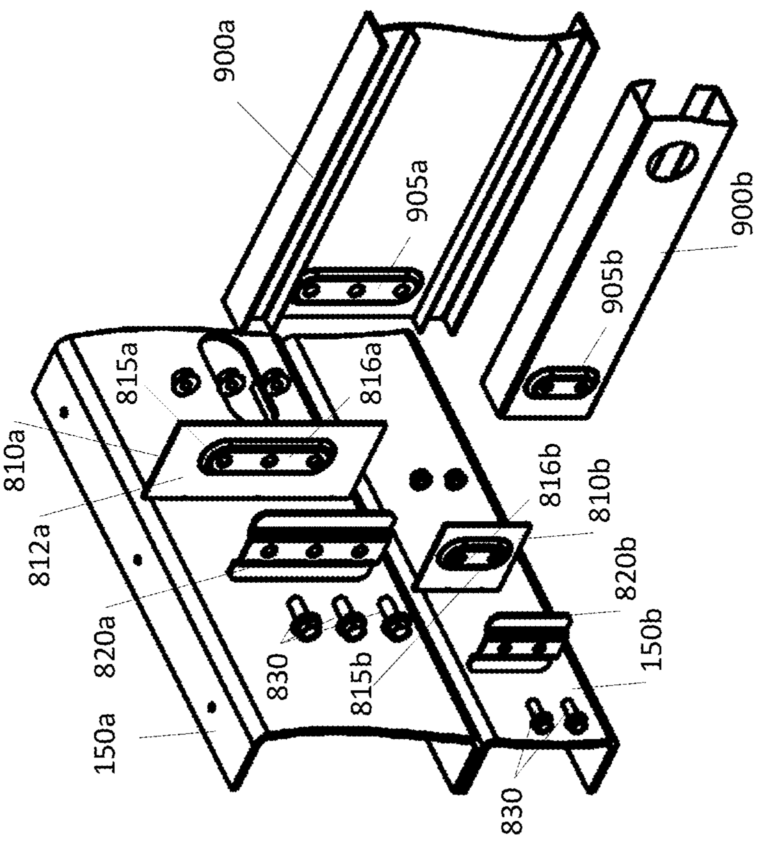
Figure 118:
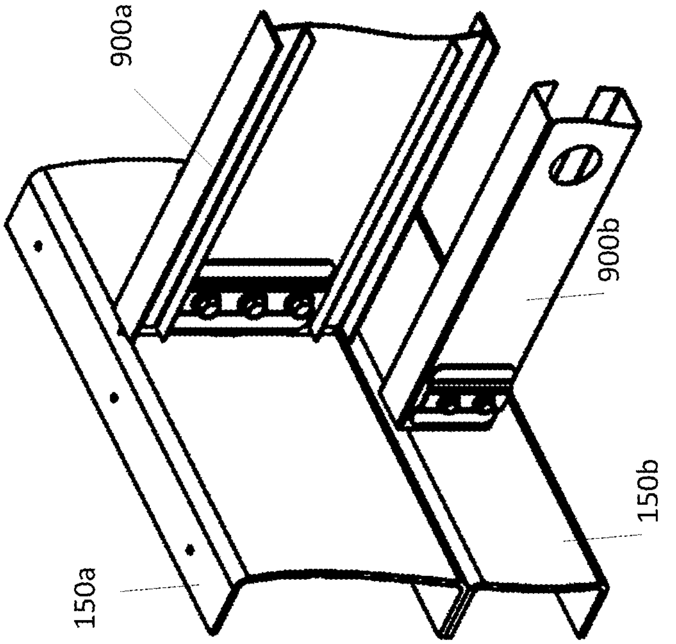
FIG. 118 is a perspective view of two couplings between horizontal structural members and joist ends in accordance with another embodiment.
Figure 120:
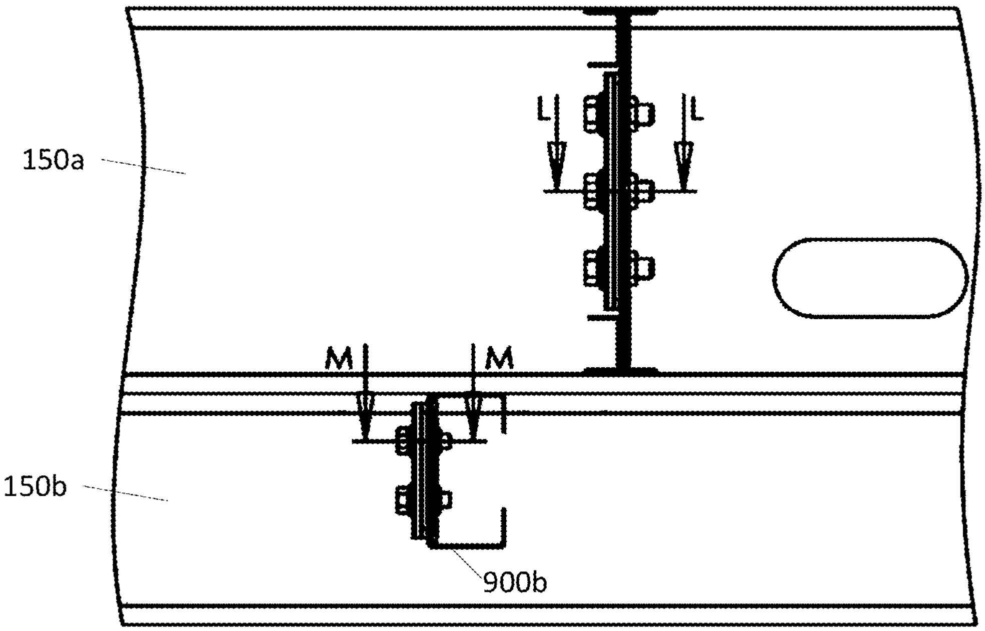

Turning to FIG. 119, each dimple 815 (which may be alternatively characterized as a linear trough, a bead, a depression, a groove, or as an indent) includes a generally planar surface 816 that is offset from the connection face 812 by a transition portion 818. The corresponding projecting surface feature 905 formed in the end of the joist 900 and the linear boss 825 (which may be alternatively characterized as a ridge, a bead, or a dimple) of floating plate 820 are each configured to engage dimple 815, as shown in FIGS. 121 and 122.

Figure 121:
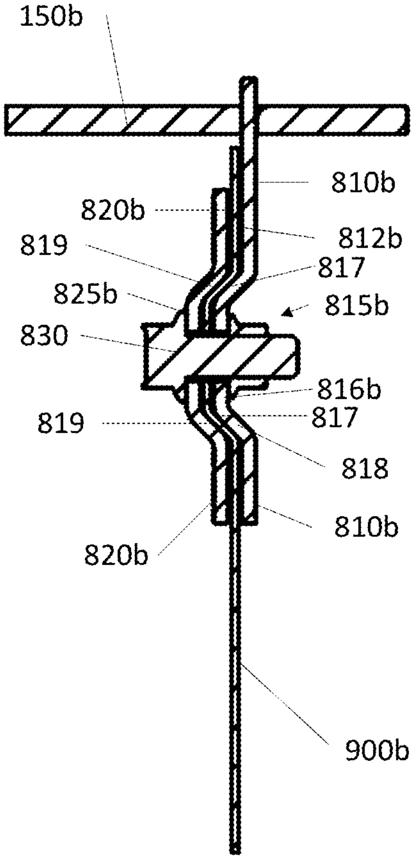
Figure 122:
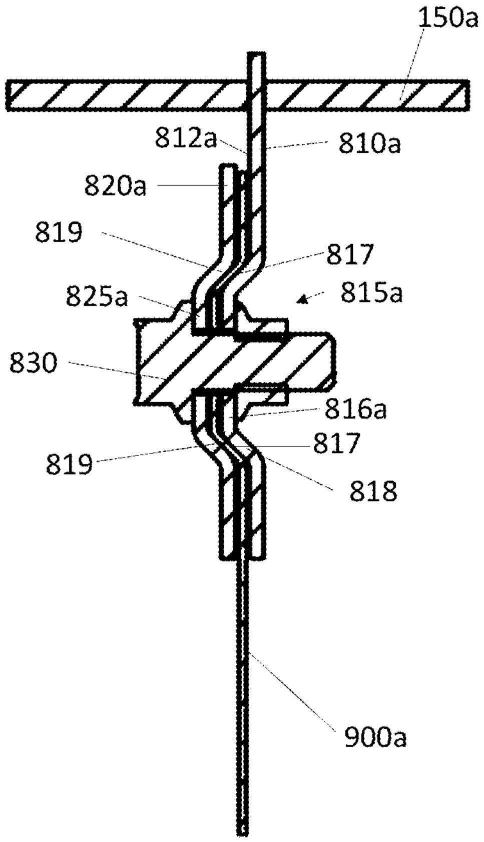

With reference to FIGS. 121 and 122, when connected by mechanical fasteners 830 a dimple 815 with a transition portion 818 between connection face 812 and surface 816 may promote contact surfaces 817 between the angled transition portion 818 and corresponding transition portion 918 of the corresponding surface feature 905 formed in the end of the joist 900 that are at an angle to the body of joist 900 and the connection face 812. Similarly, a dimple 815 with a transition portion 818 between connection face 812 and surface 816 may provide contact surfaces 819 between the angled transition portion 818 and corresponding linear boss 825 of floating plate 820 that are at an angle to the body of joist 900 and the connection face 812.

In the illustrated example, contact surfaces 817, 819 are at an angle of about 45° to the body of joist 900. Preferably, contact surfaces 817, 819 are at an angle of between about 30° and 60° to the body of joist 900.

Providing a dimple 815 that provides angled contact surfaces 817, 819 may have one or more advantages. For example, as a fixed plate member 810, an end of joist 900, and floating plate 820 are drawn together, dimple 815 may promote the relative alignment of the fixed and floating plate members and the joist end. Additionally, or alternatively, as a fixed plate member 810, an end of joist 900, and floating plate 820 are drawn together, the clamping force may be concentrated on the transition portion 818 (which may also be characterized as facets of the dimple) of dimple 815, which may improve fixity. Additionally, or alternatively, providing a dimple with a generally planar surface 816 and a transition portion 818 may reduce the reduction in thickness of the base material of fixed plate member 810 as the dimple is formed, and/or may reduce a tearing action at the transition between the connection face 812 and transition portion 818, and the transition between the transition portion 818 and surface 816, resulting from the flowing of material over surfaces of one or more forming tools used to form dimple 815.

Another potential advantage of the connections illustrated in FIGS. 71 to 80 is that the fixed plate members 810 may be welded (or otherwise secured) to horizontal structural members 150 at predetermined locations. With such an arrangement, one or more horizontal structural members 150 with pre-secured fixed plate members 810—along with a plurality of joists 900 that have pre-formed joist surface features 905—may be shipped from a fabricator to a building side (or to a modular factory located proximate a building site) as a 'knock-down' bundle of parts, which may increase the efficiency and/or decrease the cost of shipping. Additionally, alternatively, such an arrangement may reduce or eliminate the need for measuring and layout of the components of the structure.

Additionally, the use of mechanical fasteners to couple the joists between horizontal structural members may allow the components to be assembled relatively quickly, with reduced labour requirements (e.g. person-hours, specialized training), and/or with reduced equipment (e.g. without a complicated jig).

Additionally, the clamping action of the fixed plate member 810 and floating plate 820 may distribute the compression force provided by the mechanical fasteners 830, which may reduce the number of mechanical fasteners that are required. Additionally, or alternatively, the clamping action may increase the effective length of the surface features 815, 905, and 825 that are engaged.

Also, the use of mechanical fasteners having two threaded parts bearing on an adequately rigid plate may facilitate the use of devices such as specialized wrenches for measuring and/or applying a specific torque value to the fastener, which may provide a connection with quantifiable and/or verifiable mechanical properties, e.g. as may be specified by an engineer or architect.

FIG. 81 illustrates an example embodiment of a volumetric module frame, referred to generally as 1000. In this example, volumetric module frame 1000 includes four upper junction connectors 200 (one at each upper corner), three upper intermediate junction connectors 200', four lower junction connectors 300 (one at each lower corner), three lower intermediate junction connectors 300', seven columns 100, fourteen horizontal structural members 150, fourteen floor joists 900, and fourteen ceiling joists 900.

FIGS. 82 and 83 illustrate an example of a connection between upper and lower horizontal support beams 150 and one or more intermediate support studs 190. Such an arrangement may be considered desirable in cases where large vertical forces arising from tall structures are transmitted through the walls of the volumetric modules over some or all of their entire length. In the illustrated example, the intermediate support studs 190 are formed from open steel channels. Alternatively, one or more intermediate support studs 190 may be formed from a HSS. A HSS may be preferred over an open steel channel e.g. where increased load bearing capabilities are preferred or required the support stud.

FIGS. 84 to 87 illustrate another example embodiment of a volumetric module frame 1000. In this example, volumetric module frame 1000 includes four upper junction connectors 200 (one at each upper corner), three upper intermediate junction connectors 200', four lower junction connectors 300 (one at each lower corner), three lower intermediate junction connectors 300', seven columns 100, fourteen horizontal structural members 150, fourteen floor joists 900, fourteen ceiling joists 900, forty-nine support studs 190, and four diagonal bracing members. As exemplified in FIG. 87, this volumetric module frame 1000 may be provided (e.g. shipped) as a kit of pre-assembled parts, including four corner column assemblies, one intermediate column assembly, one door frame assembly, four diagonal bracing members, a floor frame with preinstalled joists, a ceiling frame with preinstalled joists, and six wall panel frames 195.

Figure 88:
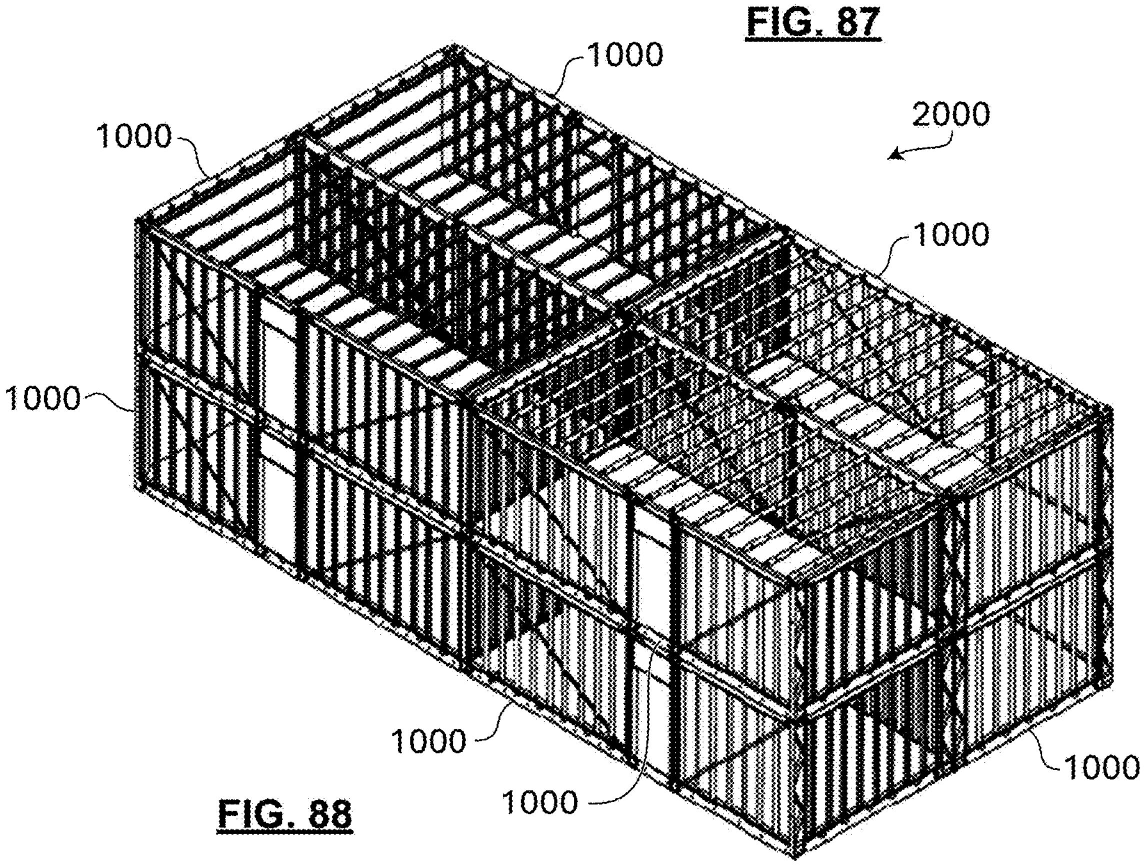
FIG. 88 is a perspective view of a plurality of volumetric module frames coupled to each other to form a building structure, in accordance with one embodiment.

FIG. 88 illustrates an example embodiment of a building structure, referred to generally as 2000, constructed using eight volumetric module frames 1000. Adjacent module frames 1000 have been secured to each other using connections between upper and lower junction connectors 200, 300, and connections between adjacent upper junction connectors 200. In the illustrated example, volumetric module frames 1000 have had flooring installed in their interiors.

Figure 90:
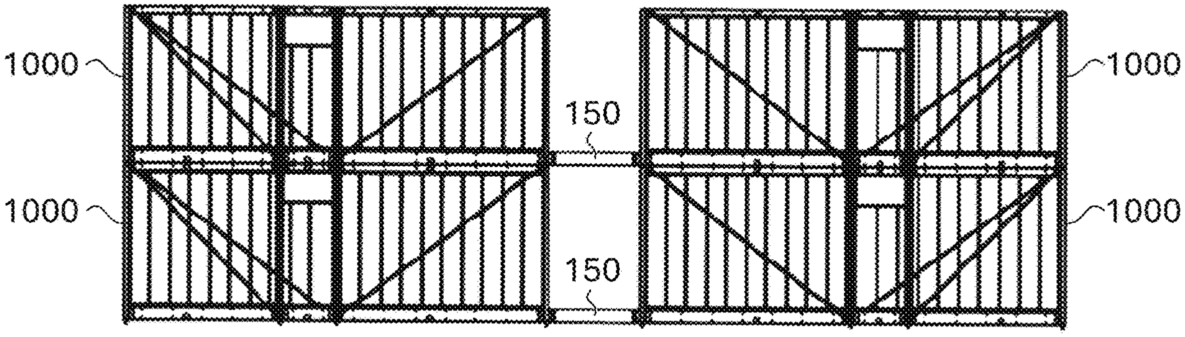
FIG. 90 is a side elevation view of the building structure of FIG. 89.
Figure 91:
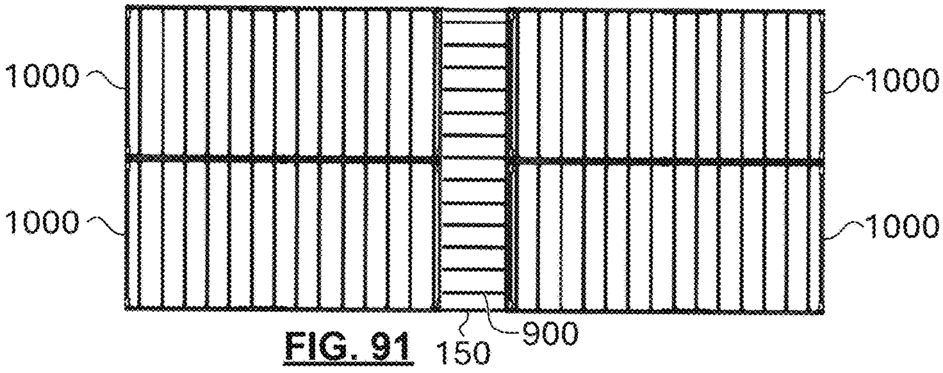
FIG. 91 is a top plan view of the building structure of FIG. 90.
Figure 92:
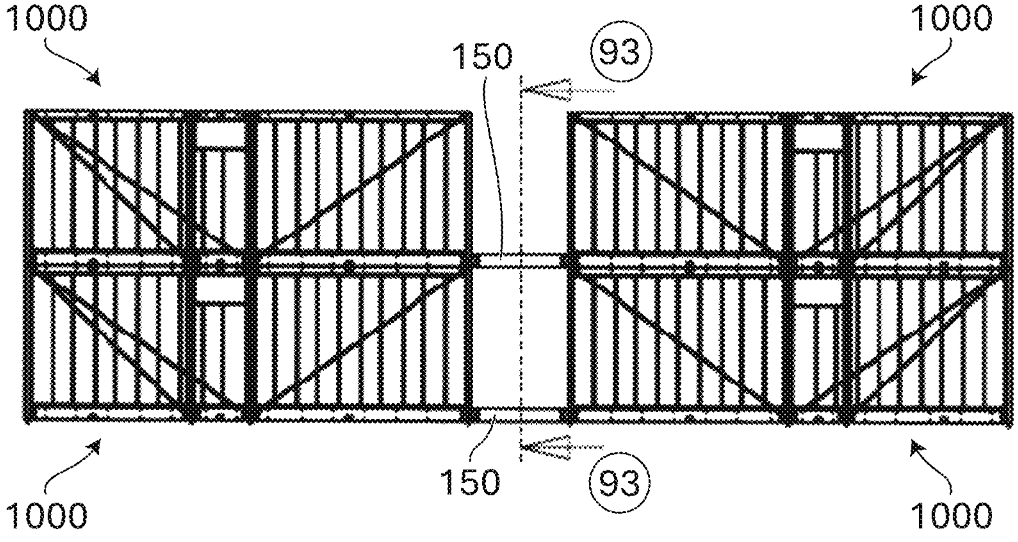
FIG. 92 is another side elevation view of the building structure of FIG. 90.
Figure 93:
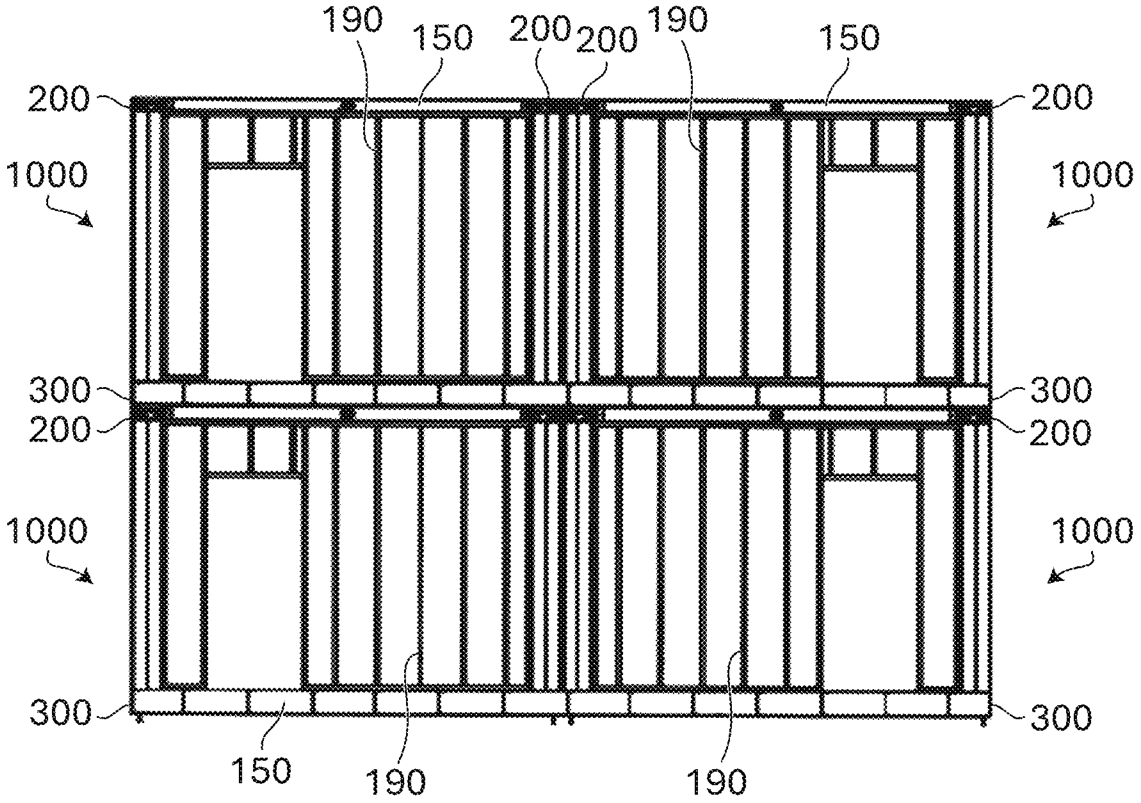
FIG. 93 is a section view of the building structure of FIG. 90, taken along line 93-93 in FIG. 93.

FIGS. 89 to 93 illustrate another example embodiment of a building structure 2000, constructed using eight volumetric module frames 1000 and two hallway frames. As illustrated in FIGS. 90 and 93, two groups of four volumetric modules are arranged with their (non-structural) end doorways facing each other, so that each end doorway faces one of the two hallways. It will be appreciated that the end doorways may be structural in one or more alternative embodiments, e.g. the volumetric frame may be a moment frame, or have a shear panel, or have diagonal bracing.

To connect the hallways to the volumetric module frames one or more lateral extension member may be used.

Figure 94:
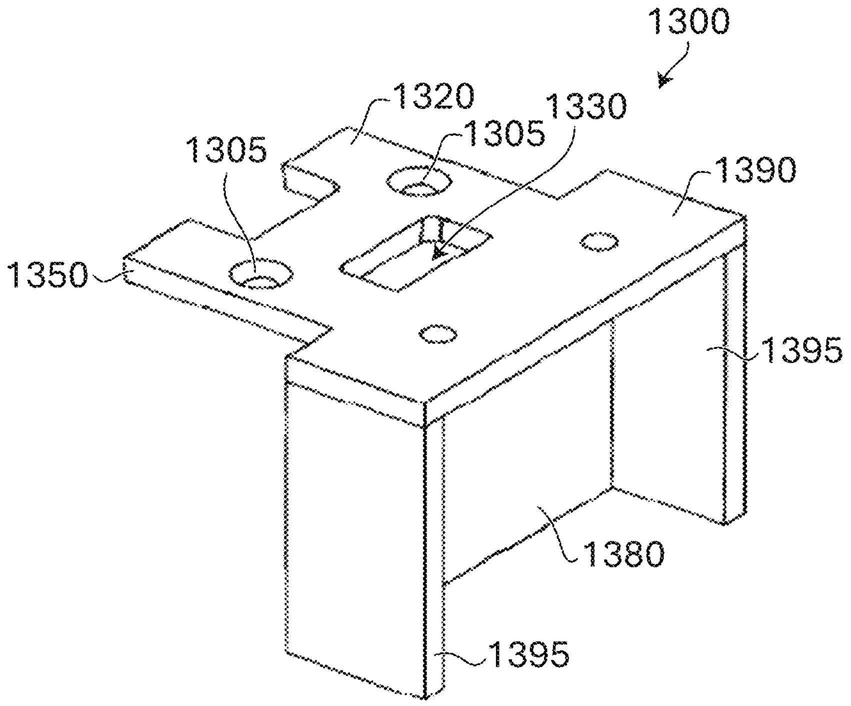
FIG. 94 is a perspective view of a lateral extension member in accordance with one embodiment.
Figure 95:
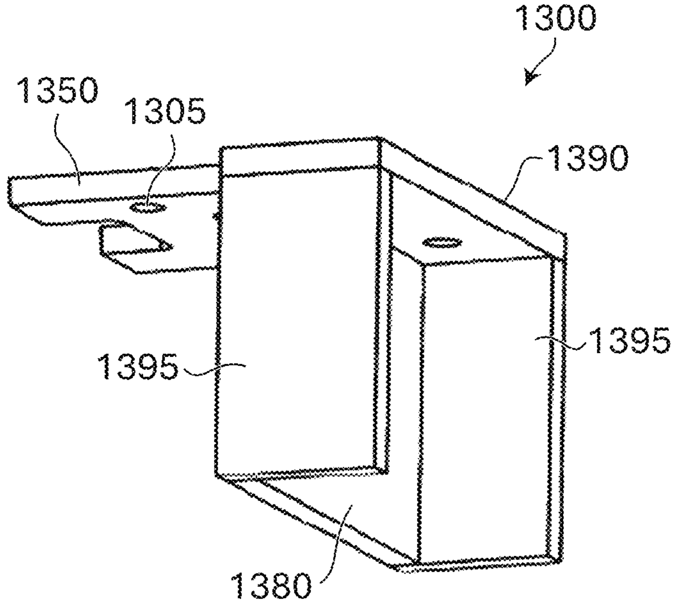
FIG. 95 is another perspective view of the lateral extension member of FIG. 94.

FIGS. 94 and 95 illustrate an example lateral extension member 1300. A portion of lateral extension member 1300 is dimensioned to seat concurrently in the recessed areas of adjacent junction connectors 200. Preferably, one or more of the sidewalls 1350 of lateral extension member 1300 are tapered such that the sidewalls 1350 sit flush against interior connector sidewalls 250 of junction connectors 200 when the extension member is seated in the recessed areas. Providing a tapered interface between lateral extension member 1300 and interior connector sidewalls 250 may result in a horizontal clamping action being exerted by the extension member as it is seated in the recesses (e.g. as one or more threaded fasteners forcing the tie member down are tightened). Similar to tie member 600, lateral extension member 1300 is dimensioned such that, when seated in the recessed areas of the upper ends of adjacent junction connectors 200, an upper surface 1320 of extension member 1300 is recessed from or flush with the upper surfaces 220 of the junction connectors 200.

Lateral extension member 1300 also includes a vertical flange 1380 that is configured to sit flush against a column or columns 100 when lateral extension member 1300 is seated in the recessed areas of the upper ends of adjacent junction connectors, and at least one perpendicular vertical flange 1395 extending outwardly from flange 1380. Flanges 1380 and 1395 cooperate to support an extension surface 1390 of lateral extension member 1300. For example, flanges 1380 and 1395 may inhibit or prevent deflection of extension surface 1390.

Figure 96:
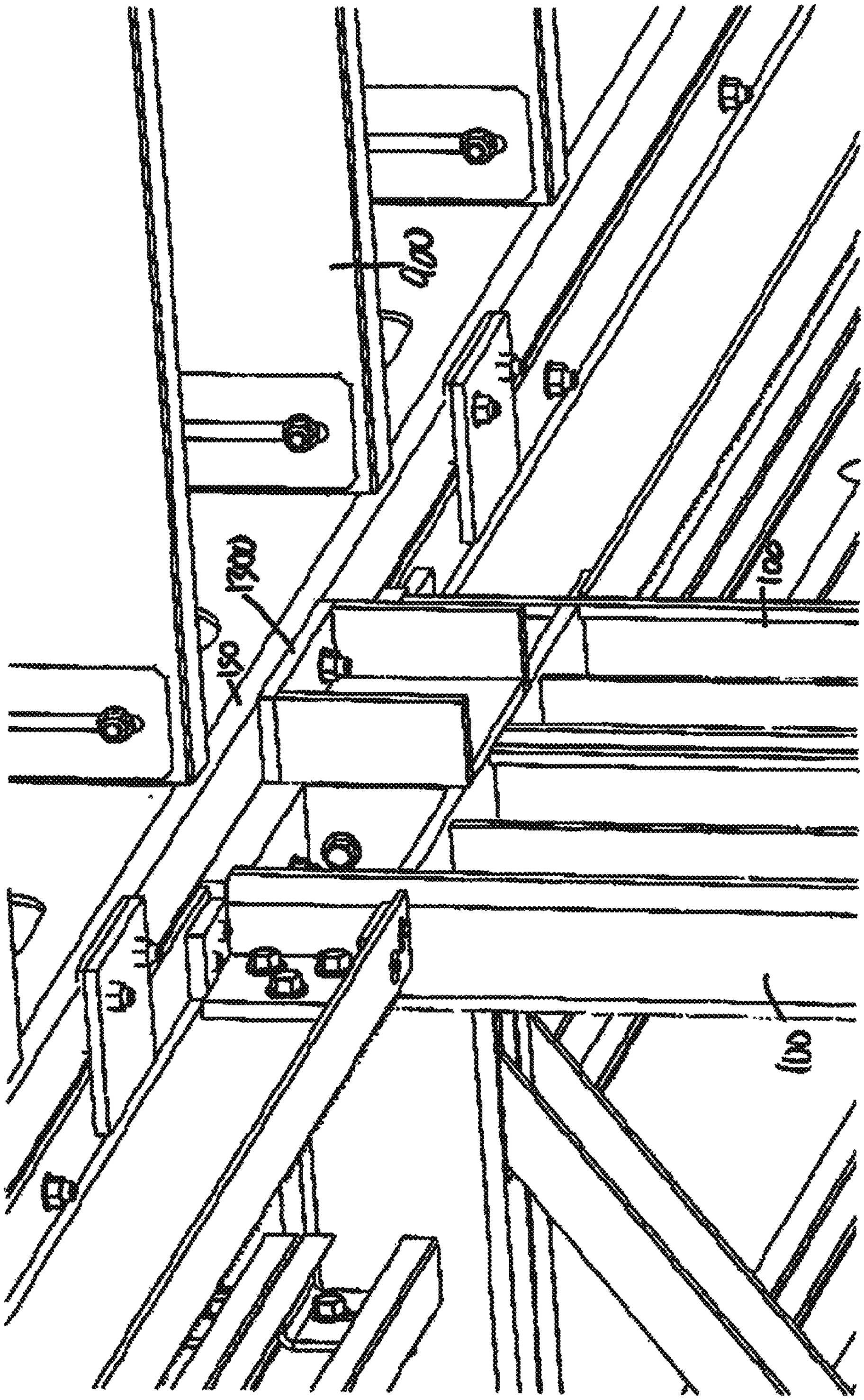
FIG. 96 is a perspective view of a coupling between two adjacent junction connectors using a lateral extension member, in accordance with one embodiment.

FIG. 96 illustrates an example connection between two adjacent upper junction connectors using the lateral extension member 1300 of FIG. 94. It will be appreciated that lateral extension members 1300 may be provided in a range of specific shapes, e.g. to accommodate eccentric conditions, parallel conditions, two, three, or more supporting columns, etc.

Figure 97:
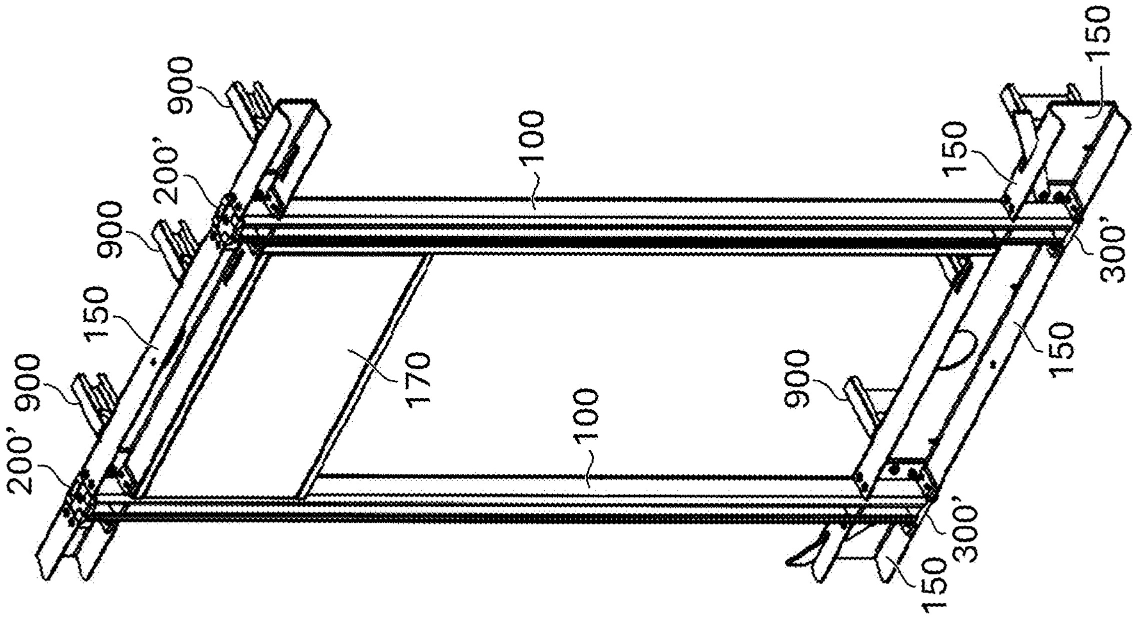
FIG. 97 is a perspective view of a door frame of a volumetric module, in accordance with one embodiment.

FIG. 97 illustrates an example embodiment of a door frame for a volumetric module frame. In this example, the door frame includes two columns 100, each with upper and lower intermediate connectors 200', 300', two horizontal structural members 150, and a door header member 170.

The illustrated door frame assembly is typical of a sub-assembly of members and connections that can be fabricated, assembled, shipped, and/or and installed as part of a larger assembly (e.g. a volumetric module frame).

FIGS. 98 to 100 illustrate an example connection between vertically adjacent door frames. Such a connection may be used when securing one volumetric module frame to another volumetric module frame. For example, vertically adjacent door frames may be coupled to each other by securing upper intermediate junction connectors 200' located at upper corners of a lower door frame to lower intermediate junction connectors 300' located at upper corners of an upper door frame.

With reference to FIGS. 99 and 100, upper junction connectors 200' and lower junction connectors 300' may be brought into alignment, with securement tabs 330 aligned with slots 230. In the illustrated example, a cap member 400 is provided to seat in the recessed area in the upper end 210 of each junction connector 200.

When the securement tabs 330 of the lower junction connectors are received in the slots 230 of the upper junction connectors, securement bolts 490 may be positioned through both the transverse bores 105 in the second column side-walls 114 and through the transverse bores 335 of the securement tabs 330 for each connector pair. In such an arrangement, the upper junction connector and the lower junction connector are secured in a fixed orientation to each other.

With reference to FIG. 98, such a connection may provide contact between the horizontal members of the vertically adjacent door frames. In such an arrangement, the connection between vertically adjacent door frames may be characterized as having a distributed load profile, which may provide capacity to transfer lateral and longitudinal loads.

Optionally, the abutting horizontal structural members 150 may be secured to each other with one or more bolts 157 (or other mechanical fasteners) as shown in FIGS. 98 to 100. As discussed above, this may serve to increase the effective depth of the structural member, which can be expected to increase its resistance to the forces acting on it.

In the illustrated example, a cutout 155 is provided in a sidewall of horizontal structural member 150 proximate the ends of an installed position of the bolt 157. Such a cutout may facilitate access to the bolts 157, e.g. during installation and/or inspection.

Figure 101:
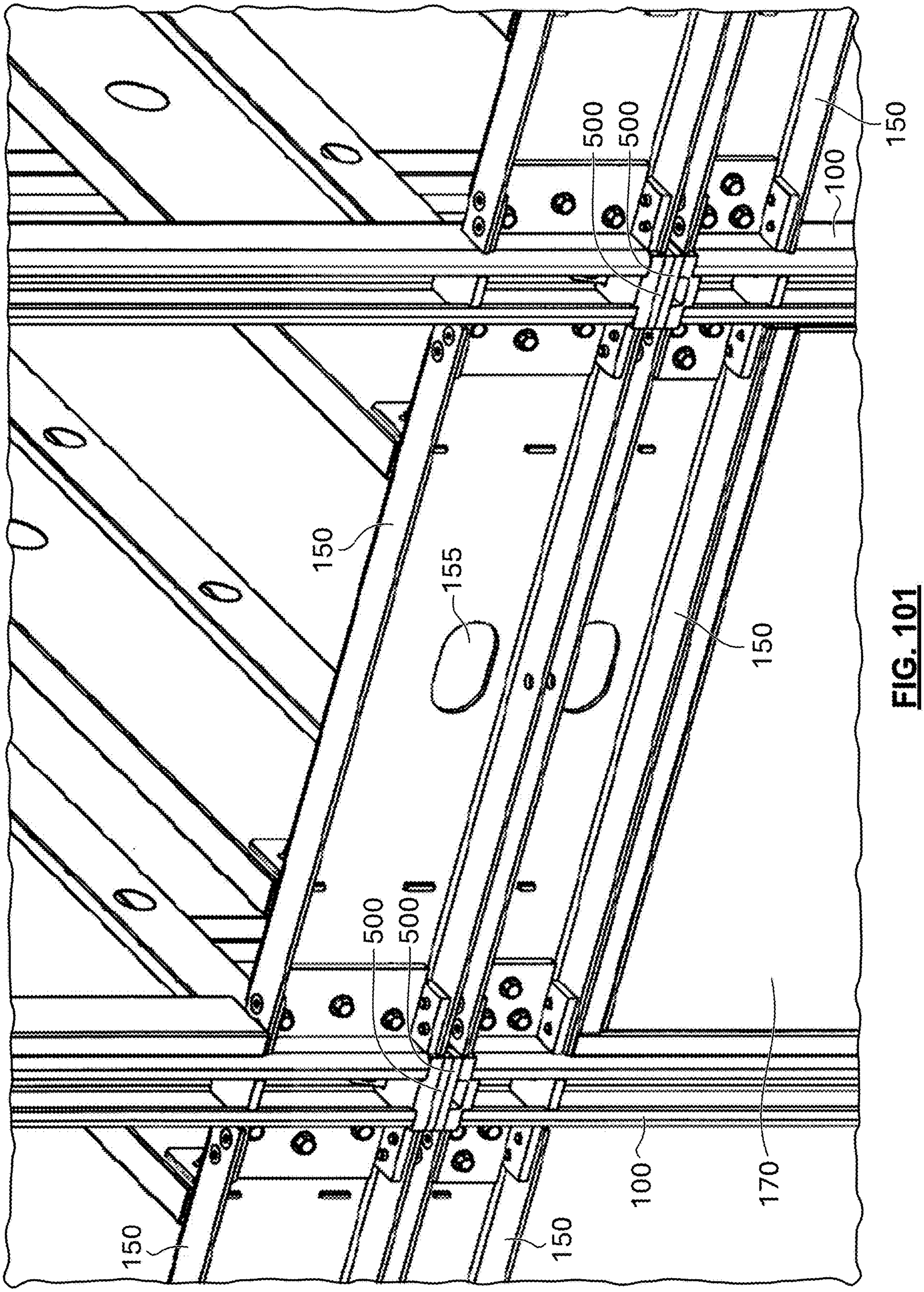
FIG. 101 is a perspective view of a coupling between a lower end of a first door frame and an upper end of a second door frame, in accordance with another embodiment.
Figure 103:
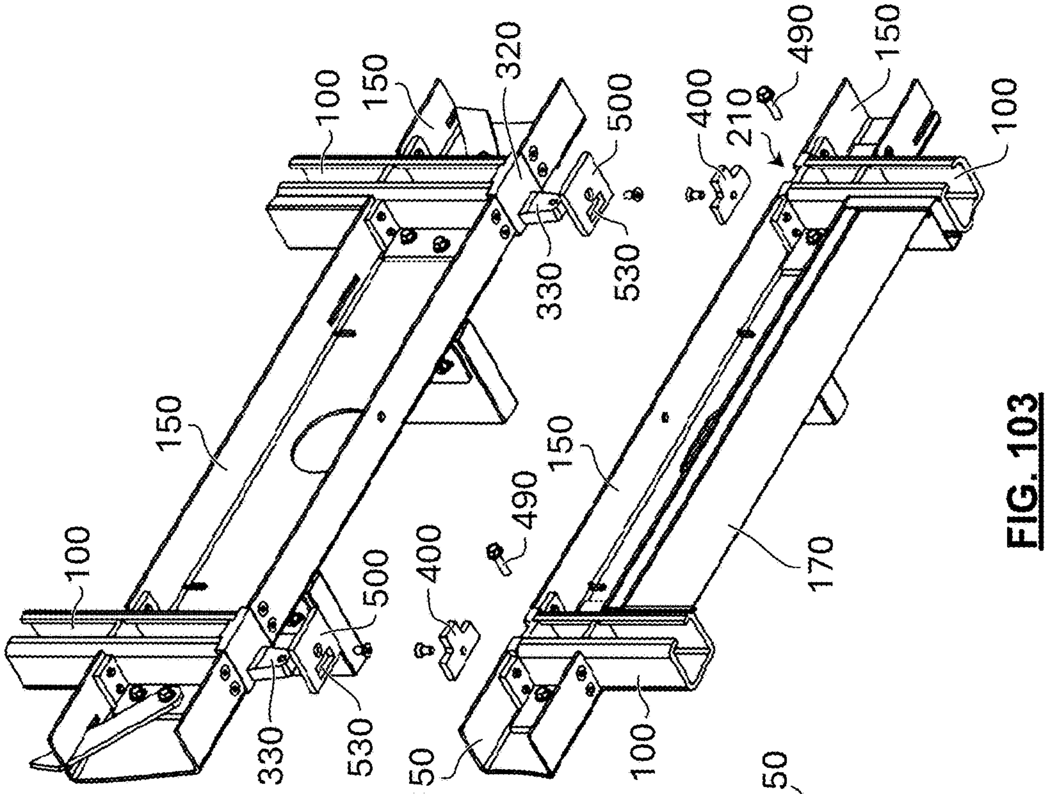
FIG. 103 is another exploded view of the coupling between the lower end of the first door frame and the upper end of the second door frame of FIG. 102.
Figure 102:
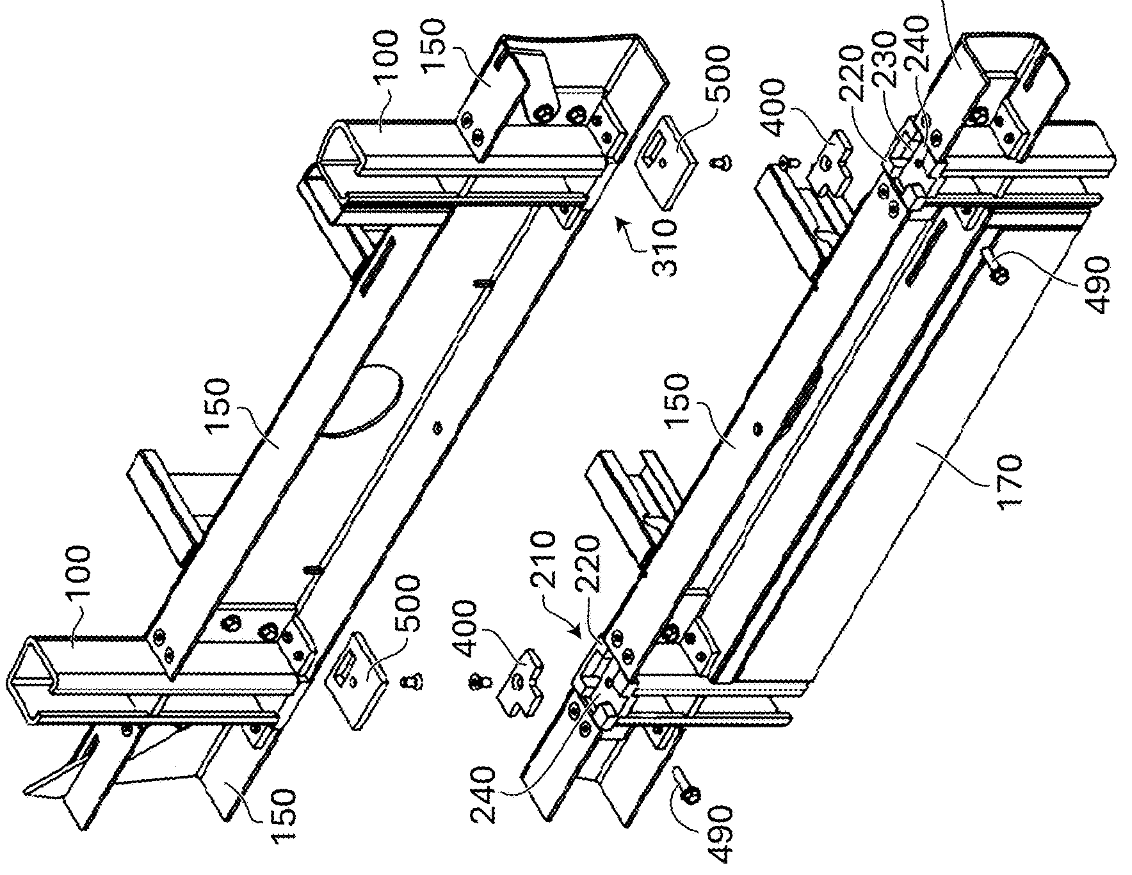
FIG. 102 is an exploded view of a coupling between a lower end of a first door frame and the upper end of a second door frame, in accordance with another embodiment.
Figure 104:
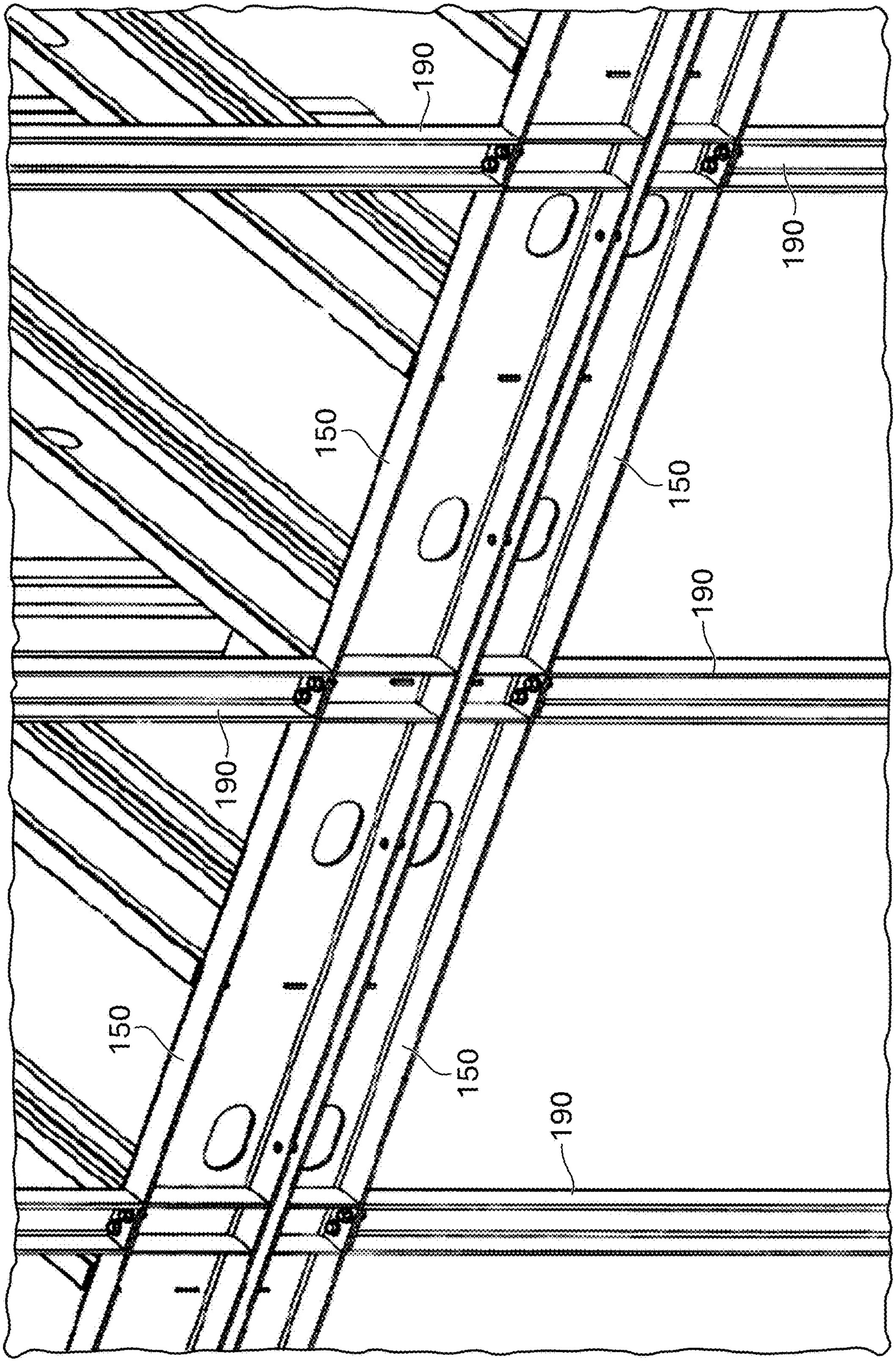
FIG. 104 is a perspective view of a structure with a first horizontal structural member spaced from a second horizontal structural member.

FIGS. 101 to 103 illustrate another example connection between vertically adjacent door frames. In this example, a spacer plate 500 is positioned between each pair of upper and lower intermediate junction connectors 200', 300'. With reference to FIG. 101, such a connection may provide separation between the horizontal members of the vertically adjacent door frames. In such an arrangement, the connection between vertically adjacent door frames may be characterized as having a point load profile.

In the example illustrate in FIG. 101, two spacer plates 500 have been provided between each pair of upper and lower intermediate junction connectors 200', 300'. It will be appreciated that more or fewer spacer plates may be provided in one or more alternative embodiments.

As discussed herein, the components and systems disclosed herein can provide a secure connection between vertically adjacent junction connectors 200, 300. Such a connection may be used to secure one volumetric module frame to another volumetric module frame. Such connections can also be made with high dimensional and/or positional accuracy.

Figure 105:
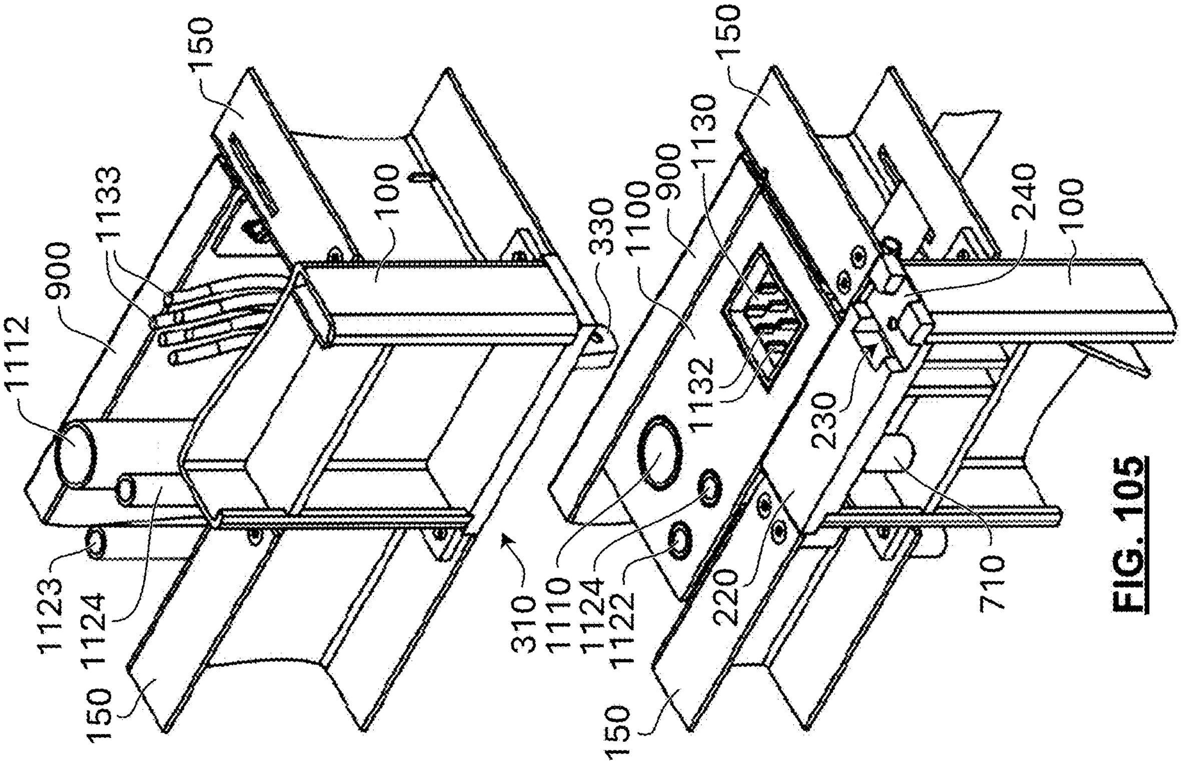
FIG. 105 is an exploded view of a coupling between adjacent volumetric modules, in accordance with one embodiment.

FIG. 105 illustrates an example embodiment of a module service connection that can be used to connect electrical, communication, HVAC, and/or plumbing systems between adjacent modules concurrently with the physical securement of adjacent module frames. In this example, an upper service connection plate 1100 includes a mating coupling 1110 for an HVAC conduit, mating couplings 1122, 1124 for hot and cold water conduits, and a recessed panel 1130 with a plurality of electrical and communication couplings 1132. Also, a lower service connection plate (not shown) includes complementary mating couplings for HVAC conduit 1110, hot and cold water conduits 1122, 1124, and for electrical and communication couplings 1132. It will be appreciated that in one or more alternative embodiments, upper and lower service connection plates may additionally or alternatively include conduits or other couplings for optical fiber, vacuum lines, fire-suppressant foam, water, or gas, heating or refrigerant fluids, rainwater leaders, and the like.

Figure 112:
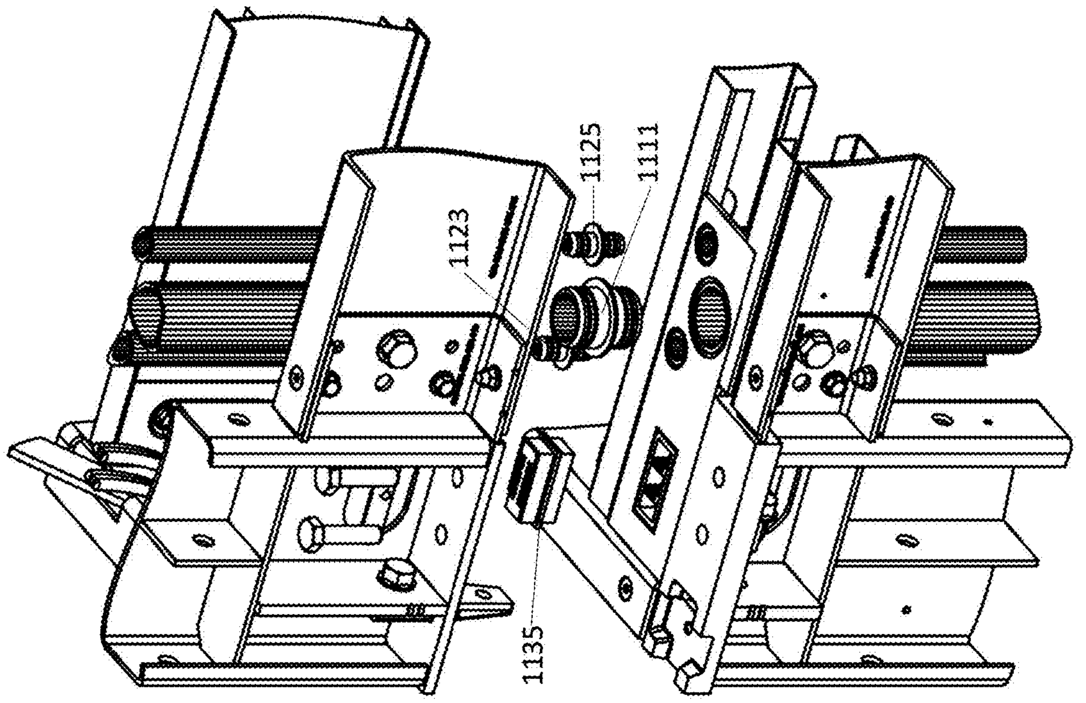
FIG. 112 is an exploded view of a coupling between adjacent volumetric modules, in accordance with another embodiment.

FIG. 112 illustrates another example embodiment of a module service connection. In this example, a fluid seal member 1111 is provided to sealingly connect HVAC mating coupling 1110 and its complementary coupling on the lower service connection plate. Also, liquid seal members 1123, 1125 are provided to sealingly connect couplings 1112, 1124 for hot and cold water conduits 1122, 1124 and their complementary coupling on the lower service connection plate. Also, an electrical block connector 1135 is provided to electrically connect the plurality of electrical and communication couplings 1132 and complementary couplings on the lower service connection plate.

In the example illustrated in FIG. 112, couplings 1111, 1123, 1125, and connector 1135 can be characterized as male/male couplings or connectors. An advantage of using male/male connectors is that the upper and/or lower service connections plates may be substantially flush (or recessed slightly from) upper and/or lower surfaces of adjacent junction connectors. As a result, during fabrication and/or transportation of a volumetric module frame, and/or during assembly of a building structure, the upper surface of a volumetric module frame may lack upwardly projecting surface features, and/or the lower surface of a volumetric module frame may lack downwardly projecting surface features.

Another advantage of using male/male connectors is that they may be secured in place as a result of the coupling of adjacent modules to each other. Optionally, an adhesive, sealant, or the like may be applied to one or more of couplings 1111, 1123, 1125 to promote a fluid-tight seal between the HVAC and/or plumbing systems of adjacent modules.

Providing a module service connection may have one or more advantages. For example, the connection plates may be provided as separate components, or as an extension or part of a column assembly. Also, the connection plates may be of various shapes and/or sizes, depending on e.g. the size of a volumetric module frame and/or building. Also, connection plates may be placed at any convenient position surrounding a structural connection (e.g. proximate a connection between adjacent junction connectors 200). In one or more alternative embodiments, service connection plates may be provided as part of an upper cap plate 120 and/or a lower cap plate 130.

Additionally, a module service connection that provides for the interconnection of services concurrent with building assembly may reduce or eliminates a portion of the work involved in the interconnection of building services. As this work is usually done on the site by workers (often skilled tradespersons), this may also reduce cost. Further, this may facilitate a more rapid completion of a building. Also, providing a module service connection may result in the quality of work for the service connection being less dependent on the skills of on-site workers, or on their effectiveness in coordinating and monitoring service installation tasks.

Additionally, module service connections may facilitate tracking and/or verification of the progress of the construction of a building. For example, a portion of the overall construction may be deemed to be complete (and may be verifiable) immediately following the placement of a volumetric module. For example, one or more signals may be transmitted from the service connection plate and/or other sensors pre-installed in the volumetric modules (e.g. a live video feed, or other data). This may facilitate the verification of completion, payment, and/or occupation of a module while the remainder of a building structure is still under construction.

Additionally, providing a module service connection may allow electrical power to be supplied to a volumetric module immediately following the placement of a volumetric module. This may e.g. allow a powered actuator 700 and/or critical building services such as smoke and fire detectors, communication systems, and the like to be operated immediately.

Additionally, or alternatively, providing a module service connection may facilitate the shipping and handling of a volumetric module without projecting components, as there may be one or more connection plates with suitable mating features placed in upper or lower receiving apertures of a volumetric module frame prior to placement of the module frame in a building structure.

Figure 106:
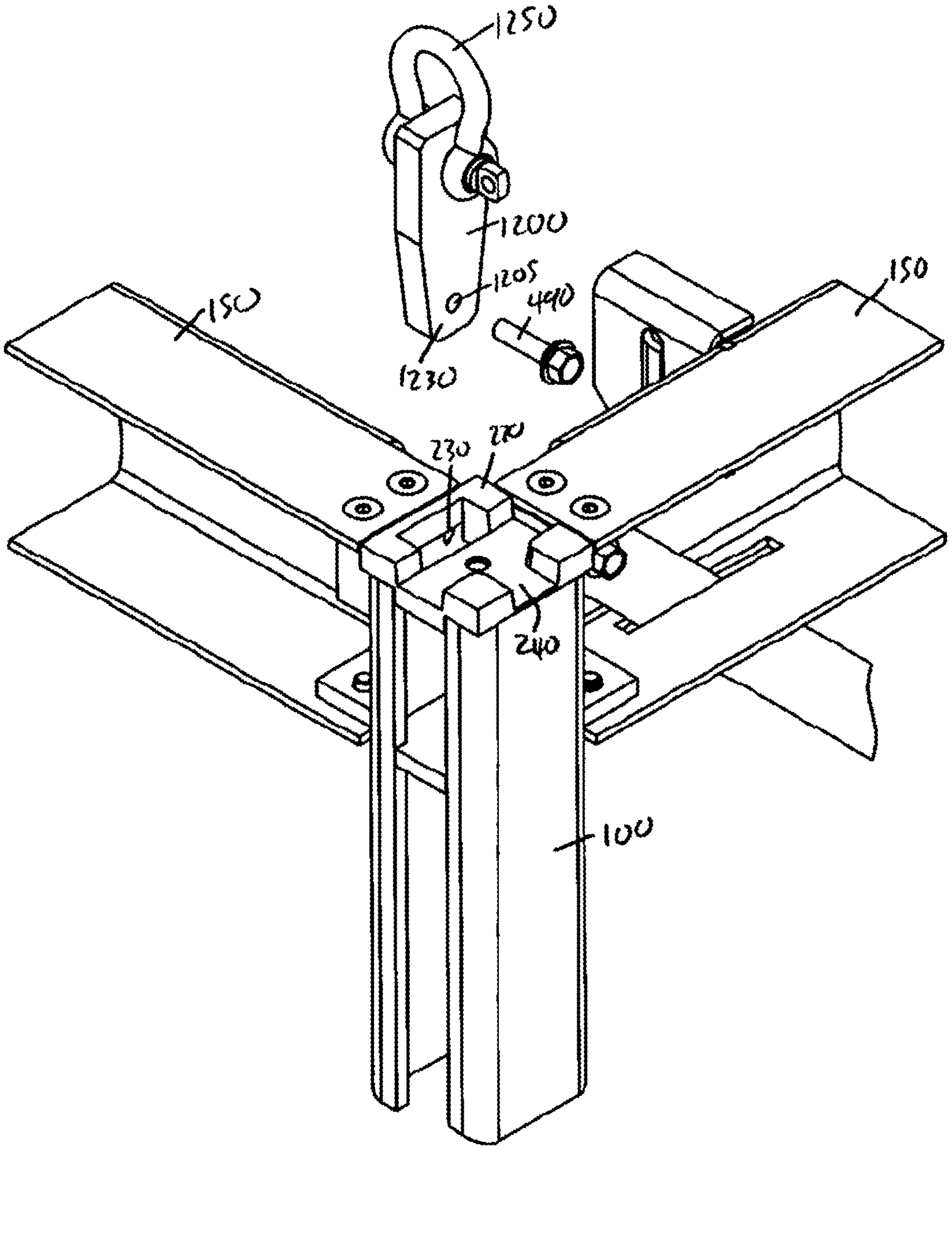
FIG. 106 is an exploded view of a coupling between an upper junction connector and a hoist attachment in accordance with one embodiment.
Figure 108:
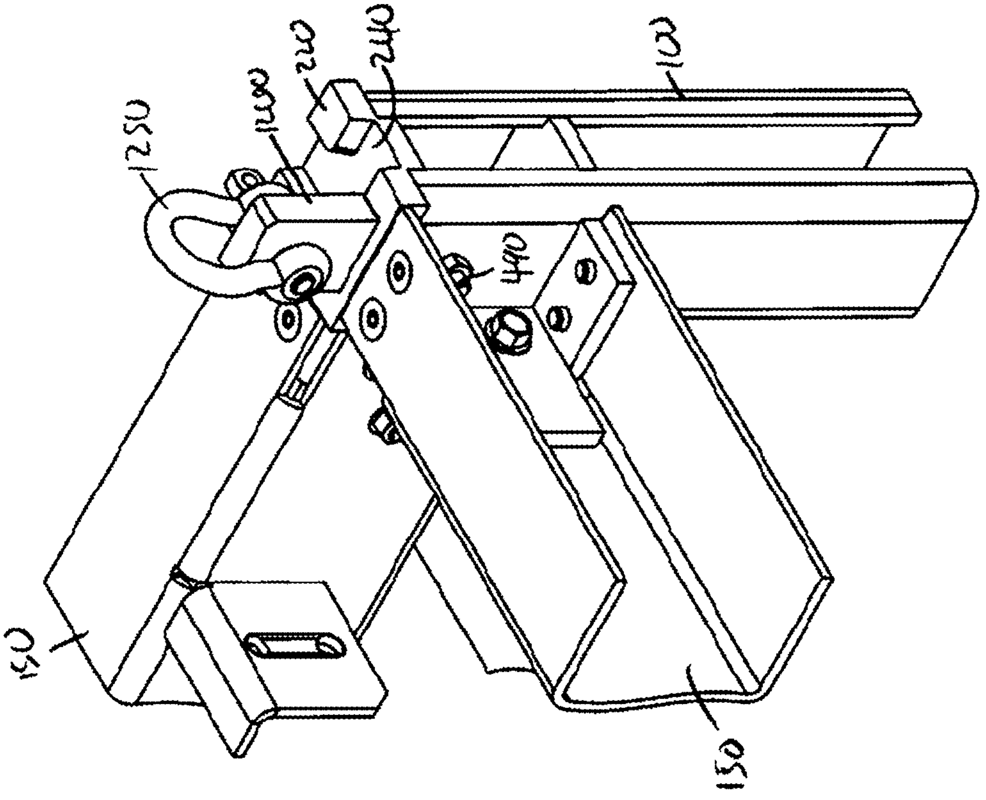
FIG. 108 is another perspective view of the coupling between an upper junction connector and the hoist attachment of FIG. 106.
Figure 107:
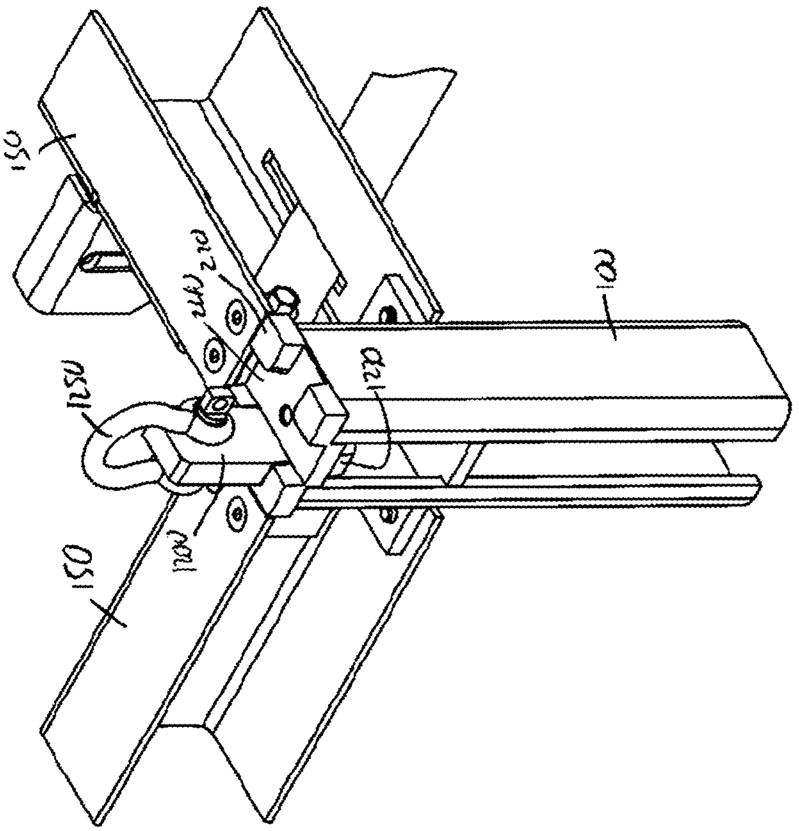
FIG. 107 is a perspective view of the coupling between an upper junction connector and the hoist attachment of FIG. 106.

FIGS. 106 to 108 illustrate an example embodiment of a hoisting connector 1200, and a connection between this hoisting connector 1200 and an upper junction connector 200.

In the illustrated example, hoisting connector 1200 includes a junction securement end 1230, which is dimensioned to be received by a slot 230 provided in an upper junction connector 200. Hoisting connector 1200 is configured to be secured to an upper junction connector 200 using a mechanical fastener, in an analogous manner to the coupling of securement tab 330 to upper junction connector 200.

Hoisting connector 1200 also includes a shackle 1250 for securing the hoisting connector to one or more hoisting cables or other hoisting apparatus. It will be appreciated that any other suitable connector may be provided instead of, or in addition to, shackle 1250.

The use of hoisting connectors 1200 may have one or more advantages. For example, by providing suitable contact points on an upper face of a volumetric module, the module may be hoisted into position without the use of slings or other apparatus that runs under the module, which may facilitate seating the module into position as part of a building structure.

Also, providing releasable hoisting connectors 1200 may have one or more advantages. For example, this may allow a volumetric module frame to be assembled and/or transported to a building site without features that project upwardly from the top face of the module frame, and the hoisting connectors 1200 may only be installed immediately prior to hoisting the module frame into position as part of a building structure.

Also, a separate, removable hoisting connector 1200 may be made of a material (e.g. a metal alloy) that has desirable mechanical properties. Additionally, or alternatively, removable hoisting connector 1200 may have a shape that is different than the shape of a permanent building connector (e.g. a downwardly-projecting securement tab 330 of a lower junction connector 300), such as: a steeper taper to facilitate placement; an upper portion having a portion angled from vertical in one or more axes so as to align more readily with upwardly arrayed cables or slings connected to a hoisting apparatus; and one or more quick release features (e.g. a removable hoisting connector may be furnished with expanding claws, a hook shape, an extendable, lockable ball or pin, or other features that facilitate its removal in a rapid manner, e.g. as compared with a threaded fastener).

Figure 109:
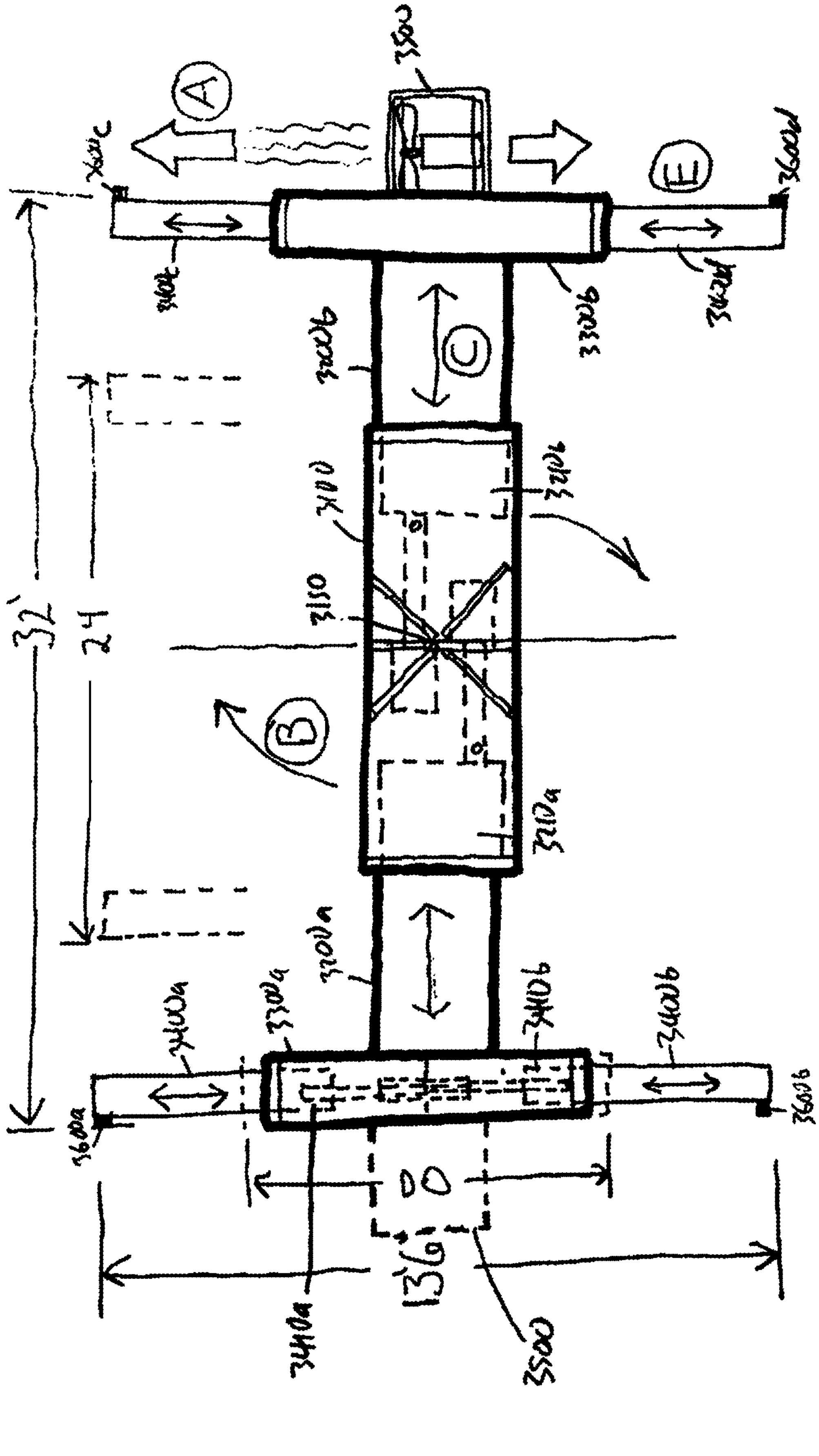
FIG. 109 is a top schematic view of a hoisting frame in accordance with one embodiment.
Figure 110:
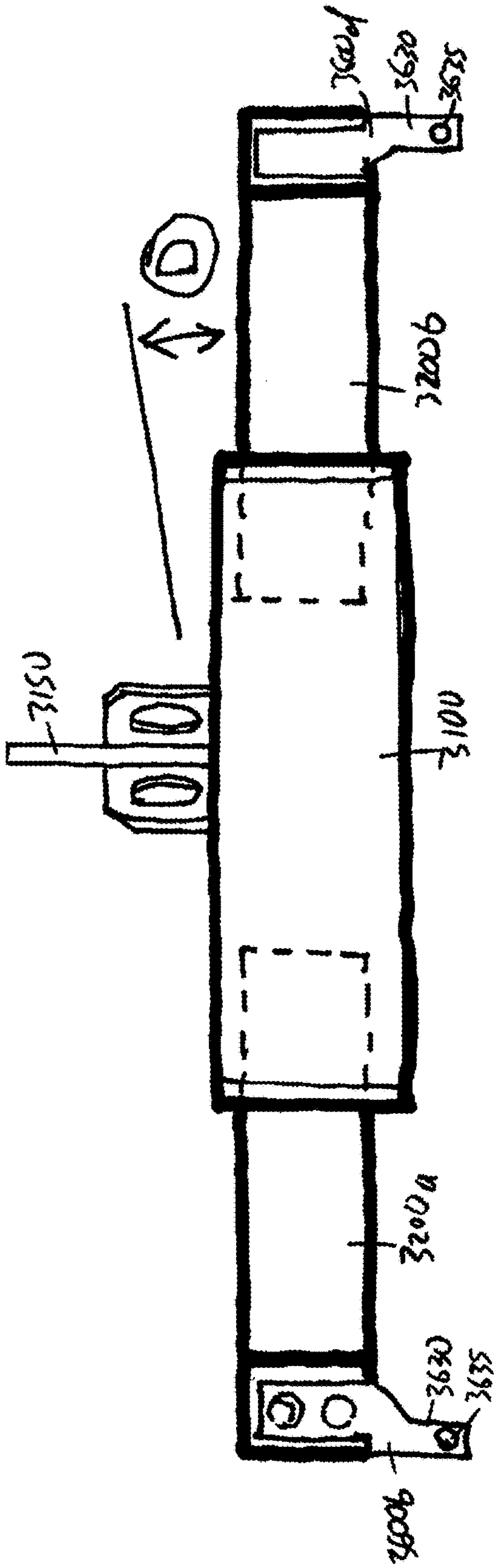
FIG. 110 is a side schematic view of the hoisting frame of FIG. 109.
Figure 111:
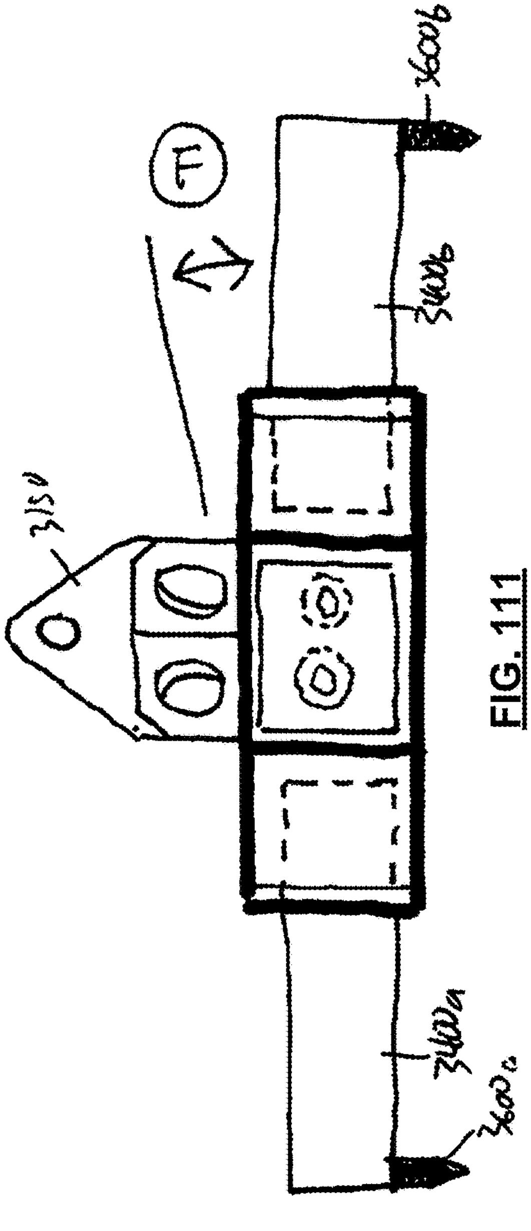
FIG. 111 is an end schematic view of the hoisting frame of FIG. 109.
Figure 113:
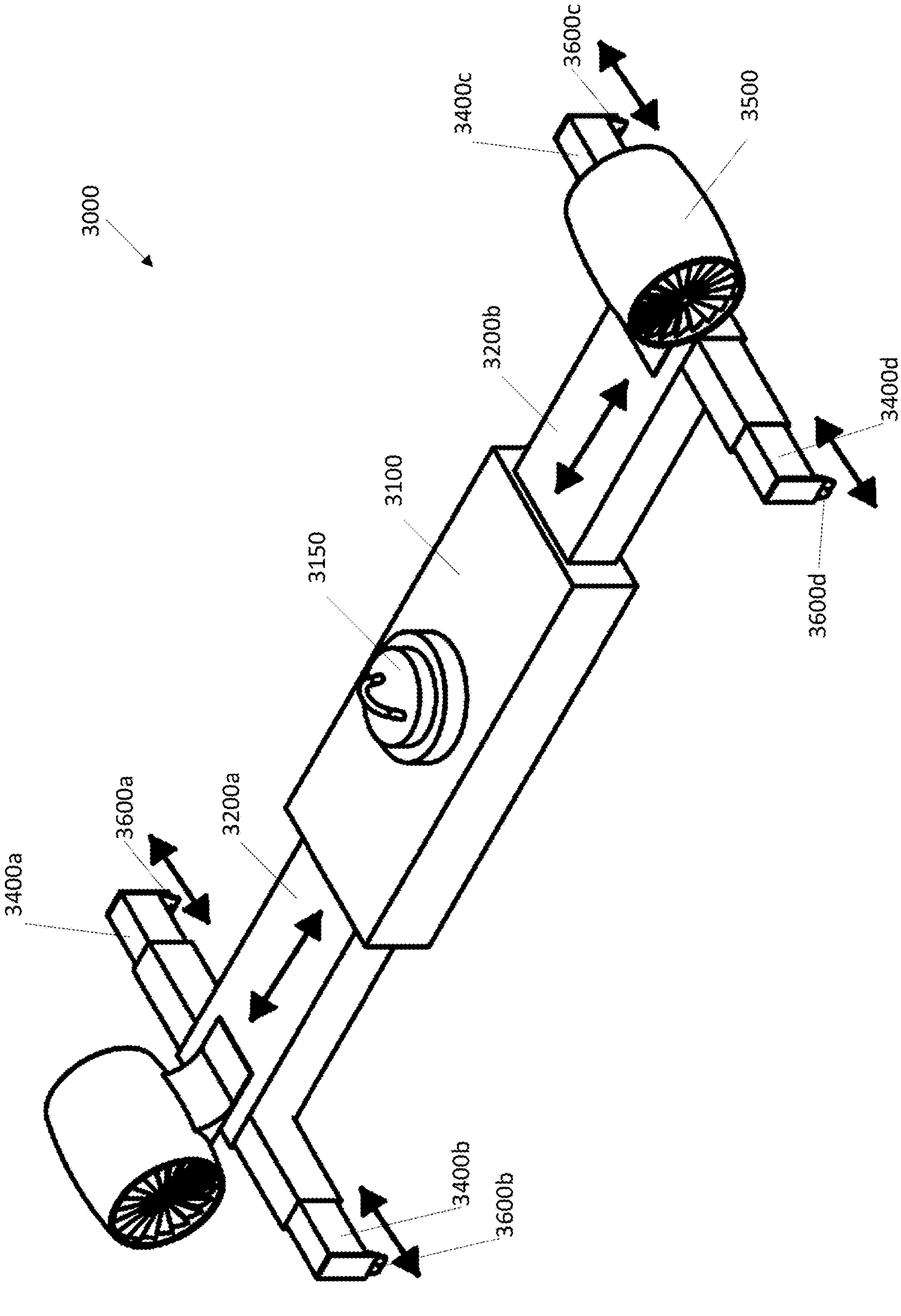
FIG. 113 is a perspective view of a hoisting frame in accordance with another embodiment.
Figure 114:
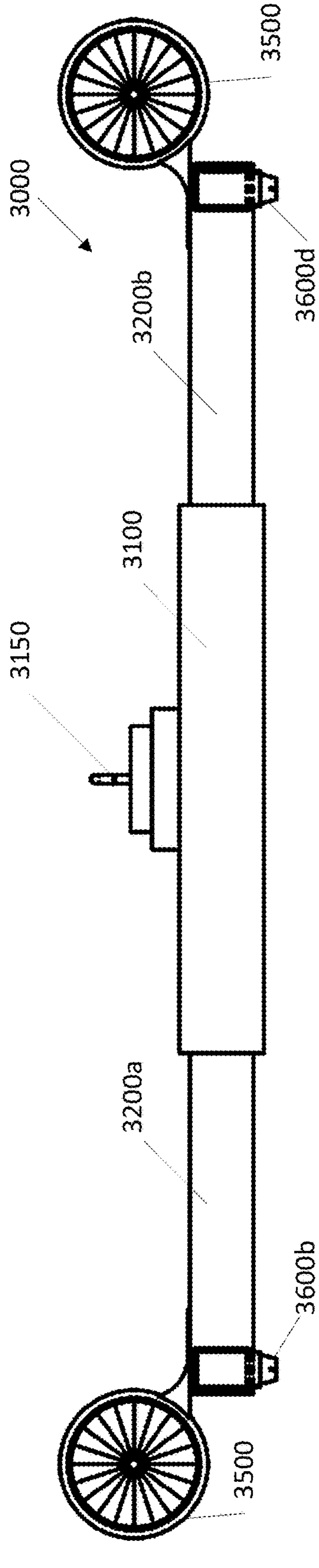
FIG. 114 is a front elevation view of the hoisting frame of FIG. 113.
Figure 115:
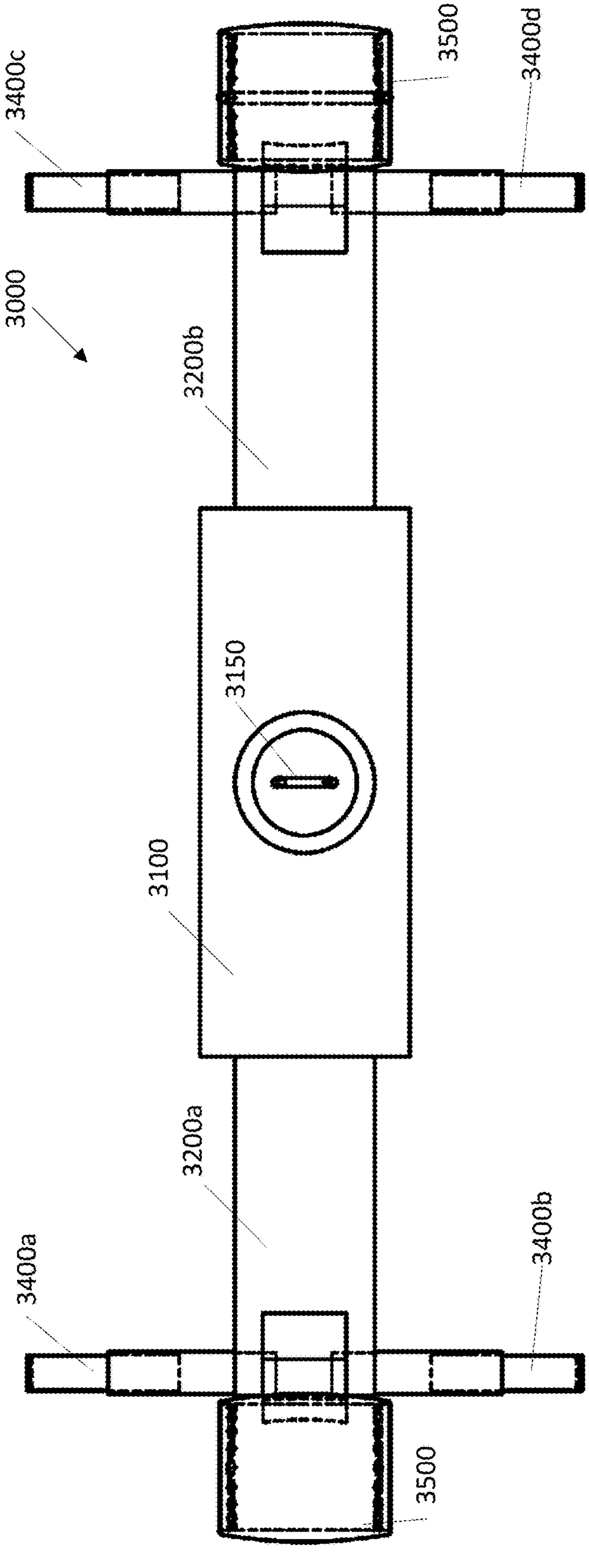
FIG. 115 is a top plan view of the hoisting frame of FIG. 113.
Figure 116:
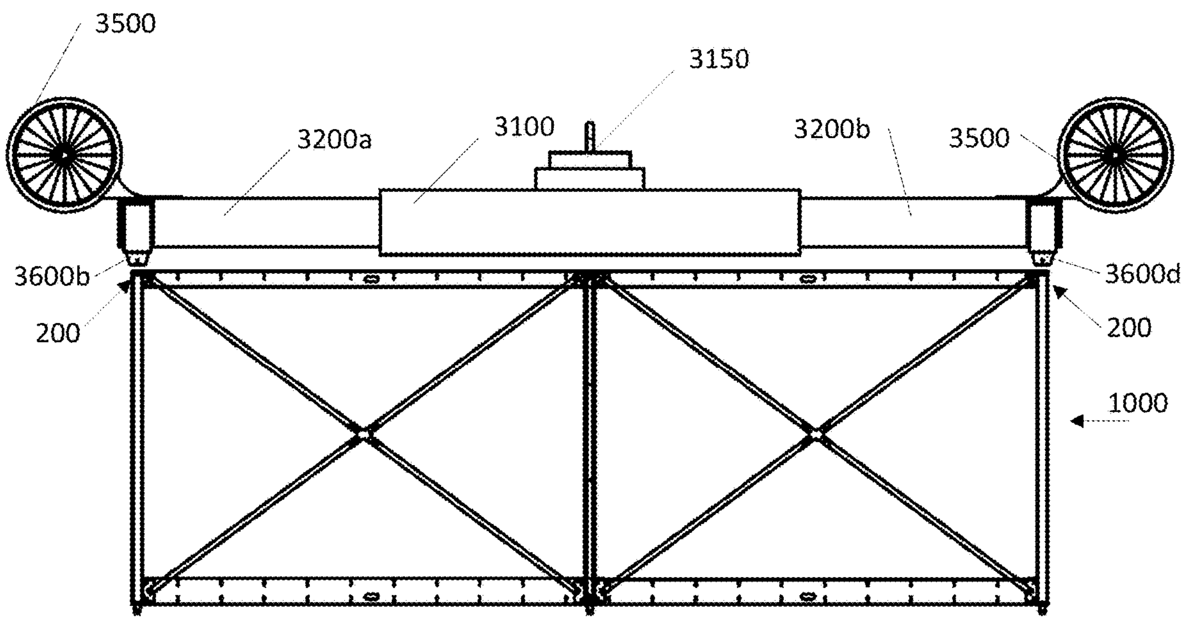
FIG. 116 is a front elevation view of the hoisting frame of FIG. 113, positioned above a volumetric module frame.
Figure 117:
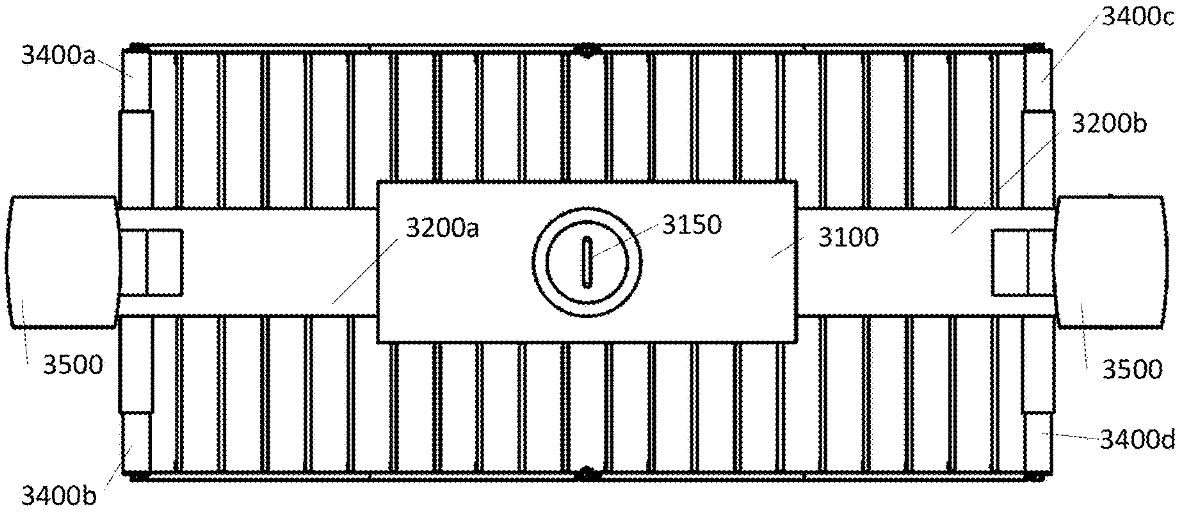
FIG. 117 is a top plan view of the hoisting frame of FIG. 113, positioned above a volumetric module frame.

FIGS. 109 to 111 schematically illustrate an example embodiment of a hoisting apparatus, referred to generally as 3000. Hoisting apparatus 3000 includes a central body portion 3100, first and second longitudinal arms 3200*a*, 3200*b*, first and second transverse body portions 3300*a*, 3300*b*, and first, second, third, and fourth transverse arms 3400*a*, 3400*b*, 3400*c*, and 3400*d*.

In the illustrated example, central body portion 3100 includes a crane connection member 3150 for securing the hoisting apparatus to the hoist cable of a crane.

First and second longitudinal arms 3200*a*, 3200*b* extend outwardly from opposite ends of central body portion 3100. Central body portion 3100 also includes actuators 3210*a*, 3210*b*, for selectively and independently moving the longitudinal arms 3200*a*, 3200*b* between their respective retracted and extended positions.

First and second transverse body portions 3300*a*, 3300*b* are provided proximate the ends of first and second longitudinal arms 3200*a*, 3200*b*. Transverse arms 3400*a* and 3400*b* extend outwardly from opposite ends of first transverse body portion 3300*a*, and transverse arms 3400*c* and 3400*d* extend outwardly from opposite ends of second transverse body portion 3300*b*. Transverse body portions 3300*a*, 3300*b* each includes actuators for selectively and independently moving the transverse arms 3200*a*, 3200*b*, 3200*c*, and 3200*d* between their respective retracted and extended positions.

Hoisting connectors 3600*a*, 3600*b*, 3600*c*, and 3600*d* are provided proximate the ends of, respectively, transverse arms 3400*a*, 3400*b*, 3400*c*, and 3400*d*. As shown in FIG. 110, each hoisting connector 3600 includes a junction securement end 3630, which is dimensioned to be received by a slot 230 provided in an upper junction connector 200. Hoisting connector 3600 is configured to be secured to an upper junction connector 200 using a mechanical fastener, in an analogous manner to the coupling of securement tab 330 to upper junction connector 200.

In a preferred embodiment, each pair of transverse arms can be selectively adjusted between a width of 8 feet and a width of 13 and one half feet (measured between the hoisting connectors at the ends of the transverse arms), and the longitudinal arms can be selectively adjusted between a length of 24 feet and a length of 32 feet (measured between the hoisting connectors at the ends of the transverse arms).

In use, hoisting apparatus 3000 may be secured to the hoist cable of a crane (via crane connection member 3150). Hoisting apparatus 3000 may also be coupled to a volumetric module by aligning hoisting connectors 3600*a*, 3600*b*, 3600*c*, and 3600*d* with upper junction connectors 200, inserting junction securement ends 3630 into slots 230, and securing each connection with a mechanical fastener. In order to align each of the hoisting connectors 3600 with slots 230, the longitudinal arms 3200*a*, 3200*b* and/or transverse arms 3400*a*, 3400*b*, 3400*c*, and 3400*d* may be extended or retracted, as appropriate.

Also, once hoisting apparatus 3000 has been coupled to a volumetric module, the longitudinal arms 3200*a*, 3200*b*, and/or transverse arms 3400*a*, 3400*b*, 3400*c*, and 3400*d* may be extended or retracted to locate the crane connection member 3150 relative to a center of gravity of the volumetric module. For example, when crane connection member 3150 is horizontally aligned with center of gravity of a coupled volumetric module, the module can be expected to remain generally level. If the crane connection member 3150 is horizontally offset from the center of gravity of the module, the module can be expected to pitch and/or roll, depending on the direction and magnitude of the offset.

In some embodiments, the extension and/or retraction of the longitudinal and/or transverse arms to locate the crane connection member relative to a center of gravity of the volumetric module may be controlled using an appropriately programmed computing device. For example, positioning of the longitudinal and/or transverse arms may be based on pre-determined information about a volumetric module and/or its contents (e.g. fittings, flooring, appliances). Alternatively, or additionally, one or more sensors may provide real-time or near-real-time feedback to the computing device regarding the relative position and/or orientation of the volumetric module.

Controlling hoisting apparatus 3000 to promote pitch and/or roll of a hoisted module may have one or more advantages. For example, as a module is brought towards its desired position on a building structure, it may be desirable for one end or edge of a lower surface of the module to be brought into contact with the building structure before another end or edge of the module. As another example, where a volumetric module has an eccentric center of gravity (e.g. due to the location of installed features such as kitchens, balconies, utilities, etc.), hoisting apparatus 3000 can be adjusted to compensate appropriately.

Hoisting apparatus 3000 may also include one or more propulsion sources 3500, such as a fan or a source of compressed gas. In use, the propulsion source may be selectively actuated (e.g. a fan may be turned on, or a valve may be opened to release a compressed gas through a directional nozzle) in order to promote rotation of a suspended volumetric module about a yaw axis. One or more batteries or other power sources may be provided as part of hoisting apparatus 3000 to supply power to the one or more propulsion sources 3500.

Controlling hoisting apparatus 3000 to promote yaw of a hoisted module may have one or more advantages. For example, as a module is brought towards its desired position on a building structure, it may be desirable to orient the module relative to the building structure before making contact with the building structure.

FIGS. 113 to 117 illustrate another example embodiment of a hoisting apparatus 3000. In this example, crane connection member 3150 includes a swivel hook with relatively low friction bearings. An advantage of providing a crane connection that can swivel relatively freely is that it may provide less resistance to the rotation of central body portion 3100 relative to a hoist cable (or cables). This may improve the yaw control of a hoisted module, and/or reduce the force output requirements of propulsion sources 3500.

In the example illustrated in FIGS. 113 to 117, propulsion sources 3500 include ducted fans. An advantage of providing ducted fans is that they may produce a larger amount of thrust per unit of power relative to un-ducted fans.

In some embodiments, hoisting apparatus 3000 may include one or more sensors to assist in controlling the position of a suspended volumetric module frame during a hoisting operation. For example, the modules to be hoisted may be provided with one or more visible markings that may be recognized by one or more cameras to automatically determine the position and/or orientation of the suspended module during a hoisting operation. Additionally, or alternatively, the modules to be hoisted may be provided with one or more visible markings that may be recognized by one or more cameras to automatically adjust the longitudinal and/or transverse arms to assist in positioning hoisting connectors 3600 to align with slots 230.

In one or more alternative embodiments, the central body of the hoisting apparatus may be used with connectors suitable to other suspended loads and connection apparatus not specific to the hoisting of volumetric modules.

Additionally, or alternatively, a hoisting apparatus 300 may be provided with only one transverse arm, or without transverse arms at the ends of the longitudinal arms (providing two or three points of suspension), or with multiple longitudinal arms and multiple transverse arms, which may or may not be at right angles to each other (providing five or more points of suspension), e.g. for loads of non-linear or non-orthogonal form.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A connection assembly for modular construction, the assembly comprising:

at least one column having an upper end, a lower end, and a first column sidewall, a second column sidewall, a third column sidewall, and a fourth column sidewall, the first, second, third, and fourth column sidewalls extending between the upper end and the lower end, wherein the fourth column sidewall defines a longitudinal gap therein, the longitudinal gap extending along a length of the fourth column sidewall;

at least one upper junction connector coupled to the upper end of the at least one column, each of the at least one upper junction connector comprising:

an upper end having first, second, third, and fourth edges, wherein the first edge overlies the first column sidewall, the second edge overlies the second column sidewall, the third edge overlies the third column sidewall, and the fourth edge overlies the fourth column sidewall, wherein the upper end has a planar upper surface, a recessed surface, and at least one connector sidewall extending between the upper surface and the recessed surface, the recessed surface and the at least one connector sidewall defining a contiguous recessed area in the upper end that extends to the second, third, and fourth edges of the upper end of the connector, wherein a slot extends through the upper end adjacent to an interior surface of the first column sidewall, and wherein a bore extends through the recessed surface;

a first lateral connector extending generally perpendicular to the first column sidewall proximate the upper end of the at least one column; and a second lateral connector extending generally perpendicular to one of the second and third column sidewall proximate the upper end of the at least one column;

wherein a transverse bore extends through the first column sidewall proximate to and aligned with the slot; and wherein the slot extends through to an interior of the column and is configured to receive a securement tab for securing the upper junction connector to a lower junction connector of an upper column by positioning a securement bolt through the transverse bore in the first column sidewall and a transverse bore in the securement tab.

2. The connection assembly of claim 1, wherein the at least one column comprises an open steel section that is brake-formed and/or roll formed.

3. The connection assembly of claim 1, wherein at least one sidewall of the slot is tapered inwardly.

4. The connection assembly of claim 1, wherein a portion of the interior surface of the first column sidewall proximate the slot is angled.

5. The connection assembly of claim 1, wherein at least a portion of the at least one connector sidewall is tapered inwardly.

6. The connection assembly of claim 1, further comprising at least one reinforcing plate positioned between opposing column sidewalls, generally perpendicular to the upper end of the upper junction connector, and proximate a lower end of the first lateral connector.

7. The connection assembly of claim 1, wherein the upper end of the at least one upper junction connector, the first lateral connector, and the second lateral connector are integrally formed.

8. The connection assembly of claim 1, further comprising:

an electrically powered actuator configured to drive a securement bolt through the transverse bore and through a corresponding transverse bore in a securement tab extending from a lower junction connector and through the slot.

9. The connection assembly of claim 8, wherein the actuator is at least one of a linear actuator and a rotary actuator.

10. A connection assembly for modular construction, the assembly comprising:

at least one column having an upper end, a lower end, and a first column sidewall, a second column sidewall, a third column sidewall, and a fourth column sidewall, the first, second, third, and fourth column sidewalls extending between the upper end and the lower end, wherein the fourth column sidewall defines a longitudinal gap therein, the longitudinal gap extending along a length of the fourth column sidewall;

at least one upper junction connector coupled to the upper end of the at least one column, each of the at least one upper junction connector comprising:

an upper end having first, second, third, and fourth edges, wherein the first edge overlies the first column sidewall, the second edge overlies the second column sidewall, the third edge overlies the third column sidewall, and the fourth edge overlies the fourth column sidewall, wherein the upper end has a planar upper surface, a recessed surface, and at least one connector sidewall extending between the upper surface and the recessed surface, the recessed surface and the at least one connector sidewall defining a contiguous recessed area in the upper end that extends to the second, third, and fourth edges of the upper end of the connector, wherein a slot extends through the upper end adjacent to an interior surface of the first column sidewall, and wherein a bore extends through the recessed surface;

a first lateral connector extending generally perpendicular to the first column sidewall proximate the upper end of the at least one column; and a second lateral connector extending generally perpendicular to one of the second and third column sidewall proximate the upper end of the at least one column;

wherein a transverse bore extends through the first column sidewall proximate to and aligned with the slot; and wherein:

the at least one column comprises a first column and a second column;

the at least one upper junction connector comprises a first upper junction connector and a second upper junction connector, wherein the first upper junction connector is coupled to the upper end of the first column, and wherein the second upper junction connector is coupled to the upper end of the second column; and the connection assembly further comprising:

a lateral tie member for securing the first upper junction connector and the second upper junction connector in a fixed orientation, the lateral tie member comprising a generally planar body having an upper surface, a lower surface, and an outer perimeter face extending from the upper surface to the lower surface, wherein a first portion of the lateral tie member is dimensioned to seat within the recessed area of the first upper junction connector, wherein a first portion of the outer perimeter face abuts the at least one connector sidewall of the first upper junction connector, and wherein the upper surface of the first portion of the lateral tie member is flush with or recessed from the upper surface of the upper end of the first upper junction connector, and wherein a second portion of the lateral tie member is dimensioned to seat within the recessed area of the second upper junction connector, wherein a second portion of the outer perimeter face abuts the at least one connector sidewall of the second upper junction connector, and wherein the upper surface of the second portion of the lateral tie member is flush with or recessed from the upper surface of the upper end of the second upper junction connector.

11. The connection assembly of claim 10, wherein:

the at least one column further comprises a third column, the at least one upper junction connector further comprises a third upper junction connector coupled to the upper end of the third column, and wherein a third portion of the lateral tie member is dimensioned to seat within the recessed area of the third upper junction connector, wherein a third portion of the outer perimeter face abuts the at least one connector sidewall of the third upper junction connector, and wherein the upper surface of the third portion of the lateral tie member is flush with or recessed from the upper surface of the upper end of the third upper junction connector.

12. The connection assembly of claim 11, wherein:

the at least one column further comprises a fourth column, the at least one upper junction connector further comprises a fourth upper junction connector coupled to the upper end of the fourth column, and wherein a fourth portion of the lateral tie member is dimensioned to seat within the recessed area of the fourth upper junction connector, wherein a fourth portion of the outer perimeter face abuts the at least one connector sidewall of the fourth upper junction connector, and wherein the upper surface of the fourth portion of the lateral tie member is flush with or recessed from the upper surface of the upper end of the fourth upper junction connector.

13. A connection assembly for modular construction, the assembly comprising:

at least one column having an upper end, a lower end, and a first column sidewall, a second column sidewall, a third column sidewall, and a fourth column sidewall, the first, second, third, and fourth column sidewalls extending between the upper end and the lower end, wherein the fourth column sidewall defines a longitudinal gap therein, the longitudinal gap extending along a length of the fourth column sidewall;

at least one upper junction connector coupled to the upper end of the at least one column, each of the at least one upper junction connector comprising:

an upper end having first, second, third, and fourth edges, wherein the first edge overlies the first column sidewall, the second edge overlies the second column sidewall, the third edge overlies the third column sidewall, and the fourth edge overlies the fourth column sidewall, wherein the upper end has a planar upper surface, a recessed surface, and at least one connector sidewall extending between the upper surface and the recessed surface, the recessed surface and the at least one connector sidewall defining a contiguous recessed area in the upper end that extends to the second, third, and fourth edges of the upper end of the connector, wherein a slot extends through the upper end adjacent to an interior surface of the first column sidewall, and wherein a bore extends through the recessed surface;

a first lateral connector extending generally perpendicular to the first column sidewall proximate the upper end of the at least one column; and a second lateral connector extending generally perpendicular to one of the second and third column sidewall proximate the upper end of the at least one column;

wherein a transverse bore extends through the first column sidewall proximate to and aligned with the slot;

an upper column having an upper end, a lower end, and a first column sidewall, a second column sidewall, a third column sidewall, and a fourth column sidewall, the first, second, third, and fourth column sidewalls extending between the upper end and the lower end, wherein the fourth column sidewall defines a longitudinal gap therein, the longitudinal gap extending along a length of the fourth column sidewall;

a lower junction connector coupled to the lower end of the upper column, the lower junction connector comprising:

a lower end having first, second, third, and fourth edges, wherein the first edge overlies the first column sidewall of the upper column, the second edge overlies the second column sidewall of the upper column, the third edge overlies the third column sidewall of the upper column, and the fourth edge overlies the fourth column sidewall of the upper column, wherein the lower end has a planar lower surface, and a securement tab projecting downwardly from the lower end, the securement tab having a transverse bore; and a securement bolt for securing one of the at least one upper junction connector and the lower junction connector in a fixed orientation, wherein, when the securement tab of the lower junction connector is received in the slot of the one of the at least one upper junction connector, and the lower surface of the lower end of the lower junction connector abuts the upper surface of the upper end of the one of the at least one upper junction connector, the securement bolt is positioned in both the transverse bore that extends through the first column sidewall and through the transverse bore of the securement tab, such that the one of the at least one upper junction connector and the lower junction connector are secured to each other in a fixed orientation.

14. The connection assembly of claim 13, wherein the securement tab is mechanically coupled to the lower junction connector.

15. A connection assembly for modular construction, the assembly comprising:

an upper junction connector coupled to the upper end of a column, the column having a column sidewall, the upper junction connector comprising:

an upper end having first, second, third, and fourth edges, and a planar upper surface wherein a slot extends through the upper end adjacent to an interior surface of the column sidewall, and wherein a transverse bore extends through the column sidewall proximate to and aligned with the slot; and at least one lateral connector extending generally perpendicular to the column sidewall proximate the upper end of the column; and a powered actuator configured to drive a securement bolt through the transverse bore and through a corresponding transverse bore in a securement tab extending from a lower junction connector and through the slot.

16. The connection assembly of claim 15, wherein the actuator is at least one of a linear actuator and a rotary actuator.

* * * * *